United States Patent [19]

Ito et al.

[11] Patent Number: 5,775,099
[45] Date of Patent: Jul. 7, 1998

[54] METHOD OF PURIFYING THE EXHAUST OF AN INTERNAL COMBUSTION ENGINE

[75] Inventors: Yasushi Ito, Susono; Zenichiro Mashiki, Toyota, both of Japan

[73] Assignee: Toyota Jidosha Kabushiki Kaisha, Aichi, Japan

[21] Appl. No.: 716,394

[22] PCT Filed: Oct. 11, 1995

[86] PCT No.: PCT/JP95/02078

§ 371 Date: Nov. 19, 1996

§ 102(e) Date: Nov. 19, 1996

[87] PCT Pub. No.: WO96/22457

PCT Pub. Date: Jul. 25, 1996

[30] Foreign Application Priority Data

| Apr. 12, 1994 | [JP] | Japan | 6-73422 |
| Jan. 20, 1995 | [JP] | Japan | 7-007363 |
| Jan. 20, 1995 | [JP] | Japan | 7-007457 |
| Feb. 13, 1995 | [JP] | Japan | 7-023914 |

[51] Int. Cl.⁶ .......................................... F01N 3/20
[52] U.S. Cl. ........................ 60/274; 60/286; 60/301; 023/430
[58] Field of Search ........................ 60/173, 301, 286; 123/430

[56] References Cited

FOREIGN PATENT DOCUMENTS

| 3-124909 | 5/1991 | Japan. |
| 3-160130 | 7/1991 | Japan. |
| 4-31649 | 2/1992 | Japan. |
| 4-231645 | 8/1992 | Japan. |
| A4-231645 | 8/1992 | Japan. |
| 4-80207 | 12/1992 | Japan. |
| 5-10137 | 1/1993 | Japan. |
| 5-231221 | 9/1993 | Japan. |
| 5-321795 | 12/1993 | Japan. |
| 5-340258 | 12/1993 | Japan. |
| A6-108824 | 4/1994 | Japan. |
| 6-137194 | 5/1994 | Japan. |
| A6-212961 | 8/1994 | Japan. |
| WO 93/07363 | 4/1993 | WIPO. |
| WO93/07363 | 4/1993 | WIPO. |

OTHER PUBLICATIONS

Bulletin of The Japan Institute of Metals (1993), vol. 32, No. 5, pp. 441–443.

*Primary Examiner*—Douglas Hart
*Attorney, Agent, or Firm*—Kenyon & Kenyon

[57] ABSTRACT

At the time of engine low load operation, the air-fuel mixture is stratified in the state where the average air-fuel ratio in the combustion chamber (5) is lean. The $NO_x$ generated at this time is absorbed by the $NO_x$ absorbent (26) provided in the exhaust passage. When making the average air-fuel ratio in the combustion chamber (5) rich so as to cause the releasing of the $NO_x$ from the $NO_x$ absorbent (26), the air-fuel ratio of the air-fuel mixture around the spark plug (10) is kept from changing and the average air-fuel ratio in the combustion chamber (5) is changed from lean to rich.

39 Claims, 109 Drawing Sheets

5,775,099

METHOD OF PURIFYING THE EXHAUST OF AN INTERNAL COMBUSTION ENGINE

TECHNICAL FIELD

The present invention relates to a method of purifying the exhaust of an internal combustion engine.

BACKGROUND ART

An internal combustion engine which provides in the engine exhaust passage an $NO_x$ absorbent which absorbs $NO_x$ when the air-fuel ratio of the inflowing exhaust gas inflowing into the $NO_x$ absorbent is lean and releases the absorbed $NO_x$ when the air-fuel ratio of the inflowing exhaust gas is made the stoichiometric air-fuel ratio or rich and is designed to normally make the air-fuel ratio of the air-fuel mixture supplied to the engine lean and at this time make the $NO_x$ exhausted from the engine be absorbed by the $NO_x$ absorbent and to make the air-fuel mixture supplied to the engine rich when causing the releasing of the $NO_x$ absorbed in the $NO_x$ absorbent has already been proposed by the applicant (see PCT International Publication WO93/07363).

However, in a stratified combustion type internal combustion engine designed to stratify the air-fuel mixture formed in the combustion chamber so as to form an air-fuel mixture ignitable in a limited region of part of the inside of the combustion chamber, when this type of stratification action is performed, if the supplied fuel were merely increased so as to change the average air-fuel ratio inside the combustion chamber from lean to rich so as to releasing the $NO_x$ from the $NO_x$ absorbent, the air-fuel mixture formed in the limited region of part of the inside of the combustion chamber would become overly rich and as a result the spark plug would not be able to ignite the air-fuel mixture well, so there would be the problem that misfires would occur.

Further, if, as in the above internal combustion engine, the air-fuel mixture supplied to the engine were merely made rich so as to releasing the $NO_x$ from the $NO_x$ absorbent, the output torque of the engine would rapidly increase, so the problem would also arise that a shock would be generated.

DISCLOSURE OF THE INVENTION

The object of the present invention is to provide a method of purifying the exhaust able to prevent the occurrence of misfires when increasing the supplied fuel so as to releasing the $NO_x$ from the $NO_x$ absorbent.

According to the present invention, there is provided a method of purifying the exhaust of an internal combustion engine providing in the engine exhaust passage an $NO_x$ absorbent which absorbs the $NO_x$ when the air-fuel ratio of the inflowing exhaust gas inflowing into the $No_x$ absorbent is lean and releasing the $NO_x$ absorbed when the air-fuel ratio of the inflowing exhaust gas is made the stoichiometric air-fuel ratio or rich, wherein, when in a lean air-fuel mixture combustion operating state where the air-fuel mixture is burned in a state with a lean average air-fuel ratio in the combustion chamber, the air-fuel mixture formed in the combustion chamber is stratified to form an ignitable air-fuel mixture in a limited region of part of the inside of the combustion chamber and the $NO_x$ produced at this time is made to be absorbed in the $NO_x$ absorbent and when releasing the $NO_x$ from the $NO_x$ absorbent when in the lean air-fuel mixture combustion operating state, the average air-fuel ratio in the combustion chamber is changed from lean to the stoichiometric air-fuel ratio or rich and the amount of fluctuation of the ignitable air-fuel ratio of the air-fuel mixture formed in the limited region of part of the inside of the combustion chamber at this time is made smaller than the amount of reduction of the average air-fuel ratio.

BEST MODE FOR WORKING THE INVENTION

FIG. 1 to FIG. 18 show a first embodiment of the application of the present invention to an in-cylinder injection type internal combustion engine. First of all, an explanation will be made of the basic operation of the in-cylinder injection type internal combustion engine with reference to FIG. 1 to FIG. 10.

Figure 1:
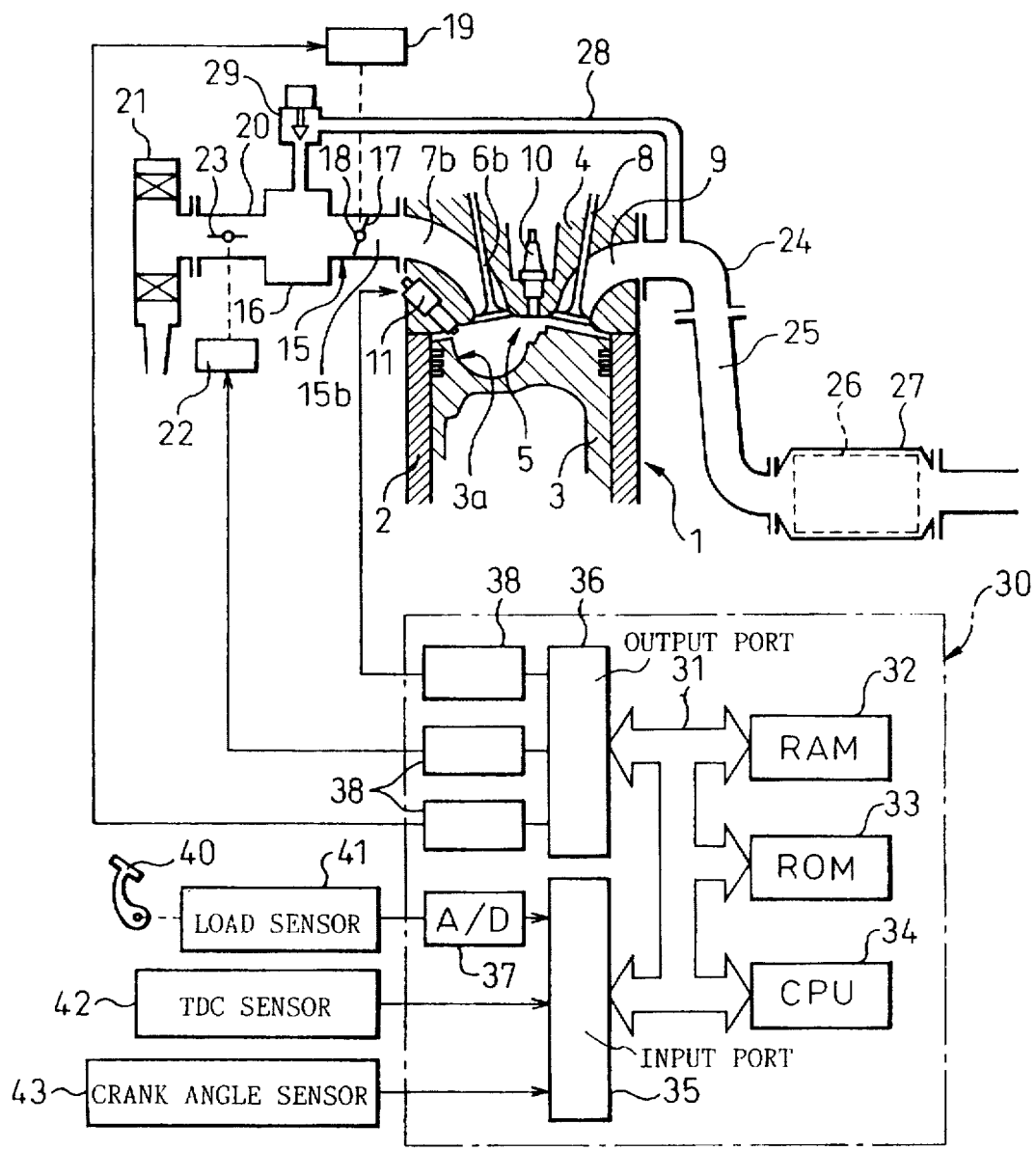
FIG. 1 is an overview of an internal combustion engine showing by a cross-section the engine body.
Figure 2:
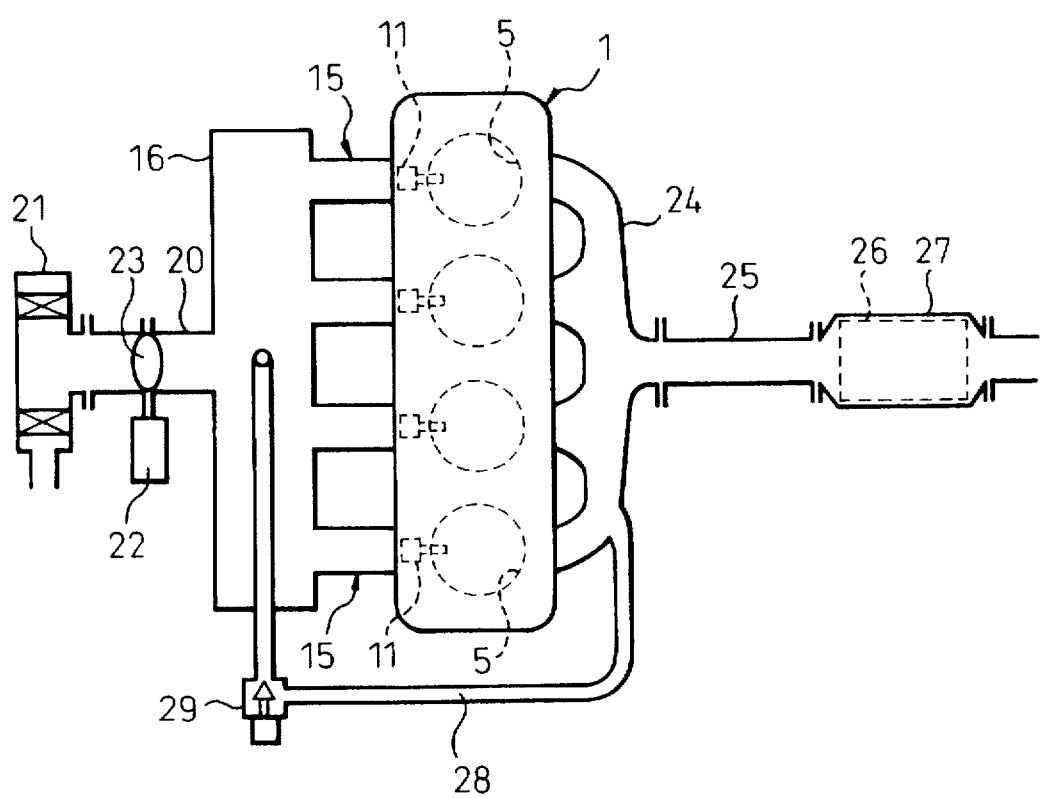
FIG. 2 is a plan view schematically showing the overall internal combustion engine shown in FIG. 1.
Figure 3:
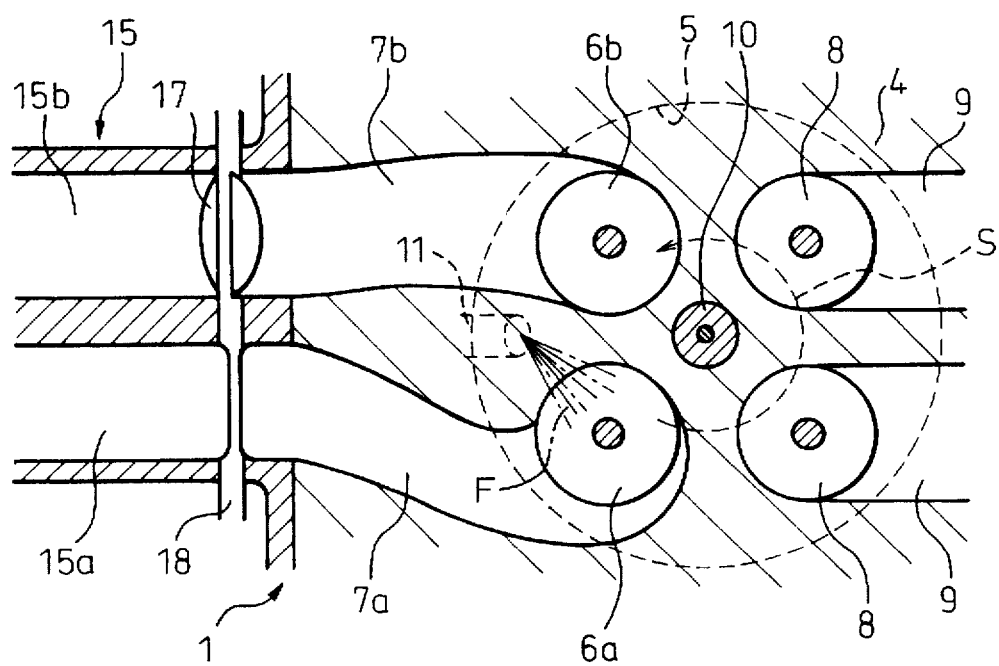
FIG. 3 is a plan cross-sectional view of a cylinder head.
Figure 4:
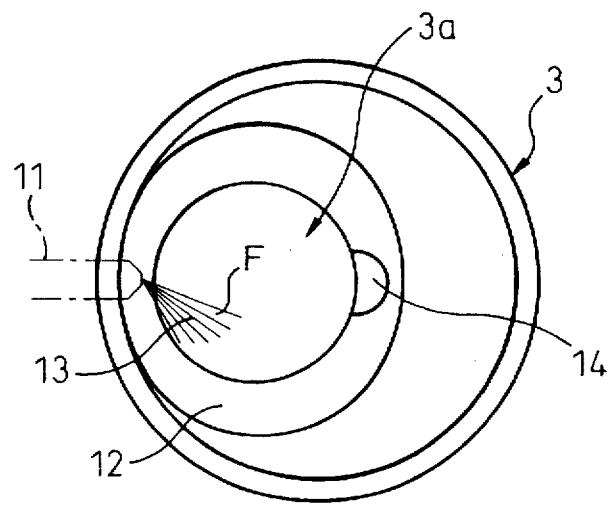
FIG. 4 is a plan view of a piston top surface.
Figure 5:
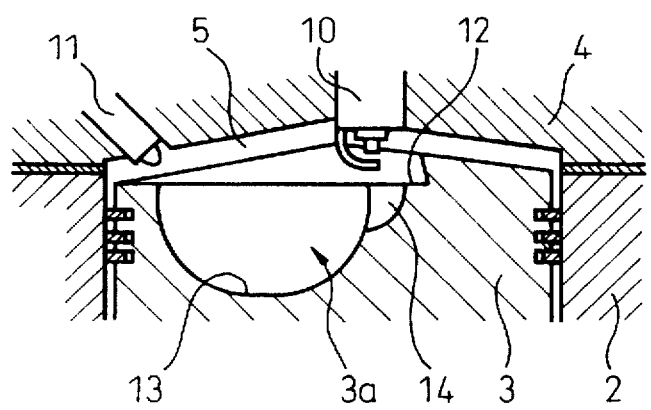
FIG. 5 is a side cross-sectional view of FIG. 3.

Referring to FIG. 1 to FIG. 5, 1 is an engine body, 2 is a cylinder block, 3 is a piston moving reciprocatively in the cylinder block 2, 4 is a cylinder head fastened on the top of the cylinder block 2, 5 is a combustion chamber formed between a piston 3 and cylinder head 4, 6a is a first intake valve, 6b is a second intake valve, 7a is a first intake port, 7b is a second intake port, 8 is a pair of exhaust valves, and 9 is a pair of exhaust ports. As shown in FIG. 3, the first intake port 7a is comprised of a helical intake port, while the second intake port 7b is comprised of a substantially straightward extending straight port. Further, as shown in FIG. 3, a spark plug 10 is arranged at the center of the inner wall of the cylinder head 4, while a fuel injector 11 is arranged near the inner wall of the cylinder head 4 between the first intake valve 6a and second intake valve 6b. On the other hand, as shown in FIG. 4 and FIG. 5, a cavity 3a is formed in the top surface of the piston 3. This cavity 3a is comprised of a shallow dish portion 12 extending from below the fuel injector 11 to below the spark plug 10 and having a substantially circular shaped contour and a deep dish portion 13 formed at the center of the shallow dish portion 12 and having a semispherical shape. Further, a recessed portion 14 having a substantially spherical shape is formed at the connection portion of the shallow dish portion 12 and deep dish portion 13 under the spark plug 10.

As shown in FIG. 1 to FIG. 3, the first intake port 7a and second intake port 7b of each of the cylinders are connected to the inside of a surge tank 16 through a first intake passage 15a and second intake passage 15b formed in the intake pipes 15. In each of the second intake passages 15b is arranged an intake control valve 17. These intake control valves 17 are connected to an actuator 19 comprised of for example a step motor through a common shaft 18. This step motor 19 is controlled by the output signal of an electronic control unit 30. The surge tank 16 is connected to an air cleaner 21 through an intake duct 20. Inside the intake duct 20 is arranged a throttle valve 23 driven by for example a step motor 22. This step motor 22 is also controlled based on the output signal of the electronic control unit 30.

On the other hand, the exhaust port 9 of each of the cylinders is connected to an exhaust manifold 24, while this exhaust manifold 24 is connected through an exhaust pipe 25 to a casing 27 housing an $NO_x$ absorbent 26. The exhaust manifold 24 and the surge tank 16 are connected with each other through an exhaust recirculation gas (hereinafter referred to as EGR gas) passage 28. In this EGR gas passage 28 is disposed an EGR valve 29 for controlling the amount of EGR gas. This EGR valve 29 is controlled by an output signal of the electronic control unit 30. When the EGR valve 29 is closed, only air is supplied through the intake ports 7a and 7b into the combustion chamber 5, while when the EGR valve 29 is opened, air and EGR gas are supplied through the intake ports 7a and 7b into the combustion chamber 5.

The electronic control unit 30 is comprised of a digital computer which is provided with a RAM (random access memory) 32, ROM (read only memory) 33, CPU (microprocessor) 34, input port 35, and output port 36 connected with each other by a bidirectional bus 31. An accelerator pedal 40 has connected to it a load sensor 41 for generating an output voltage proportional to the amount of depression of the accelerator pedal 40. The output voltage of the load sensor 41 is input through an AD converter 37 to the input port 35. A top dead center sensor 42 for example generates an output pulse when the no. 1 cylinder reaches the intake top dead center. This output pulse is input to the input port 35. The crank angle sensor 43 generates an output pulse each time when for example the crank shaft turns 30 degrees. This output pulse is input to the input port 35. In the CPU 34, the current crank angle is calculated from the output pulse of the top dead center sensor 42 and the output pulse of the crank angle sensor 43. The engine rotational speed is calculated from the output pulse of the crank angle sensor 43. On the other hand, the output port 36 is connected through the corresponding drive circuit 38 to the fuel injectors 11 and the step motors 19 and 22.

Figure 6:
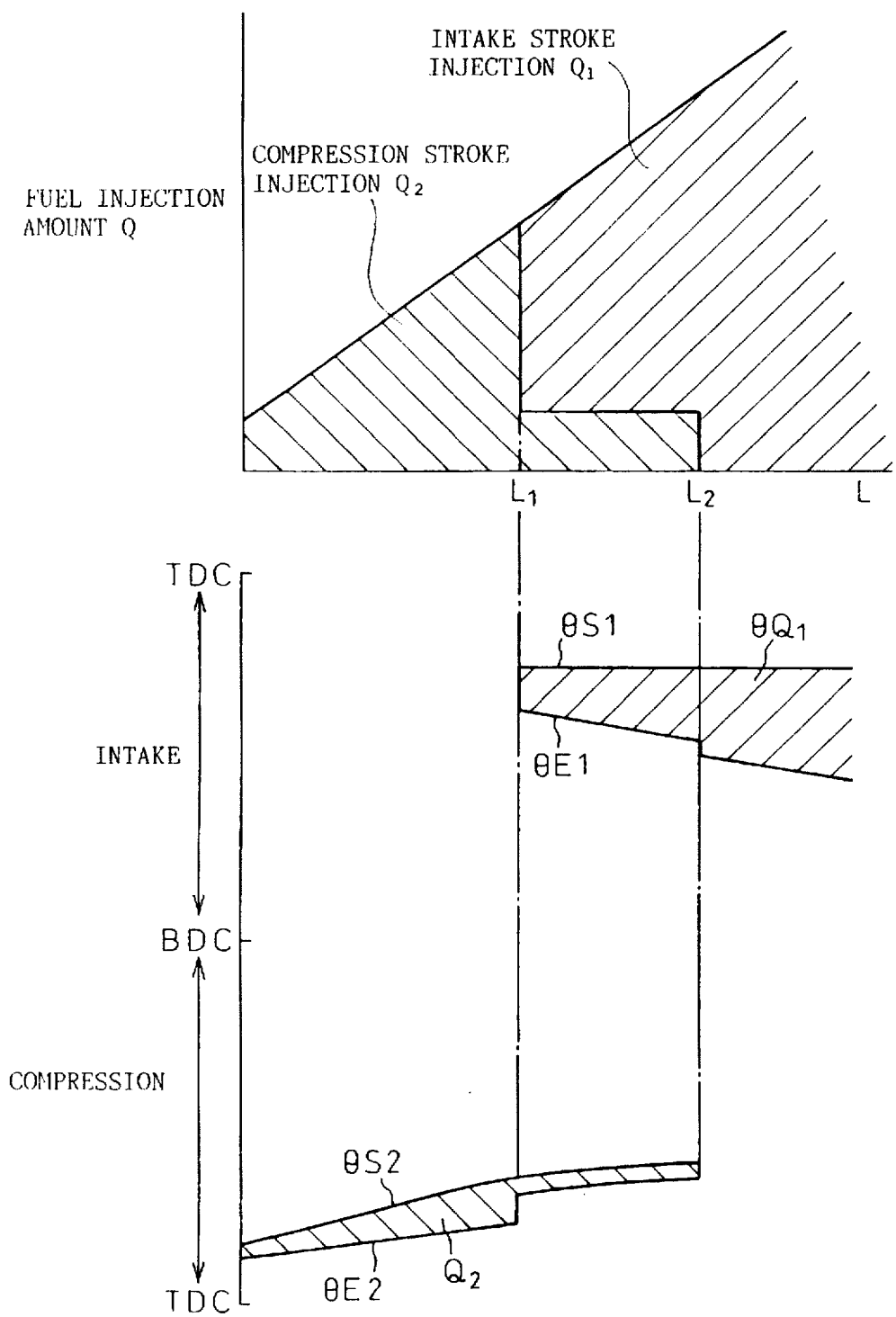
FIG. 6 is a view showing the fuel injection amount and fuel injection timing.
Figure 7:
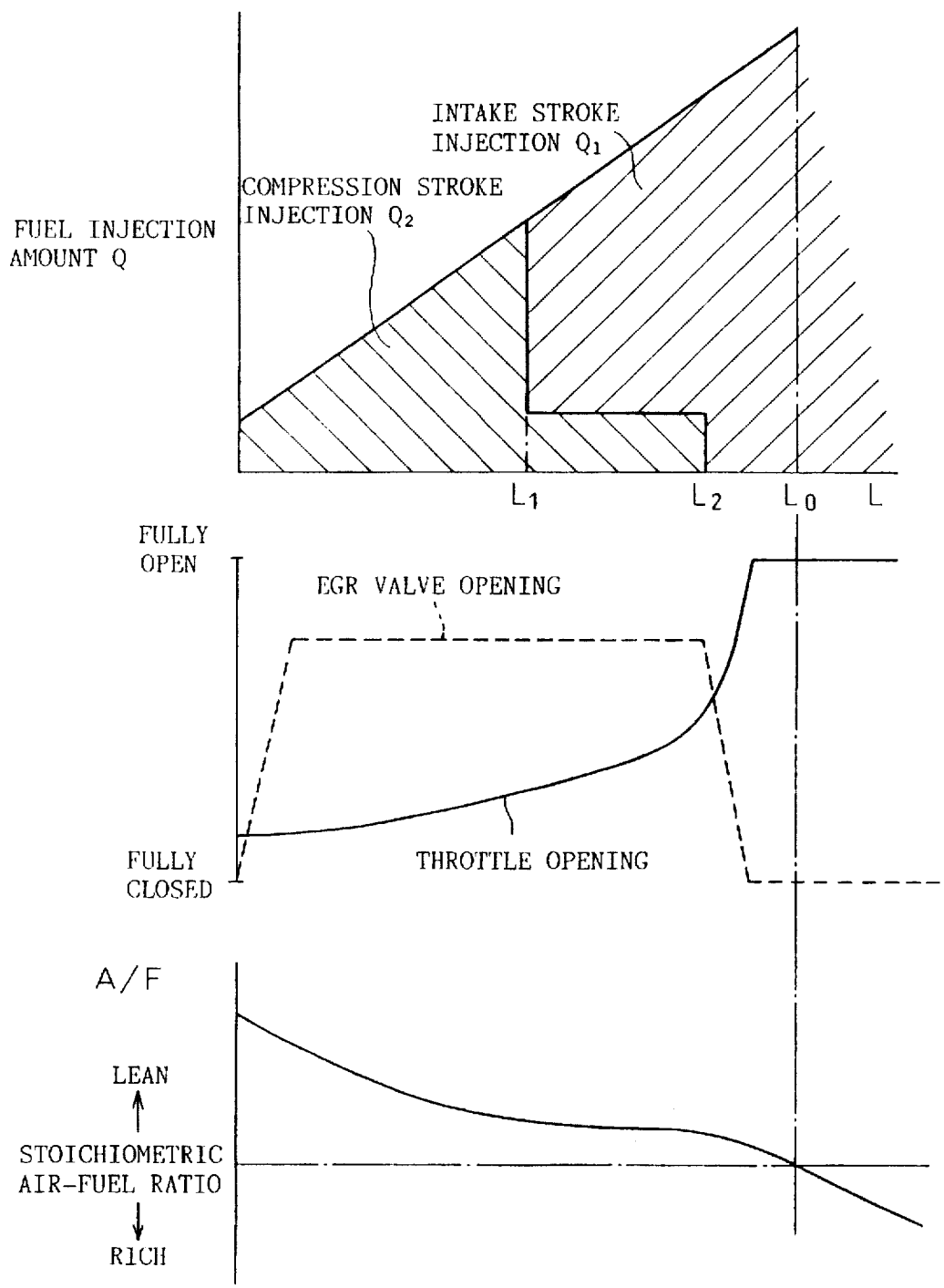
FIG. 7 is a view showing the fuel injection amount, throttle opening, EGR valve opening, and average air-fuel ratio inside the combustion chamber.

In the embodiments shown in FIG. 1 to FIG. 5, the fuel injector 11 is comprised of a swirl valve which gives a swirling force to the fuel when injecting it. From this fuel injector 11, as shown by F in FIG. 3 and FIG. 4, fuel is injected in a conical shape. FIG. 6 shows the amount of fuel injected from this fuel injector 11 and the fuel injection timing, while FIG. 7 shows, like in FIG. 6, the fuel injection amount plus the opening of the throttle valve 23, the opening of the EGR valve 29, and the average air-fuel ratio A/F in the combustion chamber 5. Note that, in FIG. 6 and FIG. 7, L shows the amount of depression of the accelerator pedal 40. As understood from FIG. 6, at the time of engine low load operation when the amount of depression L of the accelerator pedal 40 is smaller than $L_1$, fuel is injected by exactly the amount of injection $Q_2$ at the end of the compression stroke. On the other hand, at the time of engine medium load operation when the amount of depression L of the accelerator pedal 40 is between $L_1$ and $L_2$, fuel is injected by exactly the amount of injection $Q_1$ during the intake stroke and fuel is injected by exactly the amount of injection $Q_2$ at the end of the compression stroke. That is, at the time of engine medium load operation, the fuel injection is divided into the two periods of the intake stroke and the end of the compression stroke. Further, at the time of engine high load operation when the amount of depression L of the accelerator pedal 40 is larger than $L_2$, fuel is injected by exactly the amount of injection $Q_1$ during the intake stroke. Note that, in FIG. 6, $\theta S1$ and $\theta E1$ show the injection starting time and injection ending time of the fuel injection $Q_1$, performed in the intake stroke, while $\theta S2$ and $\theta E2$ show the injection starting time and injection ending time at the fuel injection $Q_2$ performed at the end of the compression stroke.

On the other hand, as shown in FIG. 7, at the time of low and medium low operation of the engine when the amount of depression L of the accelerator pedal 40 is smaller than $L_2$, the opening of the throttle valve 23 is considerably small. Further, at this time, the opening of the throttle valve 23 becomes smaller the smaller the amount of depression L of the accelerator pedal 40. On the other hand, when the amount of depression L of the accelerator pedal 40 is larger than $L_2$, the opening of the throttle valve 23 rapidly becomes larger to result in full opening. Further, at the time of low and medium low operation of the engine when the amount of depression L of the accelerator pedal 40 is smaller than $L_2$, the opening of the EGR valve 29 is considerably large. When the amount of depression L of the accelerator pedal 40 becomes larger than even $L_2$, the opening of the EGR valve 29 rapidly becomes smaller to result in full closed. The average air-fuel ratio in the combustion chamber 5 changes from lean to rich at a certain point of time $L_0$ in the high load operation region ($L<L_2$). That is, in the range where the amount of depression L of the accelerator pedal 40 is smaller than $L_0$, the average air-fuel ratio A/F becomes lean. Further, at this time, the smaller the amount of depression L of the accelerator pedal 40, the leaner the average air-fuel ratio A/F becomes. On the other hand, if the amount of depression L of the accelerator pedal 40 becomes larger than $L_0$, the average air-fuel ratio A/F becomes rich.

Figure 8:
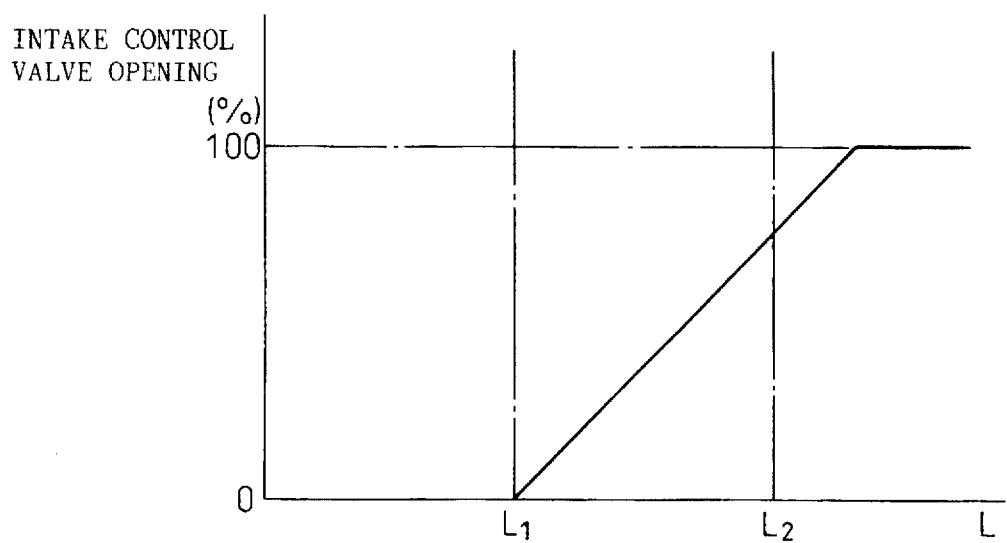
FIG. 8 is a graph showing the opening of an intake control valve.

FIG. 8 shows the relationship between the opening of the intake control valve 17 and the amount of depression L of the accelerator pedal 40. As shown in FIG. 8, at the time of engine low load operation when the amount of depression L of the accelerator pedal 40 is smaller than $L_1$, the intake control valve 17 is held in the fully closed state. When the amount of depression L of the accelerator pedal 40 becomes larger than $L_1$, the intake control valve 17 is made to open the larger the amount of depression L of the accelerator pedal 40. When the intake control valve 17 is fully closed, the intake air intake air flows into the combustion chamber 5 while swirling through the helically shaped first intake port 7a, therefore a strong swirl flow is generated in the combustion chamber 5 as shown by the arrow mark S in FIG. 3. On the other hand, when the intake control valve 17 opens, the intake air flows into the combustion chamber 5 from the second intake port 7b as well.

Figure 9A:
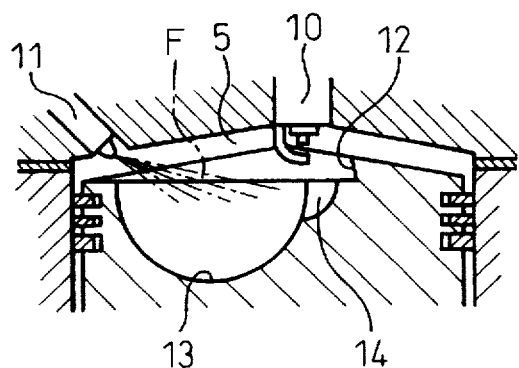
FIG. 9A, FIG. 9B, and FIG. 9C are views for explaining the method of combustion at times of low load operation.
Figure 9B:
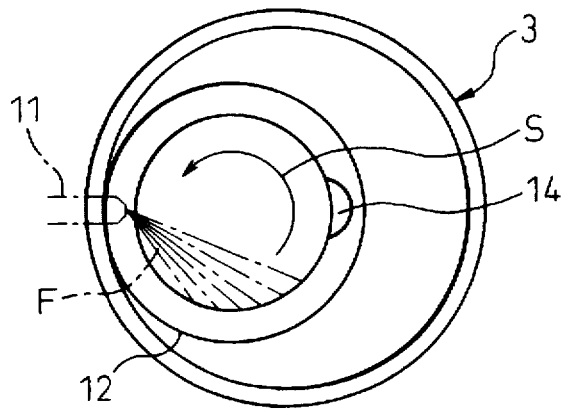
Figure 9C:
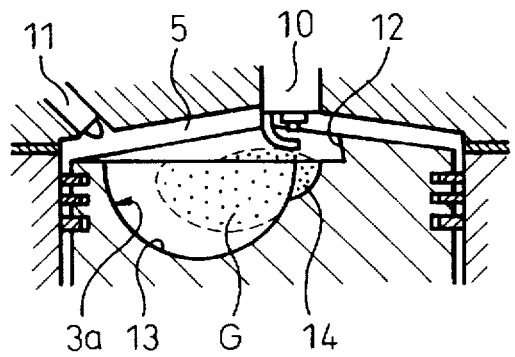
Figure 10A:
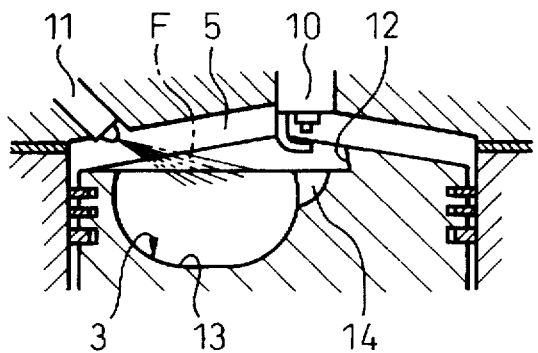
FIG. 10A, FIG. 10B, and FIG. 10C are views for explaining the method of combustion at times of medium load operation.
Figure 10B:
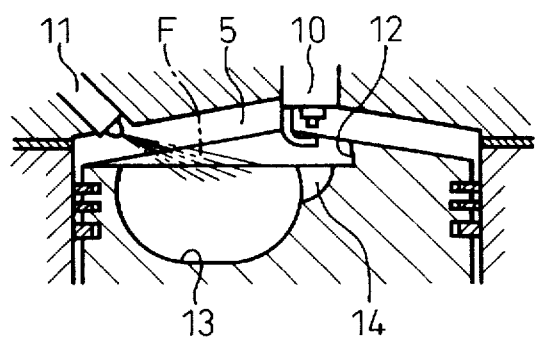
Figure 10C:
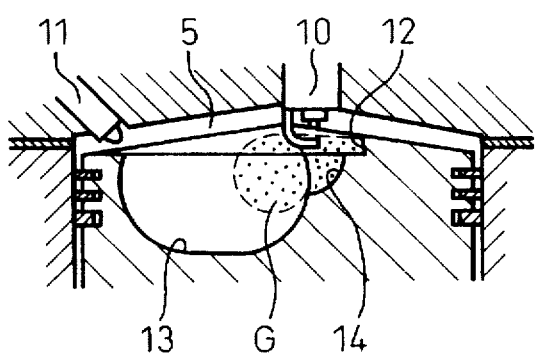

Next, an explanation will be made of the method of combustion with reference to FIG. 9A, FIG. 9B, FIG. 9C, FIG. 10A, FIG. 10B, and FIG. 10C. Note that FIG. 9A, FIG. 9B, and FIG. 9C show the method of combustion at the time of engine low load operation, while FIG. 10A, FIG. 10B, and FIG. 10C show the method of combustion at the time of engine medium load operation.

As shown in FIG. 6, at the time of an engine load operation where the amount of depression L of the accelerator pedal 40 is smaller than $L_1$, fuel is injected at the end of the compression stroke. At this time, the injected fuel F strikes the peripheral wall of the deep dish portion 13 as shown in FIG. 9A and FIG. 9B. At this time, the fuel injection $Q_2$ increases as the amount of depression L of the accelerator pedal 40 becomes larger as shown in FIG. 6. The fuel striking the peripheral wall of the deep dish portion 13 is diffused while being vaporized by the swirl flow S. Due to this, as shown in FIG. 9C, the combustible air-fuel mixture G is formed in the recessed portion 14 and deep dish portion 13, that is, in the cavity 3a. At this time, the inside of the combustion chamber 5 other than the recessed portion 14 and deep dish portion 13 is filled with air and EGR gas. Next, the air-fuel mixture G is made to ignite by the spark plug 10.

On the other hand, in FIG. 6, at the time of engine medium load operation when the amount of depression L of the accelerator pedal 40 is between $L_1$ and $L_2$, the first fuel injection $Q_1$ is performed during the intake stroke, then the second fuel injection $Q_2$ is performed at the end of the compression stroke. That is, first of all, as shown in FIG. 10A, at the start of the intake stroke, fuel injection F is performed toward the cavity 3a. This injected fuel causes a lean air-fuel mixture to be formed in the combustion chamber 5. Next, as shown in FIG. 10B, fuel injection F is performed toward the cavity 3a at the end of the compression stroke. As shown in FIG. 10C, this injected fuel causes the combustible air-fuel mixture G serving as the ignition source to be formed in the recessed portion 14b and deep dish portion 13. This combustible air-fuel mixture G is ignited by the spark plug 10. The flame of ignition causes the lean air-fuel mixture in the combustion chamber 5 as a whole to burn. In this case, the fuel injected at the end of the compression stroke is sufficient if an ignition source is produced, so as shown in FIG. 6 at the time of engine medium load operation, regardless of the amount of depression L of the accelerator pedal 40, the fuel injection amount $Q_2$ at the end of the compression stroke is kept constant. As opposed to this, the fuel injection amount $Q_1$ at the start of the intake stroke increases along with an increase in the amount of depression L of the accelerator pedal 40.

At FIG. 6, at the time of engine high load operation when the amount of depression L of the accelerator pedal 40 is larger than $L_2$, fuel is injected just once at the start of the intake stroke. Due to this, a homogeneous air-fuel mixture is formed inside the combustion chamber 15. At this time, the fuel injection amount at the start of the intake stroke, as shown in FIG. 6, increases along with the increase of the amount of depression L of the accelerator pedal 40.

The above was the basic method of combustion of the in-cylinder injection type internal combustion engine shown in FIG. 1. Next, an explanation will be made of a method of purifying exhaust gas suited to this in-cylinder injection type internal combustion engine.

Figure 11:
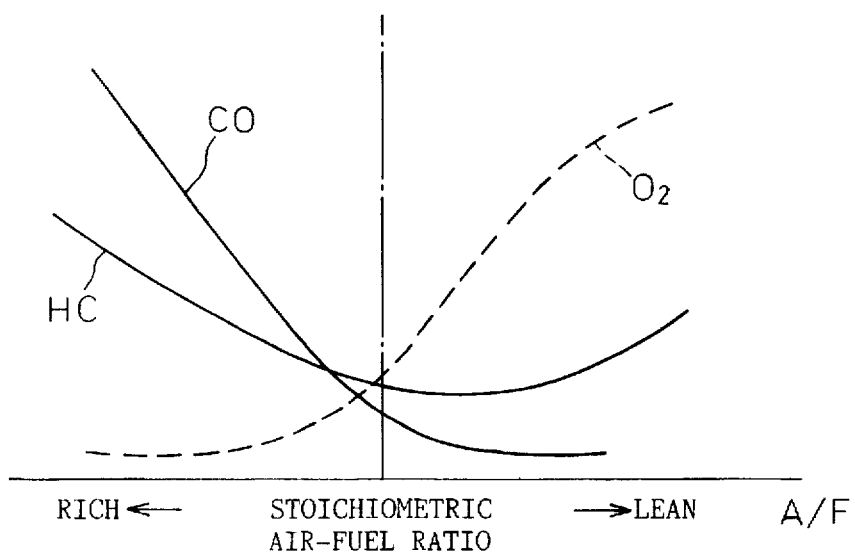
FIG. 11 is a view of the concentrations of CO, HC, and $O_2$ in the exhaust gas.

First of all, referring to FIG. 11, FIG. 11 shows roughly the relationship between the concentration of typical components in the exhaust gas exhausted from the combustion chamber 5 and the average air-fuel ratio A/F in the combustion chamber 5. As will be understood from FIG. 11, the concentrations of the unburnt HC and CO in the exhaust gas exhausted from the combustion chamber 5 increase the richer the average air-fuel ratio A/F in the combustion chamber 5, while the concentration of oxygen $O_2$ in the exhaust gas exhausted from the combustion chamber 5 becomes larger the leaner the average air-fuel ratio A/F in the combustion chamber 5.

On the other hand, the $NO_x$ absorbent 26 housed in the casing 27 shown in FIG. 1 for example uses alumina as a carrier and carries on the carrier for example at least one of an alkali metal such as potassium K, sodium Na, lithium Li, and cesium Cs, an alkali earth such as barium Ba or calcium Ca, and a rare earth such as lanthanum La or yttrium Y and a precious metal such as platinum Pt. Referring to the ratio of the total amount of air supplied to the engine intake passage, combustion chamber 5, and exhaust passage upstream of the $NO_x$ absorbent 26 to the total amount of fuel (hydrocarbons) as the air-fuel ratio of the exhaust gas flowing to the $NO_x$ absorbent 26, the $NO_x$ absorbent 26 engages in an $NO_x$ absorption and releasing action of absorbing the $NO_x$ when the air-fuel ratio of the inflowing exhaust gas flowing into the $NO_x$ absorbent of is lean and releasing the absorbed $NO_x$ when the oxygen concentration in the inflowing exhaust gas falls. Note that, when fuel (hydrocarbons) or air is not supplied to the exhaust passage upstream of the $NO_x$ absorbent 26, the air-fuel ratio of the inflowing exhaust gas matches with the average air-fuel ratio A/F in the combustion chamber 5. Accordingly, in this case, the $NO_x$ absorbent 26 absorbs $NO_x$ when the average air-fuel ratio A/F in the combustion chamber 5 is lean and releases the absorbed $NO_x$ when the oxygen concentration in the gas in the combustion chamber 5 falls.

The $NO_x$ absorbent 26 performs the actual $NO_x$ absorption and releasing action by the above $NO_x$ absorbent 26 being arranged inside the engine exhaust passage, but portions of the detailed mechanism of this absorption and releasing action are not clear. However, this absorption and releasing action is believed to be performed by the mechanism shown in FIG. 12A and FIG. 12B. Next, while the explanation was made taking as an example the case of carrying platinum Pt and barium Ba on the carrier, a similar mechanism results even with use of other precious metals, alkali metals, alkali earths, and rare earths.

Figure 12A:
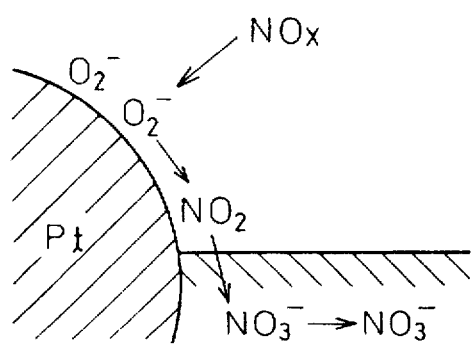
FIG. 12A and FIG. 12B are views for explaining the absorption and releasing action of $NO_x$ of an $NO_x$ absorbent.

That is, when the average air-fuel ratio A/F in the combustion chamber 5 is lean and, accordingly, when the inflowing exhaust gas is lean, the oxygen concentration in the inflowing exhaust gas becomes high. At this time, as shown in FIG. 12A, the oxygen $O_2$ adheres to the surface of the platinum Pt in the form of $O_2^-$ or $O^{2-}$. On the other hand, the NO in the inflowing exhaust gas reacts with the $O_2^-$ or $O^{2-}$ on the surface of the platinum Pt to become $NO_2$ ($2NO+O_2 \rightarrow 2NO_2$). Next, part of the $NO_2$ which is produced is absorbed in the absorbent while being oxidized on the platinum Pt and diffuses in the absorbent in the form of nitrate ions $NO_3^-$ while bonding with the barium oxide BaO as shown in FIG. 12A. In this way, the $NO_x$ is absorbed in the $NO_x$ absorbent 26.

So long as the oxygen concentration in the inflowing exhaust gas is high, $NO_2$ is produced on the surface of the platinum Pt. So long as the $NO_x$ absorbing ability of the absorbent does not become saturated, the $NO_2$ is absorbed in the absorbent and nitrate ions $No_3^-$ are produced. As opposed to this, when the oxygen concentration in the inflowing exhaust gas falls and the amount of production of $NO_2$ falls, the reaction proceeds in the reverse direction ($NO_3^- \rightarrow NO_2$) and therefore the nitrate ions $NO_3^-$ in the absorbent are released in the form of $NO_2$ from the absorbent. That is, when the oxygen concentration in the inflowing exhaust gas falls, $NO_x$ is released from the $NO_x$ absorbent 26. As will be understood from FIG. 11, the lower the degree of leanness of the inflowing exhaust gas, the lower the oxygen concentration in the inflowing exhaust gas. Accordingly, by making the degree of leanness of the inflowing exhaust gas lower, even if the air-fuel ratio of the inflowing exhaust gas is lean, $NO_x$ is released from the $NO_x$ absorbent 26.

Figure 12B:
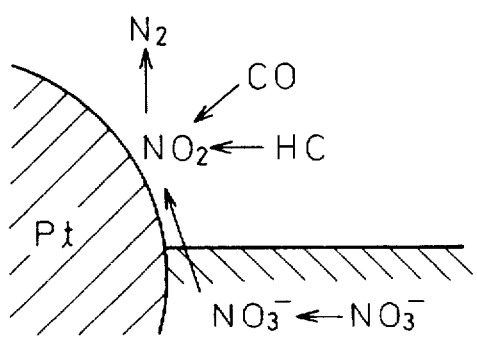

On the other hand, if at this time the average air-fuel ratio A/F in the combustion chamber 3 is made rich and the air-fuel ratio of the inflowing exhaust gas becomes rich, as shown in FIG. 11, large amounts of unburnt HC and CO are exhausted from the engine. These unburnt HC and CO are oxidized by reacting with the oxygen $O_2^-$ or $O^{2-}$ on the platinum Pt. Further, when the air-fuel ratio of the inflowing exhaust gas becomes rich, the oxygen concentration in the inflowing exhaust gas falls to an extremely low level, so $NO_2$ is released from the absorbent. This $NO_2$ is reduced by reacting with the unburnt HC and CO as shown in FIG. 12B. When there is no longer any $NO_2$ on the surface of the platinum Pt in this way, $NO_2$ is successively released from the absorbent. Accordingly, if the air-fuel ratio of the inflowing exhaust gas is made rich, $NO_x$ is released from the $NO_x$ absorbent 26 in a short time.

That is, if the air-fuel ratio of the inflowing exhaust gas is made rich, first the unburnt HC and CO immediately are oxidized reacting with the $O_2^-$ or $O^{2-}$ on the platinum Pt. Next, if even after the $O_2^-$ or $O^{-2}$ on the platinum Pt is consumed, there is still unburnt HC and CO left, this unburnt HC and CO reduce the $NO_x$ released from the absorbent and the $NO_x$ exhausted from the engine. Accordingly, by making the air-fuel ratio of the inflowing exhaust gas rich, the $NO_x$ absorbed in the $NO_x$ absorbent 26 is released and further the released $NO_x$ is reduced, so it is possible to prevent the exhaust of $NO_x$ into the atmosphere. Further, since the $NO_x$ absorbent 26 has the function of a reducing catalyst, even if the air-fuel ratio of the inflowing exhaust gas is made the stoichiometric air-fuel ratio, the $NO_x$ released from the $NO_x$ absorbent 26 is reduced. However, when the air-fuel ratio of the inflowing exhaust gas is made the stoichiometric air-fuel ratio, the $NO_x$ is only gradually released from the $NO_x$ absorbent 26, so it takes a somewhat long time to release all of the $NO_x$ absorbed in the $NO_x$ absorbent 26.

As explained above, when the average air-fuel ratio A/F in the combustion chamber 5 is lean, the $NO_x$ is absorbed by the $NO_x$ absorbent 26. However, there are limits to the ability of the $NO_x$ absorbent 26 to absorb the $NO_x$. If the ability of the $NO_x$ absorbent 26 to absorb the $NO_x$ becomes saturated, the $NO_x$ absorbent 26 can no longer absorb the $NO_x$. Accordingly, it is necessary to cause the $NO_x$ to be released from the $NO_x$ absorbent 26 before the ability of the $NO_x$ absorbent 26 to absorb $NO_x$ becomes saturated. Therefore, it is necessary to estimate to what extent the $NO_x$ is absorbed in the $NO_x$ absorbent 26. Therefore, next, an explanation will be made of the method of estimating the amount of $NO_x$ absorption.

When the average air-fuel ratio in the combustion chamber 5 is lean, the amount of $NO_x$ exhausted from the engine per unit time increases and the amount of $NO_x$ absorbed in the $NO_x$ absorbent per unit time increases the higher the engine load. Further, the amount of $NO_x$ exhausted from the engine per unit time increases the higher the engine rotational speed, so the $NO_x$ absorbed in the $NO_x$ absorbent 26 per unit time increases. Accordingly, the amount of $NO_x$ absorbed in the $NO_x$ absorbent per unit time becomes a function of the engine load and engine rotational speed. In this case, the engine load can be expressed by the amount of depression L of the accelerator pedal 40, so the amount of $NO_x$ absorbed in the $NO_x$ absorbent per unit time becomes a function of the amount of depression L of the accelerator pedal 40 and the engine rotational speed N. Accordingly, in the embodiment shown in FIG. 1, the amount A of $NO_x$ absorbed in the $NO_x$ absorbent per unit time is found in advance by experiments as a function of the amount of depression L of the accelerator pedal 40 and engine rotational speed N. This $NO_x$ amount A is stored in advance in the ROM 33 as a function of L and N in the form of the map shown in FIG. 14A.

On the other hand, when the average air-fuel ratio A/F in the combustion chamber 5 becomes the stoichiometric air-fuel ratio or rich, $NO_x$ is released from the $NO_x$ absorbent 26. At this time, the $NO_x$ releasing is mainly influenced by the amount of the exhaust gas and the average air-fuel ratio. That is, the amount of $NO_x$ released from the $NO_x$ absorbent 26 per unit time increases the greater the amount of the exhaust gas, while the amount of $NO_x$ released from the $NO_x$ absorbent 26 per unit time increases the richer the average air-fuel ratio becomes. In this case, the amount of the exhaust gas, that is, the amount of intake air, is a function of the amount of depression L of the accelerator pedal 40 and the engine rotational speed N. The average air-fuel ratio A/F is also a function of the amount of depression L of the accelerator pedal 40 and the engine rotational speed N. Accordingly, the amount D of $NO_x$ released from the $NO_x$ absorbent 26 per unit time is a function of the amount of depression L of the accelerator pedal 40 and engine rotational speed N. This $NO_x$ amount D is stored in advance in the ROM 33 in the form of the map shown in FIG. 14B as a function of L and N.

As explained above, since when the average air-fuel ratio A/F in the combustion chamber 5 is lean, the amount of $NO_x$ absorption per unit time is expressed by A, while when the average air-fuel ratio A/F in the combustion chamber 5 is the stoichiometric air-fuel ratio or rich, the $NO_x$ releasing per unit time is expressed by D, so the $NO_x$ amount $\Sigma NO_x$ estimated to be absorbed in the $NO_x$ absorbent 26 can be calculated using the following equation:

$$\Sigma NO_x = \Sigma NO_x + A - D$$

Figure 13:
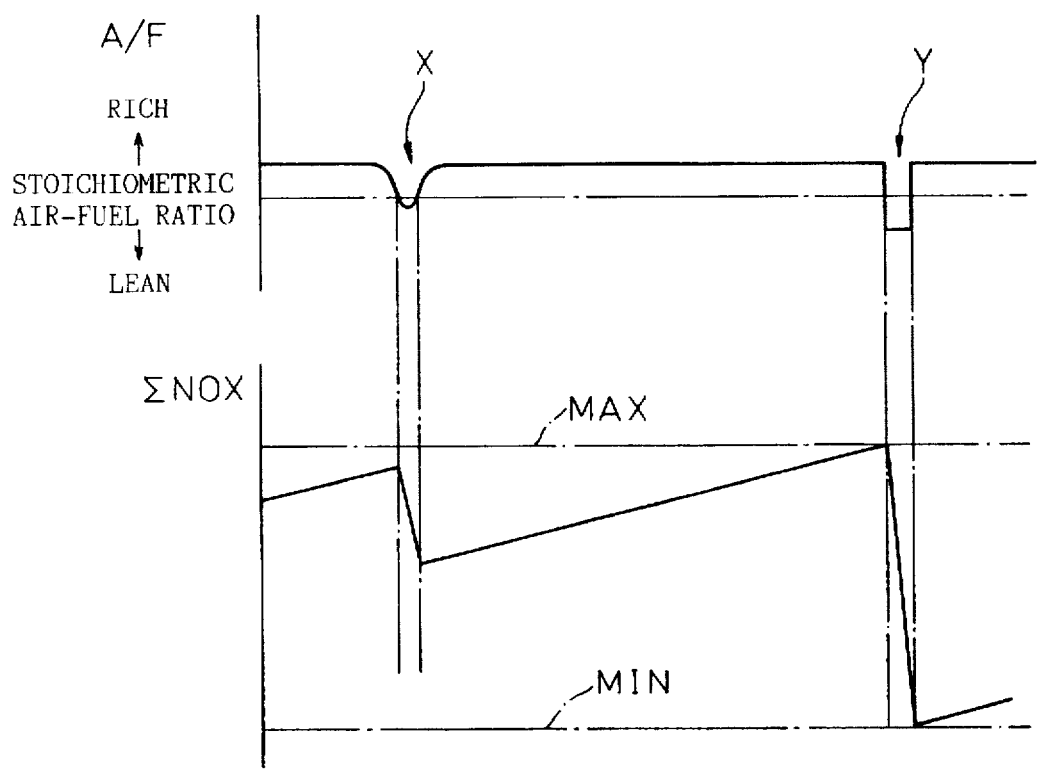
FIG. 13 is a time chart of $NO_x$ releasing control.
Figure 14A:
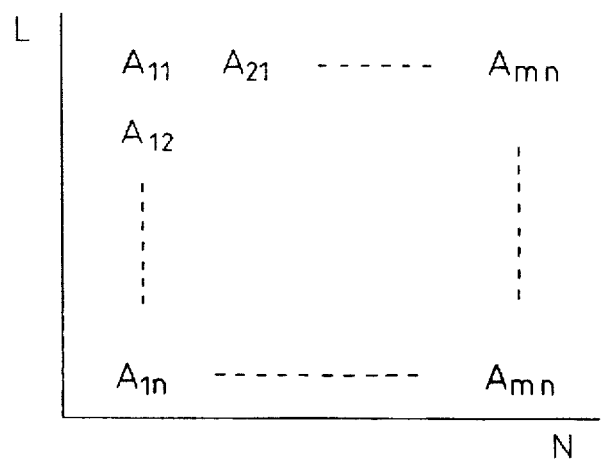
FIG. 14A and FIG. 14B are views showing maps of the amount of $NO_x$ absorption and $NO_x$ releasing.
Figure 14B:
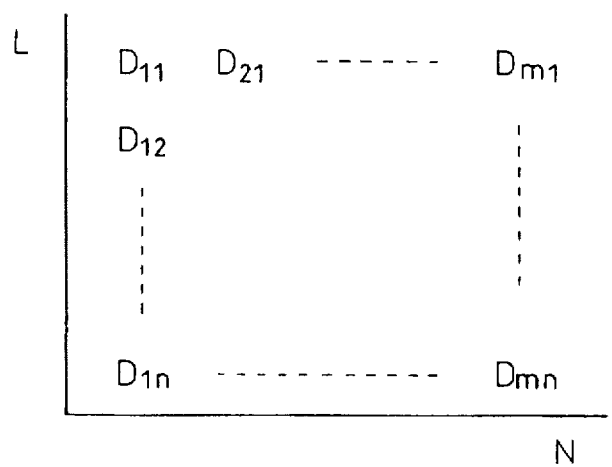

FIG. 13 shows the relationship between this $NO_x$ amount $\Sigma NO_x$ and the average air-fuel ratio A/F in the combustion chamber 5. As will be understood from FIG. 7, when the engine load L is lower than even $L_0$, the average air-fuel ratio A/F in the combustion chamber 5 becomes lean. At this time, the $NO_x$ is absorbed in the $NO_x$ absorbent 26, so as shown in FIG. 13, the $NO_x$ amount $\Sigma NO_x$ increases. On the other hand, as shown in FIG. 7, when the engine load L becomes higher than even $L_0$, the average air-fuel ratio A/F in the combustion chamber 5 becomes rich, so $NO_x$ is released from the $NO_x$ absorbent 26. Accordingly, as shown by X in FIG. 13, when the engine load L becomes higher than $L_0$ and the average air-fuel ratio A/F becomes rich, the $NO_x$ amount $\Sigma NO_x$ is reduced.

On the other hand, when the average air-fuel ratio A/F is kept continuously lean and the $NO_x$ amount $\Sigma NO_x$ exceeds the allowable value MAX, as shown by Y in FIG. 13, the average air-fuel ratio A/F in the combustion chamber 5 is forcibly made rich. When the average air-fuel ratio A/F is made rich, the $NO_x$ is rapidly released from the $NO_x$ absorbent 26, therefore as shown in FIG. 13, the $NO_x$ amount $\Sigma NO_x$ is rapidly reduced. Next, when the $NO_x$ amount $\Sigma NO_x$ falls to the lower limit MIN, the average air-fuel ratio A/F is returned from rich to lean.

However, for example, when as shown in FIG. 9C stratifying the air-fuel mixture formed in the combustion chamber 5 to form an ignitable air-fuel mixture in a limited region of part of the combustion chamber 5, that is, the cavity $3a$, when this stratification action is performed, if merely increasing the amount of injection in the compression stroke so as to change the average air-fuel ratio in the combustion chamber 5 from lean to rich so as to release the $NO_x$ from the $NO_x$ absorbent 26, the air-fuel mixture formed in the limited region of part of the combustion chamber 5, that is, the cavity $3a$, would become overly rich. As a result, the air-fuel mixture in the cavity $3a$ could not be ignited well by the spark plug 10, so the problem would occur of misfires.

Further, generally speaking, when the average air-fuel ratio A/F in the combustion chamber 5 is changed from lean to rich, the engine output torque rapidly increases, so shock is generated. Such a shock gives an unpleasant feeling to the driver, so the occurrence of this shock must be prevented. Therefore, in this embodiment of the present invention, the combustible air-fuel mixture which is easily formed in the cavity $3a$ is prevented from becoming rich and also the average air-fuel ratio A/F is changed from lean to rich to prevent the occurrence of shock. This will be explained with reference to FIG. 15 and FIG. 16.

Figure 15:
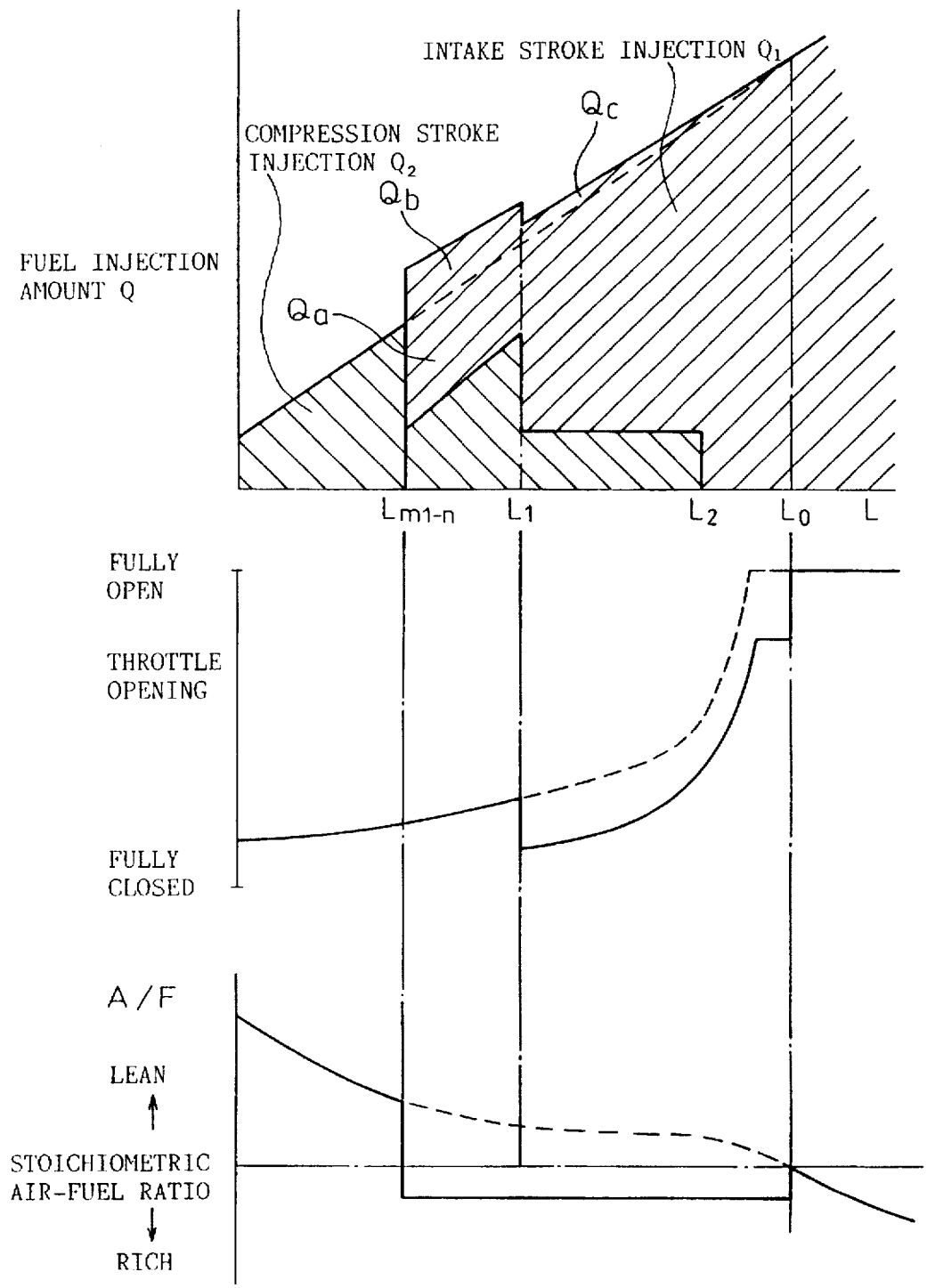
FIG. 15 is a view showing the fuel injection amount, throttle valve opening, and average air-fuel ratio in a combustion chamber.
Figure 16:
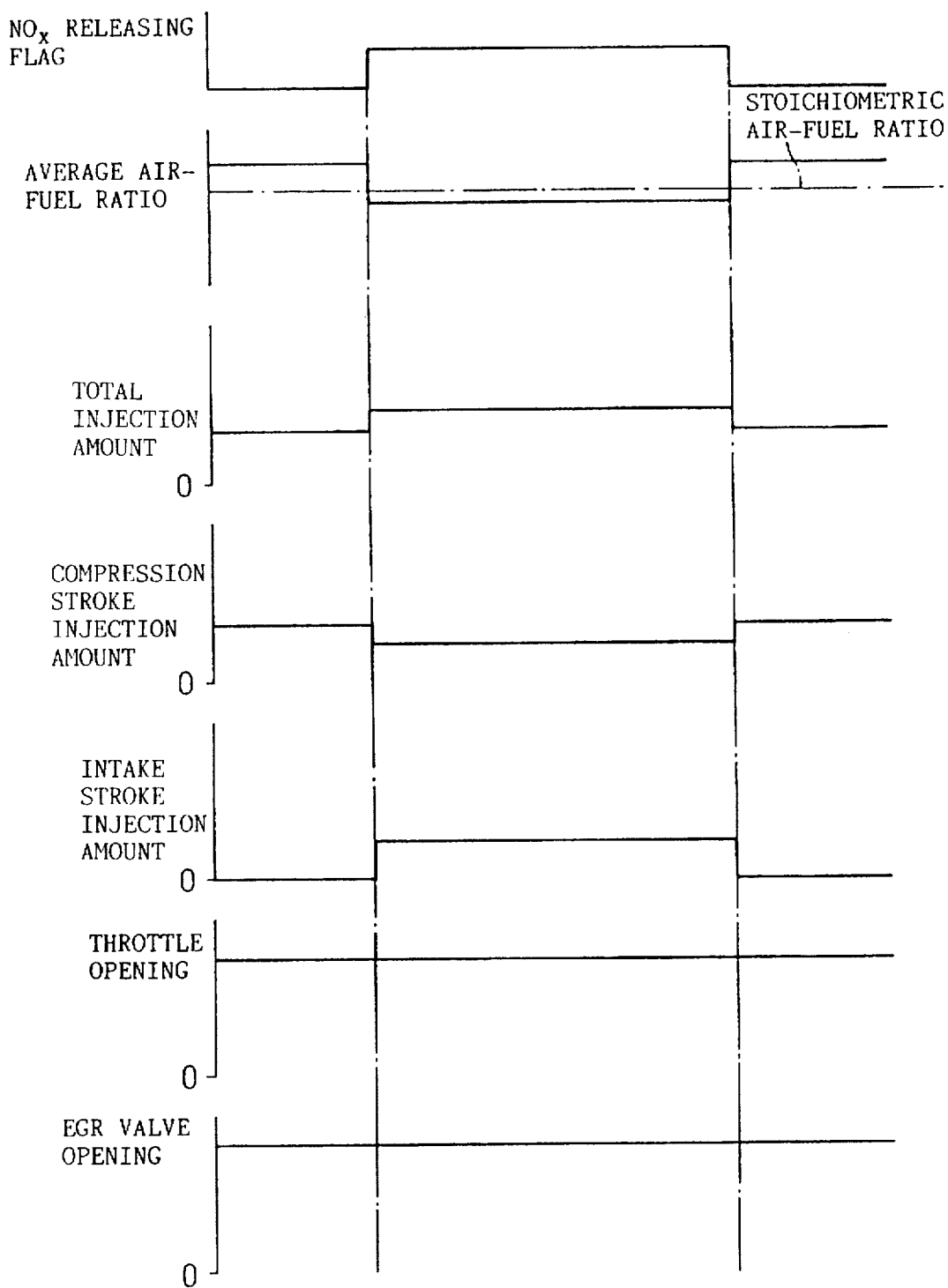
FIG. 16 is time chart showing the $NO_x$ releasing control.

In FIG. 15, the broken lines show the fuel injection amount Q, opening of the throttle valve 23, and average air-fuel ratio A/F in the combustion chamber 5 at the time of ordinary operation shown in FIG. 7. First of all, an explanation will be made of the case where at the time of engine low load operation when the engine load L is lower than $L_1$, the average air-fuel ratio A/F is changed from lean to rich so as to make the $NO_x$ be released from the $NO_x$ absorbent 26. At the time of engine low load operation, when the engine load L falls under a predetermined lower limit load $L_{min}$, even when $\Sigma NO_x$>MAX (FIG. 13), no action is performed for changing the average air-fuel ratio A/F from lean to rich, while when the engine load L is over the lower limit load $L_{min}$, if $\Sigma NO_x$>MAX, the average air-fuel ratio A/F is changed from lean to rich. That is, when the engine load L is $L_{min}$<L<$L_1$, if $\Sigma NO_x$>MAX, as shown in FIG. 16, an $NO_x$ releasing flag is set and the average air-fuel ratio in the combustion chamber 5 is changed from lean to rich. Speaking in terms of FIG. 15, at this time, the average air-fuel ratio A/F is changed from the lean state shown by the broken line to the rich state shown by the solid line.

At this time, the action of changing the average air-fuel ratio A/F from lean to rich is performed as shown in FIG. 15 and FIG. 16 by supplementing the compression stroke injection $Q_2$ with the intake stroke injection $Q_1$ so as to reduce the compression stroke injection amount $Q_2$ shown in FIG. 15 compared with the time of ordinary operation shown by the broken line and increasing the sum of the compression stroke injection amount $Q_2$ and the intake stroke injection amount $Q_1$ compared with the amount of injection at the time of ordinary operation shown by the broken line. Accordingly, in this case, if dividing the intake stroke injection amount $Q_1$ about the broken line into the injection amount portion $Q_a$ and the injection amount portion $Q_b$, the sum of the compression stroke injection amount $Q_2$ and injection amount portion $Q_a$ becomes equal to the injection amount Q at the time of ordinary operation shown by the broken line and the injection amount portion $Q_b$ becomes the increase of the supplied fuel.

However, in this case, the air-fuel mixture is formed in the cavity $3a$ by the fuel of the compression stroke injection $Q_2$ and the fuel of the injection amount portion $Q_a$. If the fuel of the injection amount portion $Q_b$ is dispersed to regions other than the cavity $3a$, the air-fuel ratio of the air-fuel mixture formed in the cavity $3a$ becomes the same as the time of ordinary operation. That is, even if the total injection amount is increased, the air-fuel mixture formed in the cavity $3a$ does not become overly rich, therefore the air-fuel mixture which is formed in the cavity $3a$ is ignited well by the spark plug 10 without the occurrence of misfires.

On the other hand, in this case, if the fuel of the compression stroke injection $Q_2$ and the fuel of the injection portion $Q_a$ are made to burn and the fuel of the injection amount portion $Q_b$ is made not to burn, the amount of fuel which is burned becomes the same as the amount of fuel of the time of ordinary operation shown by the broken line, so the output torque of the engine does not change and the fuel of the injection amount portion $Q_b$ is used merely for changing the average air-fuel ratio A/F from lean to rich. Therefore, in the embodiment of the present invention, the combustible air-fuel mixture to be burned is formed by the fuel of the compression stroke injection $Q_2$ and the fuel of the injection amount portion $Q_a$ and the incombustible air-fuel mixture is formed by the increase of the supplied fuel, that is, the fuel of the injection amount portion $Q_b$, so as to prevent the occurrence of misfires of course and also inhibit the change of the output torque of the engine and change the average air-fuel ratio A/F from lean to rich to cause the releasing of the $NO_x$ from the $NO_x$ absorbent 26.

That is, when the intake stroke injection $Q_1$, is performed, this injected fuel is dispersed inside the combustion chamber 5 as a whole, but the intake stroke injection amount $Q_1$ is made an amount able to form a lean air-fuel mixture through which the flame cannot propagate. However, even with such a lean air-fuel mixture, combustion is possible if mixed in the combustible air-fuel mixture G (see FIG. 9C) formed by the compression stroke injection $Q_2$. In this case, the combustible air-fuel mixture G formed by the compression stroke injection $Q_2$ occupies substantially all of the cavity $3a$, so by determining the intake stroke injection amount $Q_1$ so that the combustion of the injection amount portion $Q_a$ occupies substantially all of the cavity 3a, the amount of fuel which can be burnt becomes the same as at the time of ordinary operation, therefore even if the average air-fuel ratio A/F is changed from lean to rich, there will be no occurrence of misfires and further the output torque of the engine will not change.

Next, an explanation will be made of this using specific figures (not actual figures). For example, assume that the average air-fuel ratio at the time of ordinary operation is 17 (lean) and that at this time the amount of air is 17 (g) and the amount of fuel is 1 (g). When changing the average air-fuel ratio A/F from lean to rich, if 55 percent of the combustible air-fuel mixture in the cavity 3a is formed by the compression stroke injection $Q_2$ while the remaining 45 percent is formed by the intake stroke injection $Q_1$, the compression stroke injection amount $Q_2$ becomes 0.55 (g) and the injection amount portion $Q_a$ of the intake stroke injection amount $Q_1$ becomes 0.45 (g). On the other hand, if the volume of the cavity 3a comprises 65 percent of the total volume of the combustion chamber 5, the total intake stroke injection amount $(Q_a+Q_b)$ becomes 0.45 (g)/0.65=0.7 (g). Accordingly, the air-fuel ratio of the lean air-fuel mixture formed by the intake stroke injection $Q_1$ becomes 17 (g)/0.7 (g)=24.3 which is an incombustible air-fuel mixture. On the other hand, the average air-fuel ratio A/F in the combustion chamber 5 becomes 17 (g)/|0.55 (g) +0.7 (g)]=13.6 which is rich. Further, at this time, the fuel contained in the combustible air-fuel mixture which is formed in the cavity 3a is 1 (g) which is no different from the time of ordinary operation.

If the intake stroke injection amount $Q_1$ and compression stroke injection amount $Q_2$ are suitably set in this way, then it is possible to change the average air-fuel ratio A/F from lean to rich without changing the air-fuel ratio of the air-fuel mixture which is formed in the cavity 3a and without changing the amount of fuel to be burned. Note that, the intake stroke injection amount $Q_1$ ($Q_a+Q_b$) and compression stroke injection amount $Q_2$ shown in FIG. 15 are stored in advance in the ROM 33 as a function of the amount of depression L of the accelerator pedal 40 and engine rotational speed N.

Next, an explanation will be made of the case where the average air-fuel ratio A/F is changed from lean to rich so as to release the $NO_x$ from the $NO_x$ absorbent 26 when the engine load L is larger than $L_1$ and lower than $L_0$. At this time, as shown by the solid line in FIG. 15, the throttle valve 23 is closed by exactly a predetermined degree. When the throttle valve 23 is closed, the amount of air fed into the combustion chamber 5 is reduced, so the average air-fuel ratio A/F in the combustion chamber 5 becomes smaller. At this time, the throttle valve 23 is closed so that the average air-fuel ratio A/F becomes the predetermined rich air-fuel ratio shown by the solid line in FIG. 15. The amount of closing of this throttle 23 is stored in the ROM 33 in advance in the form of a function of the amount of depression L of the accelerator pedal 40 and engine rotational speed N.

Note that, when the throttle valve 23 is closed, the pumping loss increases, so the output torque of the engine falls. Therefore, in the embodiment of the present invention, at this time, the intake stroke injection amount $Q_1$ is made to increase by exactly $Q_c$ (in FIG. 15, just the portion above the broken line) so that the output torque of the engine does not fall. Note that, this amount of increase $Q_c$ of the intake stroke injection $Q_1$ is stored in advance in the ROM 33 as a function of the amount of depression L of the accelerator pedal 40 and engine rotational speed N. Note that, at this time, the compression stroke injection amount $Q_2$ becomes the optimal fuel amount for forming a spark, so the intake stroke injection amount $Q_1$ is increased without increasing the compression stroke injection amount $Q_2$.

Next, an explanation will be made of the routine for controlling the fuel injection with reference to FIG. 17 and FIG. 18. Note that this routine is executed by interruption every predetermined time interval.

Figure 17:
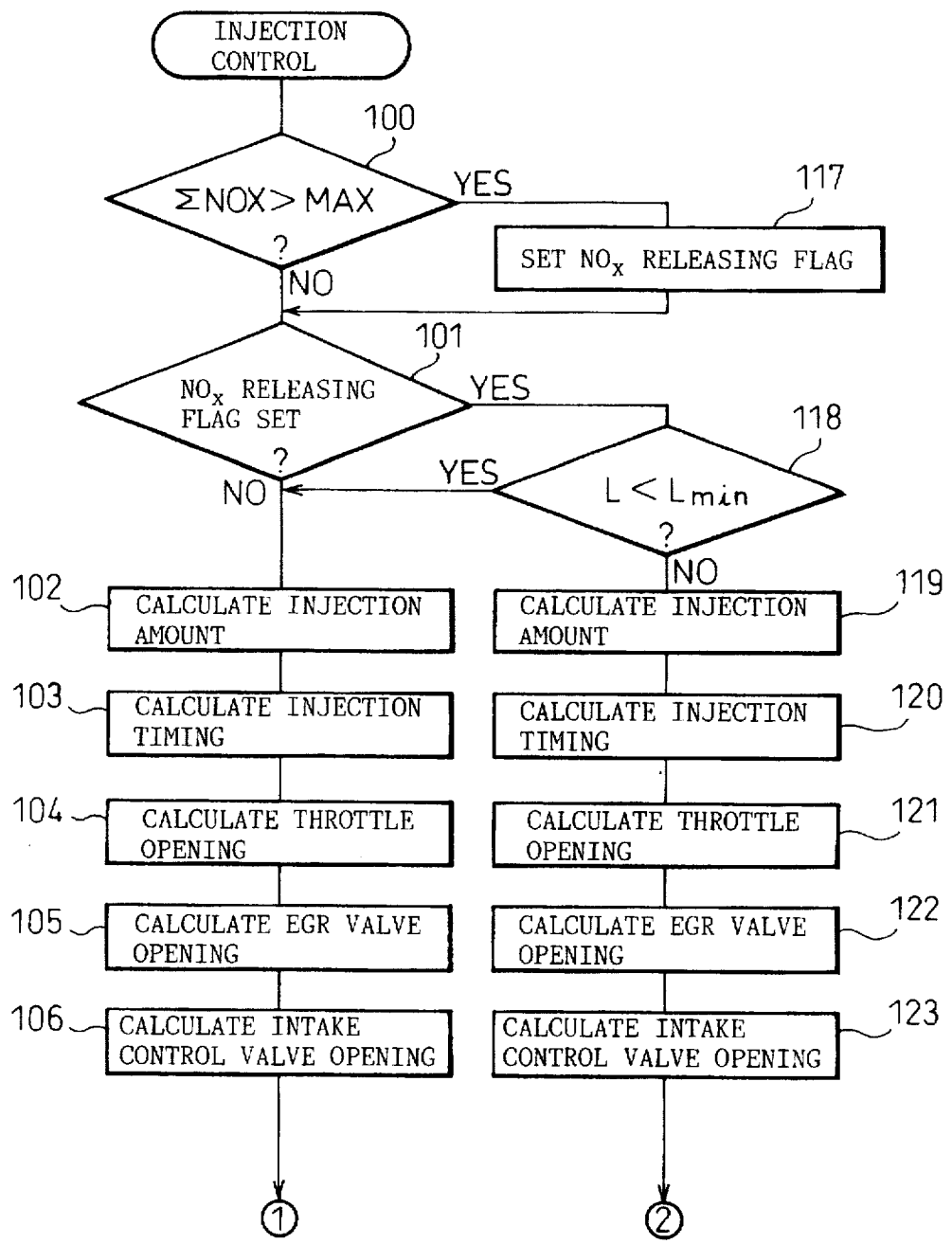
FIG. 17 and FIG. 18 are flow charts for the injection control.
Figure 18:
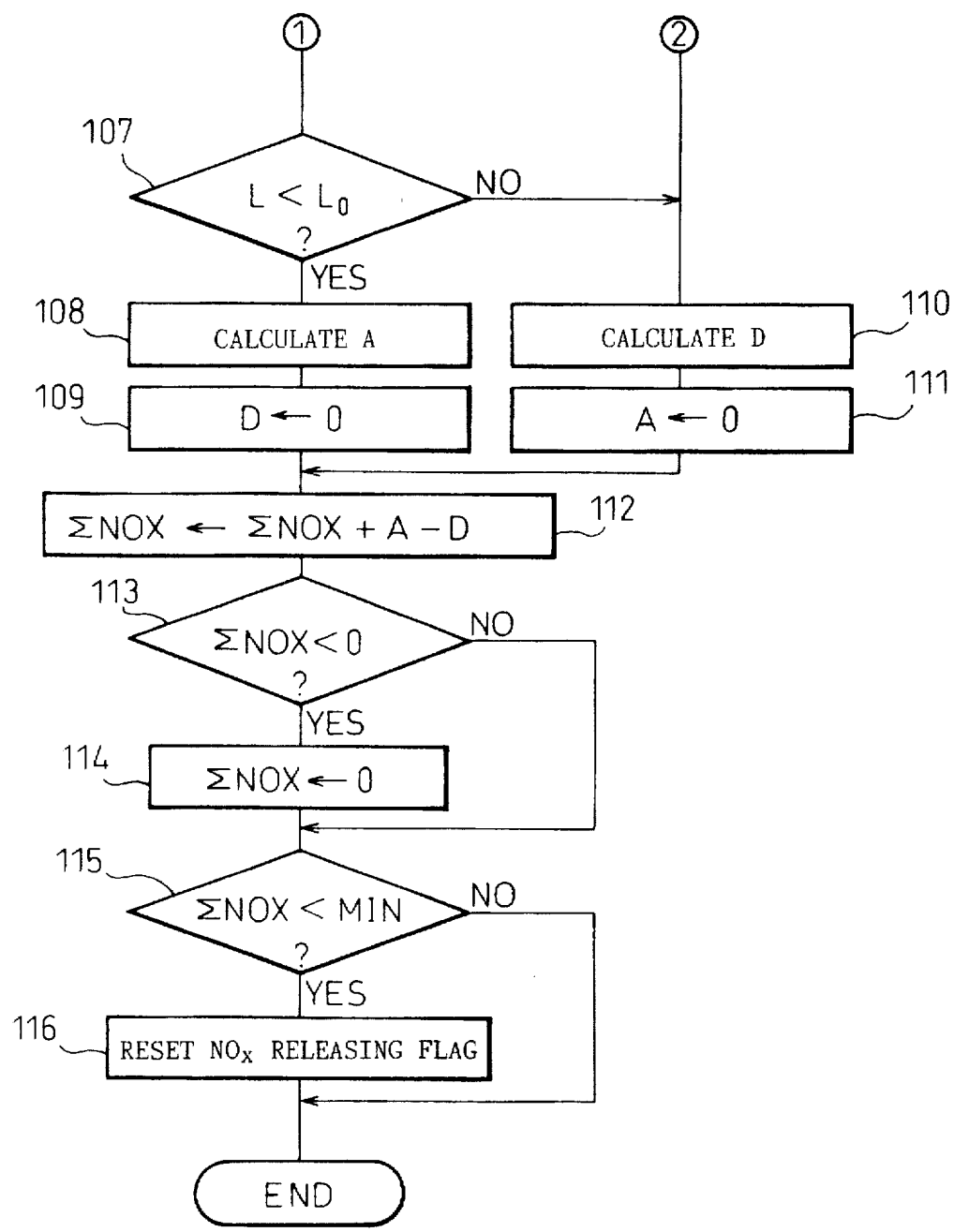

Referring to FIG. 17 and FIG. 18, first of all, at step 100, whether the $NO_x$ amount $\Sigma NO_x$ estimated to be absorbed in the $NO_x$ absorbent 26 is larger than the allowable value MAX or not is decided. When $\Sigma NO_x$<MAX, step 101 is proceeded to, where whether the $NO_x$ releasing flag is set or not is decided. Normally, the $NO_x$ releasing flag is reset, so step 102 is proceeded to. At step 102, the intake stroke injection amount $Q_1$ and compression stroke injection amount $Q_2$ are calculated from the relationships shown in FIG. 6 stored in advance in the ROM 33 based on the amount of depression L of the accelerator pedal 40 and engine rotational speed N. Next, at step 103, the injection timing is calculated from the relationships shown in FIG. 6 stored in advance in the ROM 33 based on the amount of depression L of the accelerator pedal 40 and engine rotational speed N. Next, at step 104, the opening of the throttle valve 23 is calculated from the relationships shown in FIG. 7 stored in advance in the ROM 33 based on the amount of depression L of the accelerator pedal 40 and engine rotational speed N.

Next, at step 105, the opening of the EGR valve 29 is calculated from the relationships shown in FIG. 7 stored in advance in the ROM 33 based on the amount of depression L of the accelerator pedal 40 and engine rotational speed N. Next, at step 106, the opening of the intake control valve 17 is calculated from the relationships shown in FIG. 8 stored in advance in the ROM 33 based on the amount of depression L of the accelerator pedal 40. Next, at step 107, whether the amount of depression L of the accelerator pedal 40 is less than $L_0$ (FIG. 7) or not is decided. When L<$L_0$, step 108 is proceeded to, where the amount of $NO_x$ absorption A is calculated from the map shown in FIG. 14A. Next, at step 109, the $NO_x$ releasing D is made zero, Next, step 112 is proceeded to. On the other hand, when it is decided that L<$L_0$ at step 107, step 110 is proceeded to, where the $NO_x$ releasing D is calculated from the map shown in FIG. 14B. Next, at step 111, the amount of $NO_x$ absorption A is made zero, then step 112 is proceeded to.

At step 112, the $NO_x$ amount $\Sigma NO_x$ (=$\Sigma NO_x$+A−D) estimated to be absorbed in the $NO_x$ absorbent 26 is calculated. Next, at step 113, whether $\Sigma NO_x$ has become negative or not is decided. When $\Sigma NO_x$<0, step 114 is proceeded to, where the $\Sigma NO_x$ is made zero. Next, at step 115, whether $\Sigma NO_x$ has become smaller than the lower value MIN or not is decided. When $\Sigma NO_x$<MIN, step 116 is proceeded to, where the $NO_x$ releasing flag is reset.

On the other hand, when it is decided at step 100 that $\Sigma NO_x$>MAX, step 117 is proceeded to, where the $NO_x$ releasing flag is set. When the $NO_x$ releasing flag is set, the routine proceeds from step 101 to step 118, where whether the engine load L is lower than the lower limit load $L_{min}$ or not is decided. When L<$L_{min}$, step 102 is proceeded to. Accordingly, at this time, even if $\Sigma NO_x$ >MAX, the average air-fuel ratio in the combustion chamber 5 is held lean.

As opposed to this, when L≧$L_{min}$, step 119 is proceeded to, where the intake stroke injection amount $Q_1$ and compression stroke injection amount $Q_2$ are calculated from the relationships shown in FIG. 15 stored in advance in the ROM 33 based on the amount of depression L of the accelerator pedal 40 and engine rotational speed N. Next, at step 120, the injection time is calculated from the relationships stored in advance in the ROM 33 based on the amount of depression L of the accelerator pedal 40 and engine rotational speed N. Next, at step 121, the opening of the throttle valve 23 is calculated from the relationships shown in FIG. 15 stored in advance in the ROM 33 based on the amount of depression L of the accelerator pedal 40 and engine rotational speed N.

Next, at step 122, the opening of the EGR valve 29 is calculated from the relationships stored in advance in the ROM 33 based on the amount of depression L of the accelerator pedal 40 and engine rotational speed N. Next, at step 123, the opening of the intake control valve 17 is calculated from the relationships shown in FIG. 8 stored in advance in the ROM 33 based on the amount of depression L of the accelerator pedal 40. At this time, the average air-fuel ratio in the combustion chamber 5 is made rich and the $NO_x$ is released from the $NO_x$ absorbent 26.

As mentioned above, at the time of engine low load operation when the amount of depression L of the accelerator pedal 40 is smaller than $L_1$, the fuel is injected only at the end of the compression stroke. At this time, the air-fuel mixture is formed only in the cavity 3a. The regions other than the cavity 3a are substantially filled with air and EGR gas, so a strong stratifying state with an extremely high degree of stratification results.

On the other hand, at the time of engine medium load operation when the amount of depression L of the accelerator pedal 40 is between $L_1$ and $L_2$, a lean air-fuel mixture is formed by the intake stroke injection in the combustion chamber 5 as a whole. This compression stroke injection causes an air-fuel mixture richer than the lean air-fuel mixture to be formed in the cavity 3a. Accordingly, at this time, a weak stratifying state with a degree of stratification lower than even the strong stratifying state at the time of engine low load operation results.

Further, at the time of engine high load operation when the amount of depression L of the accelerator pedal 40 is larger than $L_2$, only intake stroke injection is performed. Accordingly, at this time, a homogeneous air-fuel mixture is formed in the combustion chamber 5.

However, in the embodiments discussed up to here, the strong stratifying state is maintained and the average air-fuel ratio A/F is changed from lean to rich at the time of engine low load operation, that is, the strong stratifying state, when the $NO_x$ is to be released from the $NO_x$ absorbent 26 so that no misfires occur and further the output torque does not fluctuate.

As opposed to this, in the embodiment described next, when it becomes necessary to release the No. from the $NO_x$ absorbent 26 in the strong stratifying state, the strong stratifying state is switched to a weak stratifying state or homogeneous air-fuel mixture state and then the intake stroke injection amount is increased in the weak stratifying state or homogeneous air-fuel mixture state so as to make the average air-fuel ratio A/F the stoichiometric air-fuel ratio or rich and cause the releasing of $NO_x$ from the $NO_x$ absorbent 26. When increasing the intake stroke injection amount in this way to make the average air-fuel ratio A/F the stoichiometric air-fuel ratio or rich, there is not that much change in the air-fuel ratio of the air-fuel mixture formed in the cavity 3a compared with a strong stratifying state, therefore it is possible to inhibit the occurrence of misfires.

Further, in the next explained embodiment, when the average air-fuel ratio A/F is made the stoichiometric air-fuel ratio or rich so as to release the $NO_x$ from the $NO_x$ absorbent 26, the total amount of the injected fuel is made to be burned in the combustion chamber 5. Accordingly, when the average air-fuel ratio A/F is made the stoichiometric air-fuel ratio or is made rich so as to release the $NO_x$ from the $NO_x$ absorbent 26, the output torque of the engine is increased. When the output torque increases even when this increase of the output torque is suppressed by causing a reduction of the amount of intake air supplied to the inside of the combustion chamber 5, for example, the ignition timing is delayed so as to prevent the output torque from increasing.

Next, an explanation will be made first of the basic routine for controlling the fuel injection referring to FIG. 19 and FIG. 20.

Figure 19:
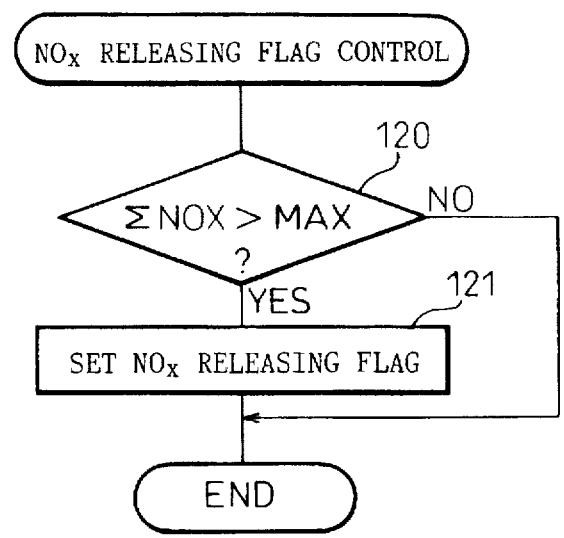
FIG. 19 is a flow chart for control of the $NO_x$ releasing flag.

FIG. 19 shows the routine for the control of the $NO_x$ releasing flag. This routine is executed by interruption every predetermined time interval. Referring to FIG. 19, first of all, at step 120, whether the $NO_x$ amount $\Sigma NO_x$ is over the allowable value MAX shown in FIG. 13 or not is decided. When $\Sigma NO_x$>MAX, step 121 is proceeded to, where the $NO_x$ releasing flag is set.

Figure 20:
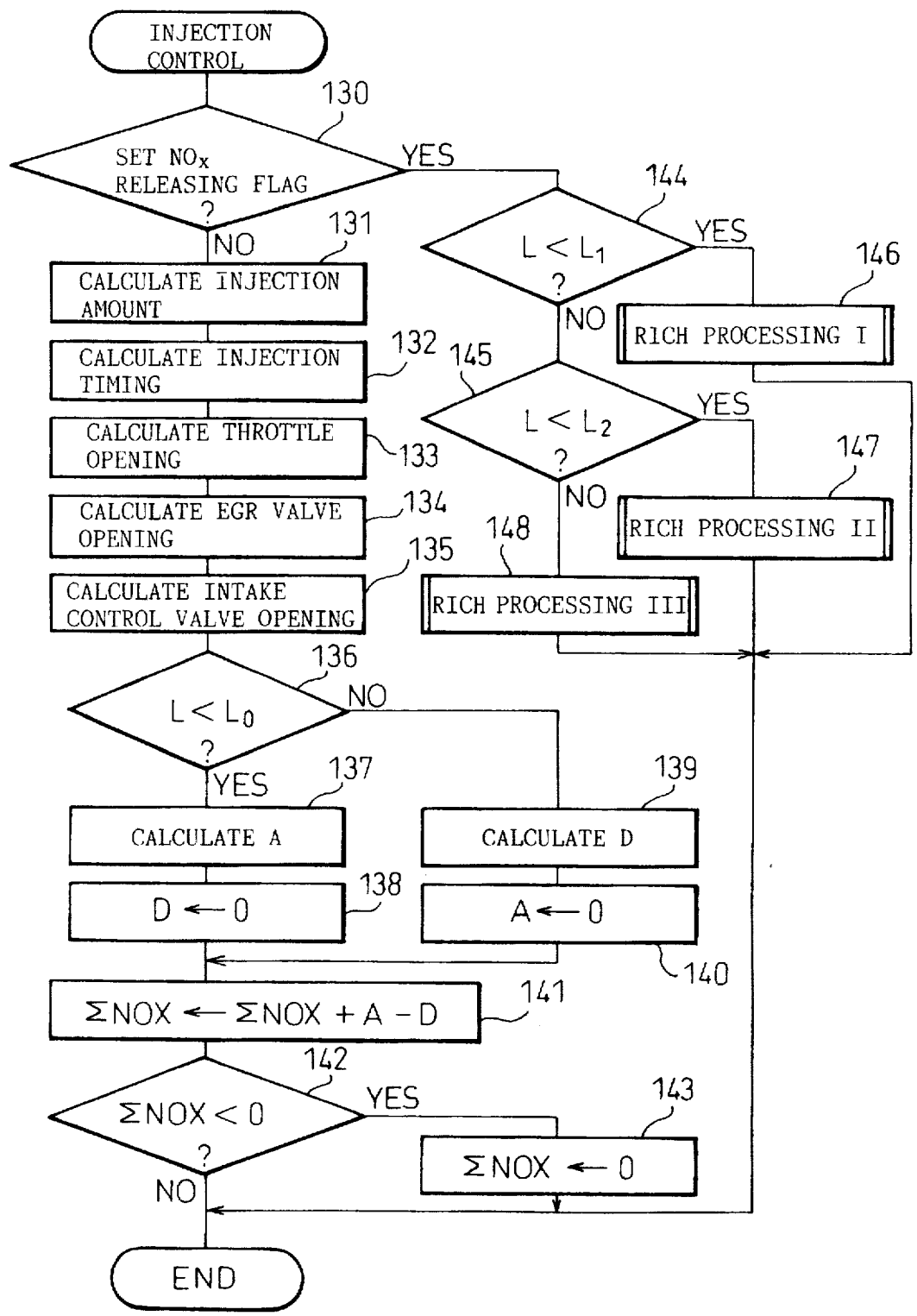
FIG. 20 is a flow chart for injection control.

FIG. 20 shows the routine for the injection control. This routine for example, is executed by interruption every predetermined time interval.

Referring to FIG. 20, first of all, at step 130, whether the $NO_x$ releasing flag is set or not is decided. When $NO_x$ releasing flag is not set, step 131 is proceeded to, where the intake stroke injection amount $Q_1$ and compression stroke injection amount $Q_2$ are calculated from the relationships shown in FIG. 6 stored in advance in the ROM 33 based on the amount of depression L of the accelerator pedal 40 and engine rotational speed N. Next, at step 132, the injection timing is calculated from the relationships shown in FIG. 6 stored in advance in the ROM 33 based on the amount of depression L of the accelerator pedal 40 and engine rotational speed N. Next, at step 133, the opening of the throttle valve 23 is calculated from the relationships shown in FIG. 7 stored in advance in the ROM 33 based on the amount of depression L of the accelerator pedal 40 and engine rotational speed N. Next, at step 134, the opening of the EGR valve 29 is calculated from the relationships stored in advance in the ROM 33 based on the amount of depression L of the accelerator pedal 40 and engine rotational speed N. Next, at step 135, the opening of the intake control valve 17 is calculated from the relationships shown in FIG. 8 stored in advance in the ROM 33 based on the amount of depression L of the accelerator pedal 40.

Next, at step 136, whether the amount of depression L of the accelerator pedal 40 is lower than $L_0$ (FIG. 7) or not is decided. When L<$L_0$, step 137 is proceeded to, where the amount of $NO_x$ absorption a is calculated from the map shown in FIG. 14A. Next, at step 138, the $NO_x$ releasing D is made zero, then step 141 is proceeded to. On the other hand, when L>$L_0$ is decided at step 136, step 139 is proceeded to, where the $NO_x$ releasing D is calculated from the map shown in FIG. 14B. Next, at step 140, the amount of $NO_x$ absorption A is made zero, then step 141 is proceeded to. At step 141, the $NO_x$ amount $\Sigma NO_x$ (=$\Sigma NO_x$+A−D) estimated to be absorbed in the $NO_x$ absorbent 26 is calculated. Next, at step 142, whether $\Sigma NO_x$ has become negative or not is decided. When $\Sigma NO_x$<0, step 143 is proceeded to, where the $\Sigma NO_x$ is made zero.

On the other hand, when it is decided that the $NO_x$ releasing flag is set at step 130, step 144 is proceeded to, where whether the amount of depression L of the accelerator pedal 40 is smaller than $L_1$ or not is decided. When L<$L_1$, step 146 is proceeded to, where the rich processing I for making the average air-fuel ratio A/F rich is performed. As opposed to this, when L>$L_1$, step 145 is proceeded to, where whether the amount of depression L of the accelerator pedal 40 is smaller than $L_2$ or not is decided. When $L<L_2$, step 147 is proceeded to, where the rich processing II is performed to make the average air-fuel ratio A/F rich. When $L>L_2$, step 148 is proceeded to, where the rich processing III is performed to make the average air-fuel ratio A/F rich.

That is, the rich processing I shows the rich processing for causing the releasing of the $NO_x$ from the $NO_x$ absorbent 26 at the time of an engine low load operation, that is, a strong stratifying state, the rich processing II shows the rich processing for causing the releasing of the $NO_x$ from the $NO_x$ absorbent 26 at the time of an engine medium load operation, that is, a weak stratifying state, and the rich processing III shows the rich processing for causing the releasing of the $NO_x$ from the $NO_x$ absorbent 26 at the time of an engine high load operation, that is, the homogeneous air-fuel mixture state. Therefore, next, the explanation will be made in the order of the rich processing I, II, and III.

Figure 21:
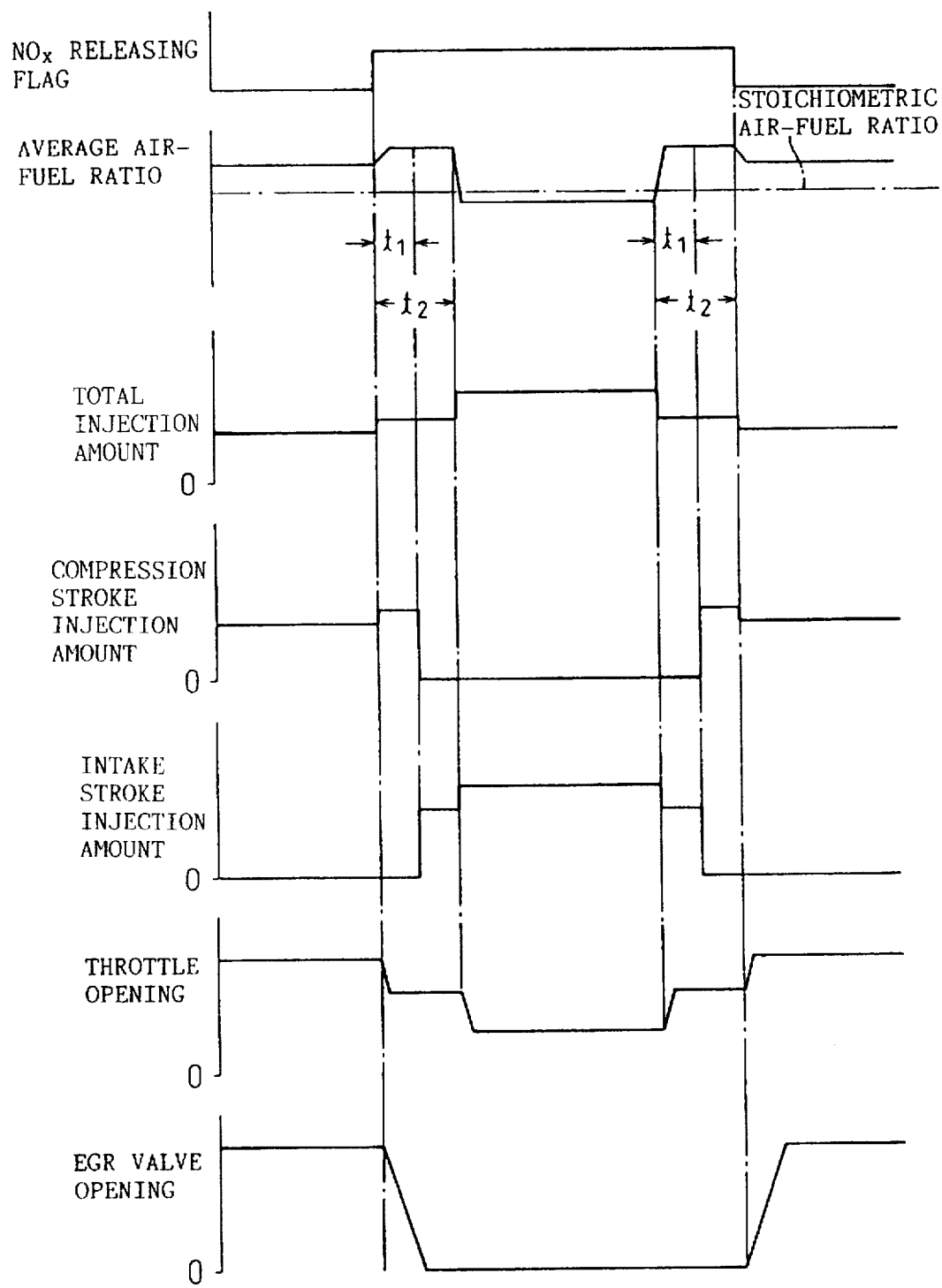
FIG. 21 is a time chart showing the $NO_x$ releasing control for the rich processing I.

FIG. 21 shows a time chart of an embodiment of the rich processing I. As shown in FIG. 21, in the engine low load operation state before the $NO_x$ releasing flag is set, that is, the strong stratifying operation state, the intake stroke injection is not performed. Only the compression stroke injection is performed and the average air-fuel ratio in the combustion chamber 5 therefore becomes lean. Further, at this time, the throttle valve 23 and EGR valve 29 are opened.

Next, when the $NO_x$ releasing flag is set so as to release the No. from the $NO_x$ absorbent 26, the EGR valve 29 is fully closed and the throttle valve 23 is closed to the set degree determined by the engine operating state so that at this time the average air-fuel ratio in the combustion chamber 5 becomes extremely lean. When the throttle valve 23 is closed to the set degree, the compression stroke injection amount is increased somewhat so the output torque of the engine does not fall.

Next, when a time t, has elapsed from when the $NO_x$ releasing flag is set, the compression stroke injection is stopped and the intake stroke injection is started. That is, the strong stratifying state is changed to the homogeneous air-fuel mixture state. At this time, the injection amount does not change and accordingly the average air-fuel ratio in the combustion chamber 5 does not change either. Note that, at this time, the fuel injection amount is small. When a small amount of fuel is burned in the homogeneous air-fuel mixture state, if a large amount of EGR gas is supplied, the risk of misfiring becomes great. Therefore, in this embodiment, as shown in FIG. 21, the EGR valve 29 is fully closed before moving to combustion of a homogeneous air-fuel mixture. Note that, in this case, the EGR valve 29 does not necessarily have to be fully closed. In some cases, it is sufficient just to reduce the opening of the EGR valve 29 somewhat.

Next, when the time $t_2$ elapses after the $NO_x$ releasing flag is set, the intake stroke injection amount is increased and the throttle valve 23 is further closed to the set degree determined by the engine operating state so as to make the average air-fuel ratio in the combustion chamber 5 rich. At this time, the throttle valve 23 is closed so as to reduce the amount of intake air supplied to the combustion chamber 5 so as to make the average air-fuel ratio A/F rich with as little fuel as possible and to prevent the output torque of the engine from increasing as much as possible when making the average air-fuel ratio A/F rich. At this time, if the increase in the output torque of the engine would become large and shock generated, it is necessary to devise some means of delaying the ignition timing at the same time as making the average air-fuel ratio A/F rich.

When the average air-fuel ratio A/F is made rich, the action of releasing of $NO_x$ from the $NO_x$ absorbent 26 is started. Next, when the action of releasing of $NO_x$ from the $NO_x$ absorbent 26 is completed, the reverse procedure is followed to return to the strong stratifying state once again. That is, when the $NO_x$ releasing action is completed, the intake stroke injection amount is reduced and the throttle valve 23 is opened. Next, when the time $t_1$ elapses from when the $NO_x$ releasing action is completed, the intake stroke injection is stopped and the compression stroke injection is started. When the time $t_2$ elapses from when the $NO_x$ releasing action is completed, the throttle valve 23 and EGR valve 29 are opened and the $NO_x$ releasing flag is reset.

Figure 22:
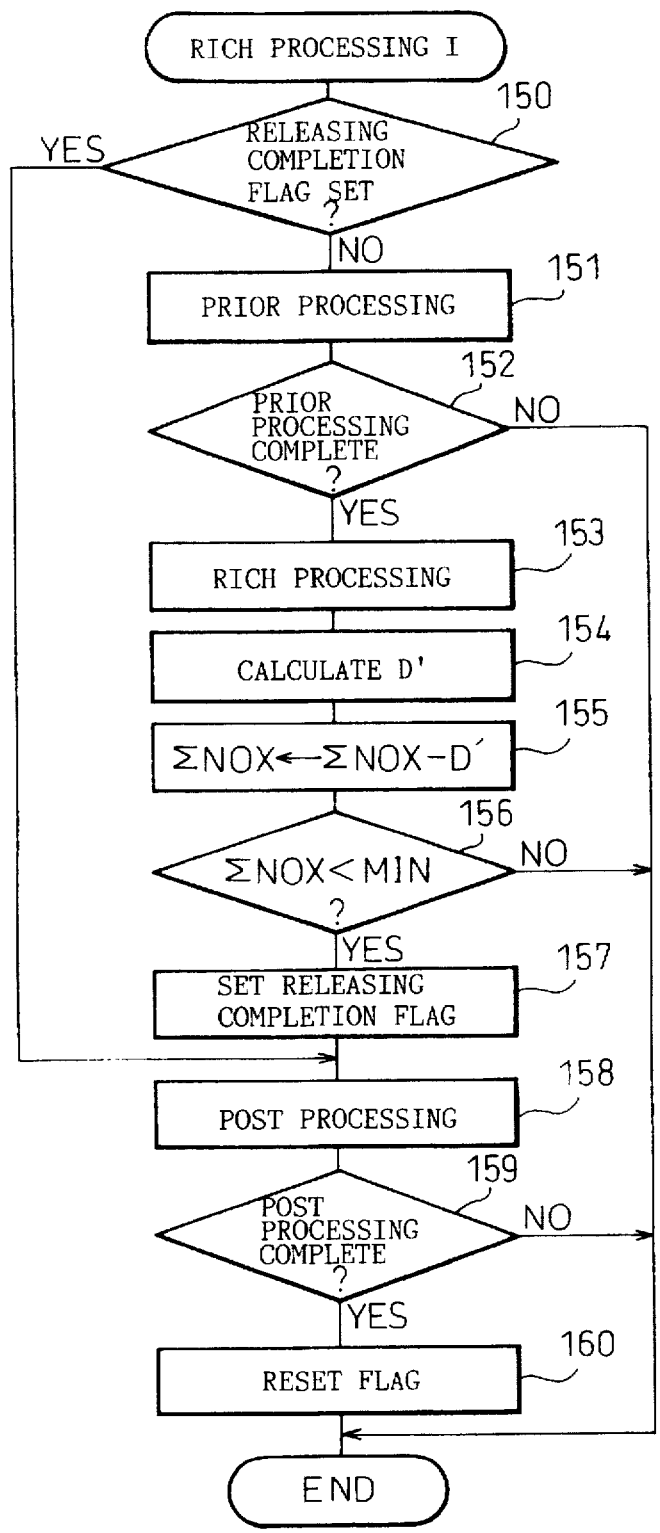
FIG. 22 is a flow chart for the rich processing I.

FIG. 22 shows the routine of the rich processing I for executing the $NO_x$ releasing control shown in FIG. 21. Referring to FIG. 22, first of all, at step 150, whether the releasing completion flag showing that the releasing of $NO_x$ has been completed is set or not is decided. The releasing completion flag is not set just after the rich processing I is started, so step 151 is proceeded to, where the prior processing is performed until the average air-fuel ratio A/F is made rich. In the embodiment shown in FIG. 21, this prior processing is comprised of the processing for closing the throttle valve 23 and EGR valve 29 when the $NO_x$ releasing flag is set, that is, the rich processing I is started, the processing for changing from the compression stroke injection to the intake stroke injection after the elapse of a time $t_1$ from when the rich processing I is started, and the processing for closing the throttle valve 23 after the elapse of the time $t_2$ after the rich processing I is started.

Figure 23:
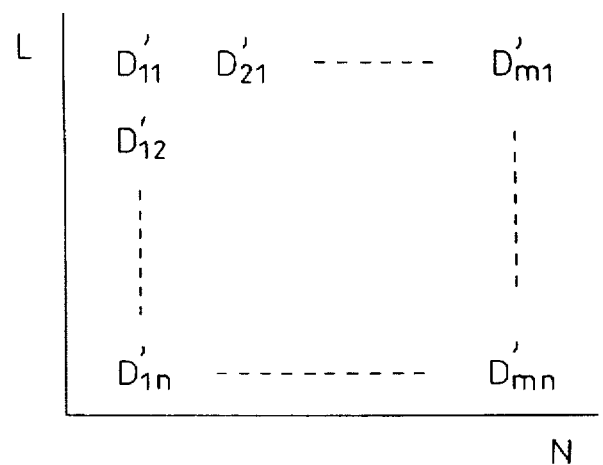
FIG. 23 is a view of a map of the $NO_x$ releasing.

Next, at step 152, whether the prior processing has been completed or not is decided. When the prior processing has been completed, step 153 is proceeded to, where the rich processing is performed to make the average air-fuel ratio A/F rich. In this embodiment, the intake stroke injection amount is increased so as to perform the rich processing. Next, at step 154, the $NO_x$ releasing D' in the $NO_x$ releasing action is calculated. This $NO_x$ releasing D' is stored in the ROM 33 as a function of the amount of depression L of the accelerator pedal 40 and engine rotational speed N in the form of a map as shown in FIG. 23. Next, at step 155, the $NO_x$ amount $\Sigma NO_x$ is reduced by the $NO_x$ releasing D', next, at step 156, whether the $NO_x$ amount $\Sigma NO_x$ has become smaller than the lower value MIN or not is decided. When $\Sigma NO_x < MIN$, it is decided that the $NO_x$ releasing action has been completed and the routine proceeds to step 157, where the releasing completion flag is set. Next, step 158 is proceeded to. Note that once the releasing completion flag is set, the routine jumps from step 150 to step 158.

At step 158, post processing is performed until the strong stratifying state is returned to after the $NO_x$ releasing action has been completed. In the embodiment shown in FIG. 21, this post processing is comprised of processing for reducing the intake stroke injection amount and opening the throttle valve 23 until the $NO_x$ releasing action has been completed, processing for switching from the intake stroke injection to the compression stroke injection after the elapse of the time $t_1$ from when the $NO_x$ releasing action has been completed, and processing for opening the throttle valve 23 and EGR valve 29 after the time $t_2$ elapses from when the $NO_x$ releasing action has been completed. At step 159, whether this post processing has been completed or not is decided. When it has been completed, step 160 is proceeded to, where the $NO_x$ releasing flag and releasing completion flag are reset.

Figure 24:
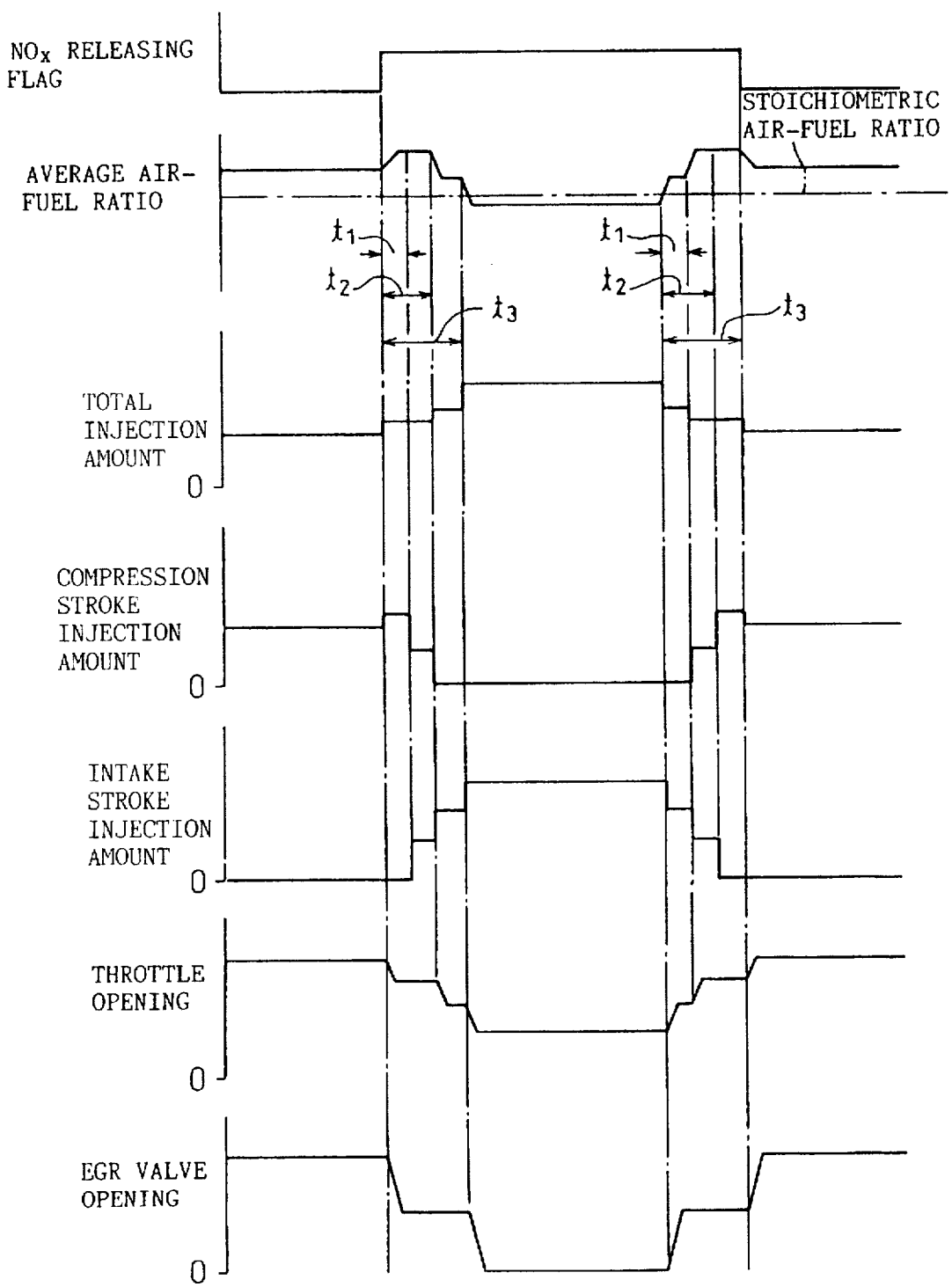
FIG. 24 is a time chart of $NO_x$ releasing control showing another embodiment for the rich processing I.

FIG. 24 shows another embodiment of the rich processing I performed in the strong stratifying state. In this embodiment, when the $NO_x$ releasing flag is set, the throttle valve 23 is slightly closed and the EGR valve 29 is closed about half. Next, when the time t, elapses from when the $NO_x$ releasing flag is set, the compression stroke injection amount is reduced and the intake stroke injection is started. That is, at this time, two injections, that is, the intake stroke injection and compression stroke injection, are performed. Accordingly, a weak stratifying state results. Next, when the time $t_2$ elapses after the $NO_x$ releasing flag is set, the compression stroke injection is stopped and only the intake stroke injection is performed, so the homogeneous air-fuel mixture state results. Further, at this time, the throttle valve 23 is once again closed.

Next, when the time $t_3$ elapses from when the $NO_x$ releasing flag is set, the EGR valve 29 is fully closed and the throttle valve 23 is further closed slightly. At this time, the intake stroke injection amount is increased and the average air-fuel ratio A/F is made rich, therefore the action of releasing of $NO_x$ from the $NO_x$ absorbent 26 is started.

On the other hand, when the $NO_x$ releasing action has been completed, the reverse procedure is followed to return to the strong stratifying state. That is, when the $NO_x$ releasing action has been completed, the intake stroke injection amount is reduced and the throttle valve 23 and EGR valve 29 are opened. Next, when the time $t_1$ has elapsed after the $NO_x$ releasing action has been completed, the intake stroke injection amount is reduced and the compression stroke injection is started so the weak stratifying state results. At this time, the throttle valve 23 is again opened. Next, when the time $t_2$ has elapsed after the $NO_x$ releasing action has been completed, the intake stroke injection is stopped and the strong stratifying state results. Next, when the time $t_3$ elapses from when the $NO_x$ releasing action has been completed, the throttle valve 23 and EGR valve 29 are further opened and the $NO_x$ releasing flag is reset.

In this embodiment, when the $NO_x$ releasing action is started, the strong stratifying state is changed through the weak stratifying state to the homogeneous air-fuel mixture state. When the $NO_x$ releasing action has been completed, the homogeneous air-fuel mixture state is changed through a weak stratifying state to the strong stratifying state. By interposing this weak stratifying state when switching between the strong stratifying state and homogeneous air-fuel mixture state, the state of combustion gradually changes and therefore it is possible to prevent misfires from occurring at the time of the change.

Figure 25:
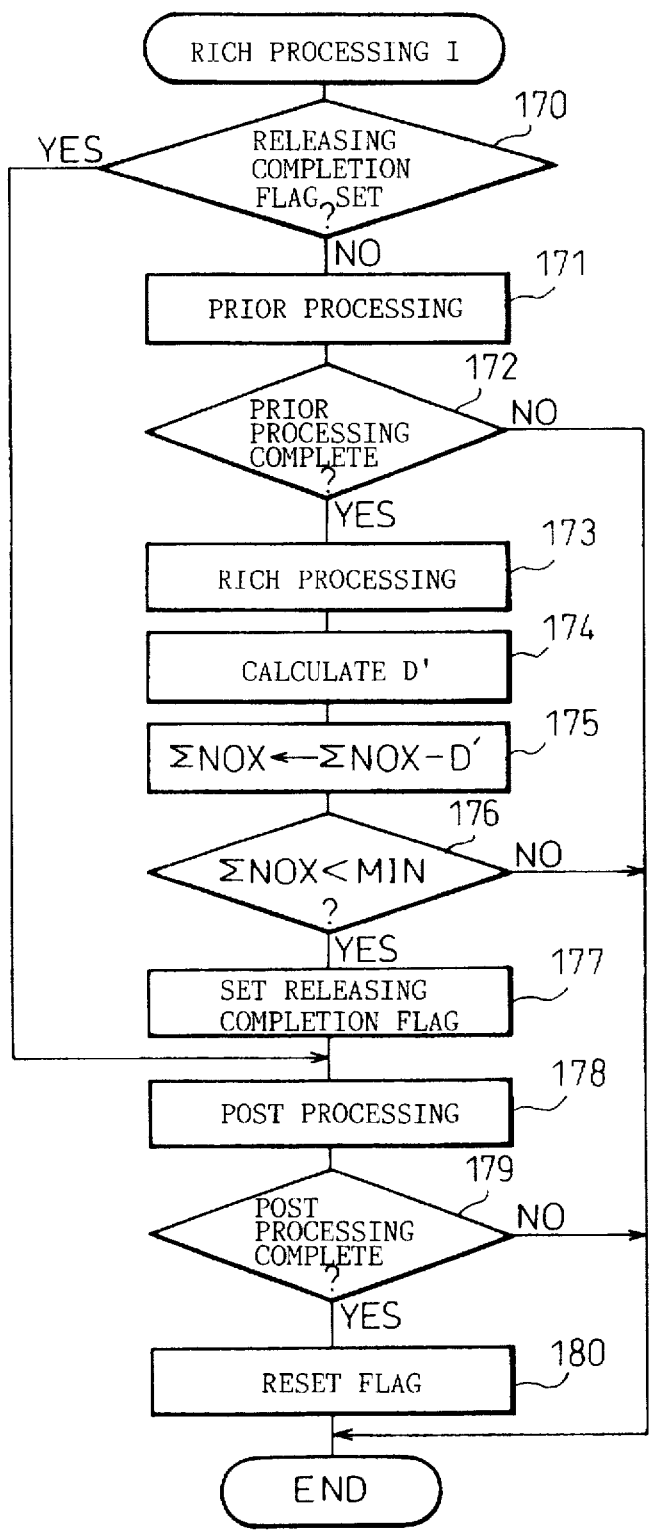
FIG. 25 is a flow chart of another embodiment for the rich processing I.

FIG. 25 shows the routine of the rich processing I for executing the $NO_x$ releasing control shown in FIG. 24. Referring to FIG. 25, first of all, at step 170, whether the releasing completion flag is set or not is decided. When the releasing completion flag is not set, step 171 is proceeded to while when the releasing completion flag is set, step 178 is jumped to. At step 171, the prior processing is performed until the average air-fuel ratio A/F is made rich after the $NO_x$ releasing flag is set. Next, at step 172, whether the prior processing has been completed or not is decided. When the prior processing has been completed, step 173 is proceeded to, where the intake stroke injection amount is increased, whereby the average air-fuel ratio A/F is made rich.

Next, at step 174, the $NO_x$ releasing D' is calculated from FIG. 23. Next, at step 175, the $NO_x$ amount $\Sigma NO_x$ is reduced by the $NO_x$ releasing D'. Next, at step 176, whether the $NO_x$ amount $\Sigma NO_x$ has become smaller than the lower value MIN or not is decided. When $\Sigma NO_x$<MIN, step 177 is proceeded to, where the releasing completion flag is set. Next, at step 178, post processing is performed until the strong stratifying state is returned to after the completion of the releasing of the $NO_x$. Next, at step 179, whether the post processing is completed or not is decided. When the post processing is completed, step 180 is proceeded to, where the $NO_x$ releasing flag and releasing completion flag are reset.

Figure 26:
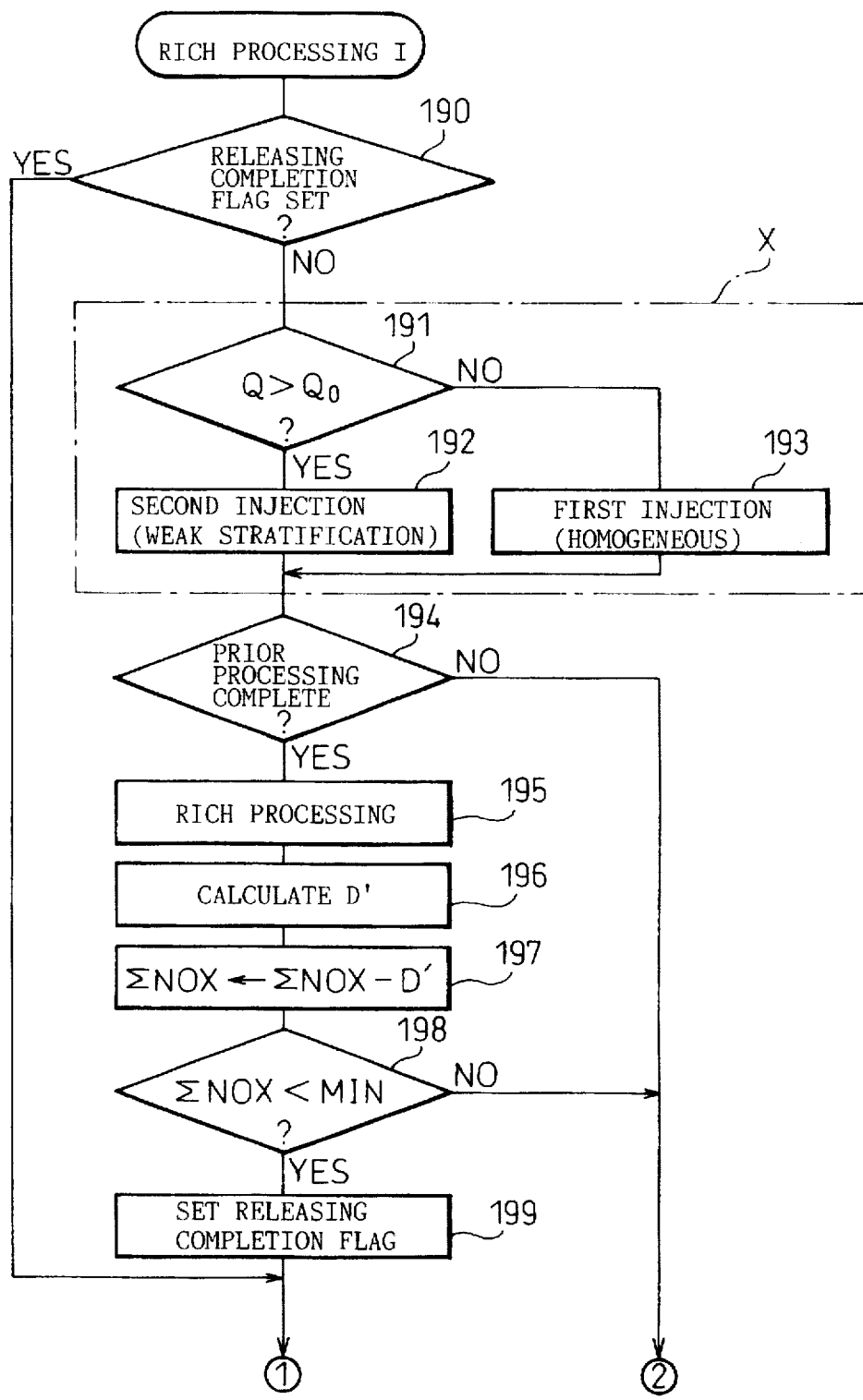
FIG. 26 and FIG. 27 are flow charts of still another embodiment for the rich processing I.
Figure 27:
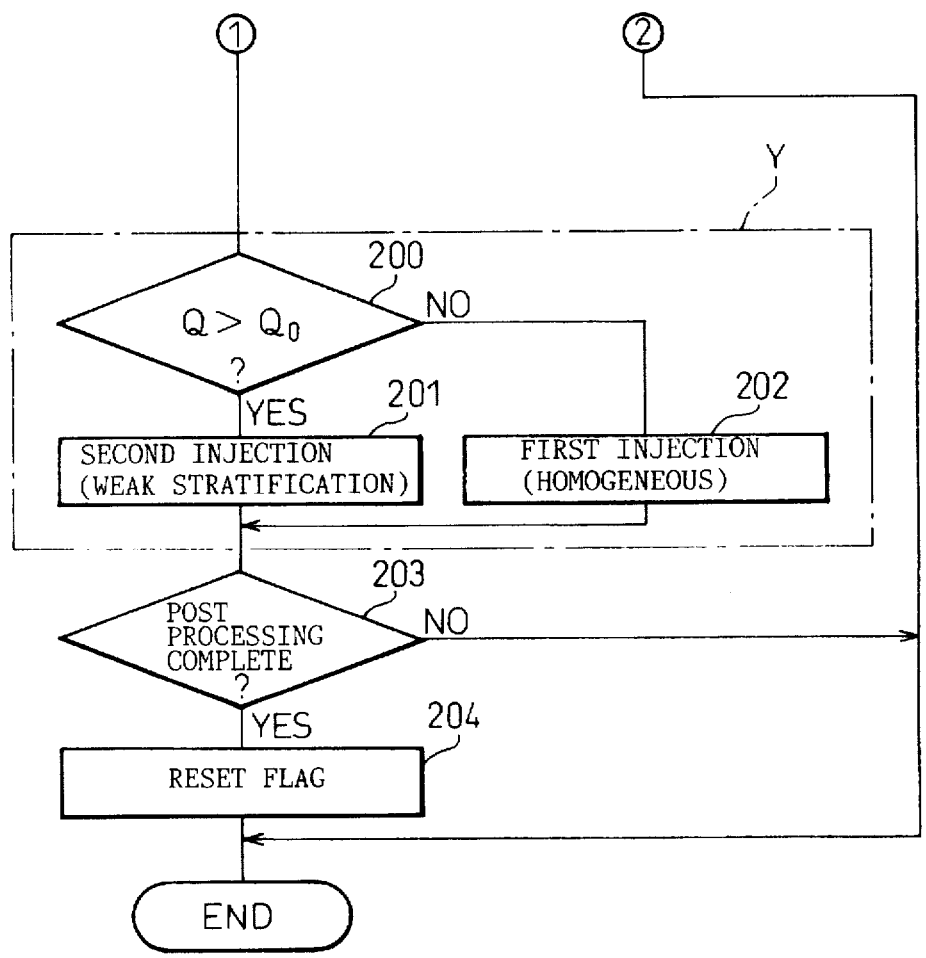

FIG. 26 and FIG. 27 show still another routine for the rich processing I. As mentioned above, to ensure a smooth transition from the strong stratifying state to the homogeneous air-fuel mixture state without the occurrence of misfires, it is preferable to interpose a weak stratifying state. However, when the fuel injection amount is small, if the weak stratifying state is set, the lean air-fuel mixture spread out in the combustion chamber 5 as a whole becomes extremely lean. There is a risk that this lean air-fuel mixture cannot be burned. Therefore, in this embodiment, when the fuel injection amount is small, when changing from the strong stratifying state to the homogeneous air-fuel mixture state, the strong stratifying state is changed to the homogeneous air-fuel mixture state directly without going through the weak stratifying state. Note that steps 191, 192, and 193 in the box shown by X in FIG. 26 show the prior processing, while the steps 200, 201, and 202 shown by Y show the post processing.

That is, referring to FIG. 26 and FIG. 27, first of all, at step 190, whether the releasing completion flag is set or not is decided. When the releasing completion flag is not set, the routine proceeds to step 191 of the prior processing X, while when the releasing completion flag is set, the routine jumps to step 200 of the post processing Y. At step 191, whether the fuel injection amount Q is greater than a predetermined set value $Q_0$ or not is decided. When Q>$Q_0$, step 192 is proceeded to, where the prior processing shown in FIG. 24, that is, the prior processing for changing from the strong stratifying state through the weak stratifying state to the homogeneous air-fuel mixture state, is performed. As opposed to this, when Q<$Q_0$, step 193 is proceeded to, where the prior processing shown in FIG. 21, that is, the prior processing for directly changing from the strong stratifying state to the homogeneous air-fuel mixture state without going through the weak stratifying state, is performed.

Next, at step 194, whether the prior processing has been completed or not is decided. When the prior processing has been completed, step 195 is proceeded to, where the intake stroke injection amount is increased whereby the average air-fuel ratio A/F is made rich. Next, at step 196, the $NO_x$ releasing D' is calculated from FIG. 23. Next, at step 197, the $NO_x$ amount $\Sigma NO_x$ is reduced by the $NO_x$ releasing D'. Next, at step 198, whether the $NO_x$ amount $\Sigma NO_x$ has become smaller than the lower value MIN or not is decided. When $\Sigma NO_x$<MIN, step 199 is proceeded to, where the releasing completion flag is set, then step 200 is proceeded to.

At step 200, whether the fuel injection amount Q is larger than a predetermined set value $Q_0$ or not is decided. When Q>$Q_0$, step 201 is proceeded to, where the post processing shown in FIG. 24, that is, the post processing for changing from the homogeneous air-fuel mixture state through the weak stratifying state to the strong stratifying state, is performed. As opposed to this, when Q<$Q_0$, step 202 is proceeded to, where the post processing shown in FIG. 21, that is, the post processing for changing from the homogeneous air-fuel mixture state directly to the strong stratifying state without going through the weak stratifying state, is performed. Next, at step 203, whether the post processing is completed or not is decided. When the post processing is completed, step 204 is proceeded to, where the $NO_x$ releasing flag and releasing completion flag are reset.

Figure 28:
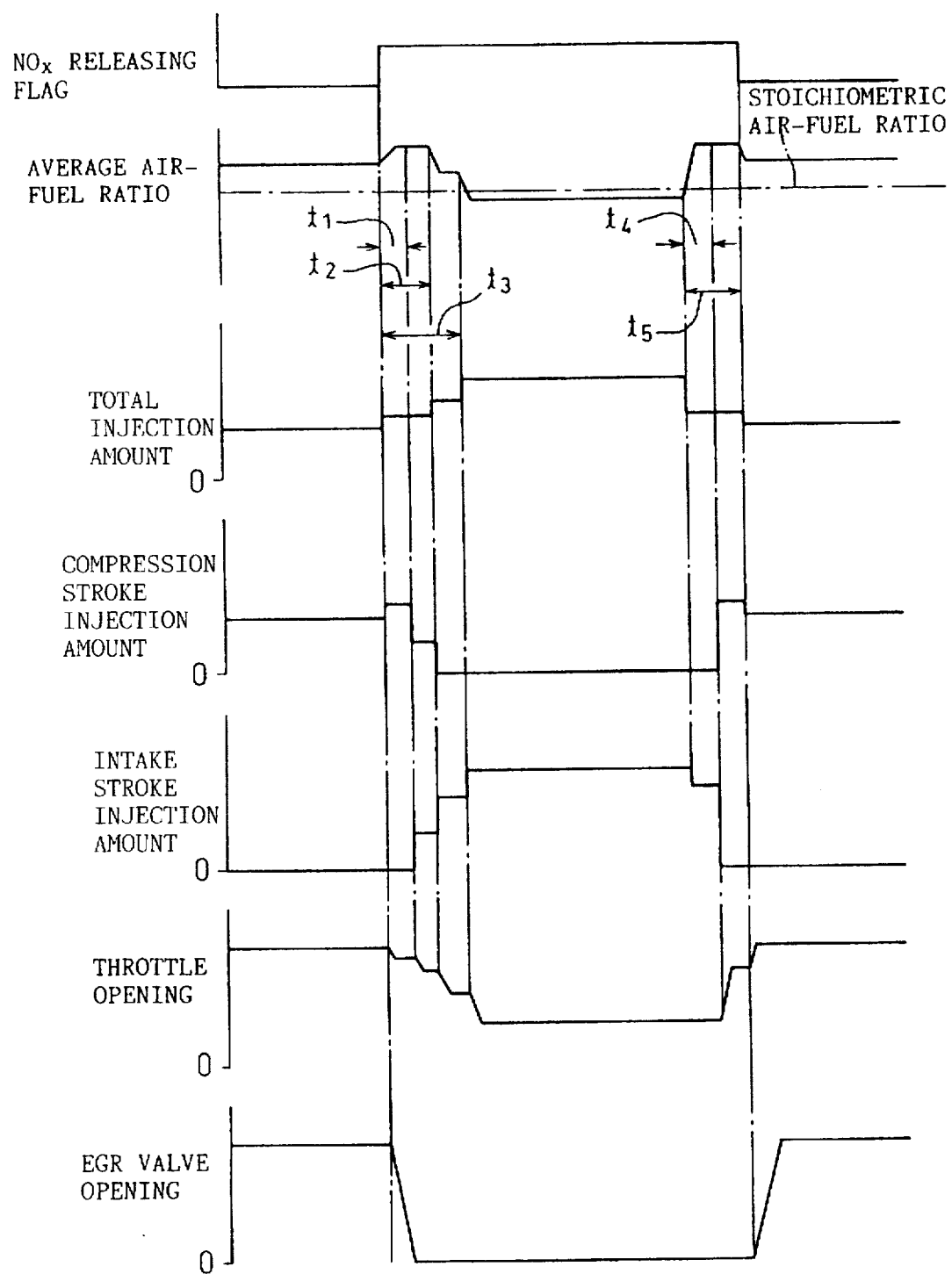
FIG. 28 is a time chart of $NO_x$ releasing control showing still another embodiment for the rich processing I.

FIG. 28 shows still another embodiment of the rich processing I performed in the strong stratifying state. In this embodiment, when the $NO_x$ releasing flag is set, the throttle valve 23 is closed a little and the EGR valve 29 is fully closed. Next, when the time $t_1$ elapses from when the $NO_x$ releasing flag is set, the compression stroke injection amount is reduced and the intake stroke injection is started. That is, at this time, two injections, that is, the intake stroke injection and compression stroke injection, are performed. Accordingly, a weak stratifying state results. At this time, the throttle valve 23 is closed slightly. Next, when the time $t_2$ elapses after the $NO_x$ releasing flag is set, the compression stroke injection is stopped and only the intake stroke injection is performed, so the result is the homogeneous air-fuel mixture state. Further, at this time, the throttle valve 23 is once again closed slightly.

Next, when the time $t_3$ has elapsed from when the $NO_x$ releasing flag is set, the throttle valve 23 is again closed slightly, the intake stroke injection amount is increased, and the average air-fuel ratio A/F is made rich therefore the action of releasing of $NO_x$ from the $NO_x$ absorbent 26 is started.

On the other hand, when the $NO_x$ releasing action has been completed, the intake stroke injection amount is reduced. Next, when the time $t_4$ has elapsed from when the $NO_x$ releasing action has been completed, the intake stroke injection is stopped and a strong stratifying state results. At this time, the throttle valve 23 is opened. Next, when the time $t_5$ has elapsed from when the $NO_x$ releasing action has been completed, the throttle valve 23 and EGR valve 29 are opened and the $NO_x$ releasing flag is reset.

In this embodiment, when starting the $NO_x$ releasing action, the strong stratifying state is changed through the weak stratifying state to the homogeneous air-fuel mixture state. When the $NO_x$ releasing action has been completed, the homogeneous air-fuel mixture state is changed directly to the strong stratifying state without going through the weak stratifying state. Note that, in this embodiment as well, in the prior processing for changing from the strong stratifying state to the homogeneous air-fuel mixture state, whether to go through the weak stratifying state or not is decided in accordance with the fuel injection amount.

Figure 29:
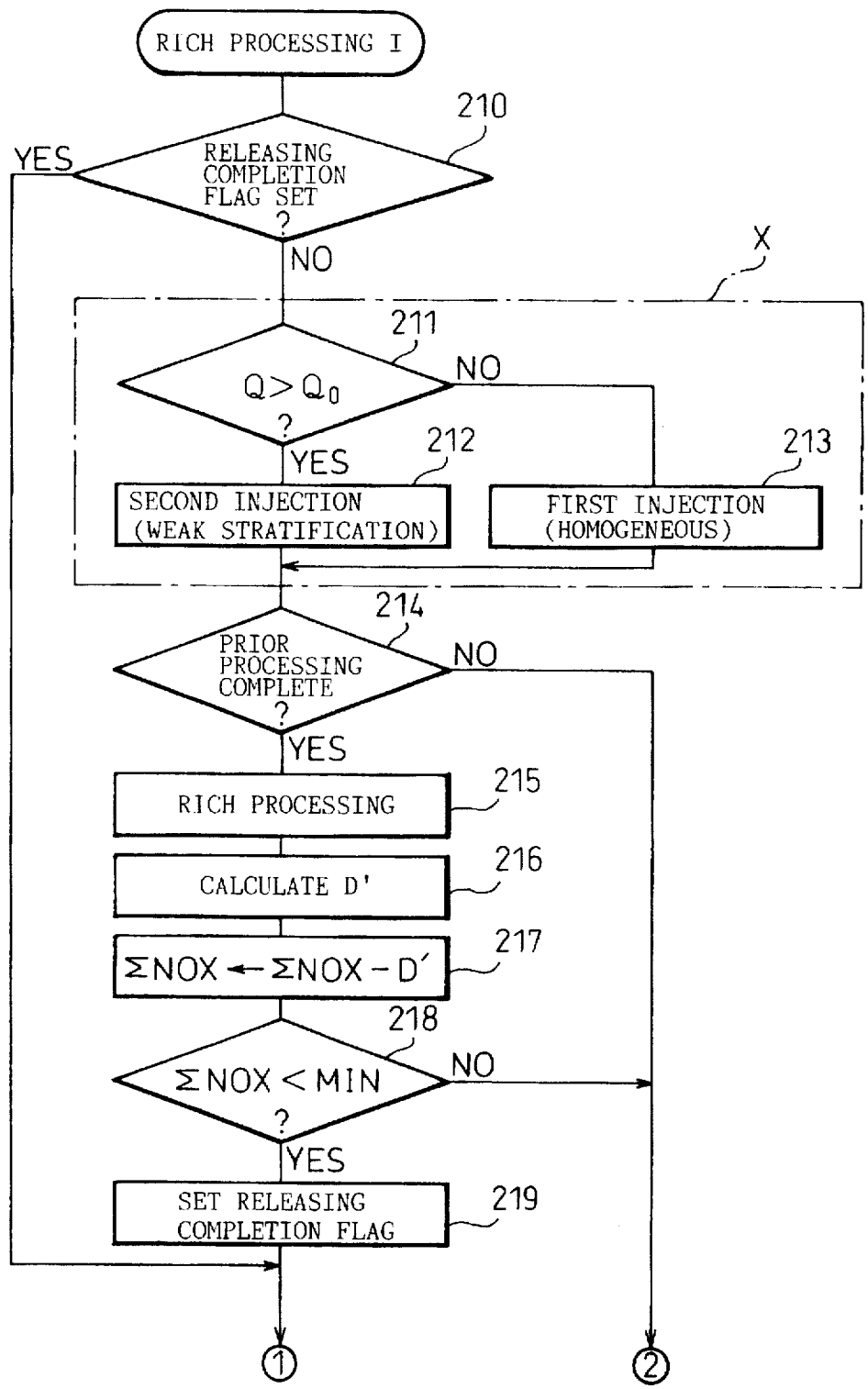
FIG. 29 and FIG. 30 are flow charts of still another embodiment for the rich processing I.
Figure 30:
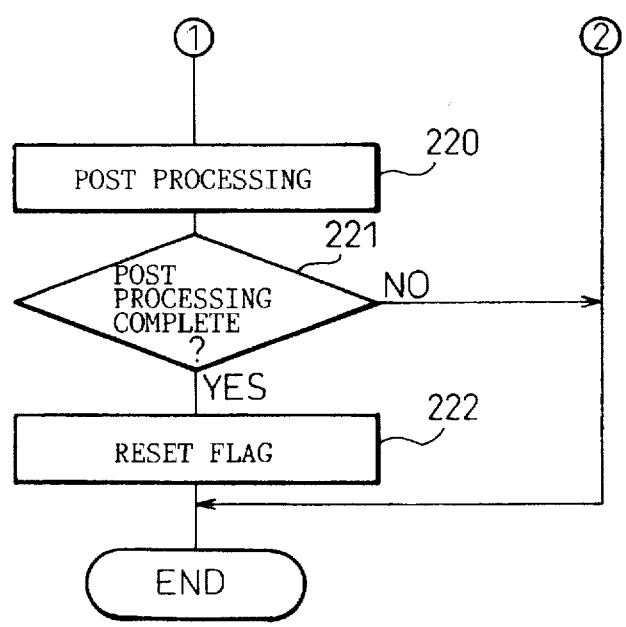

FIG. 29 and FIG. 30 show the routine of the rich processing I for executing the $NO_x$ releasing control shown in FIG. 28. Note that, the box shown by X shows the prior processing. Referring to FIG. 29 and FIG. 30, first of all, at step 210, whether the releasing completion flag is set or not is decided. When the releasing completion flag is not set, the routine proceeds to step 211 of the prior processing X, while when the releasing completion flag is set, the routine jumps to step 220. At step 211, whether the fuel injection amount Q is larger than a predetermined set value $Q_0$ or not is decided. When $Q > Q_0$, step 212 is proceeded to, where the prior processing shown in FIG. 24, that is, the prior processing for changing from the strong stratifying state through the weak stratifying state to the homogeneous air-fuel mixture state, is performed. As opposed to this, when $Q \leq Q_0$, step 213 is proceeded to, where the prior processing shown in FIG. 21, that is, the prior processing for directly changing from the strong stratifying state to the homogeneous air-fuel mixture state without going through the weak stratifying state, is performed.

Next, at step 214, whether the prior processing has been completed or not is decided. When the prior processing has been completed, step 215 is proceeded to, where the intake stroke injection amount is increased whereby the average air-fuel ratio A/F is made rich. Next, at step 216, the $NO_x$ releasing D' is calculated from FIG. 23. Next, at step 217, the $NO_x$ amount $\Sigma NO_x$ is reduced by the $NO_x$ releasing D'. Next, at step 218, whether the $NO_x$ amount $\Sigma NO_x$ has become smaller than the lower value MIN or not is decided. When $\Sigma NO_x < MIN$, step 219 is proceeded to, where the releasing completion flag is set. Next, at step 220, the post processing for returning to the strong stratifying state after completion of releasing of the $NO_x$ is performed. Next, at step 221, whether the post processing is completed or not is decided. When the post processing is completed, step 222 is proceeded to, where the $NO_x$ releasing flag and releasing completion flag are reset.

Figure 31:
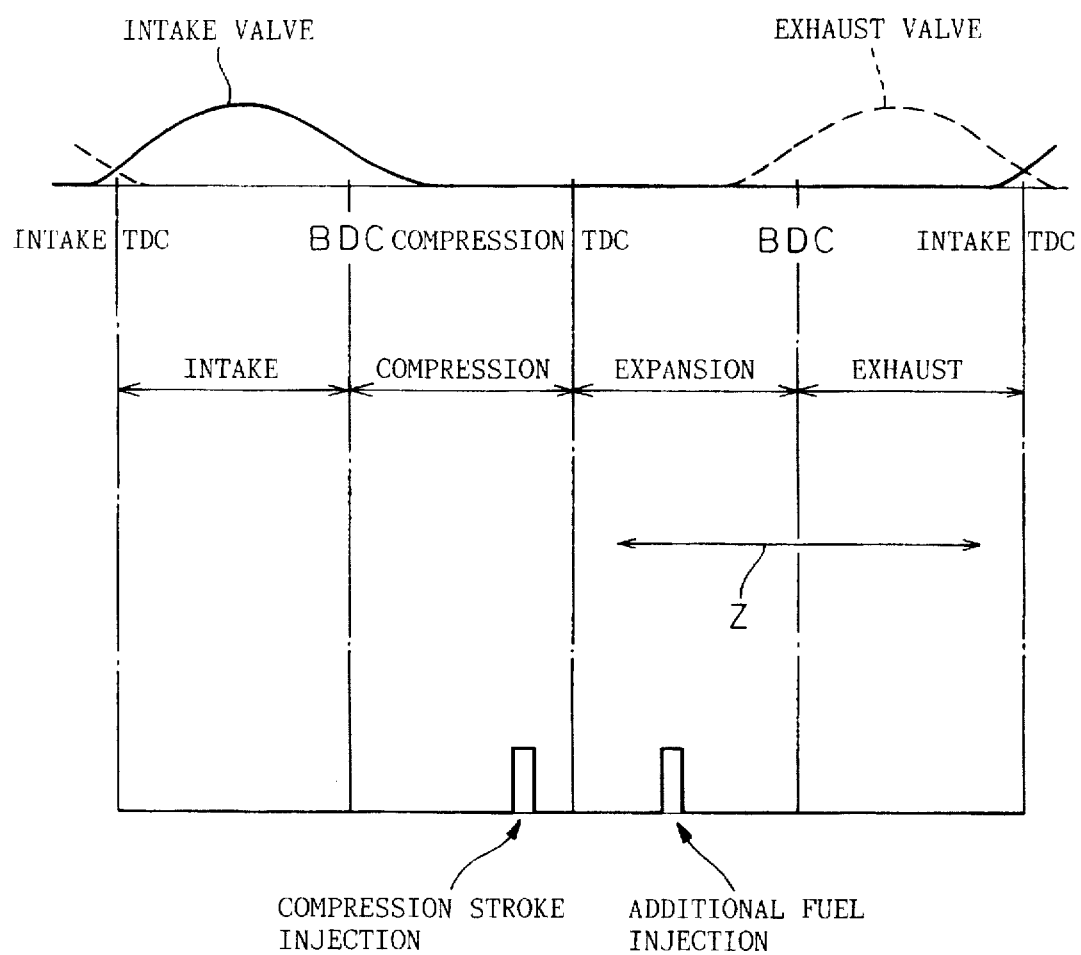
FIG. 31 is a view of additional fuel injection.
Figure 32:
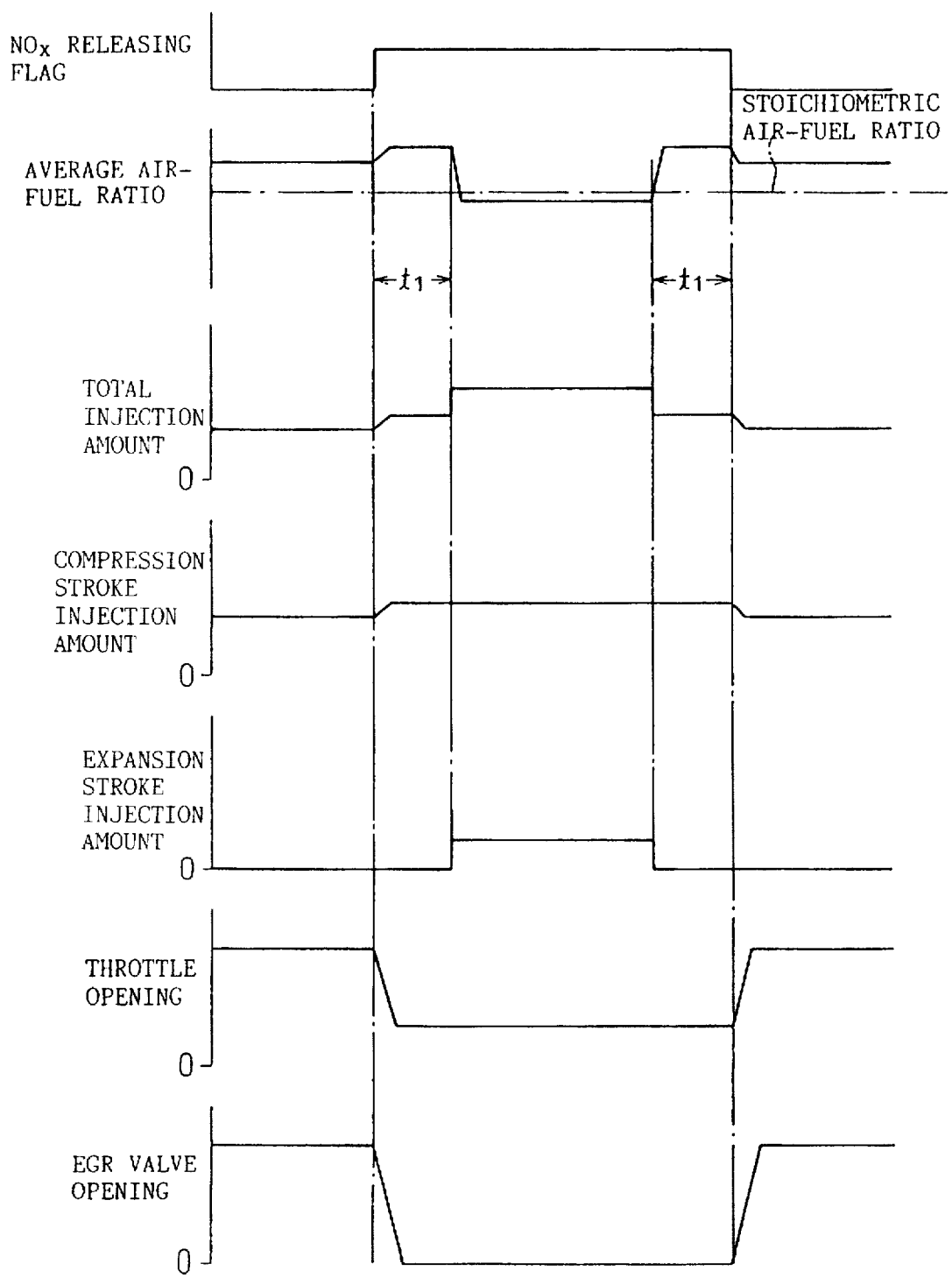
FIG. 32 is a time chart of $NO_x$ releasing control showing still another embodiment for the rich processing I.

FIG. 31 and FIG. 32 show still another embodiment of the rich processing I performed in the strong stratifying state. In this embodiment, when $NO_x$ is to be released from the $NO_x$ absorbent 26, additional fuel is made to be injected into the combustion chamber 5 during the expansion stroke or exhaust stroke. FIG. 31 shows the case of supply of this additional fuel during the expansion stroke or compression stroke. In this case, the additional fuel is supplied from the fuel injector 11 in the zone Z shown in FIG. 31. In the expansion stroke and exhaust stroke, the temperature of the burnt gas in the combustion chamber 5 is considerably high. Accordingly, if additional fuel is injected into this burnt gas, the hydrocarbons will break down into small molecules and part of the hydrocarbons will become radicals, therefore the fuel will become activated and will exhibit a strong reaction to the $NO_x$. Accordingly, the $NO_x$ is released well from the $NO_x$ absorbent 26 and the released $NO_x$ is reduced well. Note that, to enhance the reaction to the $NO_x$, it is preferable to inject additional fuel when the temperature of the burnt gas is high. Accordingly, the additional fuel injection is preferably performed in the expansion stroke as shown in FIG. 31.

Note that this additional fuel does not contribute to the output even if burned and accordingly the supply of the additional fuel does not result in any fluctuation of the output torque of the engine.

As shown in FIG. 32, in this embodiment, when the $NO_x$ releasing flag is set, the throttle valve 23 is closed and the EGR valve 29 is fully closed. Next, when a time $t_1$ elapses after the $NO_x$ releasing flag is set, the compression stroke injection amount is maintained as it is and additional fuel is injected in the expansion stroke so an action of releasing $NO_x$ from the $NO_x$ absorbent 26 is started. Note that, at this time, no intake stroke injection is performed.

On the other hand, when the $NO_x$ releasing action has been completed, the reverse procedure is followed to return to the strong stratifying state. That is, when the $NO_x$ releasing action has been completed, the additional fuel injection in the expansion stroke is stopped. Next, when the time $t_1$ has elapsed from when the $NO_x$ releasing action has been completed, the throttle valve 23 and EGR valve 29 are opened and the $NO_x$ releasing flag is reset.

Figure 33:
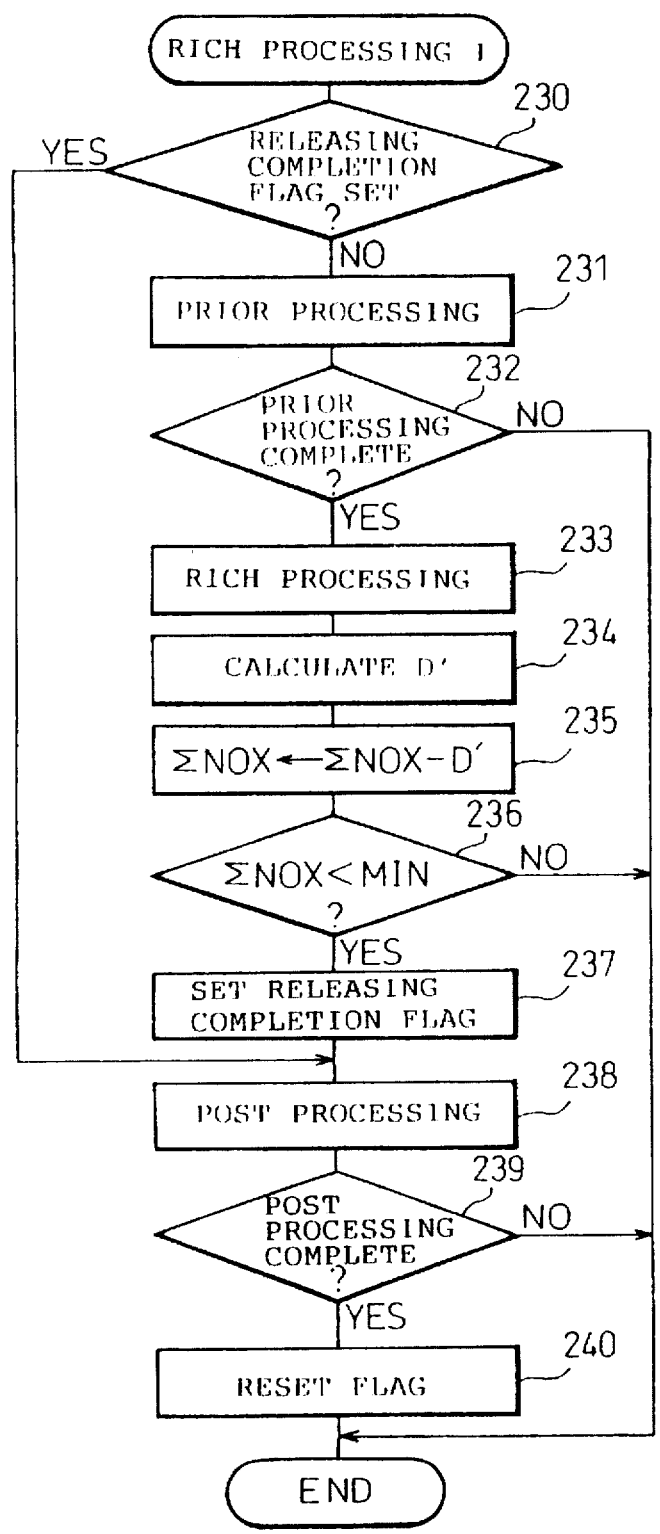
FIG. 33 is a flow chart of still another embodiment for the rich processing I.

FIG. 33 shows the routine of the rich processing I for executing the $NO_x$ releasing control shown in FIG. 32. Referring to FIG. 33, first of all, at step 230, whether the releasing completion flag is set or not is decided. When the releasing completion flag is not set, step 231 is proceeded to, while when the releasing completion flag is set, step 238 is jumped to. At step 231, the prior processing is performed until the additional fuel is supplied after the $NO_x$ releasing flag is set. Next, at step 232, whether the prior processing has been completed or not is decided. When the prior processing has been completed, step 233 is proceeded to, where the additional fuel is supplied.

Next, at step 234, the $NO_x$ releasing D' is calculated from FIG. 23. Next, at step 235, the $NO_x$ amount $\Sigma NO_x$ is reduced by the $NO_x$ releasing D'. Next, at step 236, whether the $NO_x$ amount $\Sigma NO_x$ has become smaller than the lower value MIN or not is decided. When $\Sigma NO_x < MIN$, step 237 is proceeded to, where the releasing completion flag is set. Next, at step 238, post processing is performed until the strong stratifying state is returned to from the completion of the releasing of $NO_x$. Next, at step 239, whether the post processing is completed or not is decided. When the post processing is completed, step 240 is proceeded to, where the $NO_x$ releasing flag and releasing completion flag are reset.

Figure 34:
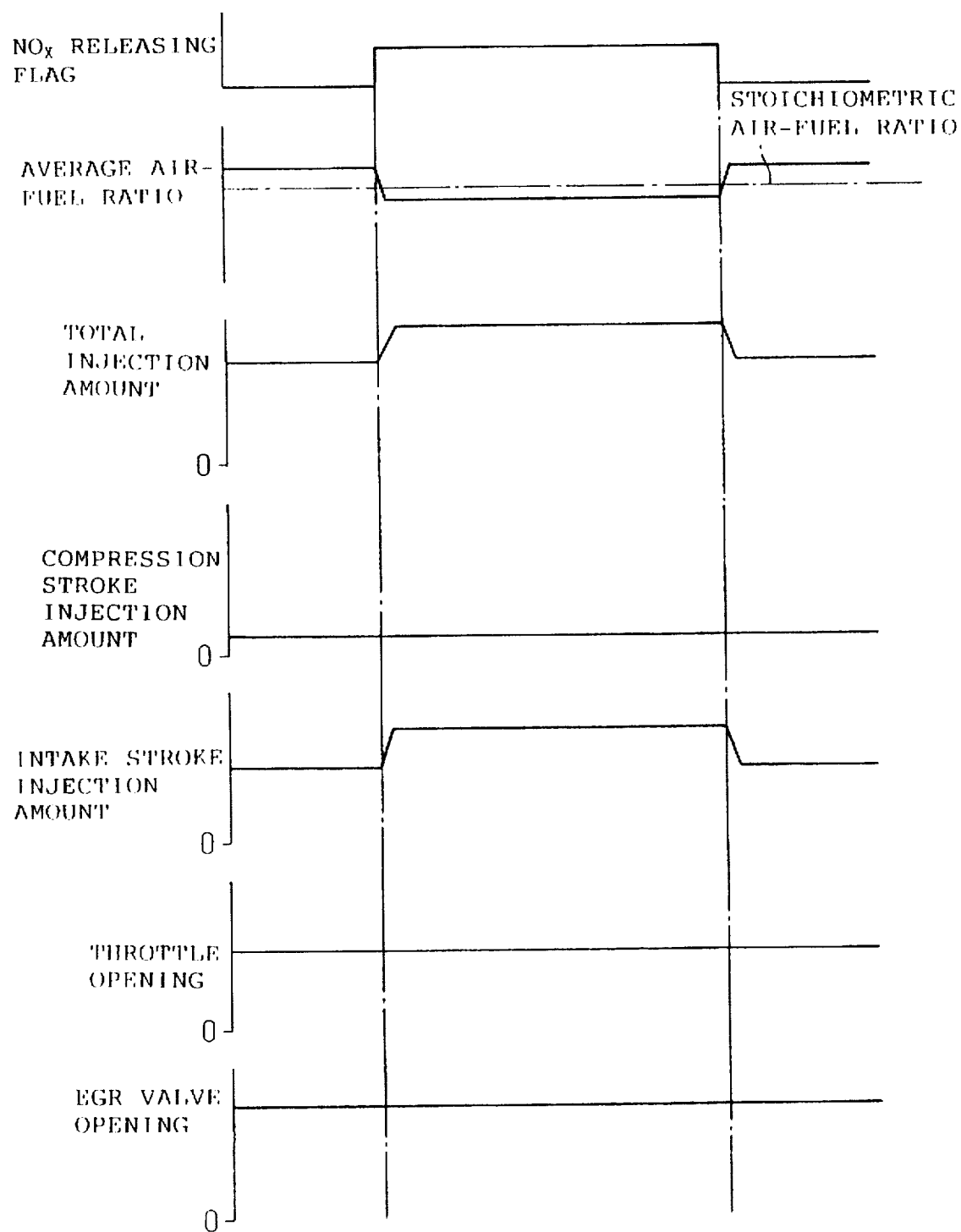
FIG. 34 is a time chart of $NO_x$ releasing control for the rich processing II.

FIG. 34 shows a time chart of an embodiment of the rich processing II. As shown in FIG. 21, at the time of engine medium load operation before the $NO_x$ releasing flag is set, two injections, that is, the intake stroke injection and compression stroke injection, are performed. That is, at this time, the mixture is in a weak stratifying state and the average air-fuel ratio in the combustion chamber 5 becomes lean. When the $NO_x$ releasing flag is set, the intake stroke injection amount is increased while still in the weak stratifying state, so the average air-fuel ratio in the combustion chamber 5 is made rich and the action of releasing the $NO_x$ from the $NO_x$ absorbent 26 is performed. When the $NO_x$ releasing action has been completed, the intake stroke injection amount is reduced.

Figure 35:
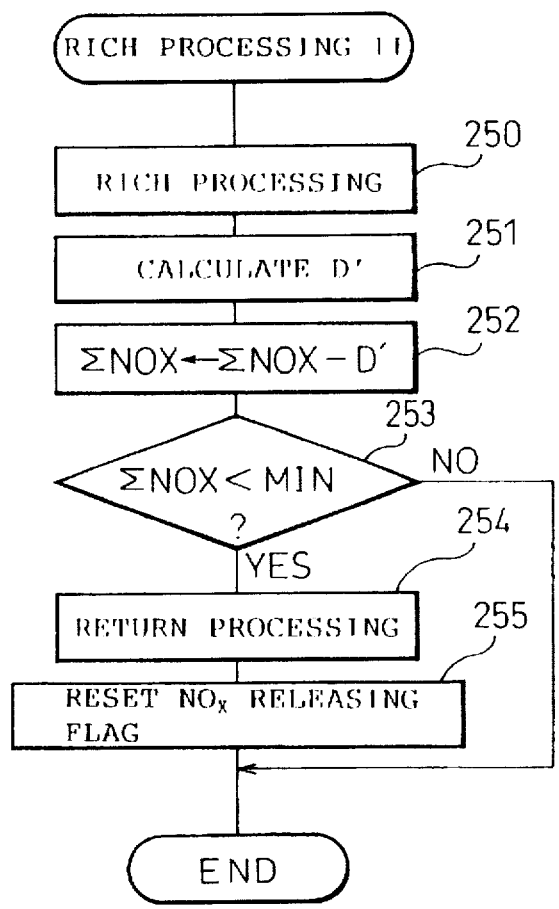
FIG. 35 is a flow chart for the rich processing II.

FIG. 35 shows the routine of the rich processing II for executing the $NO_x$ releasing control shown in FIG. 34. Referring to FIG. 35, first of all, at step 250, the intake stroke injection amount is increased whereby the average air-fuel ratio A/F is made rich. Next, at step 251, the $NO_x$ releasing D' is calculated from FIG. 2. Next, at step 252, the $NO_x$ amount $\Sigma NO_x$ is reduced by the $NO_x$ releasing D'. Next, at step 253, whether the $NO_x$ amount $\Sigma NO_x$ has become smaller than the lower value MIN or not is decided. When $\Sigma NO_x$<MIN, step 254 is proceeded to, where the intake stroke injection amount is reduced and the average air-fuel ratio A/F changes from rich to lean. Next, at step 255, the $NO_x$ releasing flag is reset.

Figure 36:
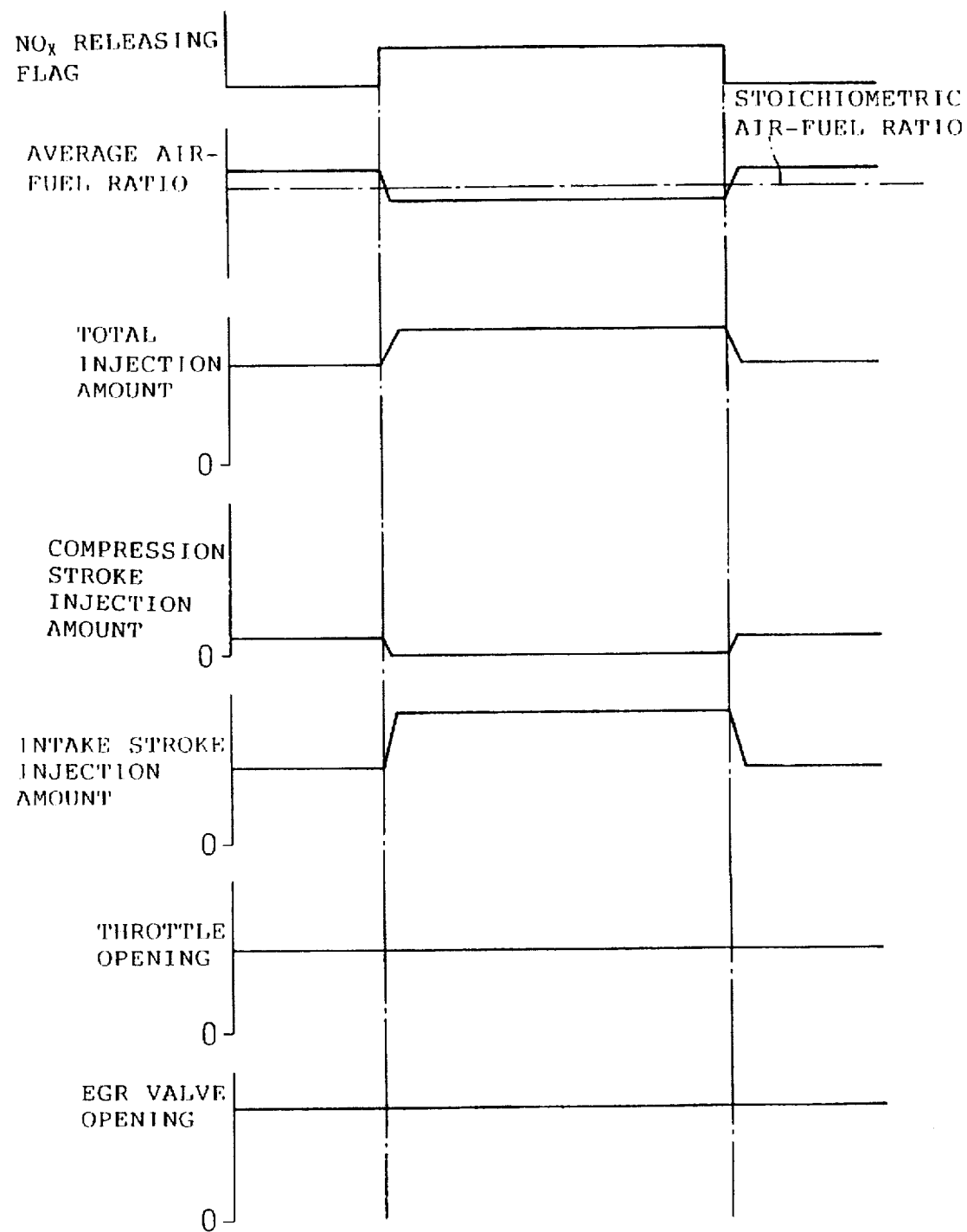
FIG. 36 is a time chart of $NO_x$ releasing control showing another embodiment for the rich processing II.

FIG. 36 shows another embodiment of the rich processing II performed in the weak stratifying state. In this embodiment, when the $NO_x$ releasing flag is set, the compression stroke injection is stopped and the intake stroke injection amount is increased. That is, when the $NO_x$ releasing flag is set, the weak stratifying state is changed to the homogeneous air-fuel mixture state, the average air-fuel ratio in the combustion chamber 5 is made rich, and the action of releasing $NO_x$ from the $NO_x$ absorbent 26 is started. When the $NO_x$ releasing action has been completed, the homogeneous air-fuel mixture state is returned to the weak stratifying state.

Figure 37:
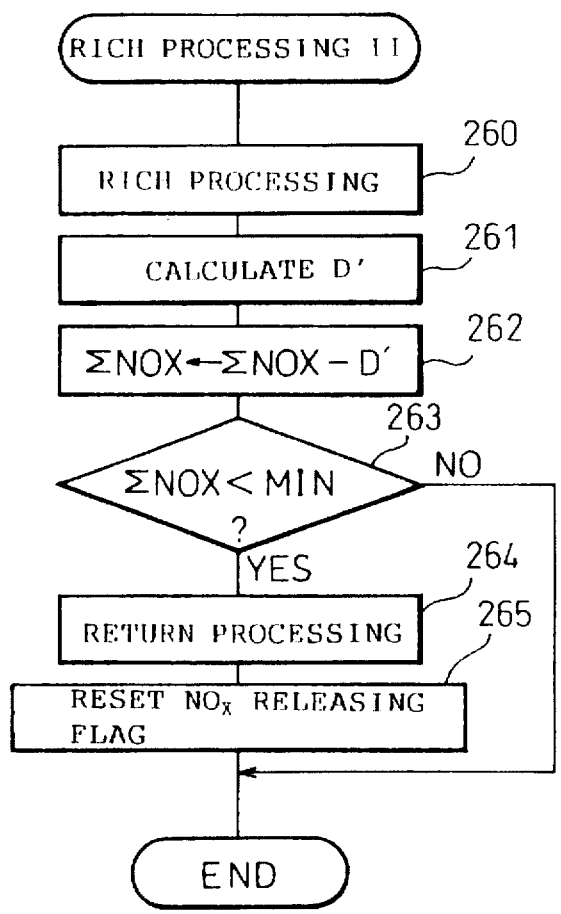
FIG. 37 is a flow chart of another embodiment for the rich processing I.

FIG. 37 shows the routine of the rich processing II for executing the $NO_x$ releasing control shown in FIG. 36. Referring to FIG. 37, first of all, at step 260, the intake stroke injection amount is increased whereby the average air-fuel ratio A/F is made rich. Next, at step 261, the No, releasing D' is calculated from FIG. 23. Next, at step 262, the $NO_x$ amount $\Sigma NO_x$ is reduced by the $NO_x$ releasing D'. Next, at step 263, whether the $NO_x$ amount $\Sigma NO_x$ has become smaller than the lower value MIN or not is decided. When $\Sigma NO_x$<MIN, step 264 is proceeded to, where the intake stroke injection amount is reduced and the average air-fuel ratio A/F changes from rich to lean. Next, at step 265, the $NO_x$ releasing flag is reset.

Figure 38:
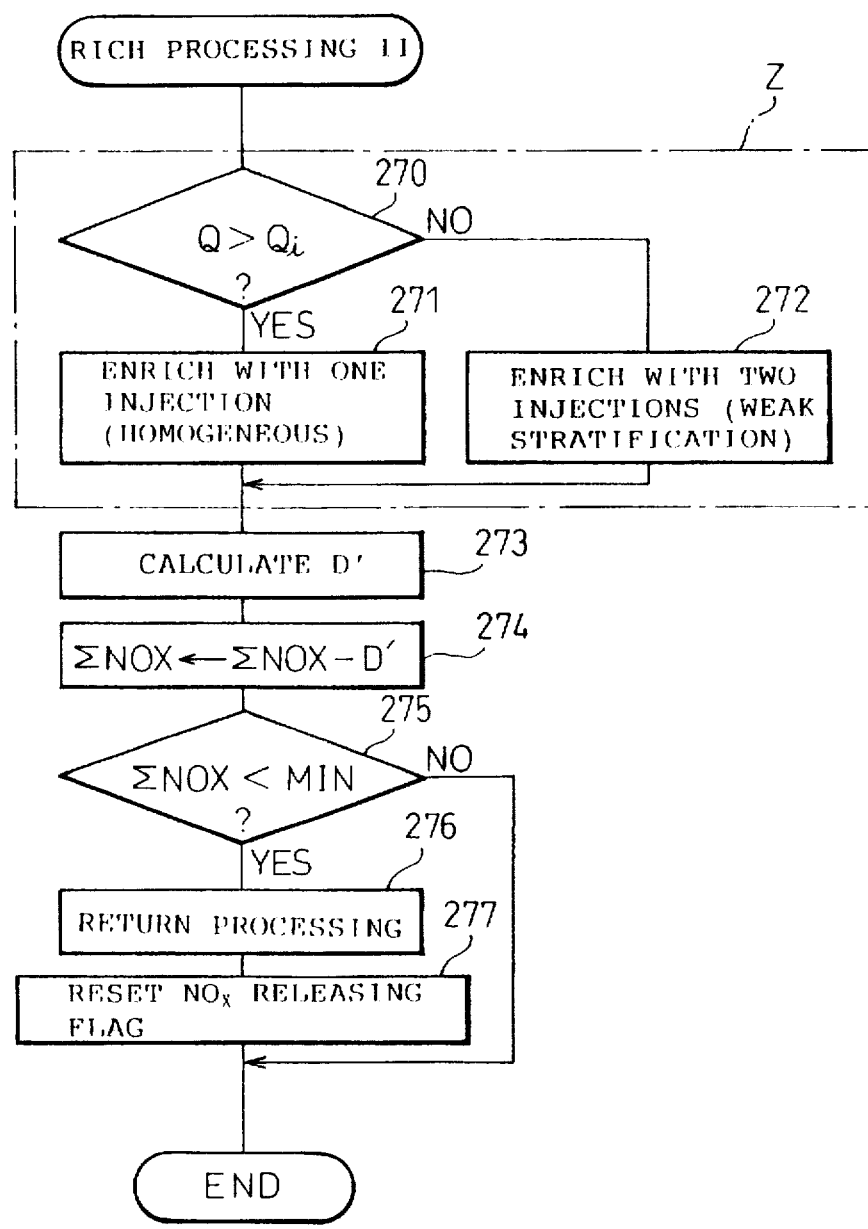
FIG. 38 is a flow chart of still another embodiment for the rich processing II.

FIG. 38 shows still another embodiment of the rich processing II performed in the weak stratifying state. In this embodiment, when releasing the $NO_x$ from the $NO_x$ absorbent 26, selection is made of whether the mixture is to be enriched in the weak stratifying state or enriched in the homogeneous air-fuel mixture state in accordance with the fuel injection amount Q. Note that, the routine shown in FIG. 38 shows the rich processing in the box shown by Z.

Referring to FIG. 38, first of all, at step 270, whether the fuel injection amount Q is larger than a predetermined set value $Q_i$ or not is decided. When Q>$Q_i$, step 271 is proceeded to, where the enrichment is performed in the homogeneous air-fuel mixture state. That is, when the $NO_x$ releasing flag is set, as shown in FIG. 36, the compression stroke injection is stopped and the intake stroke injection amount is increased. As opposed to this, when Q<$Q_i$, step 272 is proceeded to, where the enrichment is performed in the weak stratifying state. That is, when the $NO_x$ releasing flag is set, as shown in FIG. 34, the compression stroke injection is performed and the intake stroke injection amount is increased.

Next, at step 273, the $NO_x$ releasing D' is calculated from FIG. 23. Next, at step 274, the $NO_x$ amount $\Sigma NO_x$ is reduced by the $NO_x$ releasing D'. Next, at step 275, whether the $NO_x$ amount $\Sigma NO_x$ has become smaller than the lower value MIN or not is decided. When $\Sigma NO_x$<MIN, step 276 is proceeded to, where the intake stroke injection amount is reduced and the average air-fuel ratio A/F changes from rich to lean. Next, at step 277, the $NO_x$ releasing flag is reset.

Figure 39:
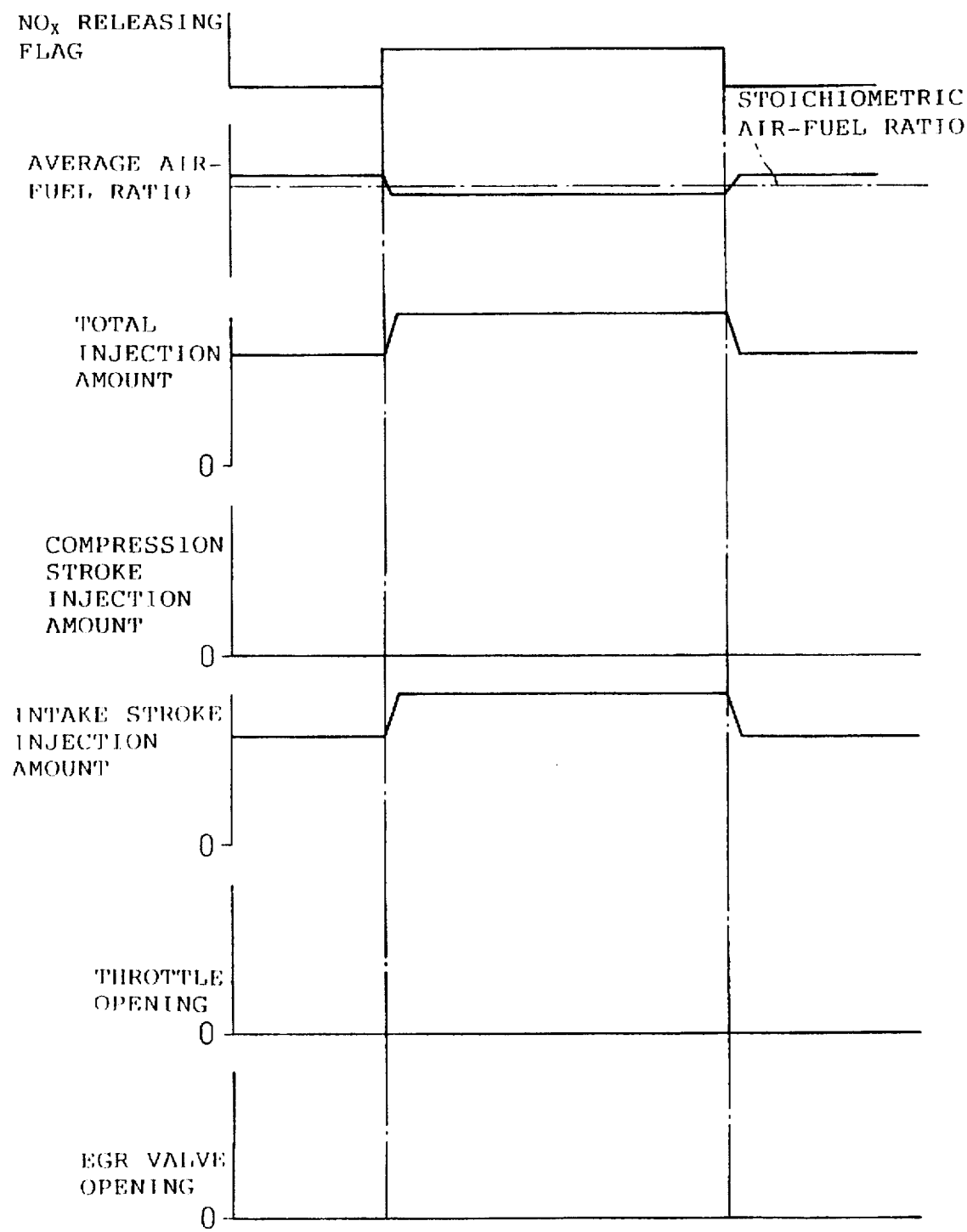
FIG. 39 is a time chart of $NO_x$ releasing control showing still another embodiment for the rich processing III.

FIG. 39 shows a time chart of an embodiment of the rich processing III. As shown in FIG. 39, at the time of engine high load operation before the $NO_x$ releasing flag is set, just the intake stroke injection is performed and the homogeneous air-fuel mixture is burned. When the $NO_x$ releasing flag is set, the intake stroke injection amount is increased and the average air-fuel ratio A/F is made rich.

Figure 40:
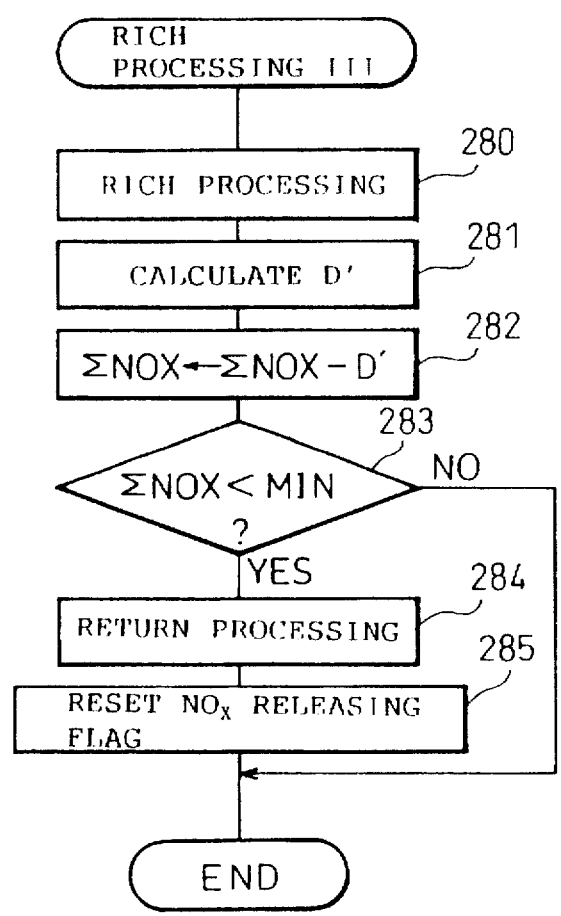
FIG. 40 is a flow chart of still another embodiment for the rich processing I.

FIG. 40 shows the routine of the rich processing III for executing the $NO_x$ releasing control shown in FIG. 39. Referring to FIG. 40, first of all, at step 280, the intake stroke injection amount is increased whereby the average air-fuel ratio A/F is made rich. Next, at step 281, the $NO_x$ releasing D' is calculated from FIG. 23. Next, at step 282, the $NO_x$ amount $\Sigma NO_x$ is reduced by the $NO_x$ releasing D'. Next, at step 283, whether the $NO_x$ amount $\Sigma NO_x$ has become smaller than the lower value MIN or not is decided. When $\Sigma NO_x$ <MIN, step 284 is proceeded to, where the intake stroke injection amount is reduced and the average air-fuel ratio A/F changes from rich to lean. Next, at step 285, the $NO_x$ releasing flag is reset.

Figure 41:
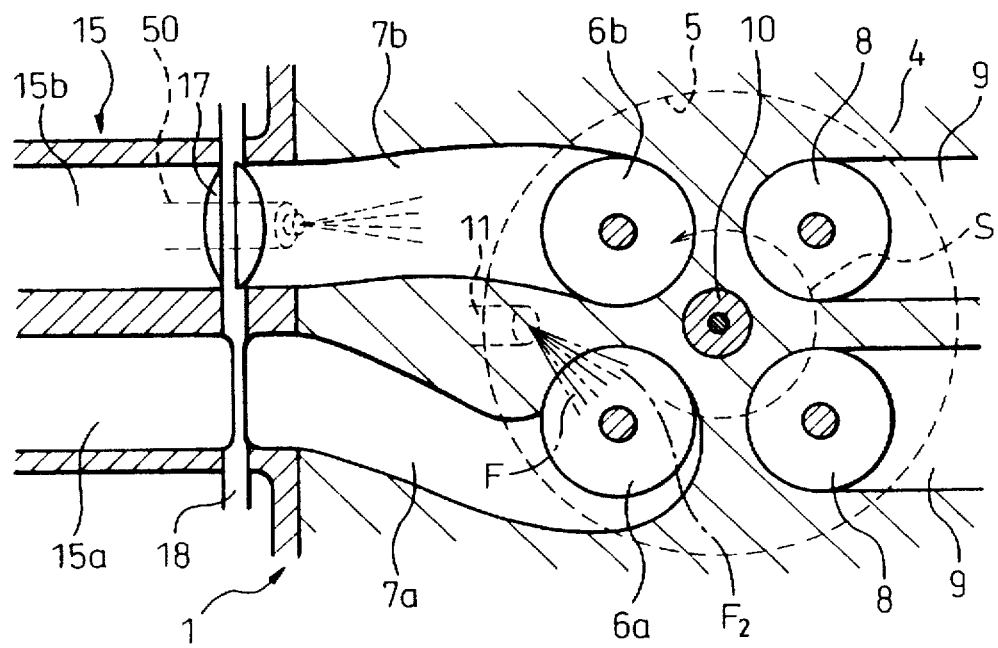
FIG. 41 is a sectional plan view of a cylinder head showing another embodiment.
Figure 42:
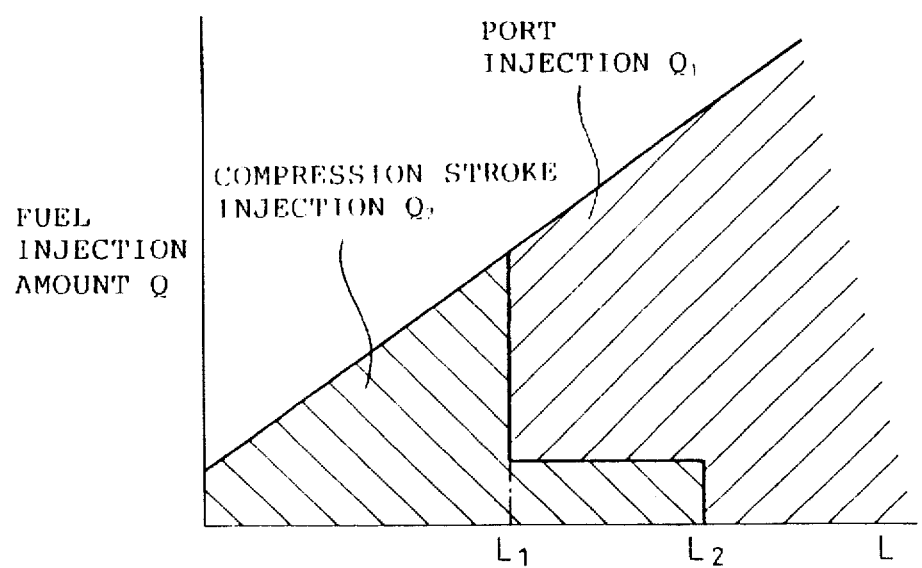
FIG. 42 is a view of the fuel injection amount.

FIG. 41 to FIG. 48 show still another embodiment. In this embodiment, as shown in FIG. 41, a fuel injector 50 for injecting fuel toward the inside of a second intake port 7b downstream of the intake control valve 17, that is, a so-called port injector 50, is provided. The fuel to be supplied into the combustion chamber 5 during the intake stroke is supplied from the port injector 50. That is, in this embodiment, at the time of ordinary operation, as shown in FIG. 42, at the time of engine low load operation when L >$L_1$, only the compression stroke injection $Q_2$ is performed, at the time of engine medium load operation when $L_1$ <L <$L_2$, compression stroke injection $Q_2$ and also port injection $Q_1$ from the port injector 50 are performed, and at the time of engine high load operation when L >$L_2$, only the port injection $Q_1$ is performed.

Accordingly, in this embodiment as well, in the same way as the embodiments discussed previously, at the time of engine low load operation a strong stratifying state results, at the time of engine low load operation, a weak stratifying state results, and at the time of engine high load operation, a homogeneous air-fuel mixture state results. Note that, in this embodiment as well, the injection control routine shown in FIG. 20 is used for the fuel injection control. Below, an explanation will be made of the rich processing I, rich processing II, and rich processing III shown in FIG. 20 in order.

Figure 43:
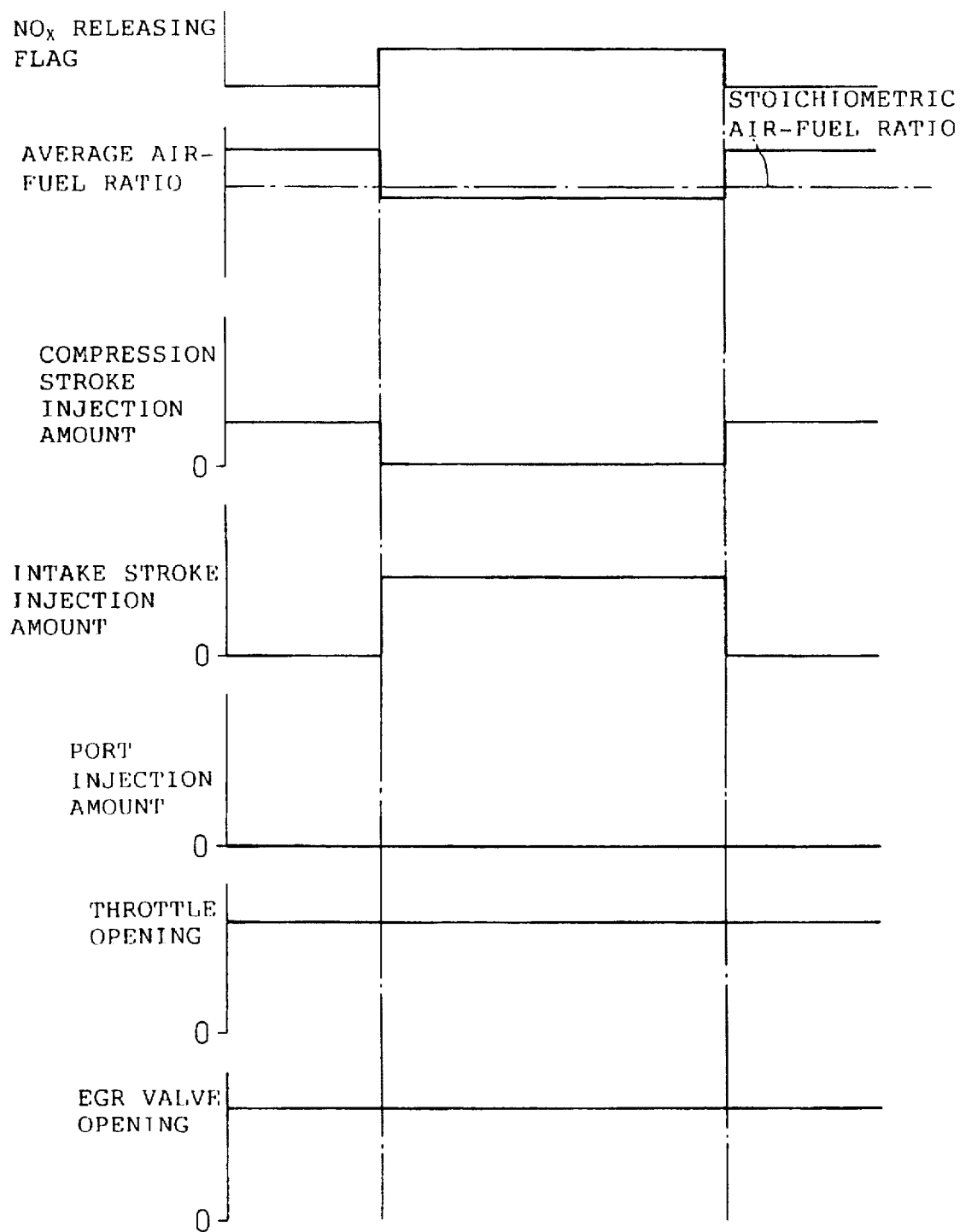
FIG. 43 is a time chart of $NO_x$ releasing control for the rich processing I.

FIG. 43 shows the rich processing I performed in the strong stratifying state. As shown in FIG. 43, at the time of engine low load operation, when the $NO_x$ releasing flag is not set, just the compression stroke injection is performed. Next, when the $NO_x$ releasing flag is set, the compression stroke injection is stopped and intake stroke injection is performed from the fuel injector 11 into the combustion chamber 5. Further, at this time, port injection is not performed from the port injector 50. Accordingly, at this time, the intake stroke injection from the fuel injector 11 causes the formation of a homogeneous air-fuel mixture of a rich average air-fuel ratio A/F in the combustion chamber 5, whereby the action of releasing the $NO_x$ from the $NO_x$ absorbent 26 is performed.

At the time of engine low load operation, port injection is not performed. If port injection is started for the $NO_x$ releasing action at this time, then since the injected fuel adheres to the inside walls of the second intake port 7b right after the start of the injection, the average air-fuel ratio A/F will not immediately become rich. That is, a delay in the response of the $NO_x$ releasing action is caused. Accordingly, when port injection is not performed, when releasing the $NO_x$ from the $NO_x$ absorbent 26, the fuel injected from the fuel injector 11 is increased whereby the average air-fuel ratio A/F is made rich. As opposed to this, when port injection is performed, no delay in response is caused even if increasing the amount of port injection, so when port injection is performed, the amount of port injection is increased to make the average air-fuel ratio A/F rich when causing the releasing of $NO_x$ from the $NO_x$ absorbent 26.

Figure 44:
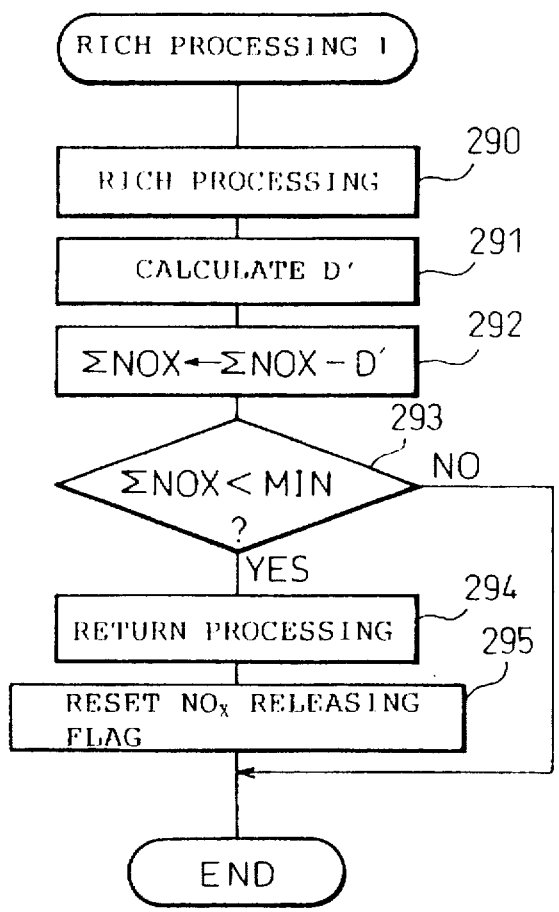
FIG. 44 is a flow chart of the rich processing I.

FIG. 44 shows the routine of the rich processing I for executing the $NO_x$ releasing control shown in FIG. 43. Referring to FIG. 44, first of all, at step 290, the intake stroke injection is started so as to make the average air-fuel ratio A/F rich. Next, at step 29, the NOX releasing D' is calculated from FIG. 23. Next, at step 292, the $NO_x$ amount $\Sigma NO_x$ is reduced by the $NO_x$ releasing D'. Next, at step 293, whether the $NO_x$ amount $\Sigma NO_x$ has become smaller than the lower limit MIN or not is decided. If $\Sigma NO_x$<MIN, step 294 is proceeded to, where the intake stroke injection is stopped and the average air-fuel ratio A/F changes from rich to lean. Next, at step 295, the $NO_x$ releasing flag is reset.

Figure 45:
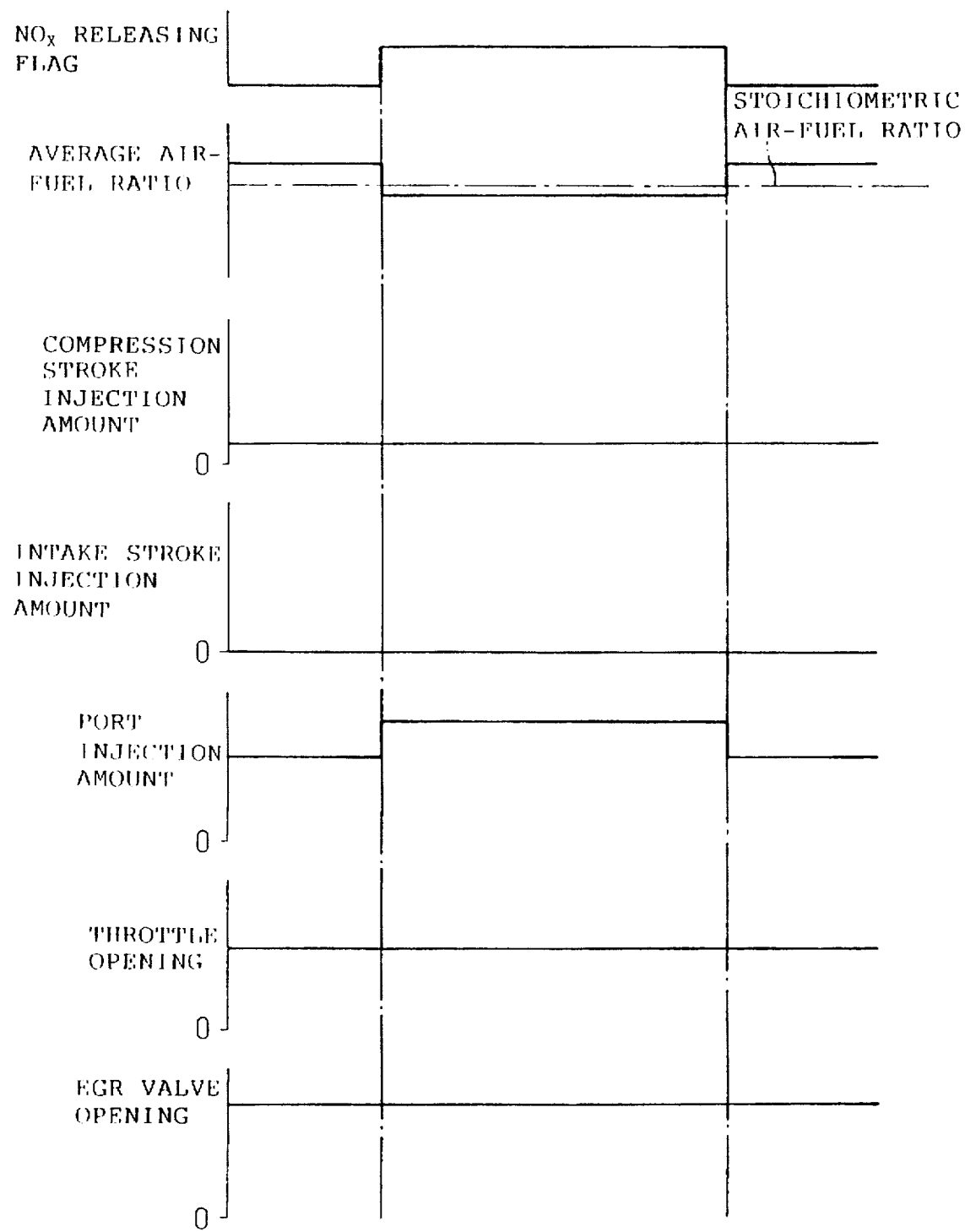
FIG. 45 is a time chart of $NO_x$ releasing control for the rich processing II.

FIG. 45 shows the rich processing II which is performed in the weak stratifying state. As shown in FIG. 45, at the time of engine medium load operation, before the $NO_x$ releasing flag is set, port injection is performed in addition to compression stroke injection. When the $NO_x$ releasing flag is set, the compression stroke injection continues to be performed and the amount of port injection is increased, whereby the average air-fuel ratio A/F is made rich and the action of releasing $NO_x$ from the $NO_x$ absorbent 26 is performed.

Figure 46:
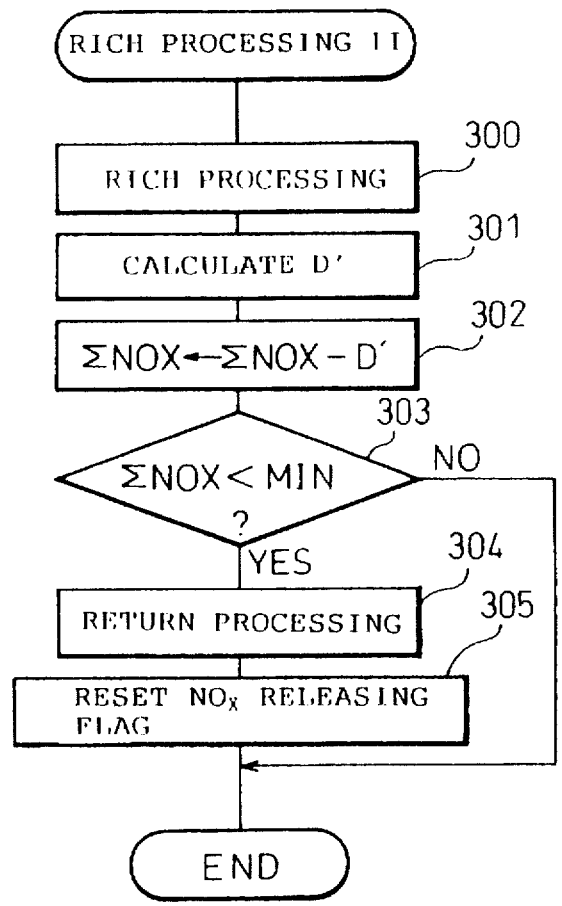
FIG. 46 is a flow chart of the rich processing II.

FIG. 46 shows the routine of the rich processing II for executing the $NO_x$ releasing control shown in FIG. 45. Referring to FIG. 46, first of all, at step 300, the amount of port injection is increased whereby the average air-fuel ratio A/F is made rich. Next, at step 301, the $NO_x$ releasing D' is calculated from FIG. 23. Next, at step 302, the $NO_x$ amount $\Sigma NO_x$ is reduced by the $NO_x$ releasing D'. Next, at step 303, whether the $NO_x$ amount $\Sigma NO_x$ has become smaller than the lower value MIN or not is decided. When $\Sigma NO_x$<MIN, step 304 is proceeded to, where the amount of port injection is reduced and the average air-fuel ratio A/F changes from rich to lean. Next, at step 305, the $NO_x$ releasing flag is reset.

Figure 47:
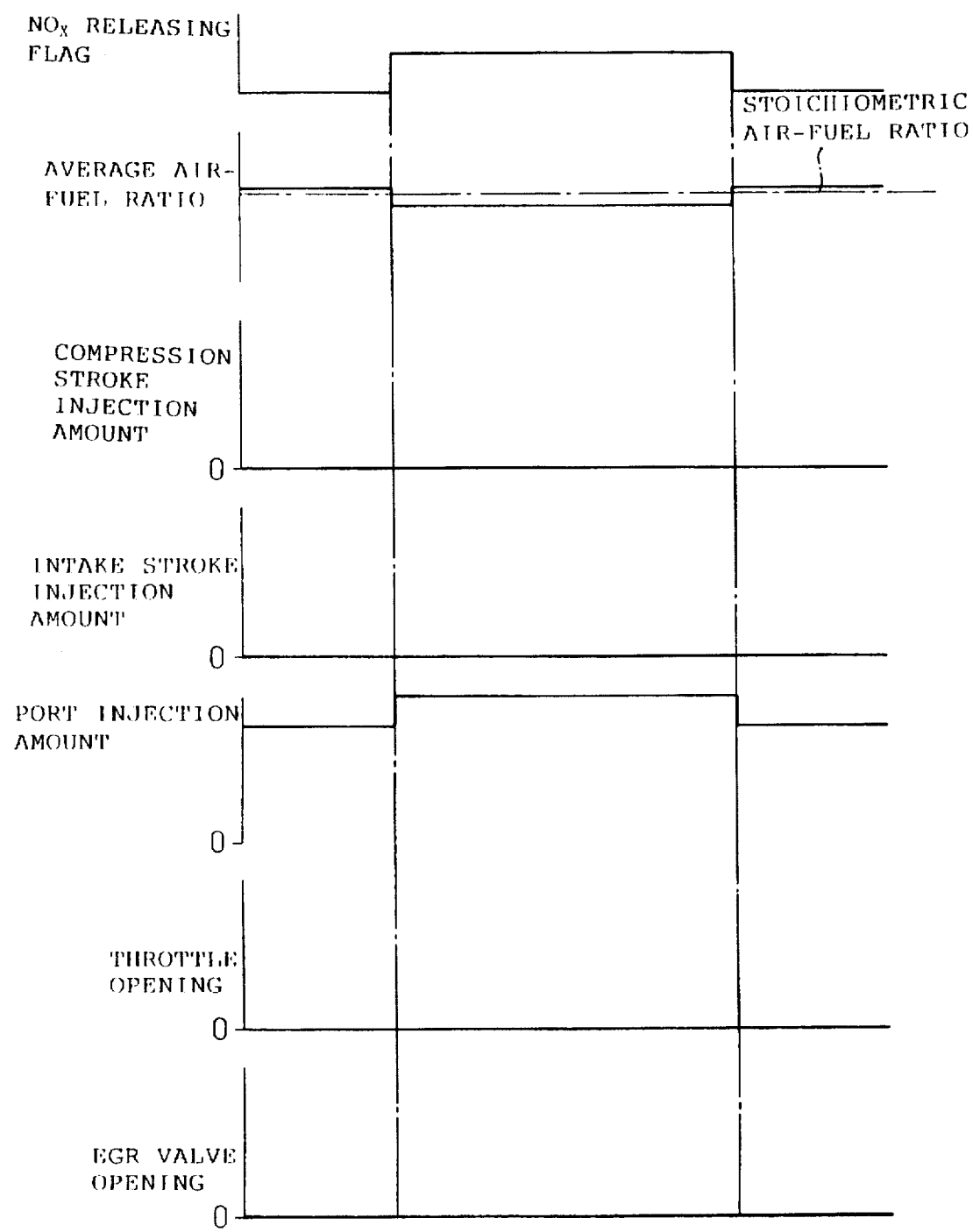
FIG. 47 is a time chart of $NO_x$ releasing control for the rich processing III.

FIG. 47 shows the rich processing III performed in a homogeneous air-fuel mixture state. As shown in FIG. 47, at the time of engine high load operation, only port injection is performed before the $NO_x$ releasing flag is set. Accordingly, at this time, a homogeneous air-fuel mixture is burned. When the $NO_x$ releasing flag is set, the amount of port injection is increased and the average air-fuel ratio A/F is made rich.

Figure 48:
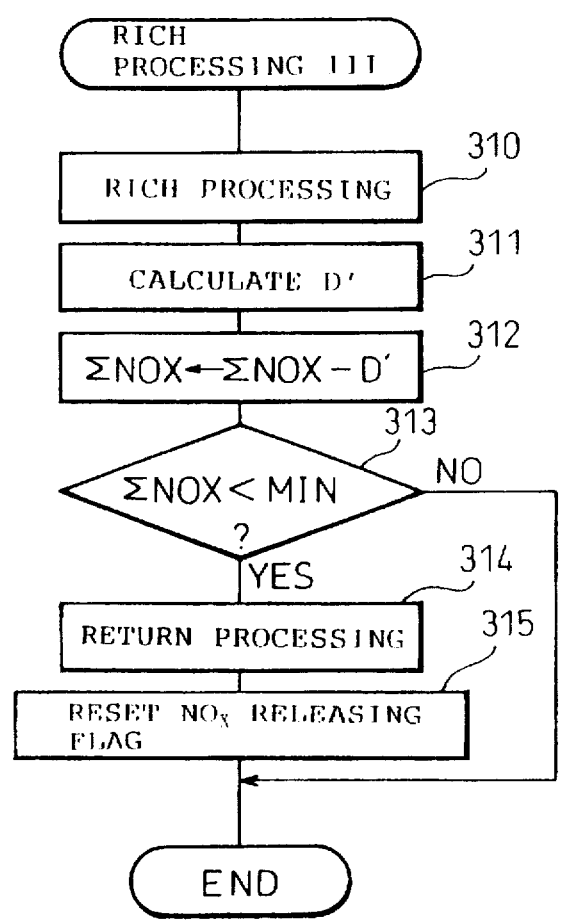
FIG. 48 is a flow chart of the rich processing II.

FIG. 48 shows the routine of the rich processing III for executing the $NO_x$ releasing control shown in FIG. 47. Referring to FIG. 48, first of all, at step 310, the amount of port injection is increased whereby the average air-fuel ratio A/F is made rich. Next, at step 311, the $NO_x$ releasing D' is calculated from FIG. 23. Next, at step 312, the $NO_x$ amount $\Sigma NO_x$ is reduced by the $NO_x$ releasing D'. Next, at step 313, whether the $NO_x$ amount $\Sigma NO_x$ has become smaller than the lower value MIN or not is decided. When $\Sigma NO_x$<MIN, step 314 is proceeded to, where the amount of port injection is reduced and the average air-fuel ratio A/F changes from rich to lean. Next, at step 315, the $NO_x$ releasing flag is reset.

Figure 49:
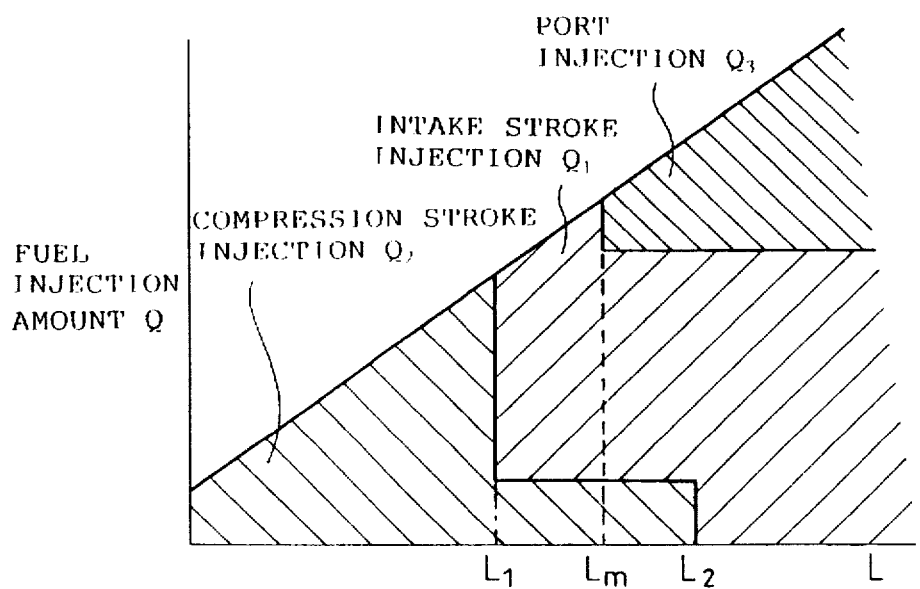
FIG. 49 is a view of the fuel injection amount.

FIG. 49 to FIG. 56 show still another embodiment in the case where the port injection is postponed further. As shown in FIG. 49, in this embodiment too, at the time of ordinary operation at the time of engine low load, only the compression stroke injection $Q_2$ is performed. On the other hand, in this embodiment, at the time of engine medium load operation, if $L_1 < L < L_m$, the intake stroke injection $Q_1$ and compression stroke injection $Q_2$ by the fuel injector 11 are performed. If $L_m < L < L_2$, in addition to the injection $Q_1$ and $Q_2$ by the fuel injector 11, port injection is performed from the port injector 50. Further, at the time of engine high load operation, fuel is injected from both of the fuel injector 11 and the port injector 50.

Figure 50:
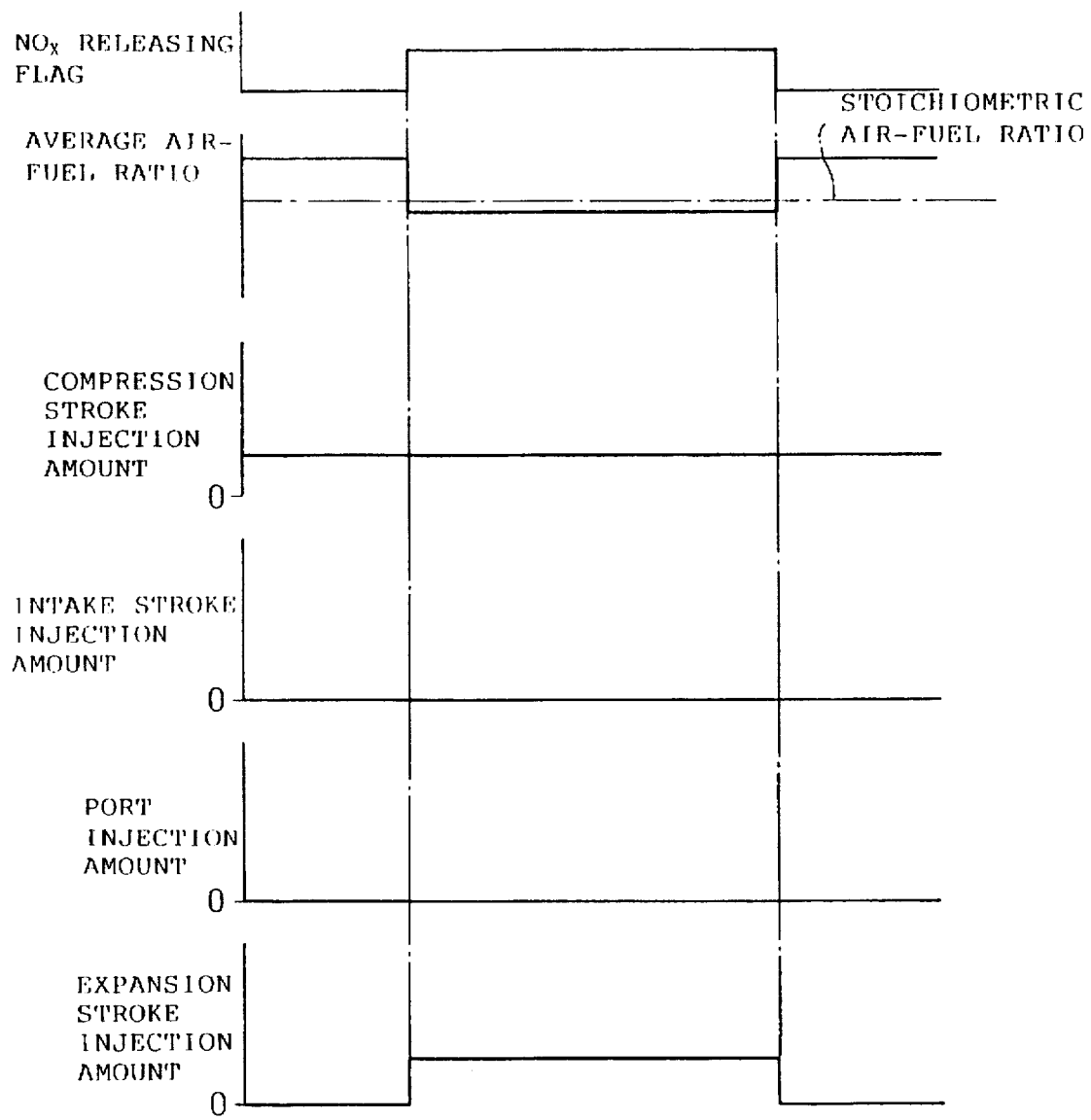
FIG. 50 is a time chart of $NO_x$ releasing control for the rich processing I.

FIG. 50 shows the rich processing I performed at the time of engine low load operation. As shown in FIG. 50, when the $NO_x$ releasing flag is set, the strong stratifying state continues as it is and additional fuel is injected during the expansion stroke so $NO_x$ is released from the $NO_x$ absorbent 26.

Figure 51:
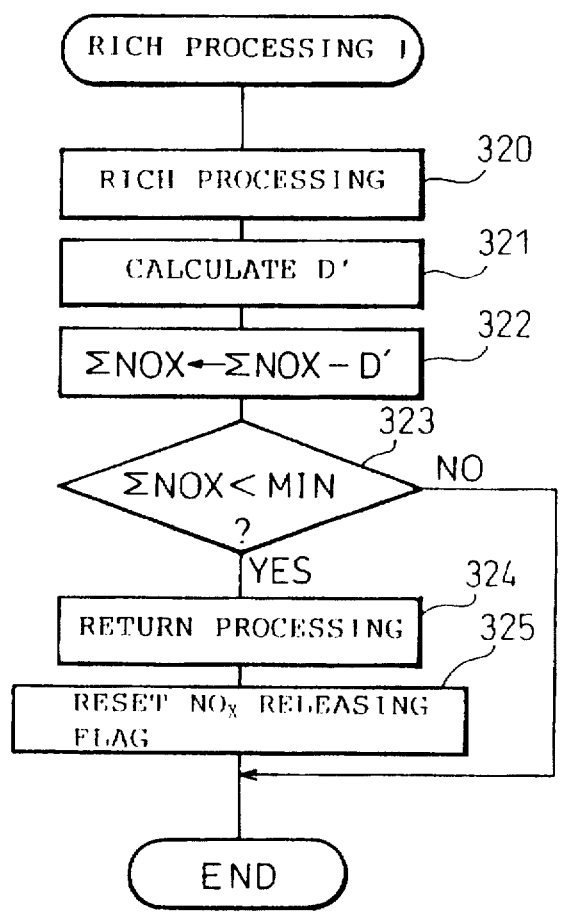
FIG. 51 is a flow chart of the rich processing I.

FIG. 51 shows the routine of the rich processing I for executing the $NO_x$ releasing control shown in FIG. 50. Referring to FIG. 51, first of all, at step 320, the additional fuel is injected at the time of the expansion stroke so that the average air-fuel ratio A/F is made rich. Next, at step 321, the $NO_x$ releasing D' is calculated from FIG. 23. Next, at step 322, the $NO_x$ amount $\Sigma NO_x$ is reduced by the $NO_x$ releasing D'. Next, at step 323, whether the $NO_x$ amount $\Sigma NO_x$ has become smaller than the lower value MIN or not is decided. When $\Sigma NO_x$<MIN, step 324 is proceeded to, where the additional fuel injection is stopped and the average air-fuel ratio A/F changes from rich to lean. Next, at step 325, the $NO_x$ releasing flag is reset.

Figure 52:
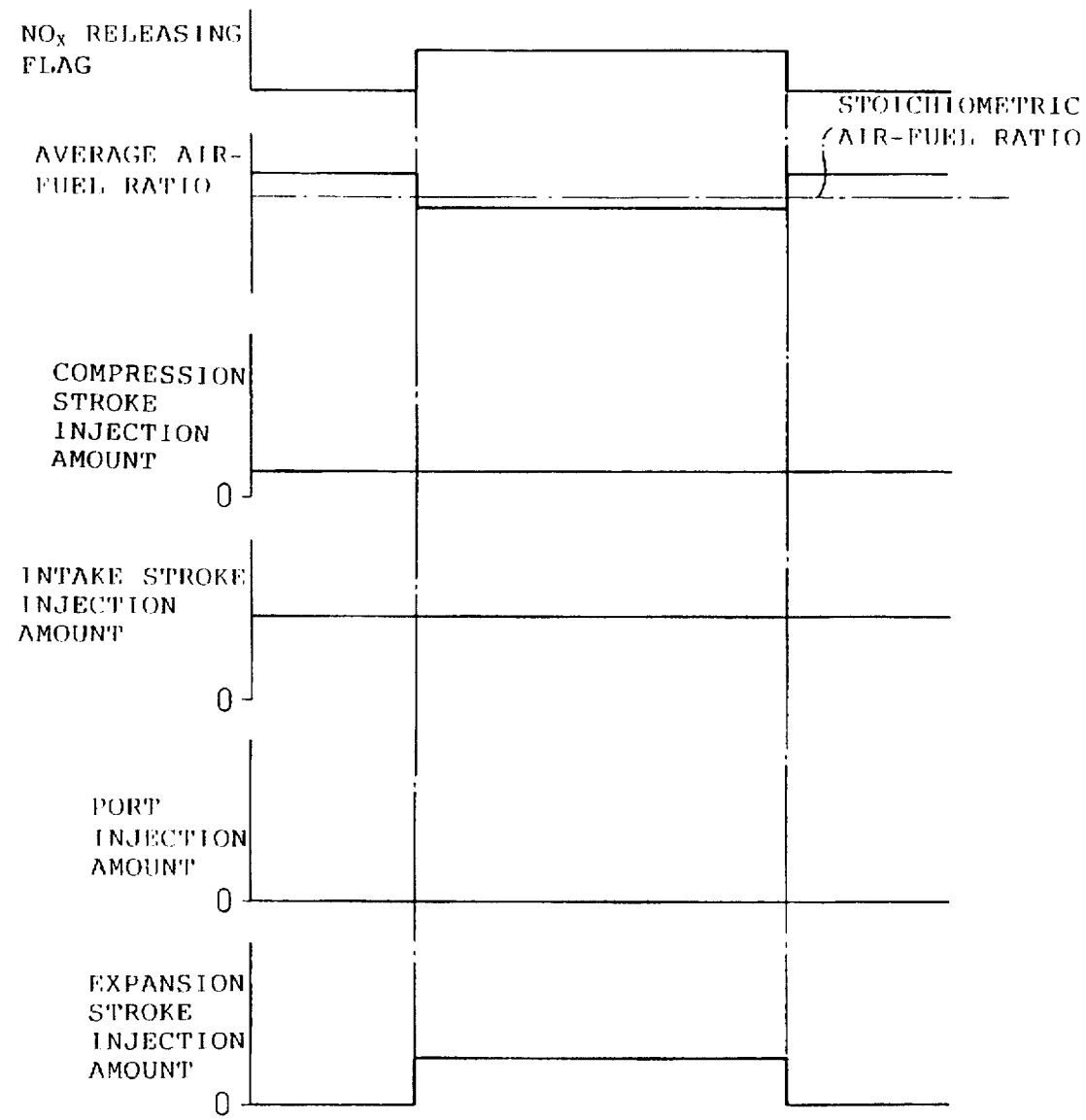
FIG. 52 is a time chart of $NO_x$ releasing control for the rich processing II.
Figure 53:
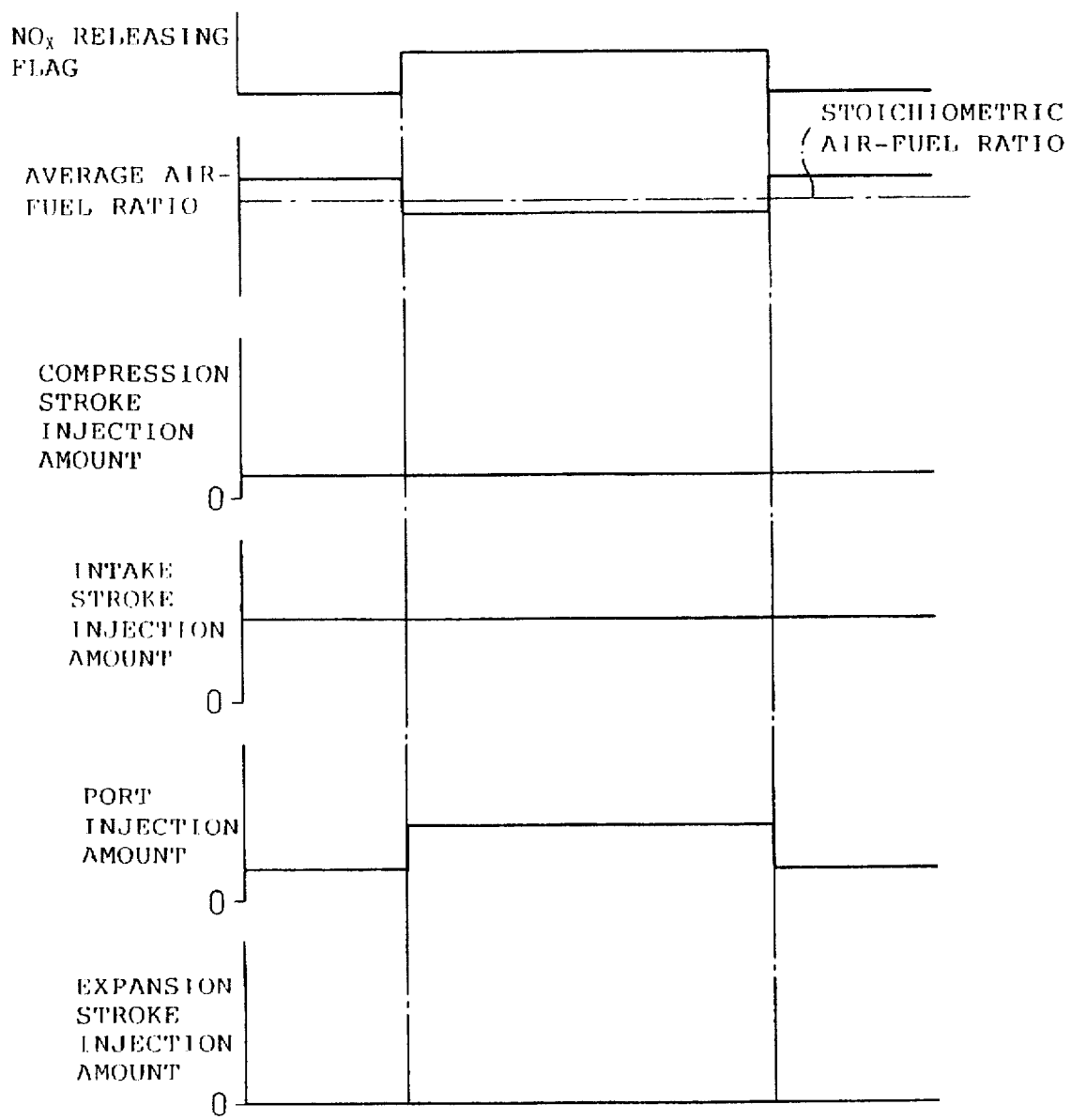
FIG. 53 is a time chart of $NO_x$ releasing control for the rich processing II.

FIG. 52 shows the time of engine medium load operation when $L_1 < L < L_m$ in FIG. 49. In this case, when the $NO_x$ releasing flag is not set, the fuel injection from the fuel injector 11 creates a weak stratifying state. When the $NO_x$ releasing flag is set, additional fuel is injected during the expansion stroke so that the $NO_x$ is released from the $NO_x$ absorbent 26. On the other hand, FIG. 53 shows the time of engine medium load operation where $L_m < L < L_1$, in FIG. 49. In this case, when the $NO_x$ releasing flag is not set, the fuel injected from the fuel injector 11 and port injector 50 create a weak stratifying state. When the $NO_x$ releasing flag is set, the amount of port injection is increased.

Figure 54:
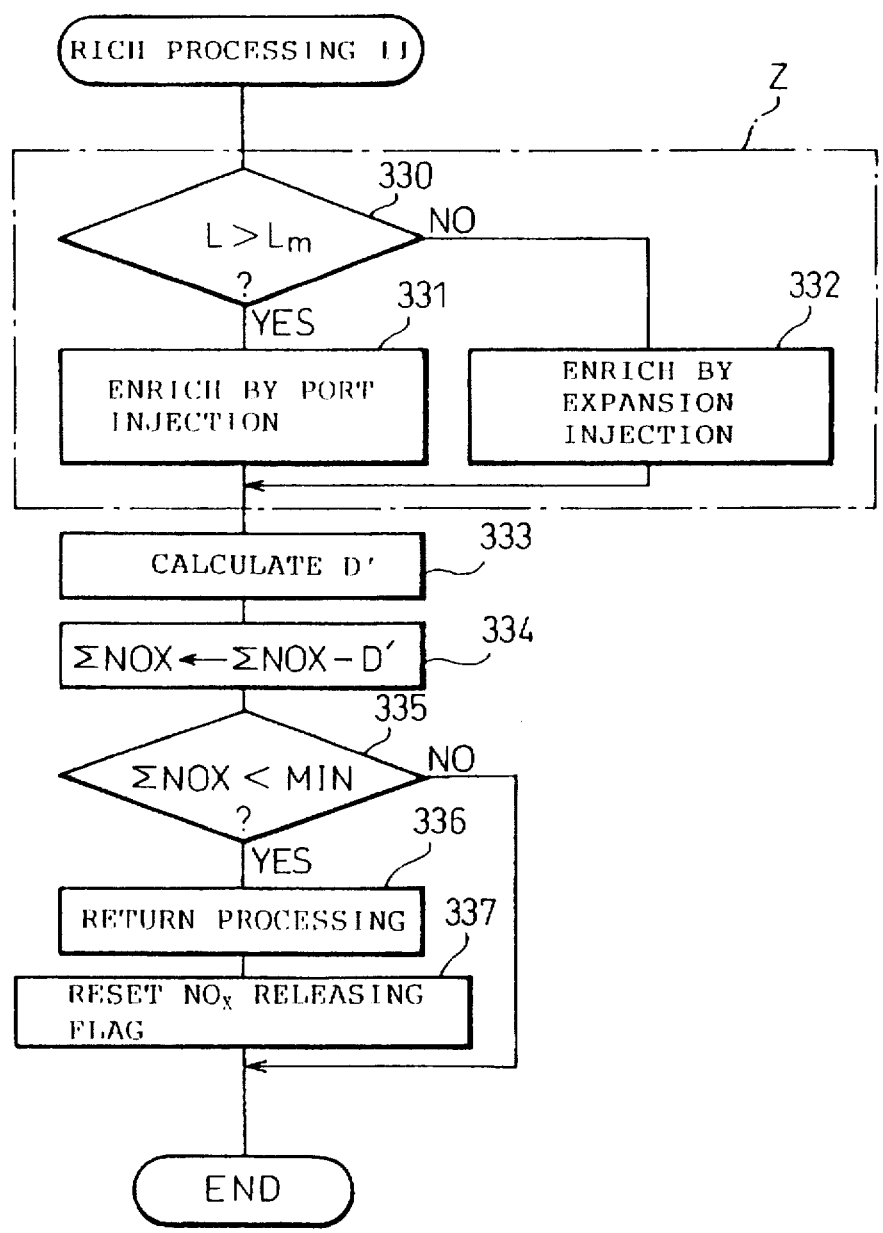
FIG. 54 is a flow chart of the rich processing II.

FIG. 54 shows the routine of the rich processing II for selective execution of the $NO_x$ releasing control shown in FIG. 52 and FIG. 53. Note that in FIG. 54, the box shown by Z shows the rich processing. Referring to FIG. 54, first of all, at step 330, whether the amount of depression L of the accelerator pedal 40 is greater than a set value $L_m$ (FIG. 49) or not is decided. When $L > L_m$, step 331 is proceeded to, where as shown in FIG. 53 the amount of port injection is increased whereby the enrichment is performed. As opposed to this, when L<$L_m$, step 332 is proceeded to, where as shown in FIG. 52 additional fuel is injected during the expansion stroke to perform the enrichment.

Next, at step 333, the $NO_x$ releasing D' is calculated from FIG. 23. Next, at step 334, the $NO_x$ amount $\Sigma NO_x$ is reduced by the $NO_x$ releasing D'. Next, at step 335, whether the $NO_x$ amount $\Sigma NO_x$ has become smaller than the lower value MIN or not is decided. When $\Sigma NO_x$<MIN, step 336 is proceeded to, where the enrichment of the air-fuel ratio is stopped and the average air-fuel ratio A/F changes from rich to lean. Next, at step 337, the $NO_x$ releasing flag is reset.

Figure 55:
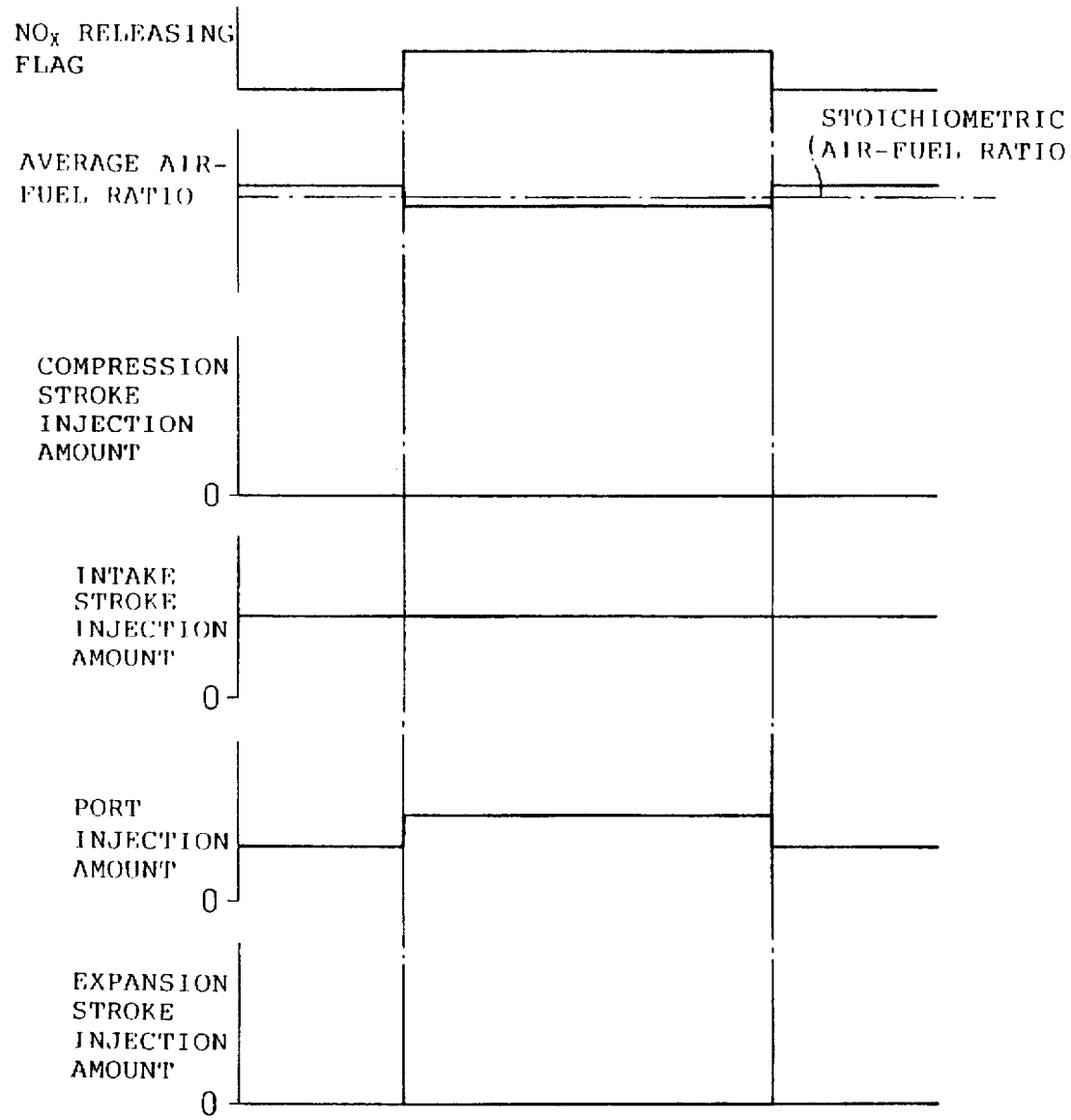
FIG. 55 is a time chart of $NO_x$ releasing control for the rich processing III.

FIG. 55 shows the rich processing III at the time of engine high load operation. As shown in FIG. 55, before the $NO_x$ releasing flag is set, fuel is injected from both of the fuel injector 11 and port injector 50 and a homogeneous air-fuel mixture is burned. When the $NO_x$ releasing flag is set, the amount of port injection is increased whereby the average air-fuel ratio A/F is made rich.

Figure 56:
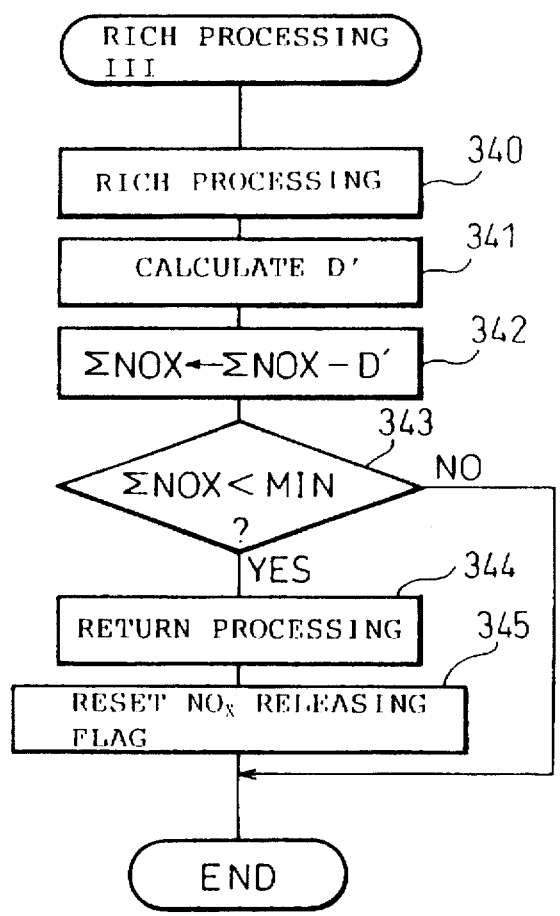
FIG. 56 is a flow chart of the rich processing III.

FIG. 56 shows the routine of the rich processing III for executing the $NO_x$ releasing control shown in FIG. 55. Referring to FIG. 56, first of all, at step 340, the amount of port injection is increased, whereby the average air-fuel ratio A/F is made rich. Next, at step 341, the $NO_x$ releasing D' is calculated from FIG. 23. Next, at step 342, the $NO_x$ amount $\Sigma NO_x$ is reduced by the $NO_x$ releasing D'. Next, at step 343, whether the $NO_x$ amount $\Sigma NO_x$ has become smaller than the lower value MIN or not is decided. When $\Sigma NO_x$<MIN, step 344 is proceeded to, where the amount of port injection is reduced and the average air-fuel ratio A/F changes from rich to lean. Next, at step 345, the $NO_x$ releasing flag is reset.

FIG. 57 to FIG. 63 show another embodiment. In this embodiment, the engine body has the automatic transmission 60 mounted in it. The automatic transmission 60 has a vehicle speed sensor 61 for detecting the vehicle speed and a neutral position sensor 62 for detecting when the automatic transmission 60 is in the neutral position. FIG. 58A and FIG. 58B show the torque converter 63 of the automatic transmission 60. This torque converter 63 is provided with a lock up mechanism 64. That is, the torque converter 63 is provided with a pump cover 65 rotating together with a crank shaft connected to the engine crank shaft, a pump impeller 66 supported by the pump cover 65, a turbine runner 68 attached to the input shaft 67 of the automatic transmission 60, and a stator 69. The rotational motion of the crank shaft is transmitted to the input shaft 67 through the pump cover 65, pump impeller 66, and turbine runner 68.

Figure 58A:
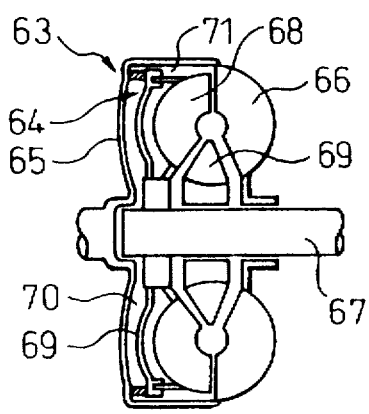
FIG. 58A and FIG. 58B are side views showing schematically a torque converter.
Figure 58B:
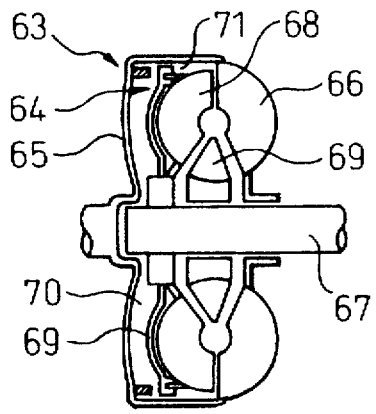

On the other hand, the lock up mechanism 64 is provided with a lock up clutch plate 69 which is attached so as to be movable in the axial direction of the input shaft 67 and rotates with the input shaft 67. Normally, that is, when not locked up, pressurized oil is supplied through the oil passage in the input shaft 67 to the chamber 70 between the lock up clutch plate 69 and the pump cover 65. Next, the pressurized oil flowing out from this chamber 70 is sent into the chamber 71 around the pump impeller 66 and turbine runner 68, then is exhausted through the oil passage in the input shaft 67. At this time, almost no pressure difference is caused between the chambers 70 and 71 at the two sides of the lock up clutch 69, so the lock up clutch 69 is separated from the pump cover 65 as shown in FIG. 58B. Accordingly, at this time, the rotational force of the crank shaft is transmitted through the pump cover 65, pump impeller 66, and turbine runner 68 to the input shaft 67.

On the other hand, when locking up, pressurized oil is supplied into the chamber 71 through the oil passage in the input shaft 67 and the oil in the chamber 70 is exhausted through the oil passage in the input shaft 67. At this time, the pressure in the chamber 71 becomes higher than the pressure in the chamber 70, therefore as shown in FIG. 58A, the lock up clutch plate 69 is pressed on the pump cover 65 and the crank shaft and input shaft 67 rotate at the same speed in a directly connected state. The control of supply of oil into the chambers 70 and 71, that is, the on/off control of the lock up mechanism 64, is performed by a control valve provided in the automatic transmission 60. This control valve is controlled based on an output signal of the electronic control unit 30.

In this embodiment as well, the fuel injection control is performed by the routine shown in FIG. 20. Accordingly, at the time of engine low load operation, a strong stratifying state is set. However, when the output torque of the engine fluctuates, the lower the engine load, the greater the fluctuation of the output torque. Accordingly, when the engine output torque fluctuates, shock easily occurs at the time of engine low load operation. Accordingly, when making the average air-fuel ratio A/F rich so as to release the $NO_x$ from the $NO_x$ absorbent 26, if the output torque of the engine fluctuates, this fluctuation of the engine output torque tends most to manifest itself as shock at the time of engine low load operation.

However, as shown in FIG. 58A, if the engine output torque fluctuates when the lock up clutch 69 is on and directly connected, that fluctuation is directly transmitted to the automatic transmission 60, so a large shock is generated. As opposed to this, as shown in FIG. 58B, if the engine output torque fluctuates when the lock up clutch 69 is off, at this time the fluctuation of the engine output torque is absorbed in the converter 63, so almost no shock is generated. Accordingly, when seen from the viewpoint of the occurrence of shock, when the lock up clutch 69 is off, there is no problem even if the engine output torque fluctuates, but when the lock up clutch 69 is on, it is preferable to keep the output torque of the engine from fluctuating.

Figure 59:
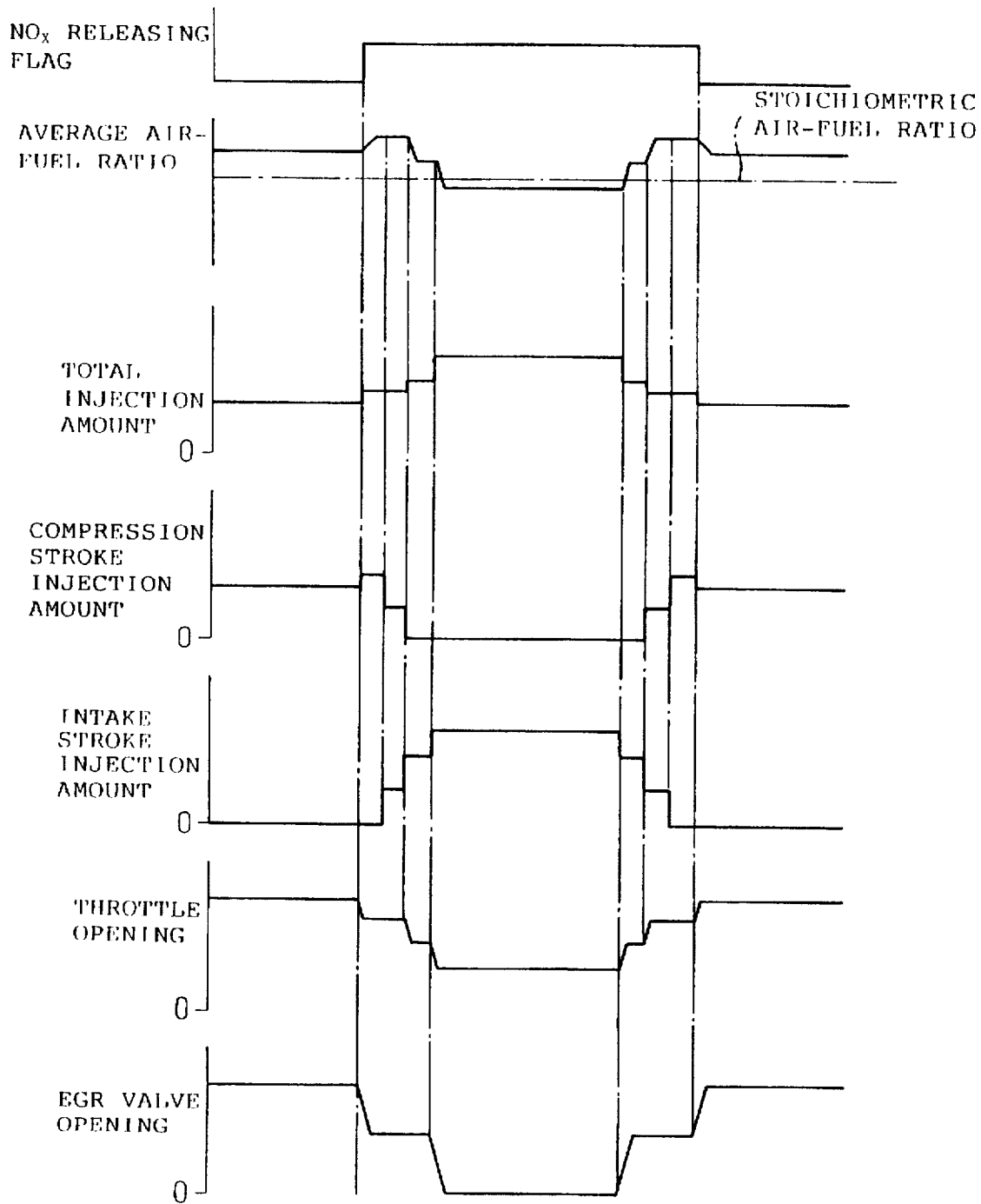
FIG. 59 is a time chart of $NO_x$ releasing control for the rich processing I.
Figure 60:
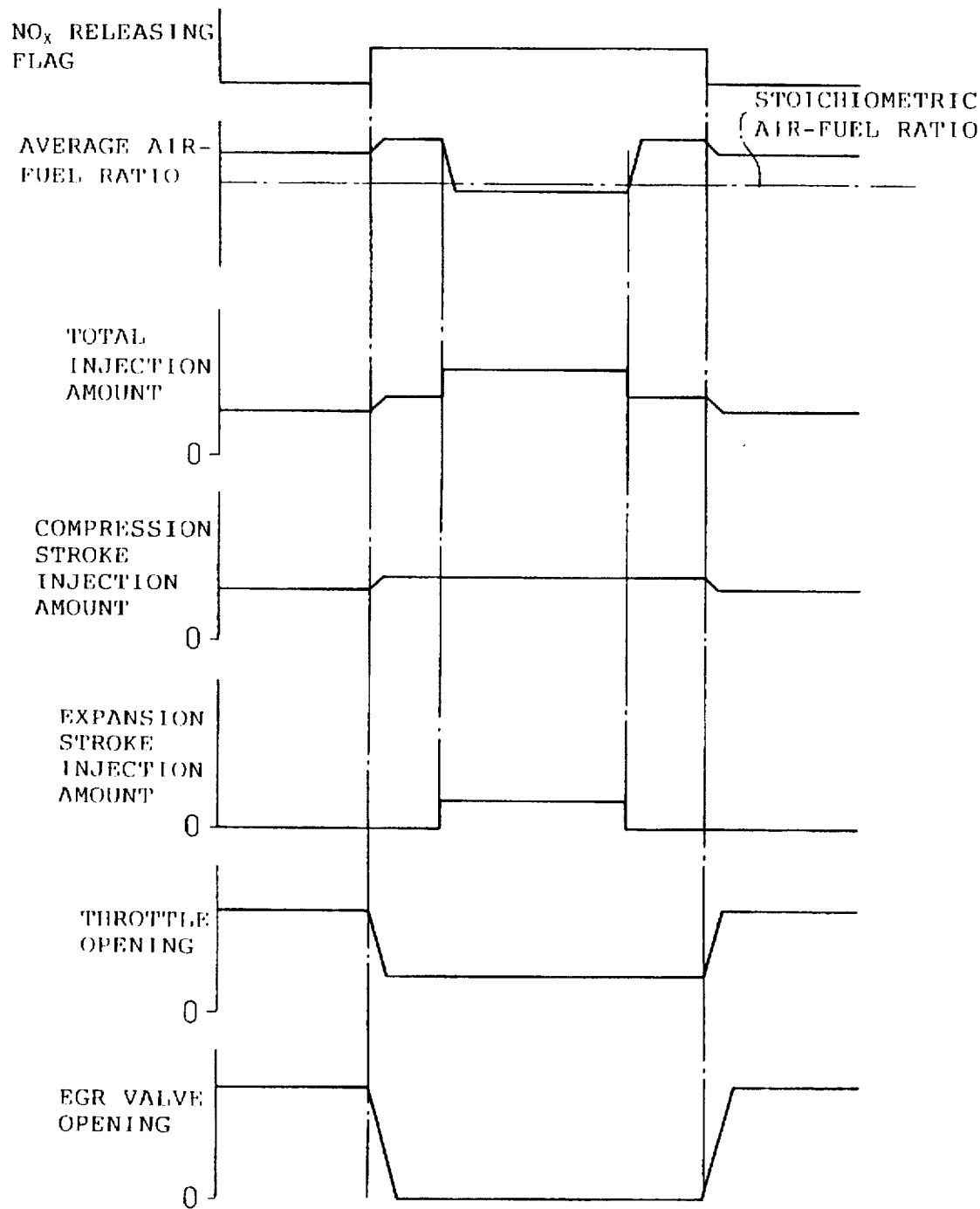
FIG. 60 is a time chart of $NO_x$ releasing control for the rich processing I.

Therefore, in this embodiment, at the time of engine low load operation, when making the average air-fuel ratio A/F rich so as to release the $NO_x$ from the $NO_x$ absorbent 26, if the lock up clutch 69 is off, as shown in FIG. 59, the strong stratifying state is changed to the homogeneous air-fuel mixture state and the average air-fuel ratio A/F is made rich, while if the lock up clutch 69 is on, as shown in FIG. 60, additional fuel is injected at the time of the expansion stroke so as to make the average air-fuel ratio A/F rich. Note that, the control method shown in FIG. 59 is the same as the already explained control method shown in FIG. 24 and the control method shown in FIG. 60 is the same as the already explained control method shown in FIG. 32, so the explanations of the control methods of FIG. 59 and FIG. 60 will be omitted.

Figure 61:
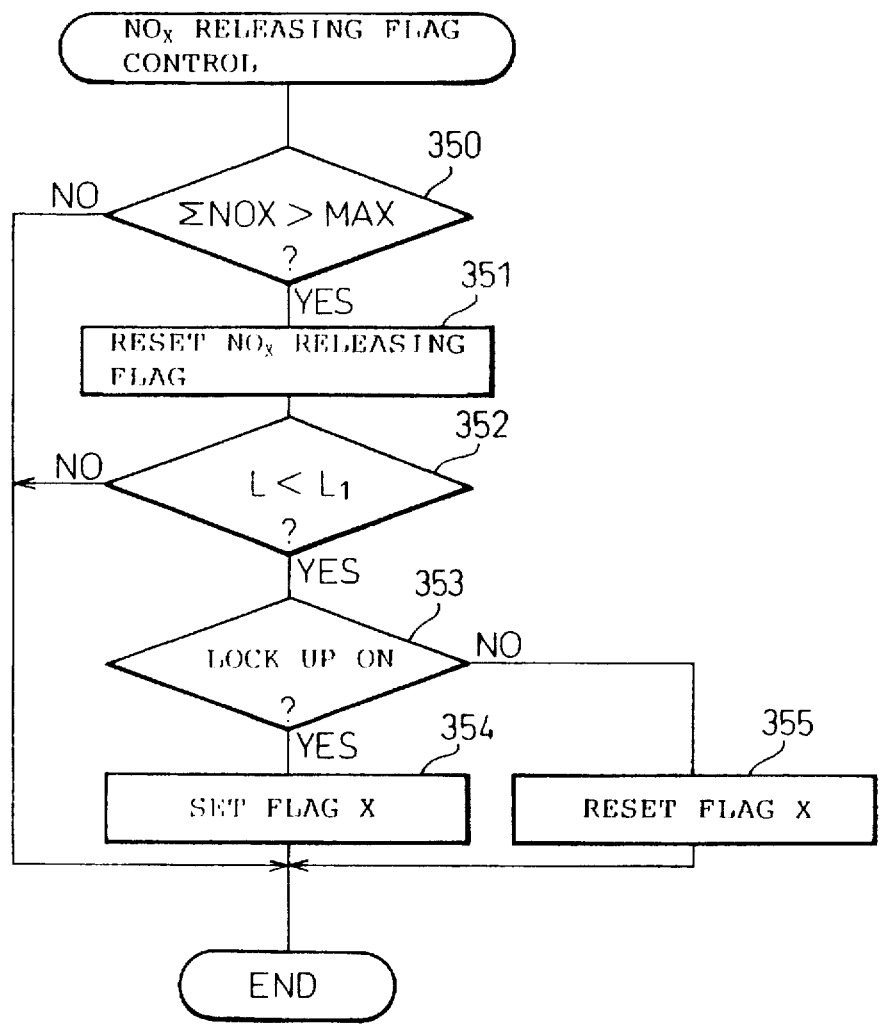
FIG. 61 is a flow chart for the control of the $NO_x$ releasing flag.

FIG. 61 shows the routine for control of the $NO_x$ releasing flag. This routine is executed by interruption every predetermined time interval.

Referring to FIG. 61, first of all, at step 350, whether the $NO_x$ amount $\Sigma NO_x$ estimated to be absorbed in the $NO_x$ absorbent 26 has become larger than the allowable value MAX or not is decided. When $\Sigma NO_x$>MAX, step 351 is proceeded to, where the $NO_x$ releasing flag is set. Next, at step 352, whether the amount of depression L of the accelerator pedal 40 is smaller than $L_1$ or not, that is, whether it is the time of engine low load operation or not, is decided. When L<$L_1$, step 353 is proceeded to, where whether the lock up clutch 69 is on or not is decided. When the lock up clutch 69 is on, step 354 is proceeded to, where the flag X is set. When the lock up clutch 69 is off, step 355 is proceeded to, where the flag X is reset.

Figure 62:
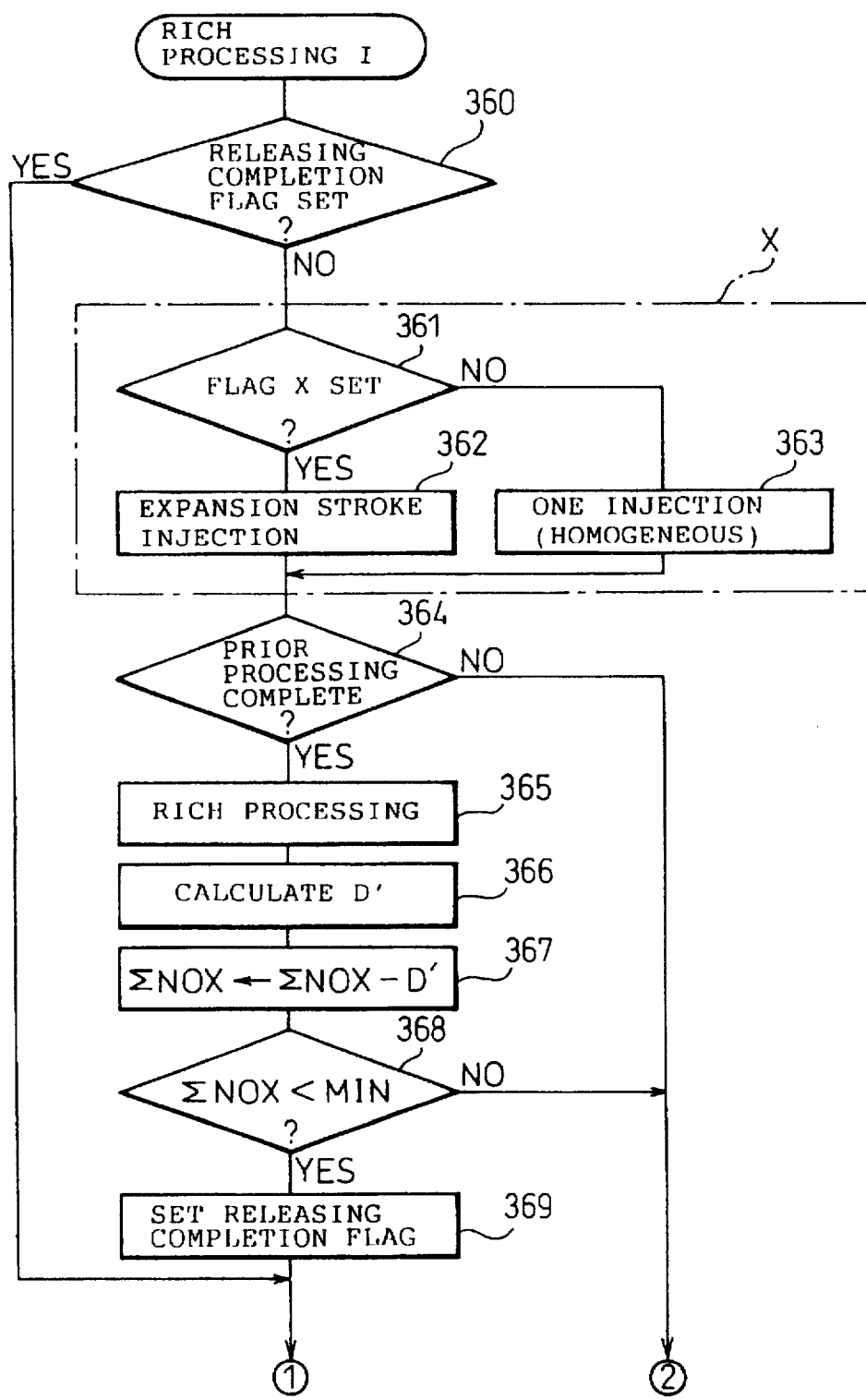
FIG. 62 and FIG. 63 are flow charts for the rich processing I.
Figure 63:
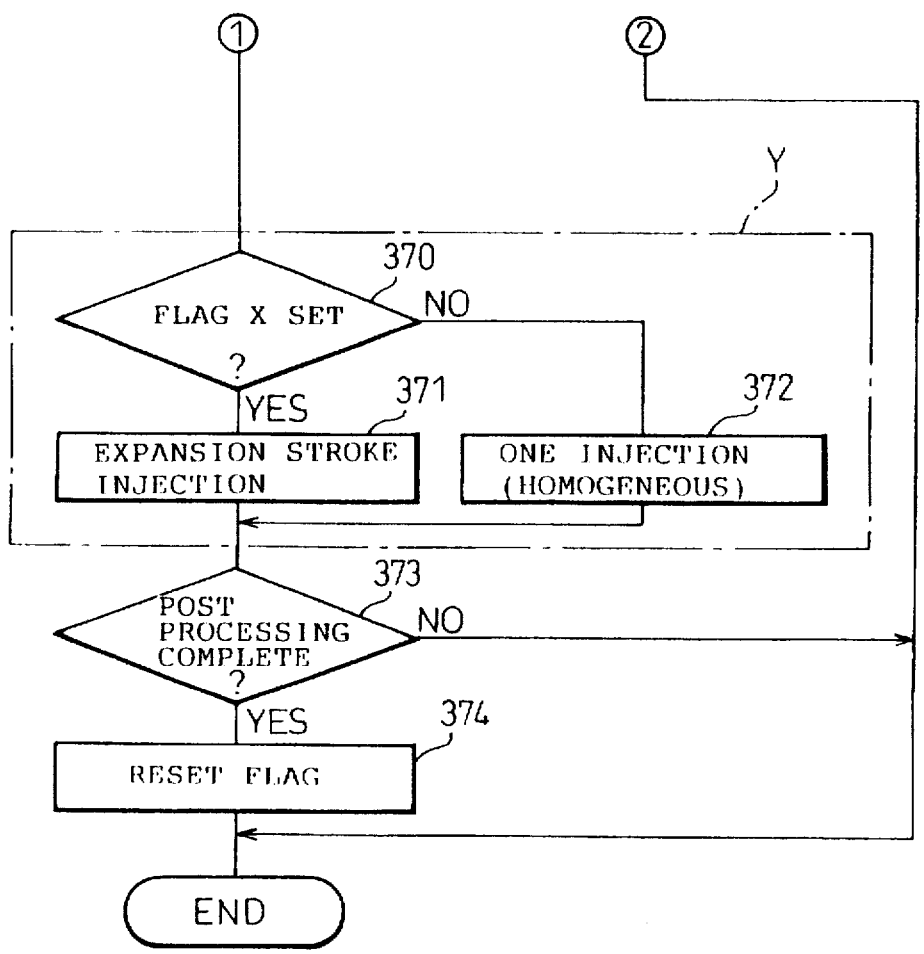

FIG. 62 and FIG. 63 show the rich processing I. Note that, the portions inside the block marked by X in FIG. 62 and FIG. 63 show the prior processing, while the portions marked by Y show the post processing.

Referring to FIG. 62 and FIG. 63, first of all, at step 360, whether the releasing completion flag is set or not is decided. If the releasing completion flag is not set, the routine proceeds to step 361 of the prior processing X, while if the releasing completion flag is set, it jumps to step 370 of the post processing. At step 361, whether the flag X is set or not is decided. When the flag X is set, step 362 is proceeded to, where the prior processing shown in FIG. 60, that is, prior processing for changing to the expansion stroke injection, is performed. As opposed to this, when the flag X is not set, step 363 is proceeded to, where the prior processing shown in FIG. 59, that is, the prior processing for changing from the strong stratifying state through the weak stratifying state to a homogeneous air-fuel mixture state, is performed.

Next, at step 364, whether the prior processing has been completed or not is decided. When the prior processing has been completed, step 365 is proceeded to, where the expansion stroke injection is performed or intake stroke injection is performed so that the average air-fuel ratio A/F is made rich. Next, at step 366, the $NO_x$ releasing D' is calculated from FIG. 23. Next, at step 367, the $NO_x$ amount $\Sigma NO_x$ is reduced by the $NO_x$ releasing D'. Next, at step 368, whether the $NO_x$ amount $\Sigma NO_x$ has become smaller than the lower value MIN or not is decided. When $\Sigma NO_x$<MIN, step 369 is proceeded to, where the releasing completion flag is set, then step 370 is proceeded to.

At step 370, whether the flag X is set or not is decided. When the flag X is set, step 371 is proceeded to, where the post processing shown in FIG. 60, that is, the post processing for changing to the strong stratifying state after the expansion stroke injection is completed, is performed. As opposed to this, when the flag X is not set, step 372 is proceeded to, where the post processing shown in FIG. 59, that is, the post processing for changing from the homogeneous air-fuel mixture state to a weak stratifying state and then a strong stratifying state, is performed. Next, at step 373, whether the post processing is completed or not is decided. When the post processing is completed, step 374 is proceeded to, where the $NO_x$ releasing flag and releasing completion flag are reset.

Figure 64:
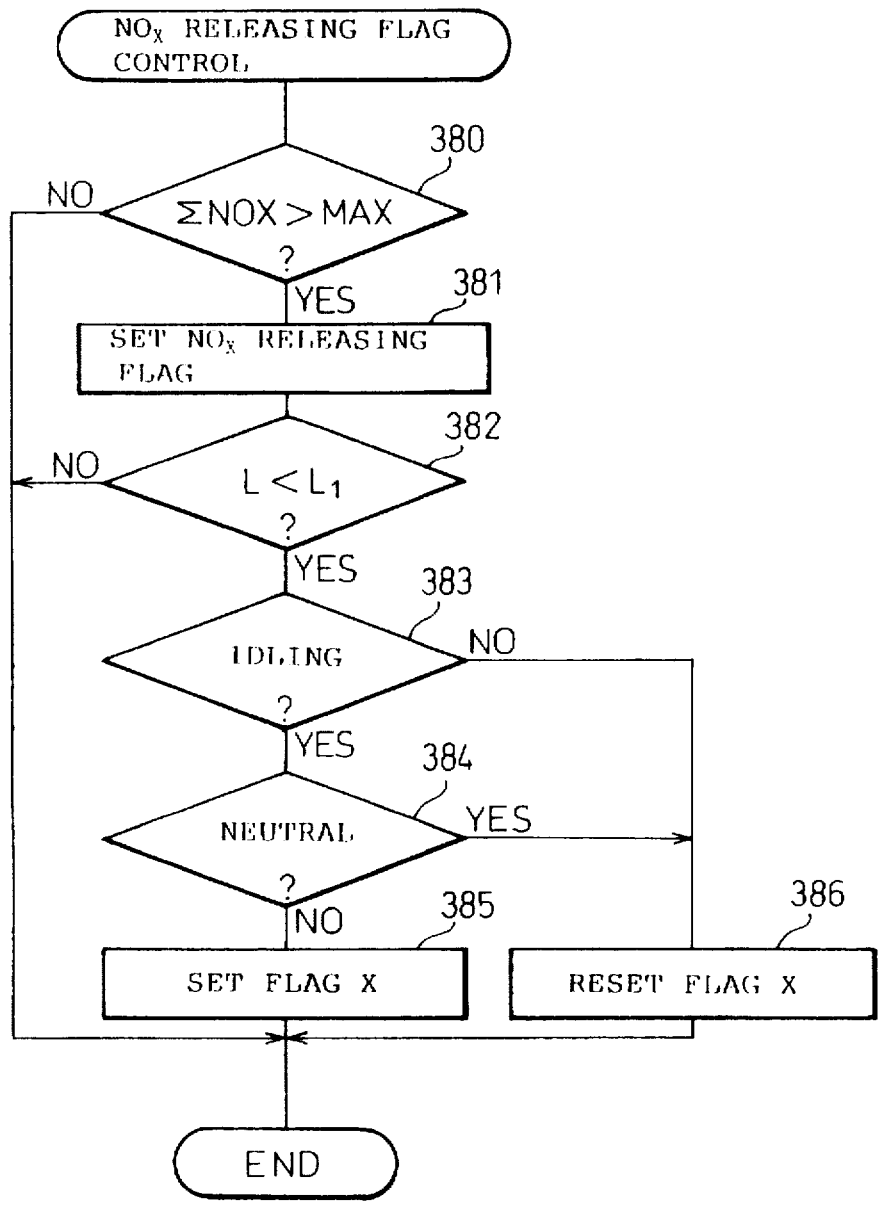
FIG. 64 is a flow chart for the control of the $NO_x$ releasing flag.
Figure 65:
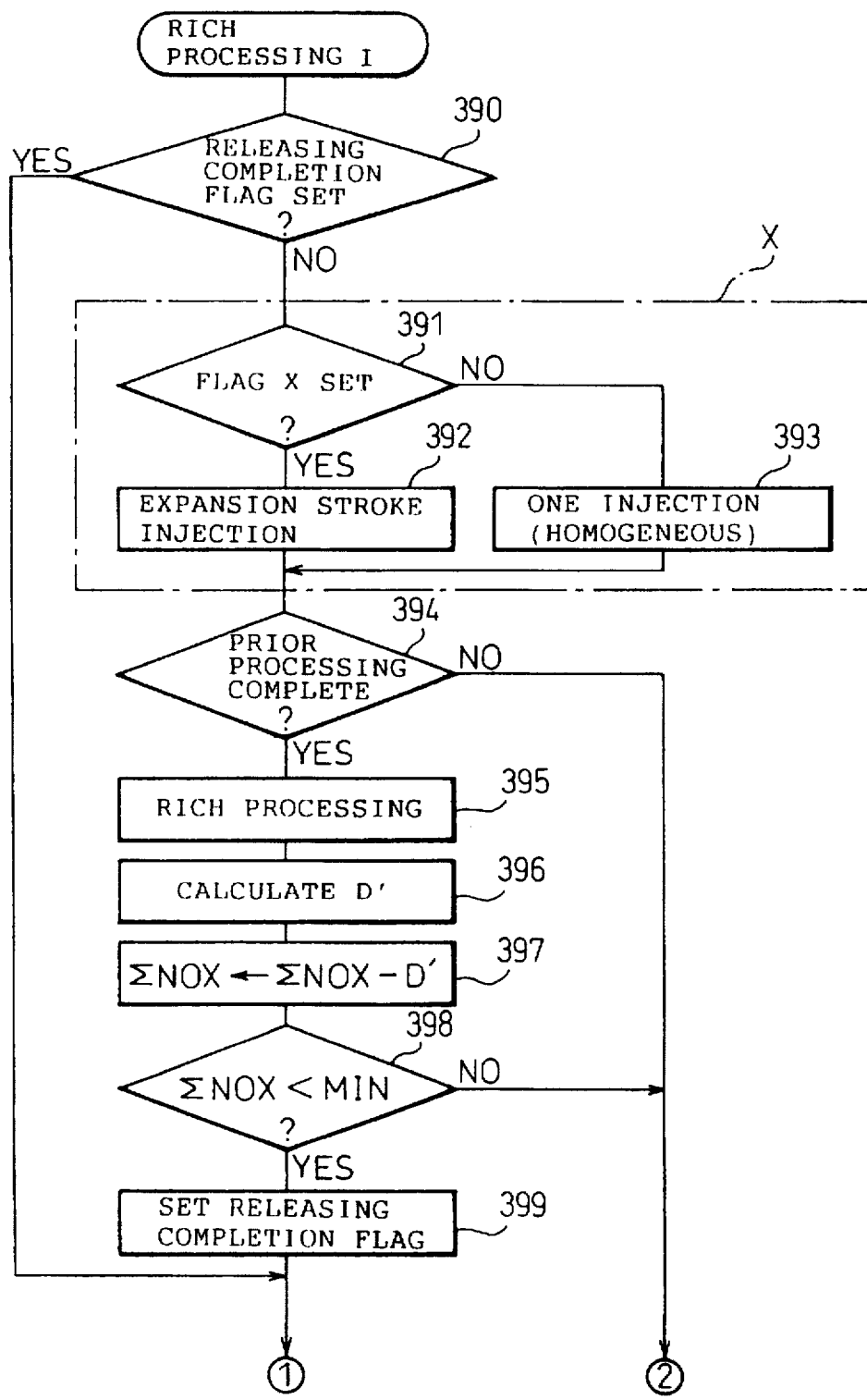
FIG. 65.
Figure 66:
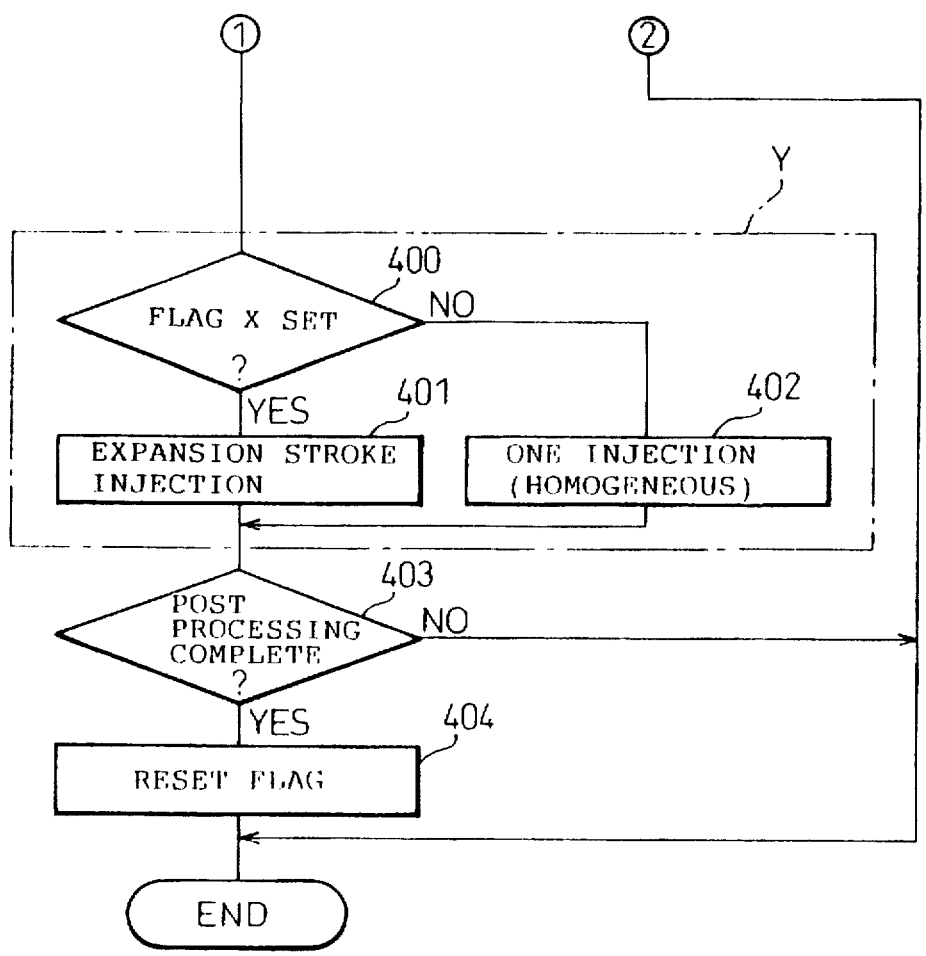
FIG. 66 are flow charts of still another embodiment for the rich processing I.

FIG. 64 to FIG. 66 show still another embodiment. In this embodiment as well, the fuel injection control is performed by the routine shown in FIG. 20. Accordingly, at the time of engine low load operation, a strong stratifying state is set. However, as mentioned above, when the output torque of the engine fluctuates, the lower the engine load, the greater the rate of fluctuation of the output torque. Accordingly, when making the average air-fuel ratio A/F rich so as to release the $NO_x$ from the $NO_x$ absorbent 26, if the output torque of the engine fluctuates, this fluctuation of the engine output torque appears most readily as shock at the time of engine idling.

However, even if shock occurs during engine idling, almost no shock occurs when the automatic transmission 60 (FIG. 57) is in the neutral position. Therefore, in this embodiment, when the engine is idling, when making the average air-fuel ratio A/F rich so as to release the $NO_x$ from the $NO_x$ absorbent 26, if the automatic transmission 60 is in the neutral position, as shown in FIG. 59, the strong stratifying state is changed to the homogeneous air-fuel mixture state so as to make the average air-fuel ratio A/F rich, while if the automatic transmission 60 is not in the neutral position, as shown in FIG. 60, additional fuel is injected during the expansion stroke so as to make the average air-fuel ratio A/F rich.

FIG. 64 shows the routine for controlling the $NO_x$ releasing flag. This routine is executed by interruption every predetermined time interval.

Referring to FIG. 64, first of all, at step 380, whether the $NO_x$ amount $\Sigma NO_x$ estimated to be absorbed in the $NO_x$ absorbent 26 has become larger than the allowable value MAX or not is decided. When $\Sigma NO_x$>MAX, step 381 is proceeded to, where the $NO_x$ releasing flag is set. Next, at step 382, whether the amount of depression L of the accelerator pedal 40 is smaller than $L_1$ or not, that is, whether it is the time of engine low load operation or not, is decided. When L<$L_1$, step 383 is proceeded to, where whether the engine is idling or not is decided. When the engine is not idling, step 586 is proceeded to, where the flag X is reset. As opposed to this, when the engine is idling, step 384 is proceeded to.

Figure 57:
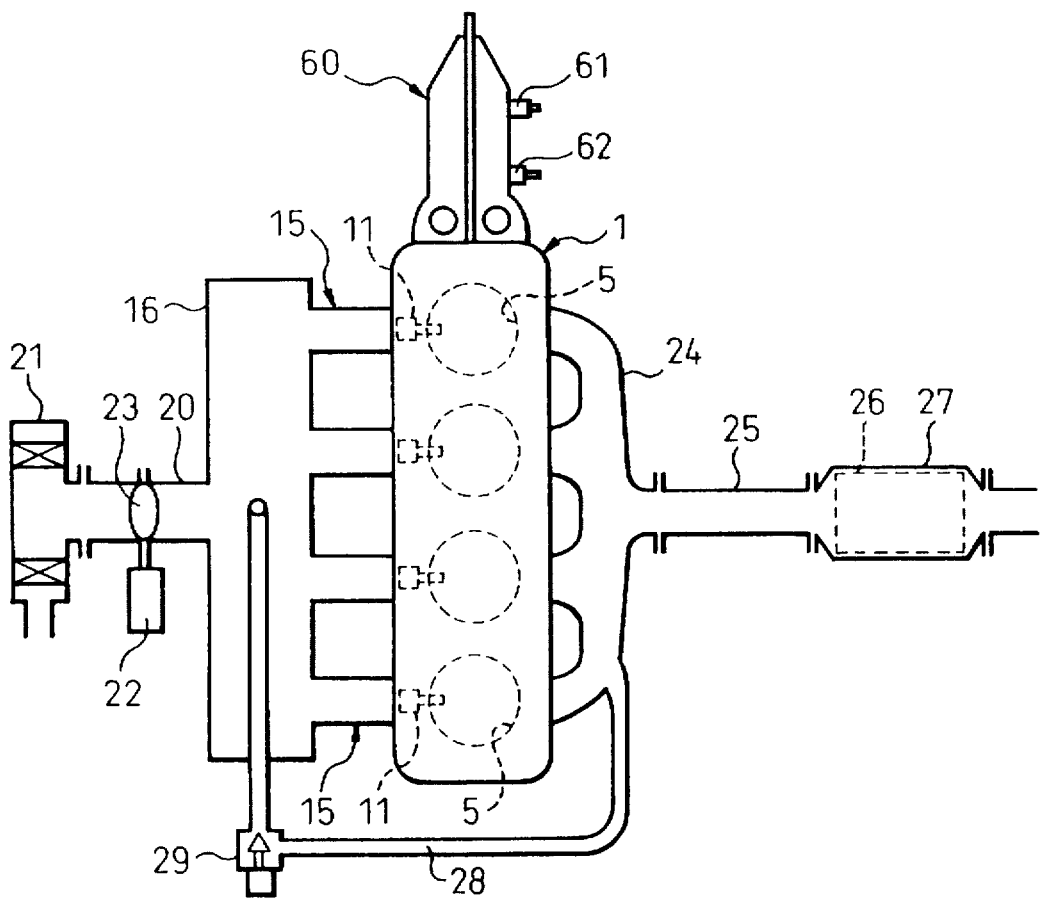
FIG. 57 is an overview of an internal combustion engine showing another embodiment.

At step 384, whether the automatic transmission 60 is in the neutral position or not is decided based on the output signal of the neutral position sensor 62 (FIG. 57). When the automatic transmission 60 is not in the neutral position, step 385 is proceeded to, where the flag X is set, while when in the neutral position, step 386 is proceeded to, where the flag X is reset.

FIG. 65 and FIG. 66 show the rich processing I. Note that, the routine shown in FIG. 65 and FIG. 66 is the same as the routine shown in FIG. 62 and FIG. 63.

That is, referring to FIG. 65 and FIG. 66, first of all, at step 390, whether the releasing completion flag is set or not is decided. When the releasing completion flag is not set, the routine proceeds to step 391 of the prior processing X, while when the releasing completion flag is set, the routine jumps to step 400 of the post processing Y. At step 391, whether the flag X is set or not is decided. When the flag X is set, step 392 is proceeded to, where the prior processing shown in FIG. 60, that is, the prior processing for changing to the expansion stroke injection, is performed. As opposed to this, when the flag X is not set, step 393 is proceeded to, where the prior processing shown in FIG. 59, that is, prior processing for changing from the strong stratifying state through the weak stratifying state to the homogeneous air-fuel mixture state is performed.

Next, at step 394, whether the prior processing has been completed or not is decided. When the prior processing has been completed, step 395 is proceeded to, where the expansion stroke injection is performed or the intake stroke injection is performed so that the average air-fuel ratio A/F is made rich. Next, at step 396, the $NO_x$ releasing D' is calculated from FIG. 23. Next, at step 397, the $NO_x$ amount $\Sigma NO_x$ is reduced by the $NO_x$ releasing D'. Next, at step 398, whether the $NO_x$ amount $\Sigma NO_x$ has become smaller than the lower value MIN or not is decided. When $\Sigma NO_x$<MIN, step 399 is proceeded to, where the releasing completion flag is set, then step 400 is proceeded to.

At step 400, whether the flag X is set or not is decided. When the flag X is set, step 401 is proceeded to, where the post processing shown in FIG. 60, that is, the post processing for changing to the strong stratifying state after the completion of the expansion stroke injection, is performed. As opposed to this, when the flag X is not set, step 402 is proceeded to, where the post processing shown in FIG. 59, that is, the post processing for changing from the homogeneous air-fuel mixture state through the weak stratifying state to the strong stratifying state, is performed. Next, at step 403, whether the post processing is completed or not is decided. When the post processing is completed, step 404 is proceeded to, where the $NO_x$ releasing flag and releasing completion flag are reset.

Figure 67:
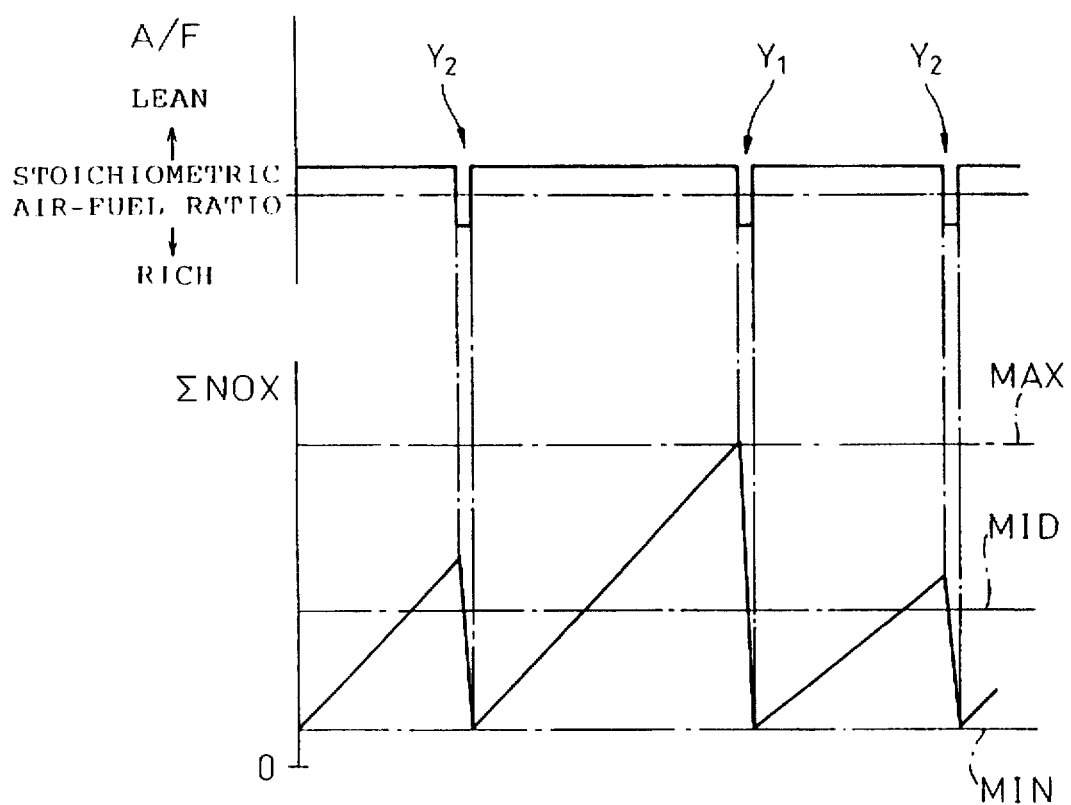
FIG. 67 is a time chart of the $NO_x$ releasing control.

FIG. 67 shows a time chart of $NO_x$ releasing control similar to FIG. 13. As shown by $Y_1$ in FIG. 67, in the embodiments explained up to now, when $\Sigma NO_x$>MAX, the average air-fuel ratio A/F was made rich so as to release the $NO_x$ from the $NO_x$ absorbent 26. In this case, it is not known at what kind of engine operating state $\Sigma NO_x$>MAX, accordingly, it is not known at what kind of engine operating state the average air-fuel ratio A/F is made rich. However, at the time of engine high load operation, the fuel injection amount is large, accordingly at this time, making the average air-fuel ratio A/F rich requires that the fuel to be increased be made large. As opposed to this, at the time of engine low load operation, the fuel injection amount is small, so just a small amount of increase of fuel is sufficient to make the average air-fuel ratio A/F rich. Accordingly, the amount of the fuel to be increased required for releasing the $NO_x$ from the $NO_x$ absorbent 26 is smaller the lower the engine load, therefore to improve the fuel consumption, it is desirable to perform the action of release of $NO_x$ from the $NO_x$ absorbent 26 at the time of engine low load operation.

Therefore, in the embodiments discussed up to now, as shown in FIG. 67, a value between the allowable value MAX of the $NO_x$ amount $\Sigma NO_x$ and the lower limit value MIN, that is, a middle decision value MID, was set. When the $NO_x$ amount $\Sigma NO_x$ does not reach the allowable value MAX but exceeds the middle decision value MID, when the engine is operating at a low load, as shown by Y2 in FIG. 67, the action of releasing of $NO_x$ from the $NO_x$ absorbent 26 is performed. By doing this, the chances of the action of releasing of $NO_x$ from the $NO_x$ absorbent 26 being performed at the time of engine low load operation are increased and therefore the amount of fuel consumption can be reduced.

Figure 68:
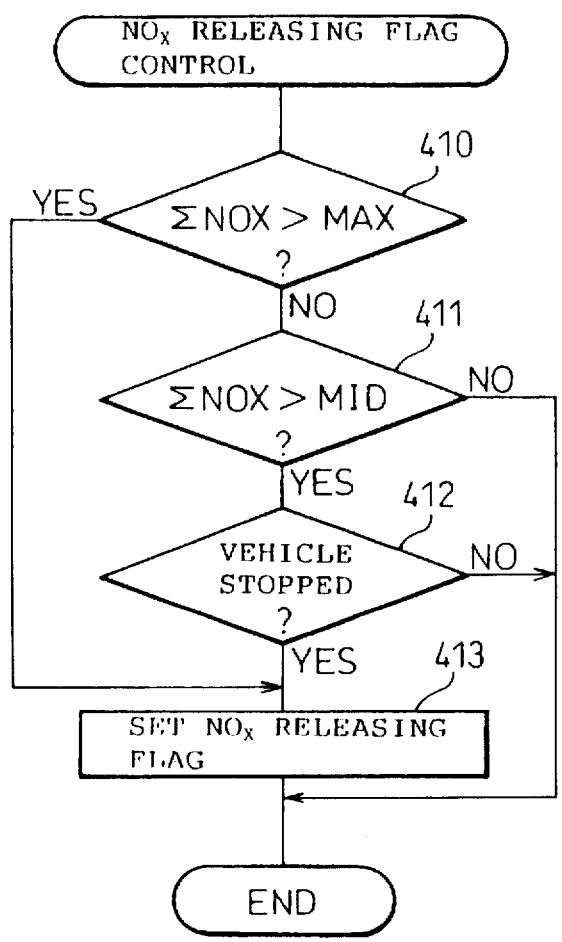
FIG. 68 is a flow chart for the control of the $NO_x$ releasing flag.

FIG. 68 shows an embodiment of the use of the middle decision value MID. Note that, in this embodiment, the routine shown in FIG. 20 is used for control of the fuel injection.

Referring to FIG. 68, first of all, at step 410, whether the $NO_x$ amount $\Sigma NO_x$ is over the allowable value MAX or not is decided. IF $\Sigma NO_x$>MAX, step 413 is proceeded to, where the $NO_x$ releasing flag is set. Accordingly, at this time, the average air-fuel ratio A/F is made rich by the routine shown in FIG. 20 and the action of releasing of $NO_x$ from the $NO_x$ absorbent 26 is performed. On the other hand, when $\Sigma NO_x$<MAX is decided at step 410, step 411 is proceeded to, where whether the $NO_x$ amount $\Sigma NO_x$ is larger than the middle decision value MID or not is decided. At this time, IF $\Sigma NO_x$>MID, step 412 is proceeded to.

At step 412, whether the vehicle is at a stop or not is decided based on the output signal of the vehicle speed sensor 61 (FIG. 57). If the vehicle is at a stop at this time, step 413 is proceeded to, where the $NO_x$ releasing flag is set, therefore the average air-fuel ratio A/F is made rich by the routine shown in FIG. 20.

When the vehicle is at a stop, normally it is idling. At this time, the action of releasing of $NO_x$ from the $NO_x$ absorbent 26 is performed, so the amount of fuel consumption can be reduced.

Figure 69:
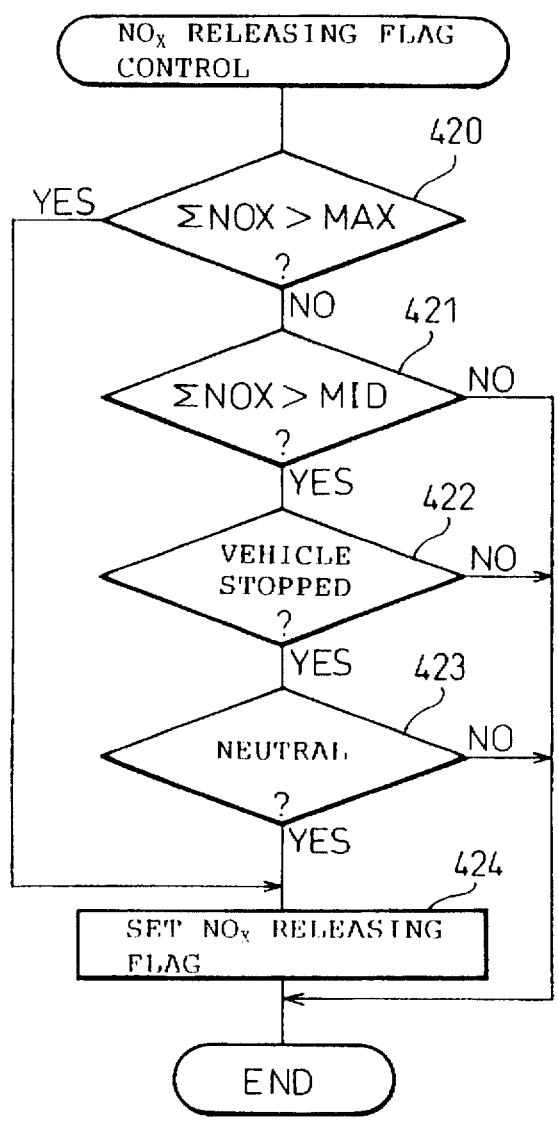
FIG. 69 is a flow chart showing another embodiment of the control of the $NO_x$ releasing flag.

FIG. 69 shows another embodiment of use of the middle decision value MID. Note that, in this embodiment as well, the routine shown in FIG. 20 is used for control of the fuel injection.

Referring to FIG. 69, first of all, at step 420, whether the $NO_x$ amount $\Sigma NO_x$ is over the allowable value MAX or not is decided. If $\Sigma NO_x$>MAX, step 424 is proceeded to, where the $NO_x$ releasing flag is set.

Accordingly, at this time, the average air-fuel ratio A/F is made rich by the routine shown in FIG. 20 and the action of releasing of $NO_x$ from the $NO_x$ absorbent 26 is performed, on the other hand, when $\Sigma NO_x$<MAX is decided at step 420, step 421 is proceeded to, where whether the $NO_x$ amount $\Sigma NO_x$ is larger than the middle decision value MID or not is decided. At this time, of $\Sigma NO_x$>MID, then step 422 is proceeded to.

At step 422, whether the vehicle is at a stop or not is decided based on the output signal of the vehicle speed sensor 61 (FIG. 57). At this time, if the vehicle is at a stop, step 423 is proceeded to, where whether the automatic transmission 60 is in the neutral position or not is decided based on the output signal of the neutral position sensor 62 (FIG. 57). If the automatic transmission 60 is in the neutral position at this time, step 423 is proceeded to, where the $NO_x$ releasing flag is set, therefore the average air-fuel ratio A/F is made rich by the routine shown in FIG. 20. When the vehicle is at a stop, normally it is idling and at this time the action of releasing of $NO_x$ from the $NO_x$ absorbent 26 is performed, so the amount of fuel consumption can be reduced. Further, in this embodiment, when the automatic transmission 60 is in the neutral position, the average air-fuel ratio A/F is made rich, so it is possible to prevent the occurrence of shock.

Figure 70:
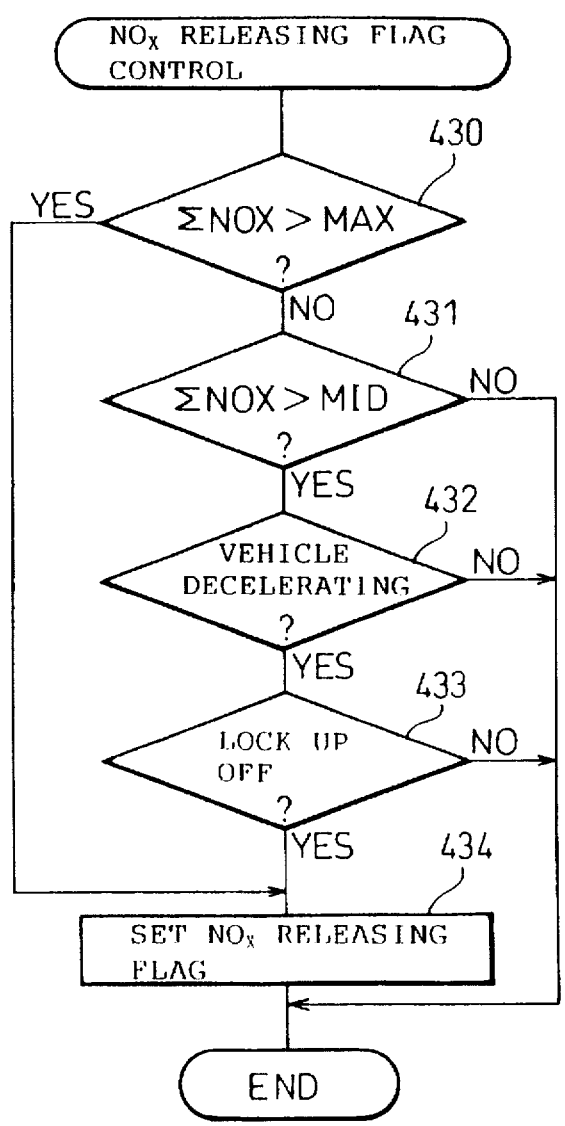
FIG. 70 is a flow chart of still another embodiment for the control of the $NO_x$ releasing flag.

FIG. 70 shows still another embodiment of use of the middle decision value MID. Note that, in this embodiment as well, the routine shown in FIG. 20 is used for control of the fuel injection.

Referring to FIG. 70, first of all, at step 430, whether the $NO_x$ amount $\Sigma NO_x$ is over the allowable value MAX or not is decided. IF $\Sigma NO_x$>MAX, step 434 is proceeded to, where the $NO_x$ releasing flag is set. Accordingly, at this time, the average air-fuel ratio A/F is made rich by the routine shown in FIG. 20 and the action of releasing of $NO_x$ from the $NO_x$ absorbent 26 is performed. On the other hand, when $\Sigma NO_x \leq$ MAX is decided at step 430, step 431 is proceeded to, where whether the $NO_x$ amount $\Sigma NO_x$ is larger than the middle decision value MID or not is decided. At this time, if $\Sigma NO_x$>MID, then step 432 is proceeded to.

At step 432, whether the vehicle is decelerating or not is decided from the output signal of the load sensor 41 and engine rotational speed. If the vehicle is decelerating at this time, step 433 is proceeded to, where whether the lock up clutch 69 (FIG. 58) is off or not is decided. If the lock up clutch 69 is off, step 434 is proceeded to, where the $NO_x$ releasing flag is set, therefore the average air-fuel ratio A/F is made rich by the routine shown in FIG. 20. When the vehicle is decelerating, the fuel injection amount is small. At this time, the action of releasing of $NO_x$ from the $NO_x$ absorbent 26 is performed, so the amount of fuel consumption can be reduced. Further, in this embodiment, when the lock up clutch 69 is off, the average air-fuel ratio A/F is made rich, so it is possible to prevent the occurrence of shock.

Figure 71:
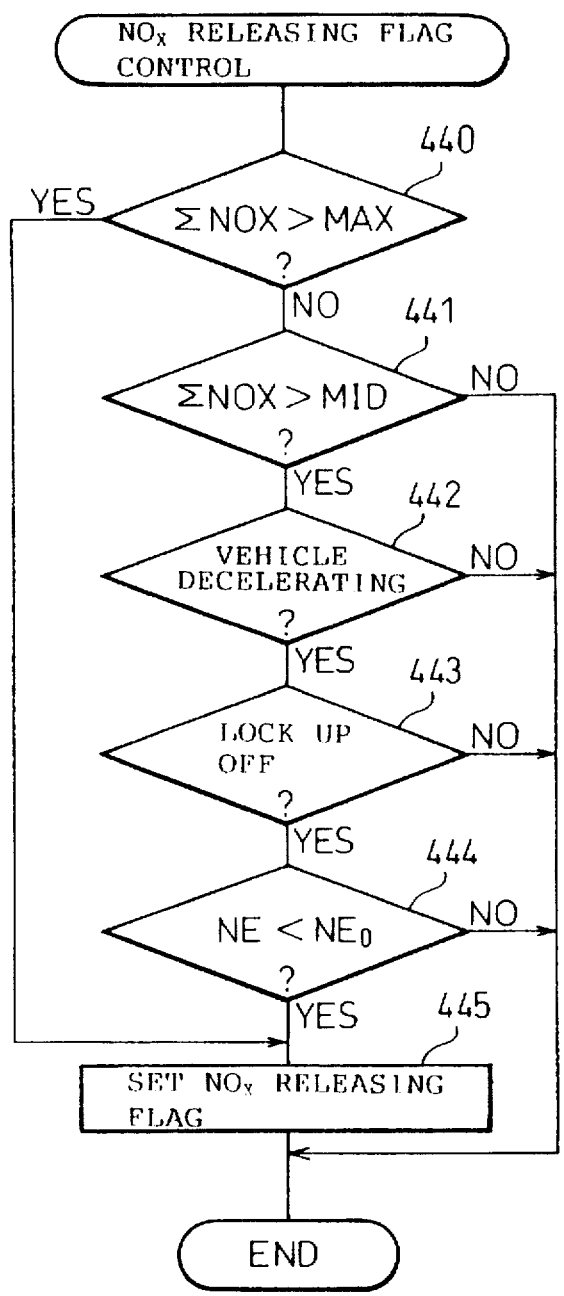
FIG. 71 is a flow chart of still another embodiment for the control of the $NO_x$ releasing flag.

FIG. 71 shows still another embodiment of use of the middle decision value MID. Note that, in this embodiment as well, the routine shown in FIG. 20 is used for control of the fuel injection.

Referring to FIG. 71, first of all, at step 440, whether the $NO_x$ amount $\Sigma NO_x$ is over the allowable value MAX or not is decided. IF $\Sigma NO_x$>MAX, step 445 is proceeded to, where the $NO_x$ releasing flag is set. Accordingly, at this time, the average air-fuel ratio A/F is made rich by the routine shown in FIG. 20 and the action of releasing of $NO_x$ from the $NO_x$ absorbent 26 is performed. On the other hand, if $\Sigma NO_x{<}MAX$ is decided at step 440, step 441 is proceeded to, where whether the $NO_x$ amount $\Sigma NO_x$ is larger than the middle decision value MID or not is decided. At this time, if $\Sigma NO_x{>}MID$, then step 442 is proceeded to.

At step 442, whether the vehicle is decelerating or not is decided from the output signal of the load sensor 41 and engine rotational speed. If the vehicle is decelerating at this time, step 443 is proceeded to, where whether the lock up clutch 69 (FIG. 58) is off or not is decided. When the lock up clutch 69 is off, step 444 is proceeded to, where whether the engine rotational speed NE is lower than a predetermined set rotational speed $NE_0$ or not is decided. If $NE{<}NE_0$ at this time, step 445 is proceeded to, where the $NO_x$ releasing flag is set, therefore the average air-fuel ratio A/F is made rich by the routine shown in FIG. 20. When the vehicle is decelerating, the fuel injection amount is small. Further, when $NE{<}NE_0$, the fuel injection amount becomes further smaller. In this embodiment, when the fuel injection amount is extremely small in this way, the action of releasing of $NO_x$ from the $NO_x$ absorbent 26 is performed, so the amount of fuel consumption can be reduced. Further, in this embodiment, when the lock up clutch 69 is off, the average air-fuel ratio A/F is made rich, so it is possible to prevent the occurrence of shock.

Figure 72:
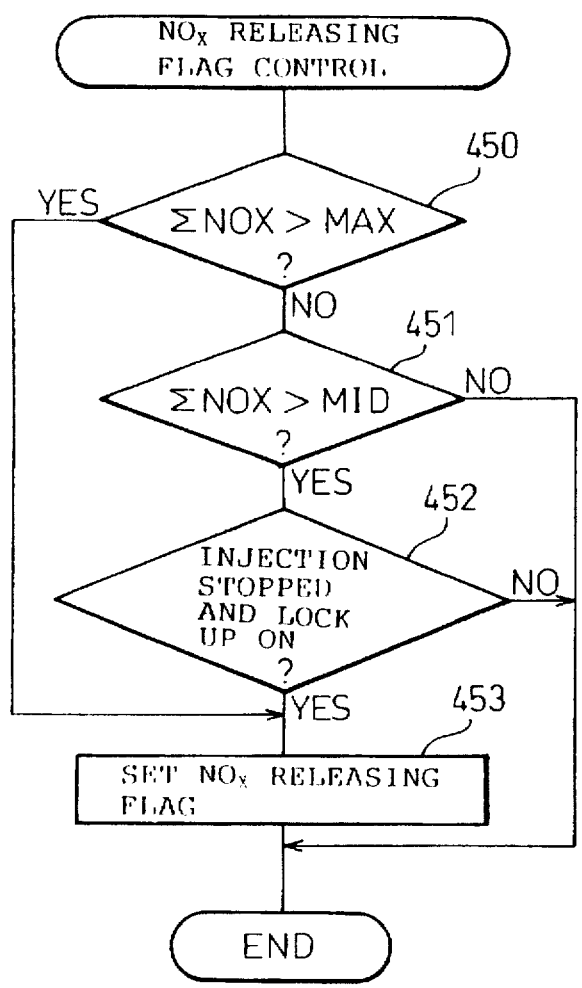
FIG. 72 is a flow chart of still another embodiment for the control of the $NO_x$ releasing flag.

FIG. 72 shows still another embodiment of use of the middle decision value MID. Note that, in this embodiment as well, the routine shown in FIG. 20 is used for control of the fuel injection.

Referring to FIG. 72, first of all, at step 450, whether the $NO_x$ amount $\Sigma NO_x$ is over the allowable value MAX or not is decided. If $\Sigma NO_x{>}MAX$, step 453 is proceeded to, where the $NO_x$ releasing flag is set. Accordingly, at this time, the average air-fuel ratio A/F is made rich by the routine shown in FIG. 20 and the action of releasing of $NO_x$ from the $NO_x$ absorbent 26 is performed. On the other hand, when $\Sigma NO_x{\leq}MAX$ is decided at step 450, step 451 is proceeded to, where whether the $NO_x$ amount $\Sigma NO_x$ is larger than the middle decision value MID or not is decided. At this time, if $\Sigma NO_x{>}MID$, then step 452 is proceeded to.

At step 452, whether the vehicle is decelerating is not, the fuel injection is stopped, and the lock up clutch 69 9 is on so that the engine brake action is performed are decided from the output signal of the load sensor 41 and engine rotational speed. When the vehicle is decelerating, the fuel injection is stopped, and the lock up clutch 69 is on, step 453 is proceeded to, where the $NO_x$ releasing flag is set, therefore the average air-fuel ratio A/F is made rich by the routine shown in FIG. 20. When the vehicle is decelerating, the amount of intake air is small, so at this time injection of just a small amount of fuel enables the average air-fuel ratio A/F to be made rich. In this way, in this embodiment, since injection of just a small amount of fuel is sufficient for the action of releasing of $NO_x$ from the $NO_x$ absorbent 26 to be performed, the amount of fuel consumption can be reduced.

Figure 73:
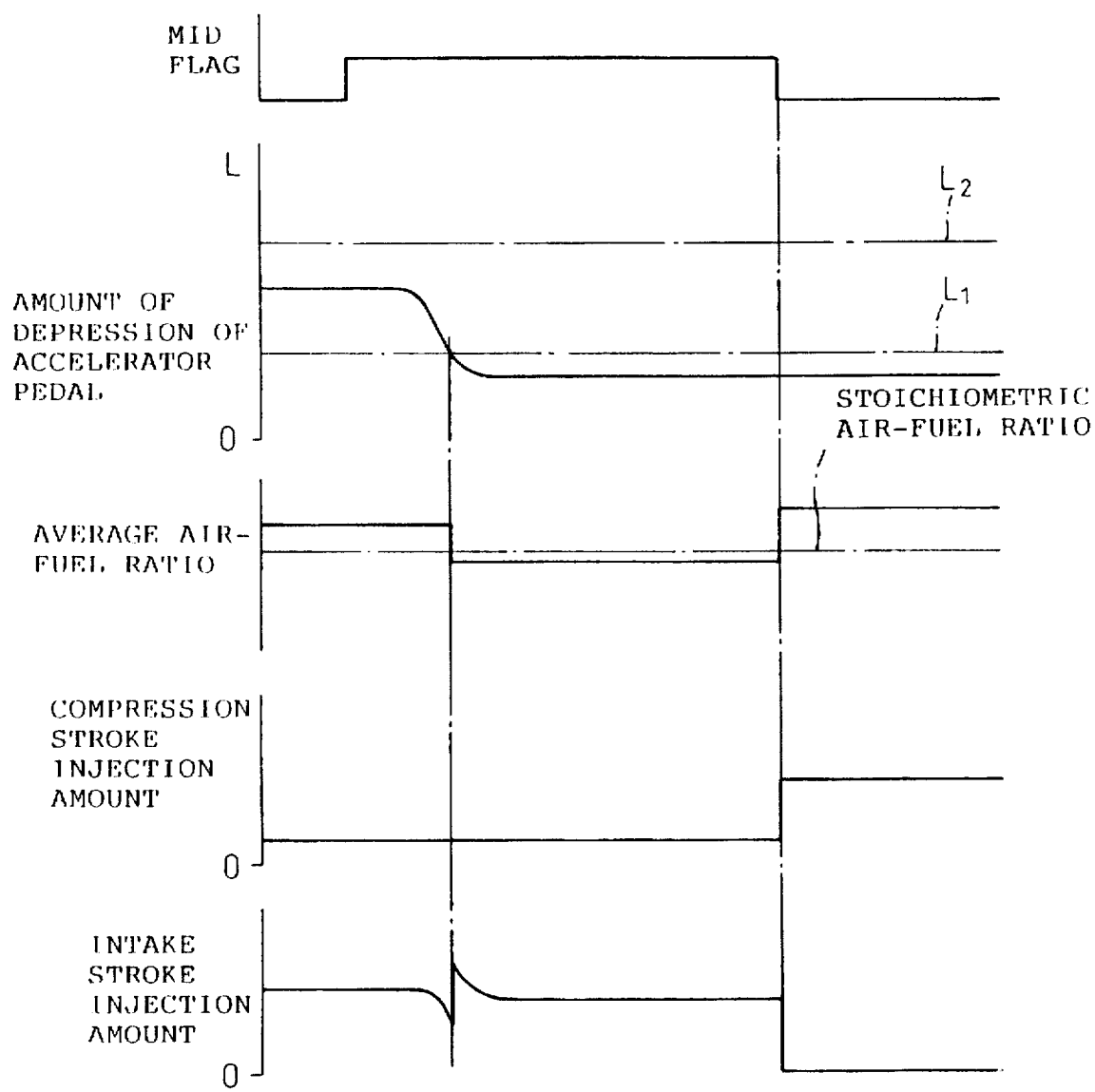
FIG. 73 is a time chart of $NO_x$ releasing control showing still another embodiment for rich processing.

FIG. 73 to FIG. 77 show still another embodiment using the middle decision value MID. In this embodiment, when $\Sigma NO_x{>}MID$, the MID flag is set. As shown in FIG. 73, when the MID flag is set, a weak stratifying state is maintained for a short period when the engine operating state changes from the weak stratifying state medium load operation to the low load operation for the strong stratifying state. During this period, the intake stroke injection amount is increased and the average air-fuel ratio A/F is made rich. Next, after the action of releasing of the No, from the $NO_x$ absorbent 26 is completed, the average air-fuel ratio A/F is changed from rich to lean and the weak stratifying state is changed to the strong stratifying state.

That is, in this embodiment, when the MID flag is set, when changing from an operating state for a weak stratifying state to an operating state for a strong stratifying state, the transition from the weak stratifying state to the strong stratifying state is delayed and during that interval the action of releasing of the $NO_x$ from the $NO_x$ absorbent 26 is performed. In this way, in this embodiment as well, when the engine load is reduced, the average air-fuel ratio A/F is made rich, so the amount of fuel consumption can be reduced. Further, when making the average air-fuel ratio A/F rich after the engine load has become low and the weak stratifying state is changed to a strong stratifying state, the average air-fuel ratio A/F is made rich after the strong stratifying state is returned once more to the weak stratifying state. Accordingly, the stratifying state is frequently changed and therefore the combustion become unstable and there is a risk of torque fluctuation. Therefore, in this embodiment, when the engine load is reduced, the action of releasing of the $NO_x$ is performed without changing the stratifying state. The stratifying state is changed after the completion of the $NO_x$ releasing action.

Figure 74:
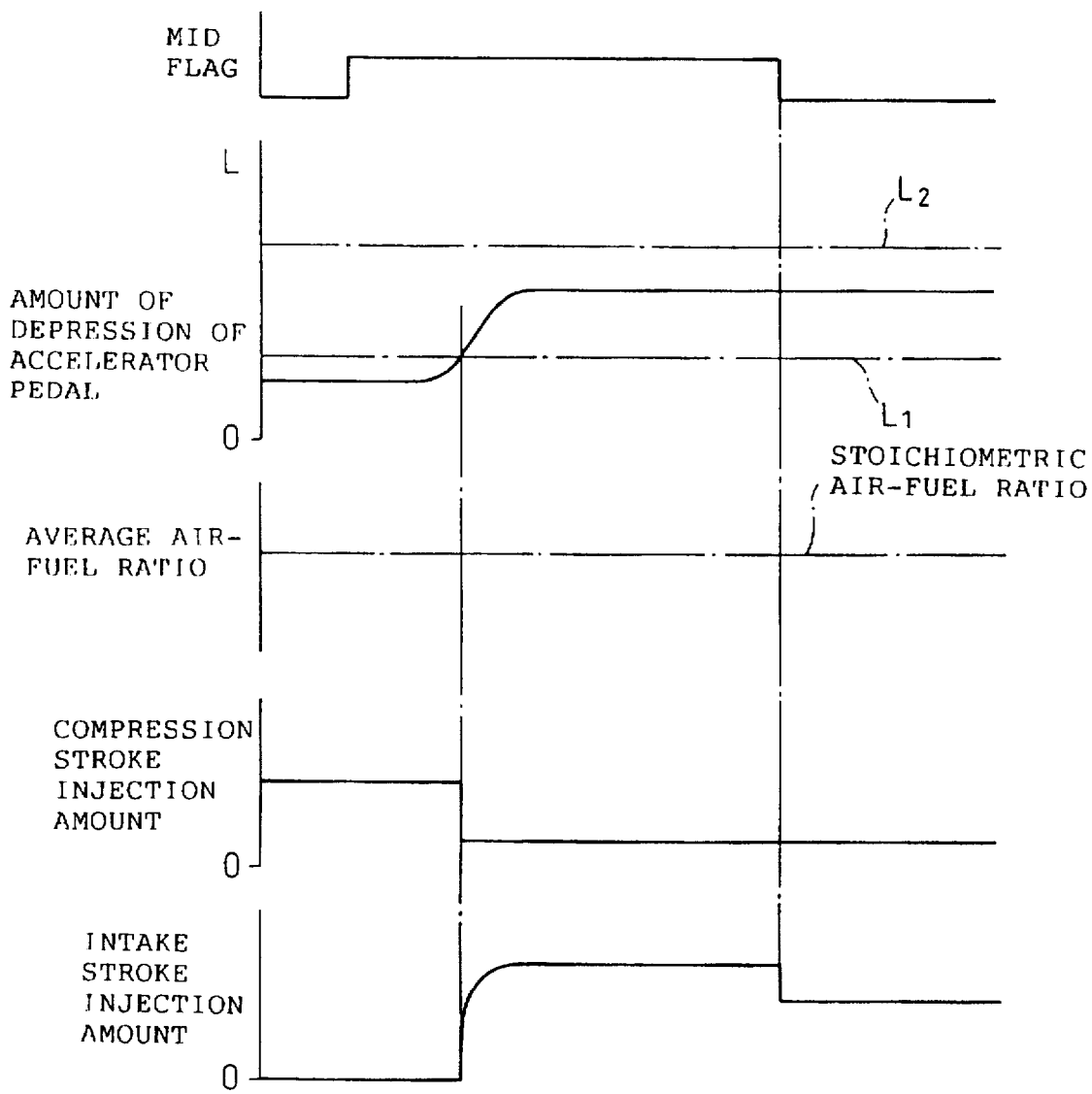
FIG. 74 is a time chart of $NO_x$ releasing control showing still another embodiment for the rich processing.

On the other hand, in this embodiment, as shown in FIG. 74, even if the MID flag is set at the time of engine low load operation, at this time, the average air-fuel ratio A/F is not made rich. After the MID flag is set, when the engine load changes from a low load operation to a medium load operation, the average air-fuel ratio A/F is immediately made rich in the weak stratifying state. In this case too, frequent switching of the stratification states is prevented. Further, when the engine load is relatively low, the $NO_x$ releasing action is performed.

Figure 75:
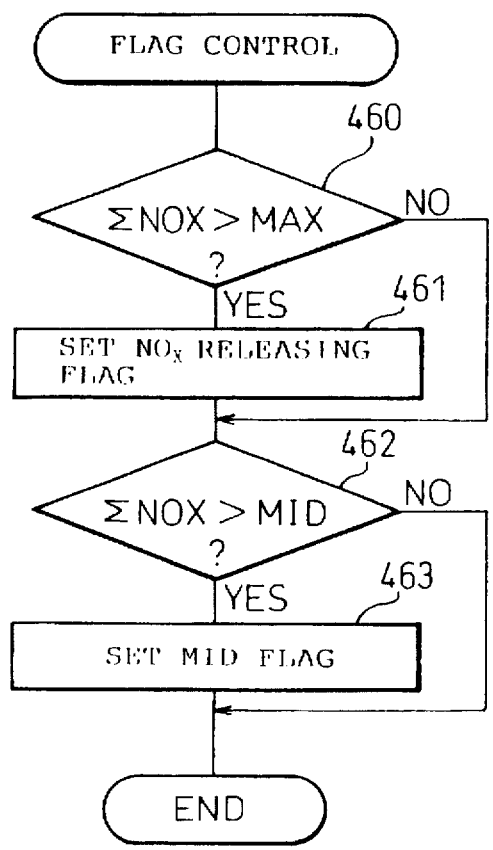
FIG. 75 is a flow chart for flag control.

FIG. 75 shows the routine for control of the flag. This routine is executed by interruption every predetermined time interval.

Referring to FIG. 75, first of all, at step 460, whether the $NO_x$ amount $\Sigma NO_x$ has become larger than the allowable value MAX or not is decided. When $\Sigma NO_x{\leq}MAX$, step 462 is jumped to. If $\Sigma NO_x{>}MAX$, step 461 is proceeded to, where the $NO_x$ releasing flag is set, then step 462 is proceeded to. At step 462, whether the $NO_x$ amount $\Sigma NO_x$ has become larger than the middle set value MID or not is decided. When $\Sigma NO_x{>}MID$, step 463 is proceeded to, where the MID flag is set.

Figure 76:
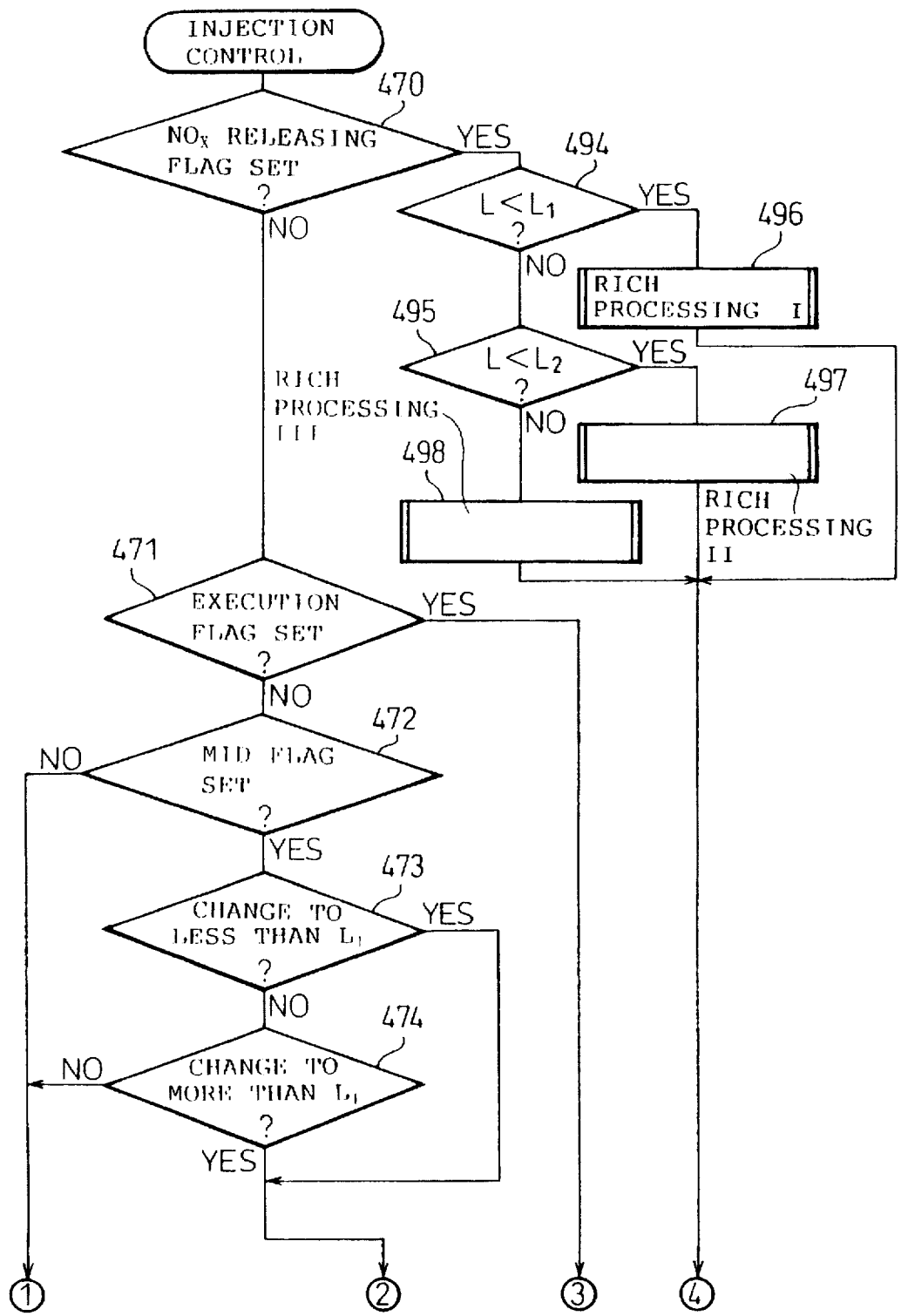
FIG. 76 and FIG. 77 are flow charts for injection control.
Figure 77:
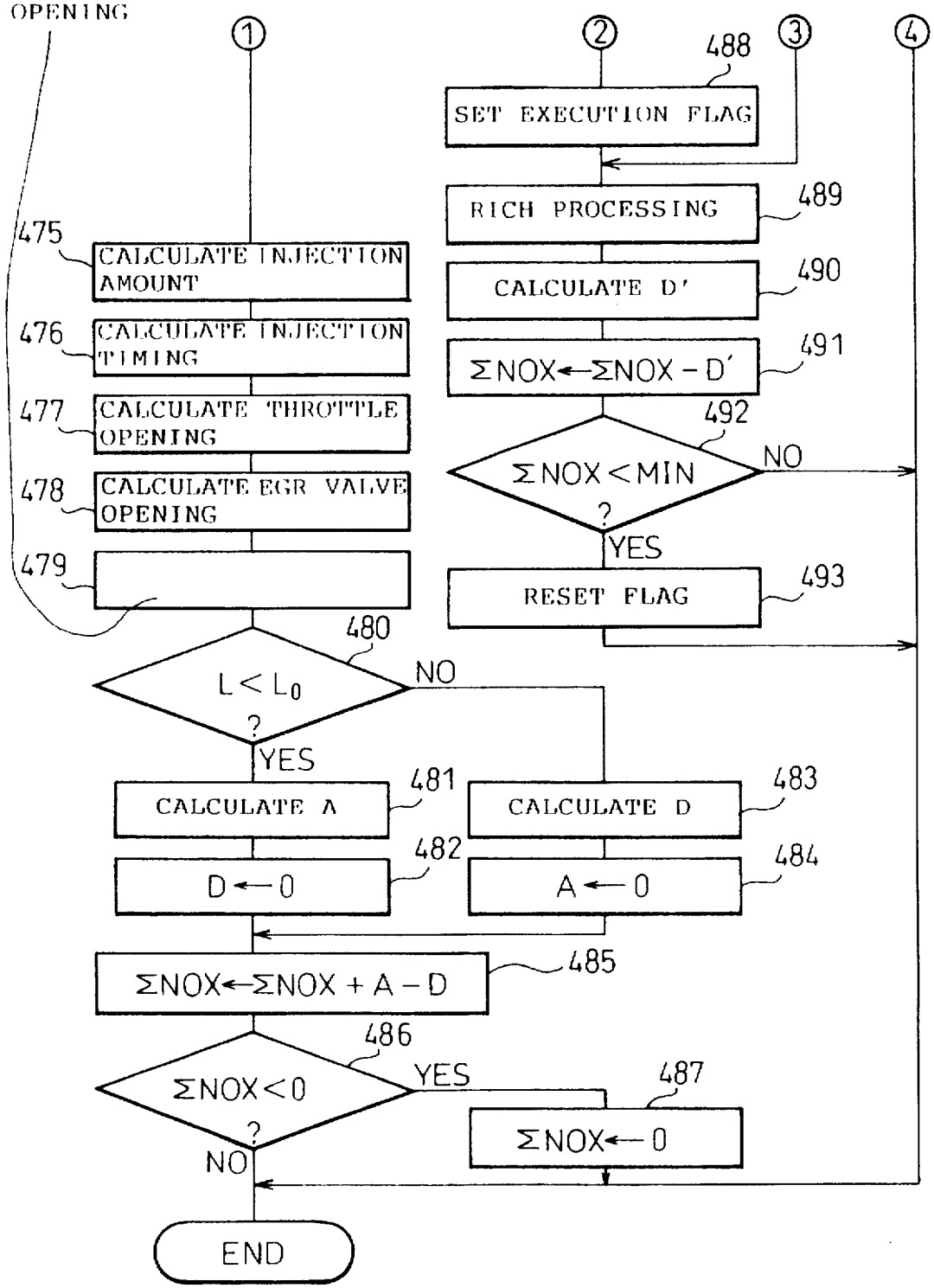

FIG. 76 and FIG. 77 show the routine for control of the fuel injection. This routine for example is executed by interruption every predetermined time interval.

Referring to FIG. 76 and FIG. 77, first of all, at step 470, whether the $NO_x$ releasing flag is set or not is decided. When the $NO_x$ releasing flag is not set, step 471 is proceeded to, where whether the execution flag is set or not is decided. The execution flag is set when the MID flag is set and when the engine load changes from medium or high load to low load or changes from low load to medium or high load. Whei the execution flag is not set, step 472 is proceeded to, where whether the MID flag is set or not is decided. When the MID flag is not set, step 475 is proceeded to. At step 475, the intake stroke injection amount $Q_1$ and compression stroke injection amount $Q_2$ are calculated based on the amount of depression L of the accelerator pedal 40 and engine rotational speed N from the relationship stored in advance in the ROM 33 and shown in FIG. 6. Next, at step 476, the injection timing is calculated based on the amount of depression L of the accelerator pedal 40 and engine rotational speed N from the relationship stored in advance in the ROM 33 and shown in FIG. 6. Next, at step 477, the opening of the throttle valve 23 is calculated based on the amount of depression L of the accelerator pedal 40 and engine rotational speed N from the relationship stored in advance in the ROM 33 and shown in FIG. 7. Next, at step 478, the opening of the EGR valve 29 is calculated based on the amount of depression L of the accelerator pedal 40 and engine rotational speed N from the relationship stored in advance in the ROM 33. Next, at step 479, the opening of the intake control valve 17 is calculated based on the amount of depression L of the accelerator pedal 40 from the relationship stored in advance in the ROM 33 and shown in FIG. 8.

Next, at step 480, whether the amount of depression L, of the accelerator pedal 40 is lower than $L_0$ (FIG. 7) or not is decided. When $L<L_0$, step 481 is proceeded to, where the amount of $NO_x$ absorption A is calculated from the map shown in FIG. 14A. Next, at step 482, the $NO_x$ releasing D is made zero. Next, step 485 is proceeded to. On the other hand, when $L \geq L_0$ is decided at step 480, step 483 is proceeded to, where the $NO_x$ releasing D is calculated from the map shown in FIG. 14B. Next, at step 484, the amount of $NO_x$ absorption A is made zero, then step 485 is proceeded to. At step 485, the $NO_x$ amount $\Sigma NO_x$ estimated to be absorbed in the $NO_x$ absorbent 26 (=$\Sigma NO_x$+A−D) is calculated. Next, at step 486, whether the $\Sigma NO_x$ has become negative or not is decided. When $\Sigma NO_x<0$, step 487 is proceeded to, where the $\Sigma NO_x$ is made zero.

On the other hand, when it is decided at step 472 that the MID flag is set, step 473 is proceeded to, where whether the amount of depression L of the accelerator pedal 40 has become less than $L_1$ or not, that is, whether the engine load changes from medium or high load to low load or not, is decided. When $L<L_1$ is not true, step 474 is proceeded to, where whether the amount of depression L of the accelerator pedal 40 is more than $L_1$ or not, that is, whether the engine load changes from low load to medium or high load or not, is decided. When $L>L_1$ is not true, step 475 is proceeded to.

On the other hand, when after the MID flag is set at step 473, the amount of depression L of the accelerator pedal 40 has become lower than $L_1$, that is, the engine load changes from medium or high load to low load, is decided, step 488 is proceeded to, where the execution flag is set, then step 489 is proceeded to. Note that once the execution flag is set, the routine jumps from step 471 to step 489. At step 489, the weak stratifying state where the intake stroke injection and compression stroke injection are performed is set. As shown in FIG. 73, by increasing the intake stroke injection amount in the weak stratifying state, the average air-fuel ratio A/F is made rich.

Next, at step 490, the $NO_x$ releasing D' is calculated from FIG. 23. Next, at step 491, the $NO_x$ amount $\Sigma NO_x$ is reduced by the $NO_x$ releasing D'. Next, at step 492, whether the $NO_x$ amount $\Sigma NO_x$ has become smaller than the lower value MIN or not is decided. When $\Sigma NO_x<MIN$, step 493 is proceeded to, where the MID flag and execution flag are reset. When these flags are reset, the normal strong stratifying state is shifted to. On the other hand, after the MID flag is set, when at step 474, the amount of depression L of the accelerator pedal 40 has become higher than $L_1$, that is, the fact that the engine load changes from low load to medium or high load is decided, step 488 is proceeded to, where the execution flag is set, then step 489 is proceeded to. At step 489, if the engine is in medium or high load operation at this time, as shown in FIG. 74, the weak stratifying state where the intake stroke injection and compression stroke injection are performed is set. By increasing the intake stroke injection amount in this weak stratifying state, the average air-fuel ratio A/F is made rich. On the other hand, if the engine is in high load operation at this time, the average air-fuel ratio A/F is made rich in the homogeneous air-fuel mixture state.

Next, the routine proceeds through step 489, 490, and 491 to step 492. When $\Sigma NO_x<MIN$, step 493 is proceeded to, where the MID flag and execution flag are reset. When these flags are reset, the normal weak stratifying state or homogeneous air-fuel mixture state is returned to.

On the other hand, when it is decided at step 470 that the $NO_x$ releasing flag is set, step 494 is proceeded to, where whether the amount of depression L of the accelerator pedal 40 is smaller than $L_1$ or not is decided. When $L<L_1$, step 496 is proceeded to, where the rich processing I for making the average air-fuel ratio A/F rich is performed. As opposed to this, when $L>L_1$, step 495 is proceeded to, where whether the amount of depression L of the accelerator pedal 40 is smaller than $L_2$ or not is decided. When $L<L_2$, step 497 is proceeded to, where the rich processing II for making the average air-fuel ratio A/F rich is performed, while when $L \geq L_2$, step 498 is proceeded to, where the rich processing III for making the average air-fuel ratio A/F rich is performed.

Figure 78:
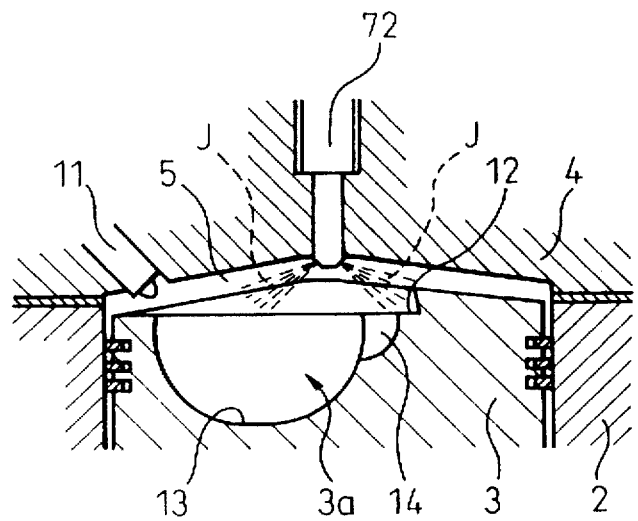
FIG. 78 is a side cross-sectional view of another embodiment of an internal combustion engine.
Figure 79:
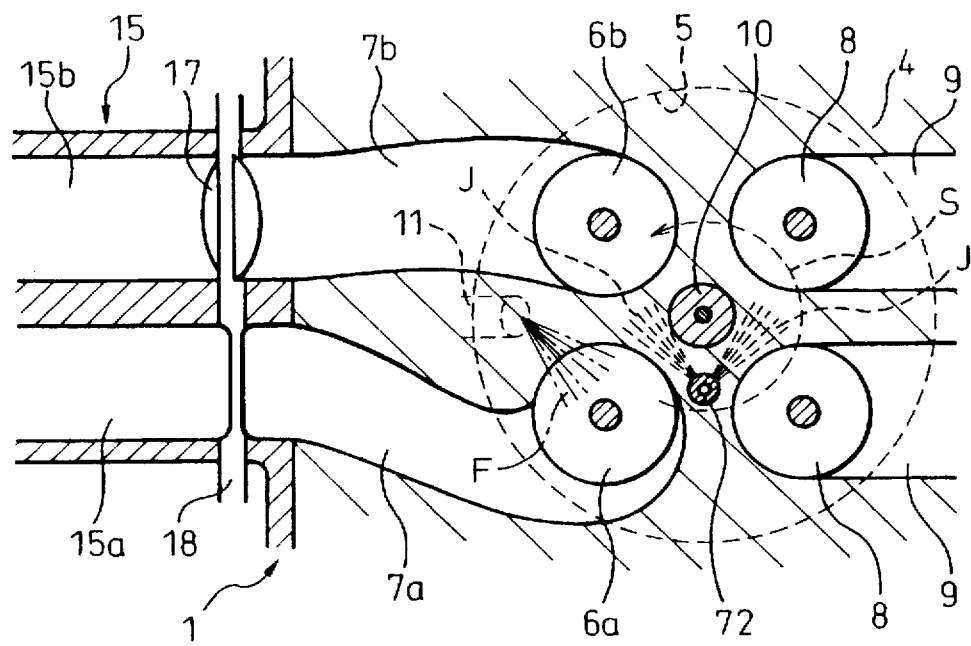
FIG. 79 is a plane cross-sectional view of the cylinder head shown in FIG. 78.

FIG. 78 to FIG. 81 show still another embodiment. In this embodiment, as shown in FIG. 78 and FIG. 79, an air injector 71 is provided at the center of the inner wall of the cylinder head at the side of the spark plug 10. When the average air-fuel ratio A/F is made rich so as to release the $NO_x$ from the $NO_x$ absorbent 26, air is injected from the air injector 71 as shown by J into the combustion chamber 5 around the spark plug 10. In the embodiment shown in FIG. 78 and FIG. 79, the action of injection of air from the air injector 71 is performed at the end of the compression stroke.

In this way, when air is injected around the spark plug 10, the oxygen concentration in the air-fuel mixture around the spark plug 10 becomes high, therefore even if for example an overly rich air-fuel mixture is formed around the spark plug 10, it is possible to ensure good ignition without the occurrence of misfires.

Figure 80:
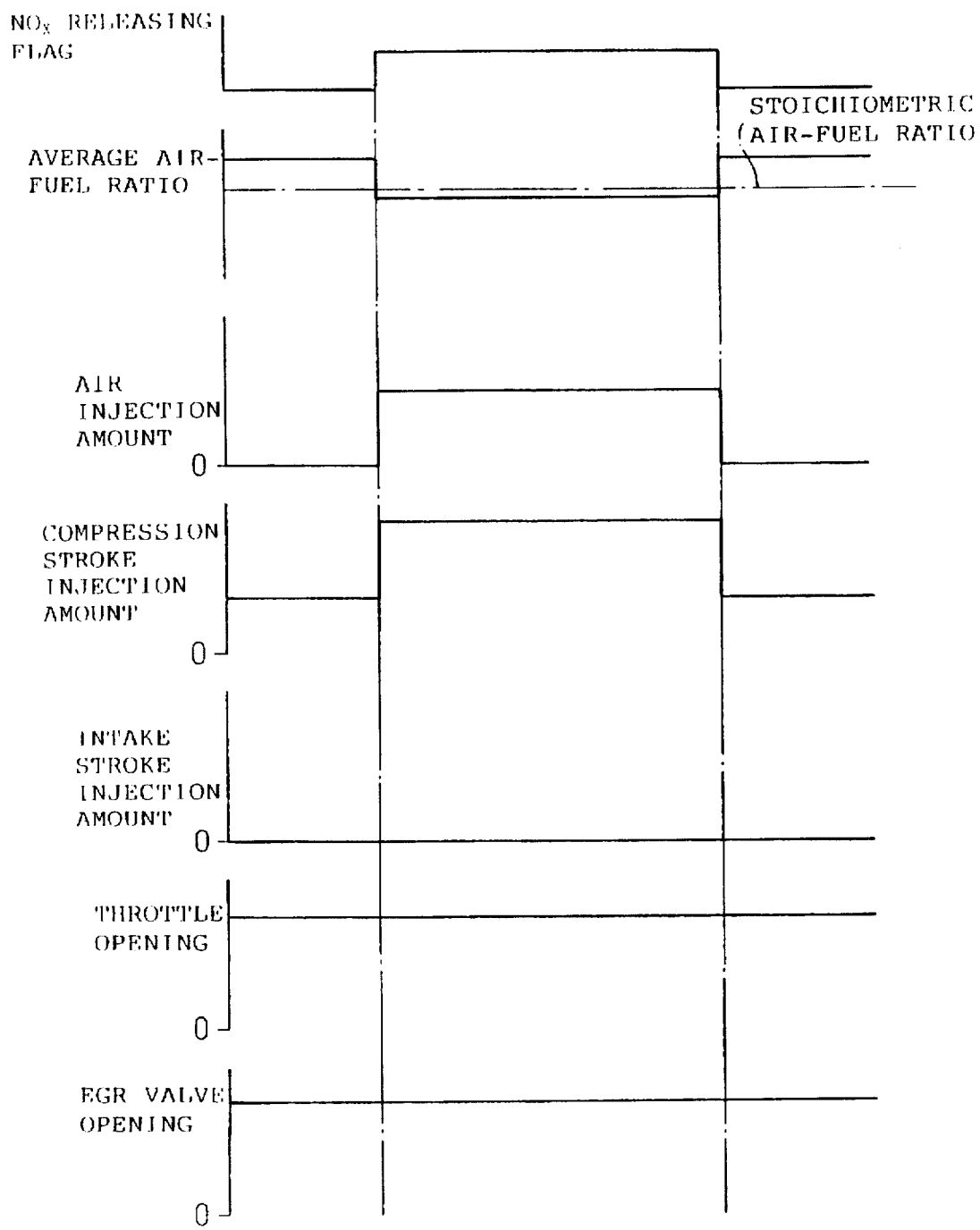
FIG. 80 is a time chart of $NO_x$ releasing control for the rich processing I.

FIG. 80 shows an example of the $NO_x$ releasing control at the time of engine low load operation in the case of use of such an air injector 71. As shown in FIG. 80, in this example, before the $NO_x$ releasing flag is set, only the compression stroke injection is performed. Even if the $NO_x$ releasing flag is set, only compression stroke injection is performed. However, when the $NO_x$ releasing flag is set, the amount of the compression injection is increased and air is injected from the air injector 71. At this time, the increase in the amount of the compression injection makes the average air-fuel ratio A/F become rich, but the air injected from the air injector 71 causes an air-fuel mixture of the optimal air-fuel ratio to be formed around the spark plug 10.

Figure 81:
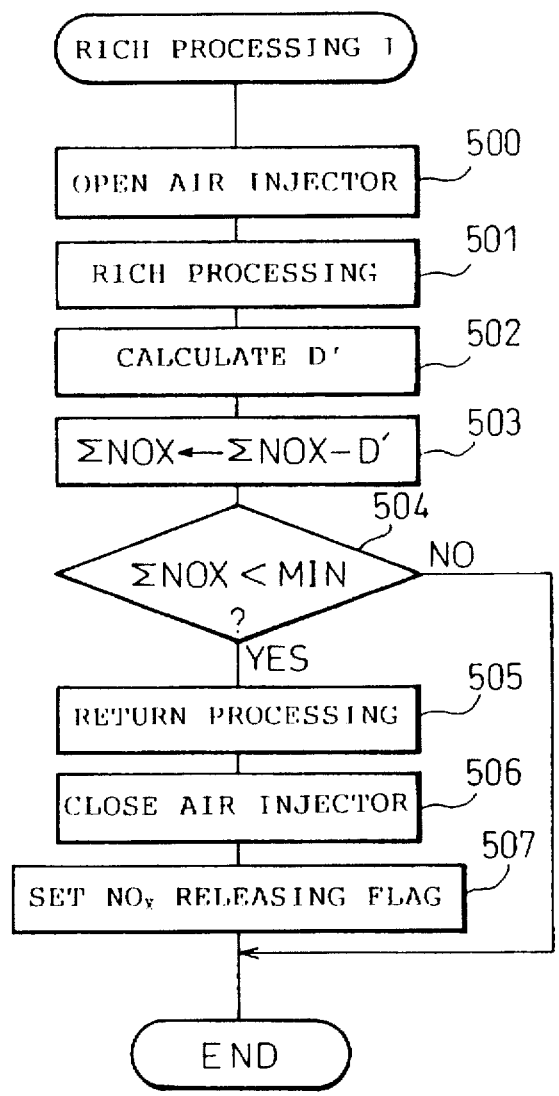
FIG. 81 is a flow chart of the rich processing I.

FIG. 81 shows the rich processing I for executing the $NO_x$ releasing control shown in FIG. 80. Note that, in this embodiment as well, the routine shown in FIG. 20 is used as the routine for control of the fuel injection. Referring to FIG. 81, first of all, at step 500, the processing for opening the air injector 71 at the end of the compression stroke is performed. Next, at step 501, the compression stroke injection amount is increased whereby the average air-fuel ratio A/F is made rich. Next, at step 502, the $NO_x$ releasing D' is calculated from FIG. 23. Next, at step 503, the $NO_x$ amount $\Sigma NO_x$ is reduced by the $NO_x$ releasing D'. Next, at step 504, whether the $NO_x$ amount $\Sigma NO_x$ has become smaller than the lower value MIN or not is decided. When $\Sigma NO_x<MIN$, step 505 is proceeded to, where the compression stroke injection amount is reduced and the average air-fuel ratio A/F changes from rich to lean. Next, at step 506, the air injector 71 is held in a closed state. Next, at step 507, the No releasing flag is reset.

Figure 82:
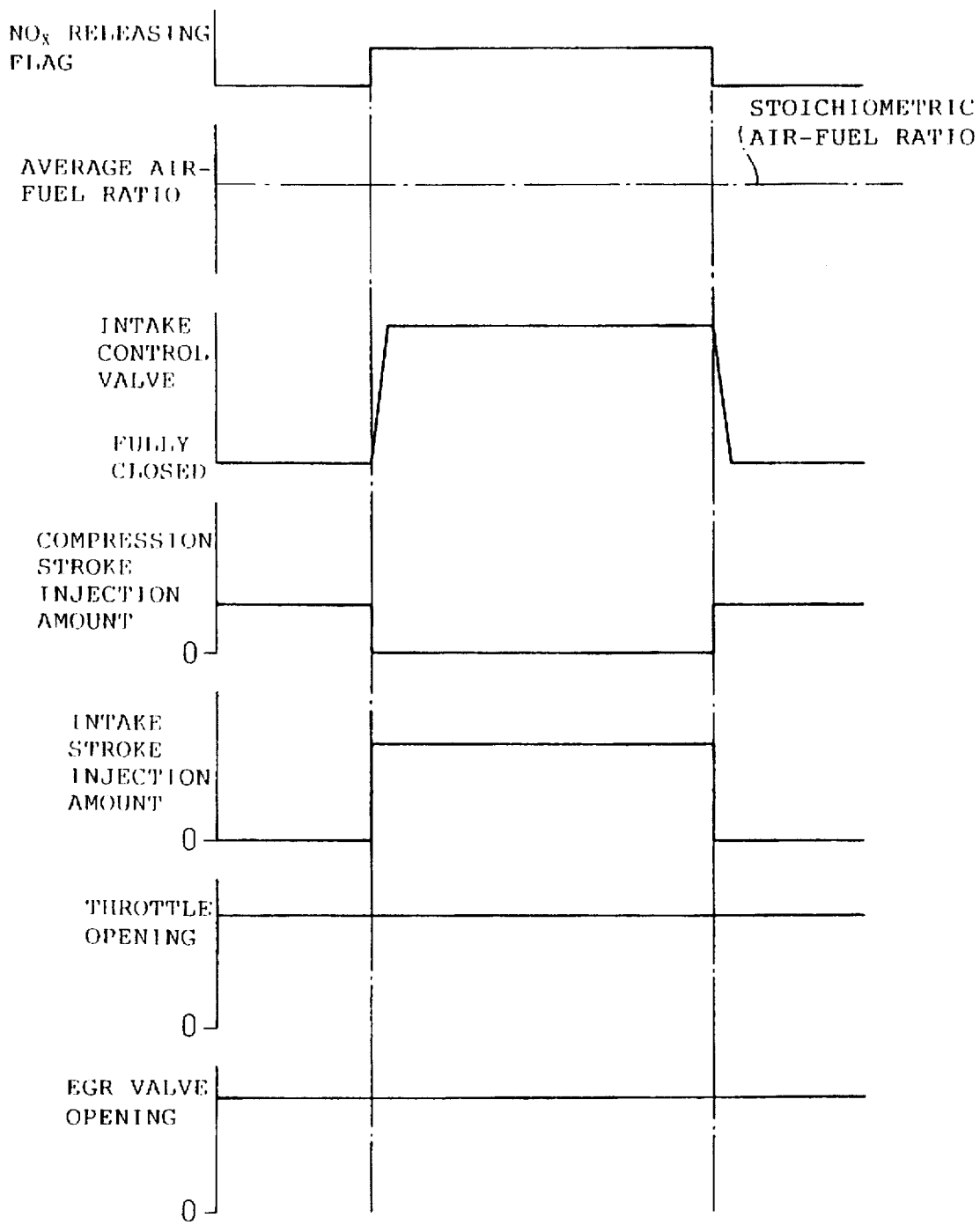
FIG. 82 is a time chart of $NO_x$ releasing control showing still another embodiment for the rich processing I.
Figure 83:
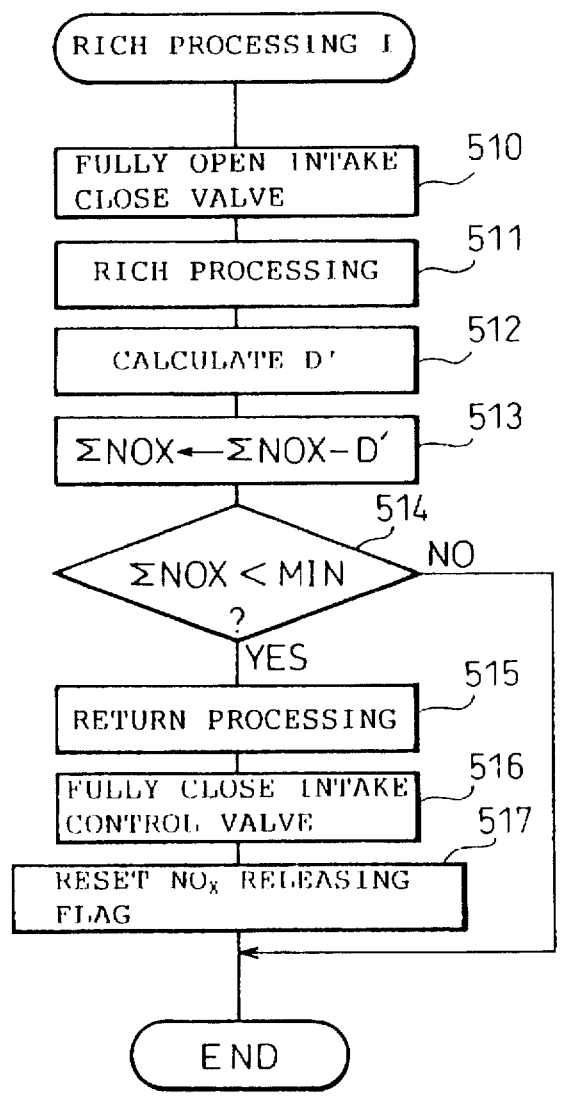
FIG. 83 is a time chart of $NO_x$ releasing control showing still another embodiment for the rich processing I.

FIG. 82 and FIG. 83 show the rich processing in the case of controlling the intake control valve 17 (FIG. 3). In the embodiment shown in FIG. 1 to FIG. 5, at the time of engine low load operation, the intake control valve 17 is closed. At this time, a swirl flow S (FIG. 3) is caused to form in the combustion chamber 5. The fuel injected at the time of the compression stroke is collected in a predetermined limited region by this swirl flow. The fuel collected in this limited region is ignited by the spark plug 10.

To create a strong stratifying state giving excellent ignition at the time of engine low load operation in this way, it is necessary to cause the generation of a swirl flow, but it is not particularly necessary to cause such a swirl flow to make the homogeneous air-fuel mixture state. Therefore, in the embodiment shown in FIG. 82, when making the average air-fuel ratio A/F rich, the intake control valve 17 is opened. That is, as shown in FIG. 82 showing the rich processing at the time of engine low load operation, only compression stroke injection is performed before the $NO_x$ releasing flag is set. At this time, the intake control valve 17 is closed. As opposed to this, when the $NO_x$ releasing flag is set, the compression stroke injection is stopped and the intake stroke injection is started. At this time, the intake control valve 17 is opened. At this time, a homogeneous air-fuel mixture is formed with a rich average air-fuel ratio A/F and the action of releasing of $NO_x$ from the $NO_x$ absorbent 26 is performed.

FIG. 83 shows the rich processing I for executing the $NO_x$ releasing control shown in FIG. 82. Note that, in this embodiment as well, the routine shown in FIG. 20 is used as the routine for control of the fuel injection. Referring to FIG. 83, first of all, at step 510, the intake control valve 17 is fully opened. Next, at step 511, the compression stroke injection is stopped and the intake stroke injection is started, whereby the average air-fuel ratio A/F is made rich. Next, at step 512, the $NO_x$ releasing D' is calculated from FIG. 23. Next, at step 513, the $NO_x$ amount $\Sigma NO_x$ is reduced by the $NO_x$ releasing D'. Next, at step 514, whether the $NO_x$ amount $\Sigma NO_x$ has become smaller than the lower value MIN or not is decided. When $\Sigma NO_x$<MIN, step 515 is proceeded to, where the intake stroke injection is stopped and the compression stroke injection is started and the average air-fuel ratio A/F changes from rich to lean. Next, at step 516, the intake control valve 17 is fully closed. Next, at step 517, the $NO_x$ releasing flag is reset.

Figure 84:
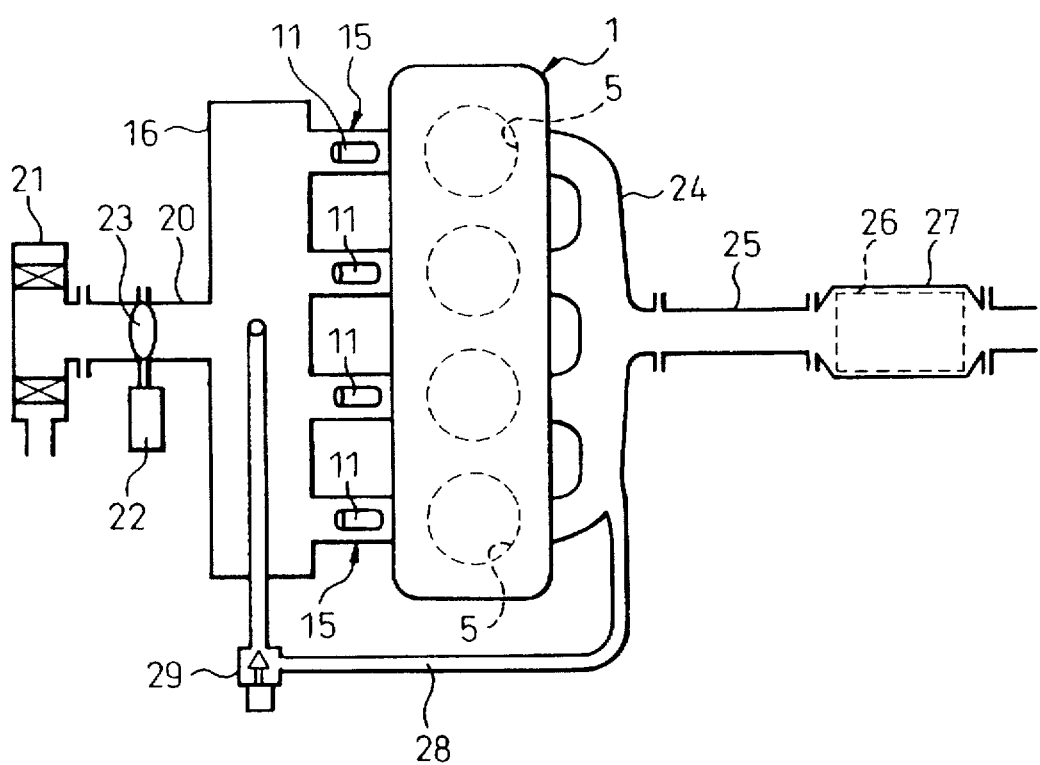
FIG. 84 is an overview of still another embodiment of an internal combustion engine.

FIG. 84 shows an internal combustion engine where the combustion chamber 5 is not provided with any fuel injector and the fuel injector 11 is mounted in the intake pipe 15. The present invention can also be applied to such an internal combustion engine. In such a so-called port injection type internal combustion engine, the air-fuel mixture has been stratified by various methods in the past. The present invention can be applied to all internal combustion engines designed so that the air-fuel mixture is stratified at the time of engine low load operation. For example, in an internal combustion engine designed to stratify the mixture at the time of engine low load operation, when the average air-fuel ratio is changed from lean to rich to release the $NO_x$, the degree of stratification is weakened or a homogeneous air-fuel mixture is made.

Further, in an internal combustion engine designed to cause stratification by causing a swirl flow in the combustion chamber 5, when the average air-fuel ratio is changed from lean to rich so as to release the $NO_x$ either the swirl flow is weakened or the generation of a swirl flow is stopped to weaken the degree of stratification or a homogeneous air-fuel mixture is set.

However, in the embodiment shown in FIG. 31 to FIG. 33, in the internal combustion engine shown in FIG. 1, the additional fuel is supplied during the expansion stroke only when the rich processing is performed. Further, in the embodiment shown in FIG. 49 to FIG. 56, in the internal combustion engine shown in FIG. 1, additional fuel is supplied during the expansion stroke when performing the rich processing I and addition fuel is supplied during the expansion stroke only when the engine load is low when performing the rich processing II. However, the additional fuel need not be supplied during the expansion stroke only in such specific operating states. It is also possible to supply the additional fuel during the expansion stroke at all times when the $NO_x$ amount $\Sigma NO_x$ is over the allowable value MAX. FIG. 85 to FIG. 88 show an embodiment where additional fuel is supplied during the expansion stroke at all times when the $NO_x$ amount $\Sigma NO_x$ is over the allowable value MAX in the internal combustion engine shown in FIG. 1.

However, when additional fuel is injected in the expansion stroke, if injected at the start of the expansion stroke, the additionally injected fuel is immediately burned. If injected a while after the expansion stroke is started, the additionally injected fuel is exhausted from the combustion chamber 5 in the form of unburnt fuel without being burned much at all. When the additional fuel is burned, the oxygen concentration in the exhaust gas falls by an extreme amount. Accordingly, at this time, if the EGR valve 29 is held open to a large degree, a large amount of exhaust gas with an extremely low oxygen concentration is recirculated through the EGR gas passage 28 to the surge tank 16. Next, this large amount of EGR gas with an extremely low oxygen concentration is supplied to the inside of the combustion chamber 5. Accordingly, at this time, the inside of the combustion chamber 5 is occupied by a large amount of EGR gas with an extremely low oxygen concentration.

However, if in this way the inside of the combustion chamber 5 is filled with a large amount of EGR gas with an extremely low oxygen concentration, then the oxygen concentration around the spark plug 10 becomes low, so the problem arises that misfires end up occurring. Accordingly, when the average air-fuel ratio A/F is made rich so as to release the $NO_x$ from the $NO_x$ absorbent 26, the amount of EGR gas has to be reduced or the oxygen concentration in the combustion chamber 5 has to be increased. Accordingly, when additional fuel is injected in the initial period of the expansion stroke, when the average air-fuel ratio A/F is made rich so as to release the $NO_x$ from the $NO_x$ absorbent 26 as shown in FIG. 32, the recirculation of the EGR gas is stopped. This is similar to the embodiment shown in FIG. 85 to FIG. 88. In this embodiment, when the average air-fuel ratio A/F is made rich so as to release the $NO_x$ from the $NO_x$ absorbent 26, the recirculation of the EGR gas is stopped.

On the other hand, when almost none of the additional fuel is burned, exhaust gas including a large amount of unburnt fuel is exhausted from the combustion chamber 5. At this time, if the EGR valve 29 is opened and held at a large opening, a large amount of exhaust gas including a large amount of unburnt fuel is recirculated through the EGR gas passage 28 to the inside of the surge tank 16. Next, this large amount of exhaust gas including a large amount of unburnt fuel is supplied inside the combustion chamber 5. However, when a large amount of unburnt fuel is recirculated into the combustion chamber 5 in this way, in particular when as shown in FIG. 9C or FIG. 10C having the air-fuel mixture collect around the spark plug 10, the air-fuel mixture around the spark plug 10 becomes overly rich and as a result the problem arises that misfires end up occurring. Accordingly, in this case as well, when the average air-fuel ratio A/F is made rich so as to release the $NO_x$ from the $NO_x$ absorbent 26, it is necessary that the amount of EGR gas be reduced or unburnt fuel be kept from flowing into the combustion chamber 5.

Figure 85:
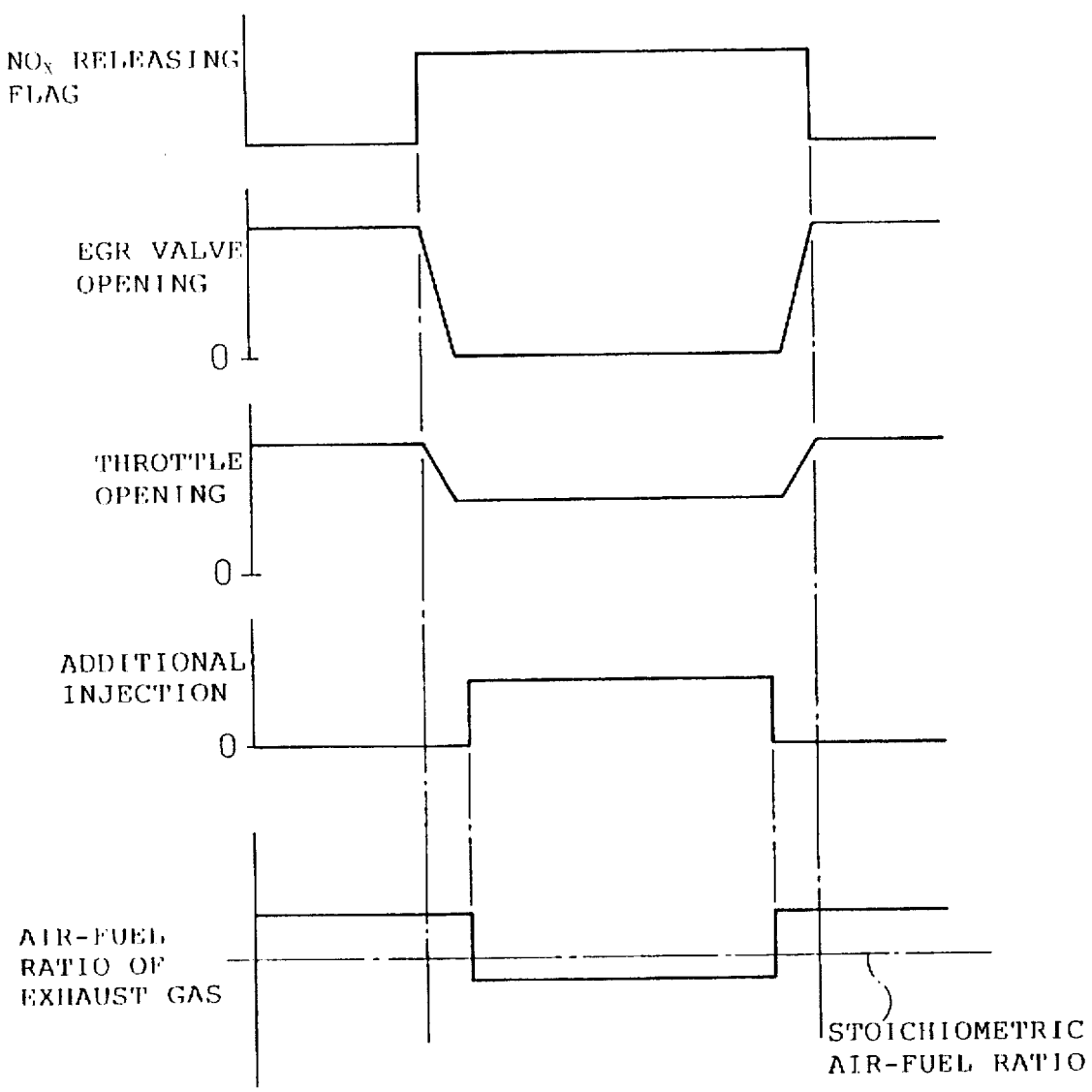
FIG. 85 is a time chart showing the EGR valve opening, throttle opening, additional fuel injection, etc..

In the embodiment shown in FIG. 85 to FIG. 88, as shown in FIG. 85, when the $NO_x$ releasing flag is set, the EGR valve 29 is fully closed and the throttle valve 23 is opened to a predetermined degree. When the closing operation of the EGR valve 29 and closing operation of the throttle valve 23 are completed, additional fuel is injected at the time of the expansion stroke. When additional fuel is injected, the air-fuel ratio of the exhaust gas flowing into the $NO_x$ absorbent 26 becomes rich, therefore the action of releasing of $NO_x$ from the $NO_x$ absorbent 26 is started. When the action of releasing $NO_x$ from the $NO_x$ absorbent 26 has been completed, the action of injection of additional fuel is stopped and then the EGR valve 29 and throttle valve 23 are opened to their original degrees.

As shown in FIG. 85, in this embodiment, when additional fuel is injected, the EGR valve 29 is fully closed. Accordingly, even when the injection of the additional fuel causes the oxygen concentration in the exhaust gas to fall by an extreme amount or even if the exhaust gas includes a large amount of unburnt fuel, this exhaust gas is not recirculated into the combustion chamber 5, therefore it becomes possible to prevent the occurrence of misfires. Further, in the in-cylinder injection type internal combustion engine shown in FIG. 1, when the amount of the supply of the EGR gas falls or the supply of the EGR gas is stopped, the amount of intake air supplied into the combustion chamber 5 increases and therefore the air-fuel mixture becomes overly lean and misfires occur. Accordingly, to keep the air-fuel mixture from becoming overly lean in this way, when the opening of the EGR valve 29 is reduced to reduce the amount of the supply of the EGR gas, the opening of the throttle valve 23 is reduced so as to reduce the amount of intake air.

Figure 86:
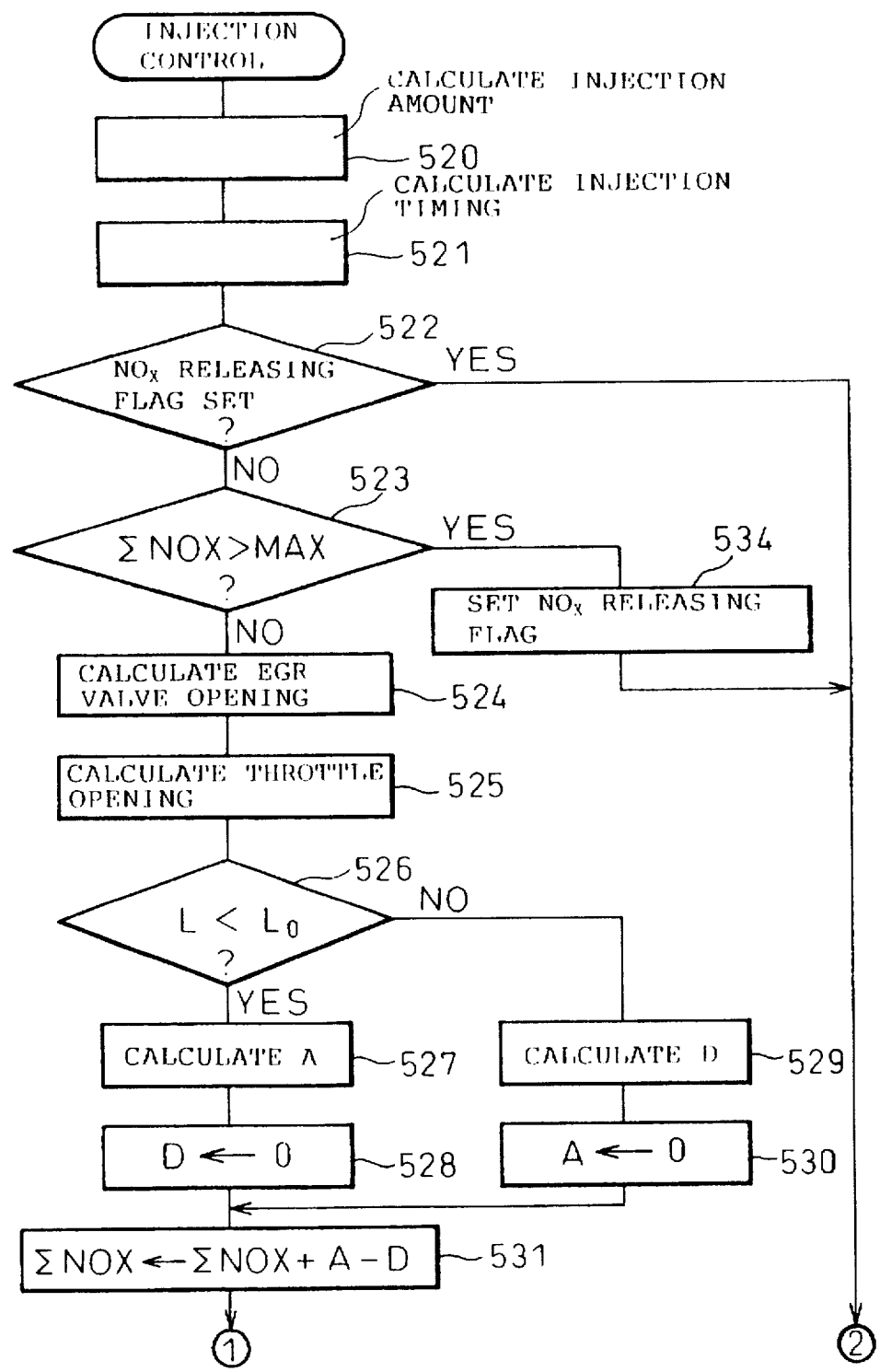
FIG. 86 to FIG. 88 are flow charts for injection control.
Figure 87:
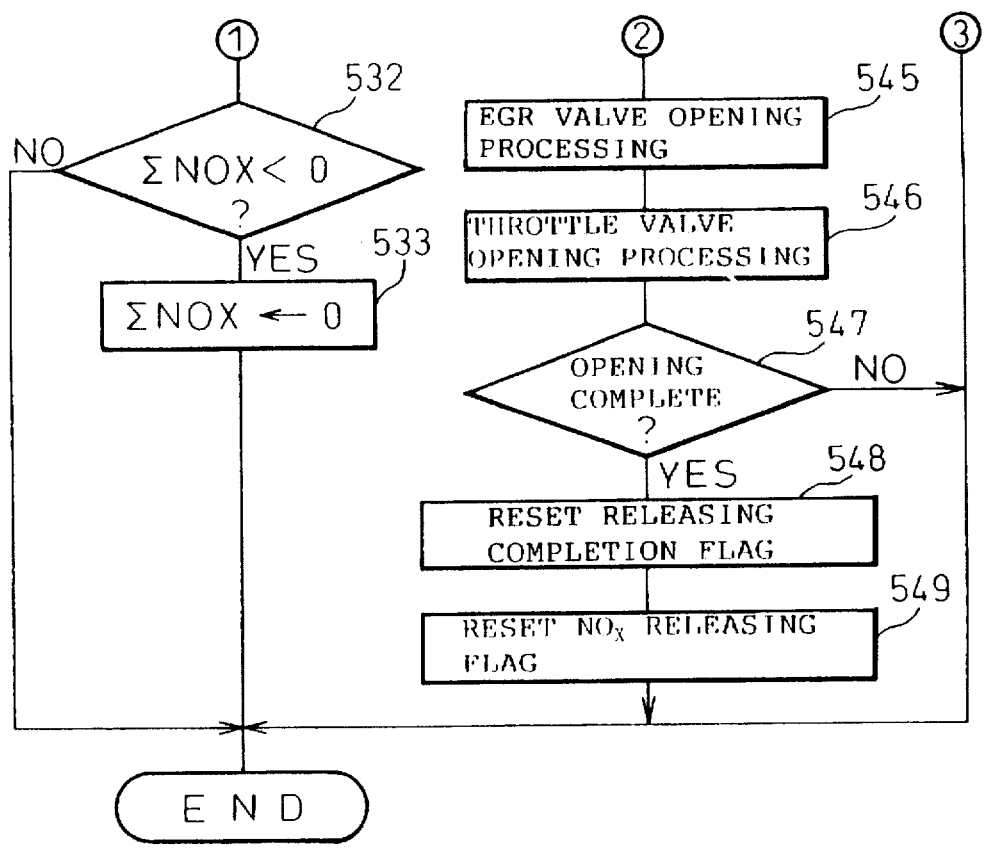
Figure 88:
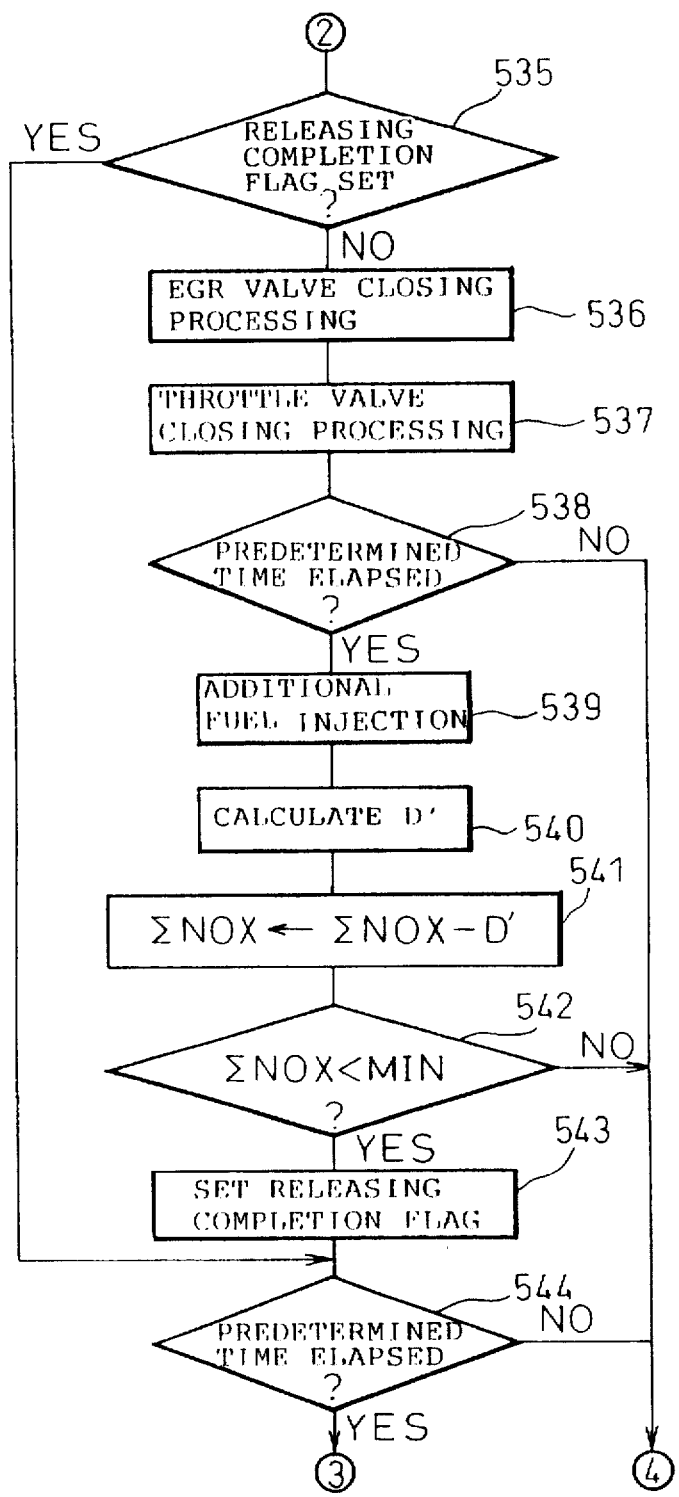

FIG. 86 to FIG. 88 show the fuel injection control routine shown in FIG. 85. This routine is executed by interruption every predetermined time interval.

Referring to FIG. 86 to FIG. 88, first of all, at step 520, the intake stroke injection amount $Q_1$ and compression stroke injection amount $Q_2$ shown in FIG. 6 and stored in advance in the ROM 32 as a function of the amount of depression L of the accelerator pedal 40 and engine rotational speed N are calculated. Next, at step 521, the injection timing shown in FIG. 6 stored in advance in the ROM 32 as a function of the amount of depression L of the accelerator pedal 40 and engine rotational speed N is calculated. Next, step 522 is proceeded to, where whether the $NO_x$ releasing flag is set or not is decided. Normally, the $NO_x$ releasing flag is reset, so step 523 is proceeded to. At step 523, whether the $NO_x$ amount $\Sigma NO_x$ estimated to be absorbed in the $NO_x$ absorbent 26 is larger than the allowable value MAX or not is decided. When $\Sigma NO_x \leq MAX$, step 524 is proceeded to.

At step 524, the opening of the EGR valve 29 shown in FIG. 7 and stored in advance in the ROM 32 as a function of the amount of depression L of the accelerator pedal 40 and engine rotational speed N is calculated. Next, at step 525, the opening of the throttle valve 23 shown in FIG. 7 and stored in advance in the ROM 32 as a function of the amount of depression L of the accelerator pedal 40 and engine rotational speed N is calculated.

Next, at step 526, whether the amount of depression L of the accelerator pedal 40 is lower than $L_0$ (FIG. 7) or not is decided. When $L<L_0$, step 527 is proceeded to, where the amount of $NO_x$ absorption A is calculated from the map shown in FIG. 14A. Next, at step 528, the $NO_x$ releasing D is made zero, then step 536 is proceeded to. On the other hand, when $L \geq L_0$ is decided at step 526, step 529 is proceeded to, where the $NO_x$ releasing D is calculated from the map shown in FIG. 14B. Next, at step 530, the amount of $NO_x$ absorption A is made zero, then step 531 is proceeded to.

At step 531, the $NO_x$ amount $\Sigma NO_x$ $(=\Sigma NO_x+A-D)$ estimated to be absorbed in the $NO_x$ absorbent 26 is calculated. Next, at step 532, whether $\Sigma NO_x$ has become negative or not is decided. When $\Sigma NO_x<0$, step 533 is proceeded to, where the $\Sigma NO_x$ is made zero.

On the other hand, when $\Sigma NO_x>MAX$ is decided at step 523, step 534 is proceeded to, where the $NO_x$ releasing flag is set, then step 535 is proceeded to. Note that once the $NO_x$ releasing flag is set, the routine jumps from step 522 to step 535. At step 535, whether the releasing completion flag is set or not is decided. At this time, the releasing completion flag is not set, so step 536 is proceeded to.

At step 536, the EGR valve 29 is fully closed. Next, at step 537, the throttle valve 23 is closed to a predetermined degree. This predetermined degree is stored in advance in the ROM 32 in the form of a function of the amount of depression L of the accelerator pedal 40 and engine rotational speed N. Next, at step 538, whether a predetermined time has elapsed from when the processing for closing the EGR valve 29 and throttle valve 23 is performed or not is decided. When the predetermined time has elapsed, step 539 is proceeded to.

At step 539, the action of injecting the predetermined amount of additional fuel is started. Next, at step 540, the $NO_x$ releasing D' when the additional fuel injection is performed is calculated. Next, at step 541, the $NO_x$ amount $\Sigma NO_x$ is reduced by the $NO_x$ releasing D'. Next, at step 542, whether the $\Sigma NO_x$ has become smaller than the lower value MIN or not is decided. When $\Sigma NO_x<MIN$, step 543 is proceeded to, where the releasing completion flag is set. Next, step 544 is proceeded to. Note that, once the releasing completion flag is set, the routine jumps from step 535 to step 544.

At step 544, whether a predetermined time has elapsed from when the releasing completion flag is set or not is decided. When the predetermined time has elapsed, step 545 is proceeded to. At step 545, the EGR valve 29 is opened to the original degree, more precisely speaking, to the degree stored in the ROM 32 and determined by the operating state. Next, at step 546, similarly, the throttle valve 23 is opened to the original degree, more precisely speaking, to the degree stored in the ROM 32 and determined by the operating state. Next, at step 547, whether the processing for opening the EGR valve 29 and throttle valve 23 has been completed or not is decided. When the opening processing has been complete, step 548 is proceeded to, where the releasing completion flag is reset. Next, at step 549, the $NO_x$ releasing flag is reset.

Figure 89:
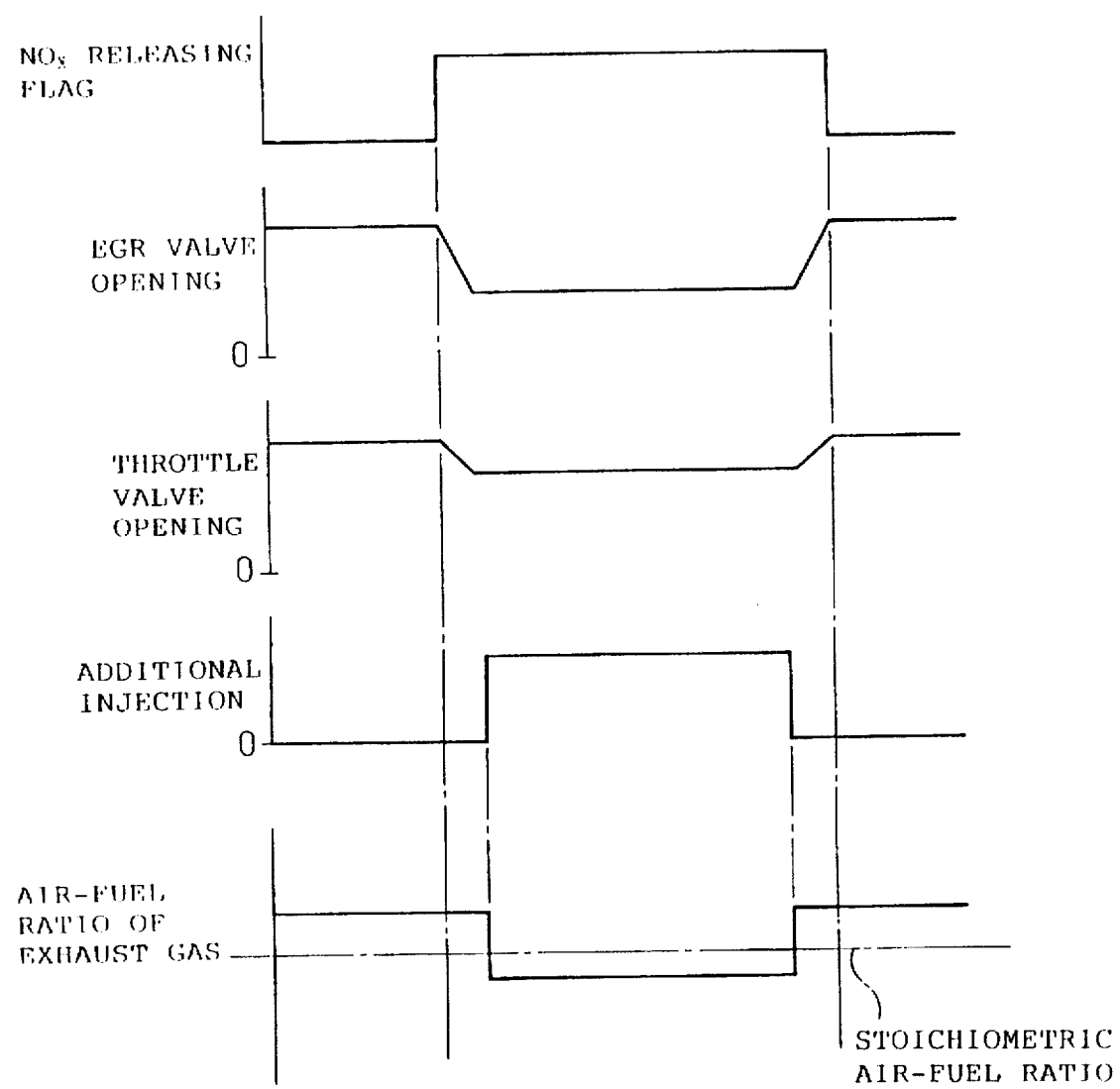
FIG. 89 is a time chart showing EGR valve opening, throttle opening, additional fuel injection, etc..

FIG. 89 shows another embodiment. In this embodiment as well, when the $NO_x$ releasing flag is set, the EGR valve 29 and throttle valve 23 are closed. When the operation for opening the EGR valve 29 and throttle valve 23 has been completed, additional fuel is supplied, but in this embodiment, the EGR valve 29 is not fully opened and is closed to a certain degree. That is, in this embodiment, the amount of recirculation of the EGR gas is reduced. In this way, in this embodiment, even if the injection of the additional fuel causes the oxygen concentration in the exhaust gas to fall by an extreme amount or even if the exhaust gas contains a large amount of unburnt fuel, the amount of the exhaust gas recirculated into the combustion chamber 5 is reduced, so it is possible to inhibit the occurrence of misfires.

Figure 90:
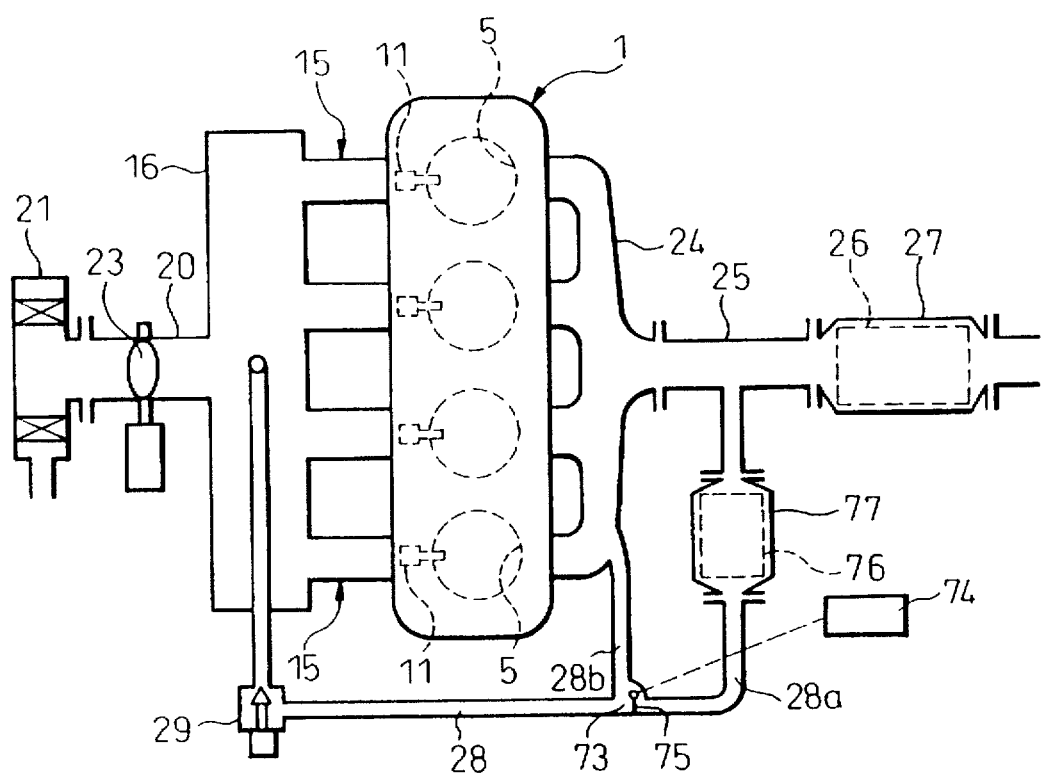
FIG. 90 is an overview of still another embodiment of an internal combustion engine.
Figure 91:
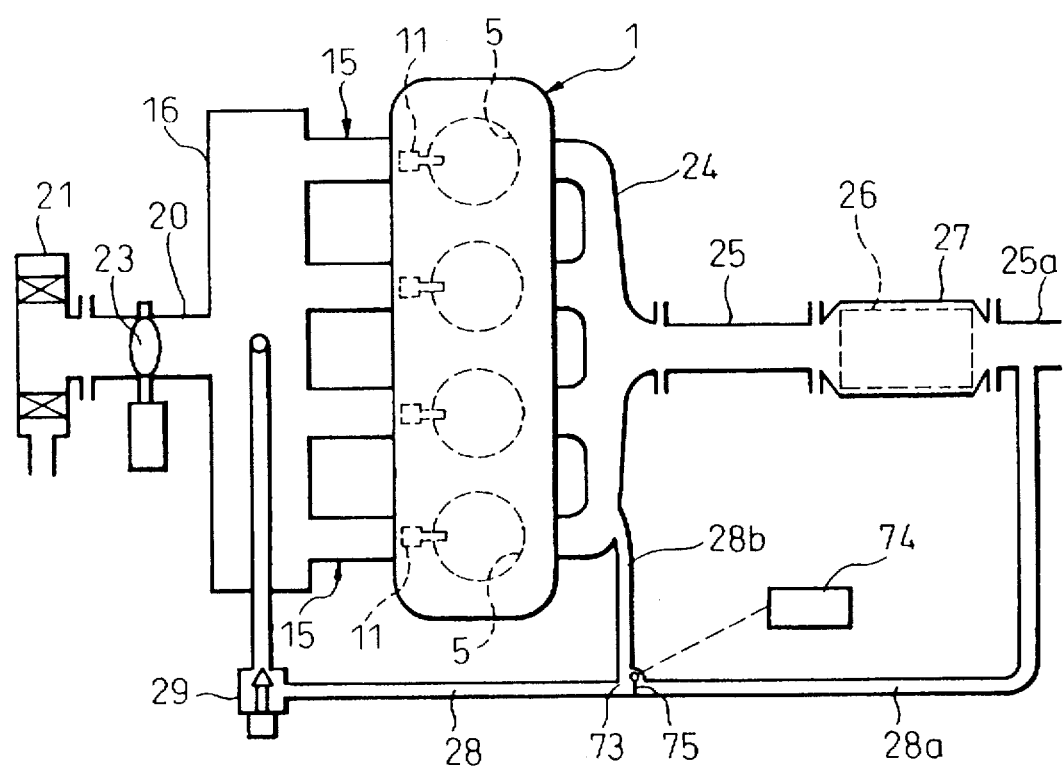
FIG. 91 is an overview of still another embodiment of an internal combustion engine.
Figure 92:
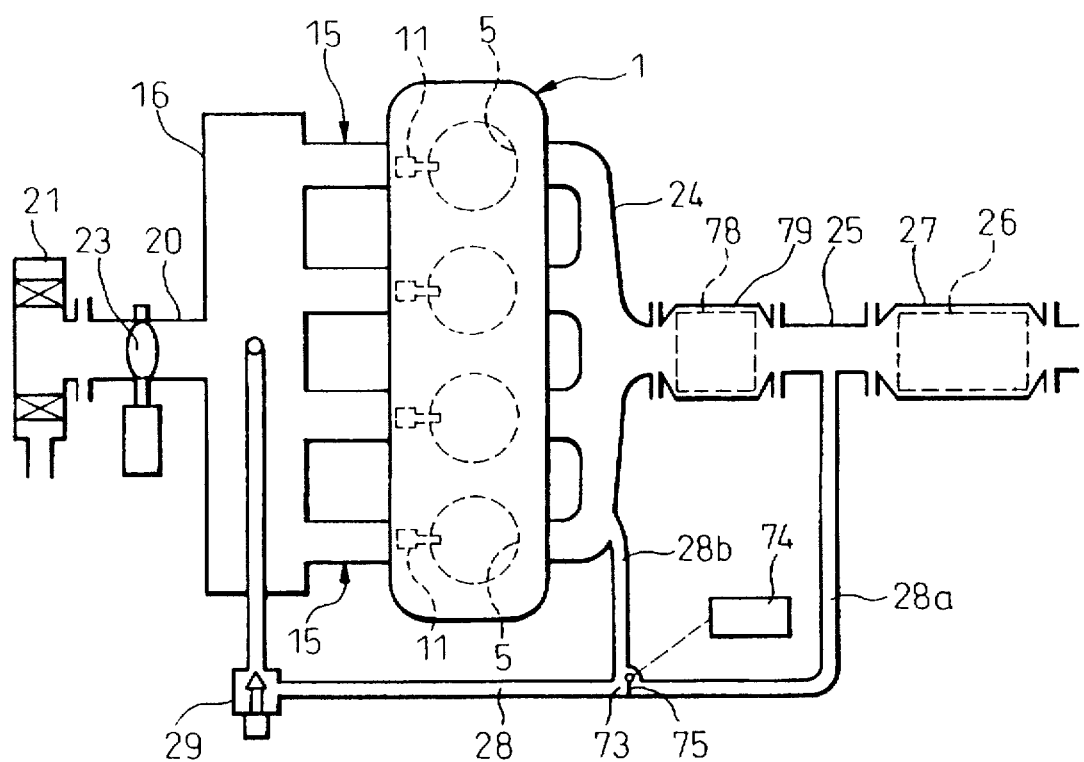
FIG. 92 is an overview of still another embodiment of an internal combustion engine.

FIG. 90 to FIG. 92 show other embodiments where the unburnt fuel contained in the exhaust gas is prevented from being recirculated into the combustion chamber 5 when injecting the additional fuel. Referring to FIG. 90 to FIG. 92, in each of these embodiments, the EGR gas passage 28 is provided with a first passage 28a connected to the exhaust pipe 25 or 25a downstream of the exhaust manifold 24 and a second passage 28b connected to the exhaust manifold 24. At the portion where the first passage 28a and second passage 28b join, a switching means comprised of a changeover valve 75 controlled by an actuator 74 is provided. One of the first passage 28a and second passage 28b is connected by the switching action of the changeover valve 75 through the EGR gas passage 28 and EGR valve 29 to the inside of the surge tank 16.

Figure 93:
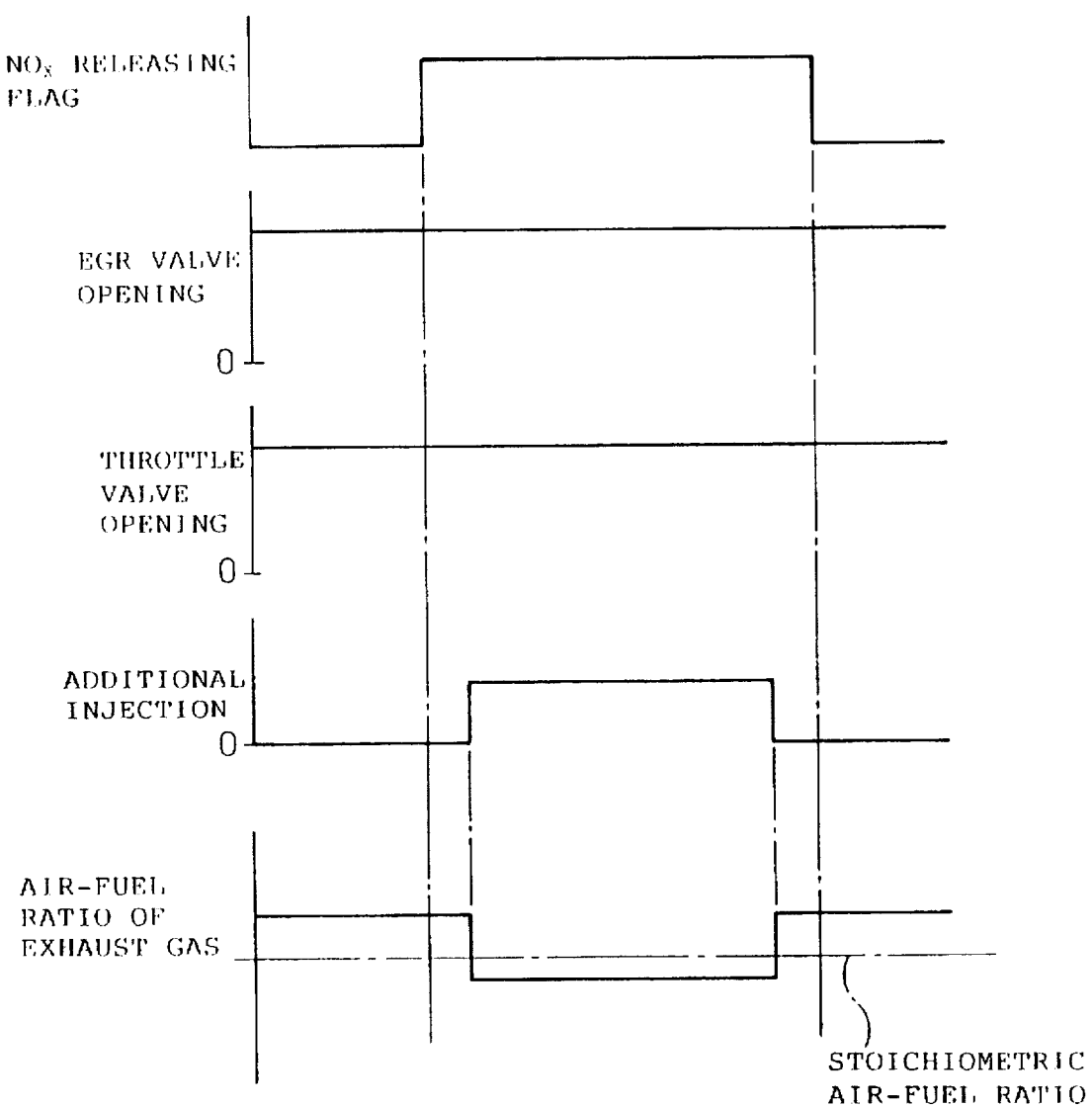
FIG. 93 is a time chart showing EGR valve opening, throttle opening, additional fuel injection, etc..

That is, in these embodiments, normally the first passage 28a is closed by the changeover valve 75, and the second passage 28b is communicated through the EGR gas passage 28 and EGR valve 29 with the surge tank 16. Accordingly, normally, the exhaust gas in the exhaust manifold 24 is refluxed through the second passage 28b to the surge tank 16. On the other hand, when the $NO_x$ is to be released from the $NO_x$ absorbent 26, the switching action of the changeover valve 75 is performed, the second passage 28b is closed by the changeover valve 75, and the first passage 28a is connected through the EGR gas passage 28 and EGR valve 29 to the surge tank 16. Further, as shown in FIG. 93, even when the $NO_x$ releasing flag is set so as to release the $NO_x$ from the $NO_x$ absorbent 26, the EGR valve 29 and throttle valve 23 are held open in that degree of opening. Accordingly, at this time, the exhaust gas is recirculated through the first passage 28a to the surge tank 16.

In the embodiment shown in FIG. 90, an unburnt fuel eliminating device 77 containing an oxidation catalyst or HC absorbent 76 is provided in the first passage 28a. When additional fuel injection is performed so as to release the $NO_x$ from the $No_x$ absorbent 26, the exhaust gas in the exhaust pipe 25 is recirculated through the unburnt fuel eliminating device 77 into the surge tank 16. When this unburnt fuel eliminating device 77 contains an oxidation catalyst 76, the unburnt fuel in the exhaust gas is oxidized by the oxidation catalyst 76, while when the unburnt fuel eliminating device 77 contains an HC absorbent 76, the unburnt fuel in the exhaust gas is absorbed by the HC absorbent 76 at this time. In either case, the unburnt fuel is not recirculated into the combustion chamber 5, therefore it becomes possible to prevent misfires from occurring.

On the other hand, as mentioned above, normally the exhaust gas in the exhaust manifold 24 bypasses the unburnt fuel eliminating device 77 and is circulated to the combustion chamber 5. This is so that when there is unburnt fuel present in the exhaust gas at the time of ordinary operation, the unburnt fuel can be made to be recirculated into the combustion chamber 5 as much as possible and burned in the combustion chamber 5 so as to make the unburnt fuel contribute to the greater output and also to prevent as much as possible the exhaust of the unburnt fuel into the atmosphere.

In the embodiment shown in FIG. 91, the first passage 28a is connected to the exhaust pipe 25a downstream of the $NO_x$ absorbent 26. Accordingly, in this embodiment, when additional fuel is injected so as to release the $NO_x$ from the $NO_x$ absorbent 26, the exhaust gas passed through the $NO_x$ absorbent 26 is recirculated through the first passage 28a to the inside of the surge tank 16. The unburnt fuel contained in the exhaust gas is used to reduce the $NO_x$ released from the $NO_x$ absorbent 26, that is, the unburnt fuel is oxidized in the $NO_x$ absorbent 26, therefore in this embodiment as well, the unburnt fuel is not recirculated into the combustion chamber 5. Note that, in this embodiment, the $NO_x$ absorbent 26 performs the simultaneous function of an unburnt fuel eliminating device.

In the embodiment shown in FIG. 92, a catalytic converter 79 housing an oxidation catalyst 78 is provided between the exhaust manifold 24 and $NO_x$ absorbent 27 and the first passage 28a is connected to the exhaust pipe 25 between the catalytic converter 79 and the $NO_x$ absorbent 26. Accordingly, in this embodiment, when additional fuel is injected so as to release the $NO_x$ from the $NO_x$ absorbent 26, the exhaust gas passing through the oxidation catalyst 78 is recirculated through the first passage 28a to the inside of the surge tank 16. The unburnt fuel contained in the exhaust gas is oxidized when passing through the oxidation catalyst 78, therefore in this embodiment as well unburnt fuel is not recirculated into the combustion chamber 5. Note that, in this embodiment, the oxidation catalyst 78 performs the simultaneous function of an unburnt fuel eliminating device.

Figure 94:
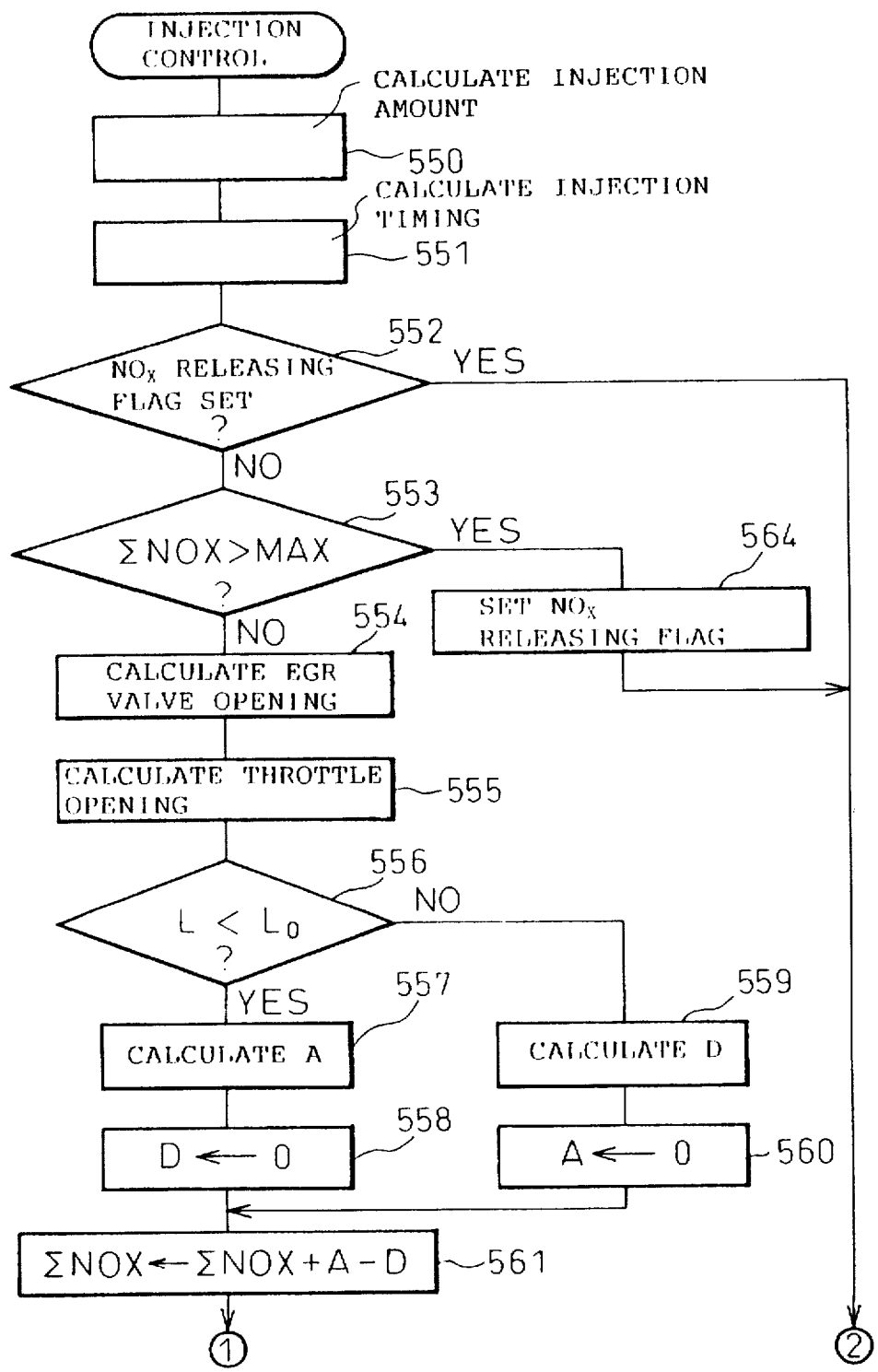
FIG. 94 to FIG. 96 are flow charts for injection control.
Figure 95:
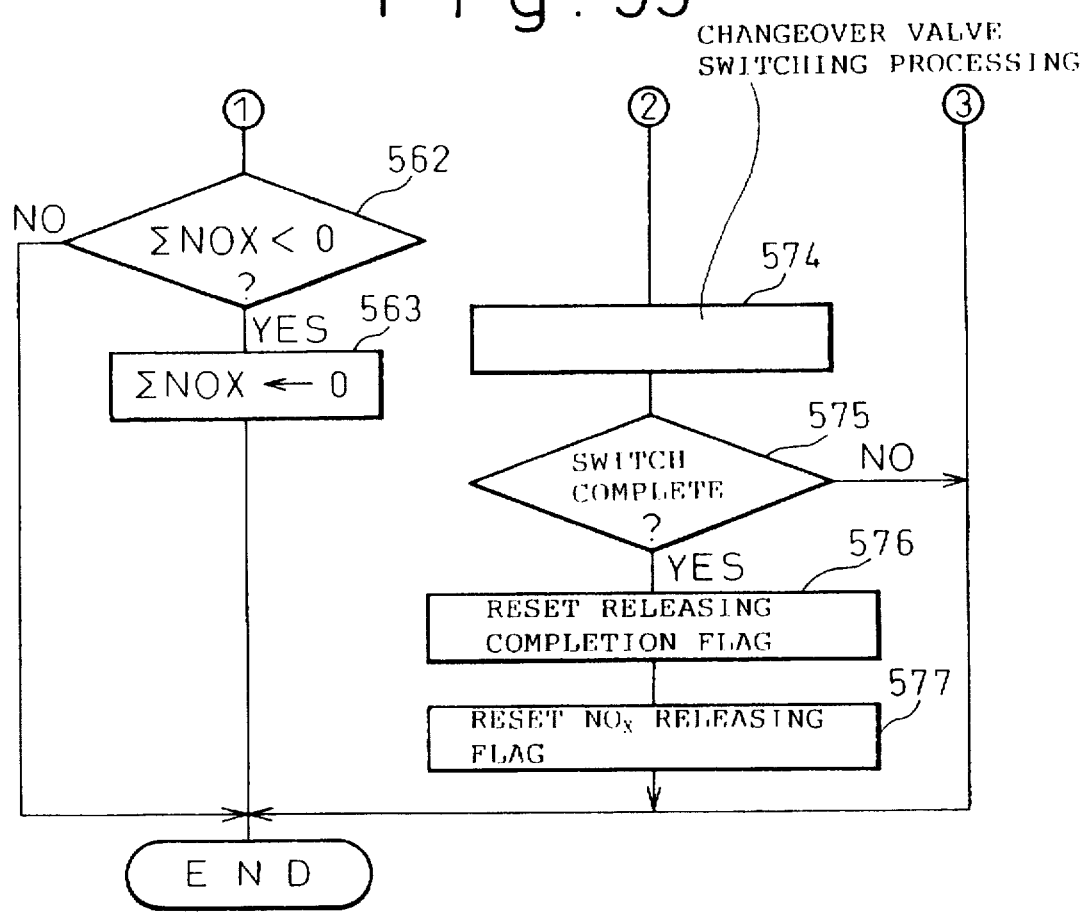
Figure 96:
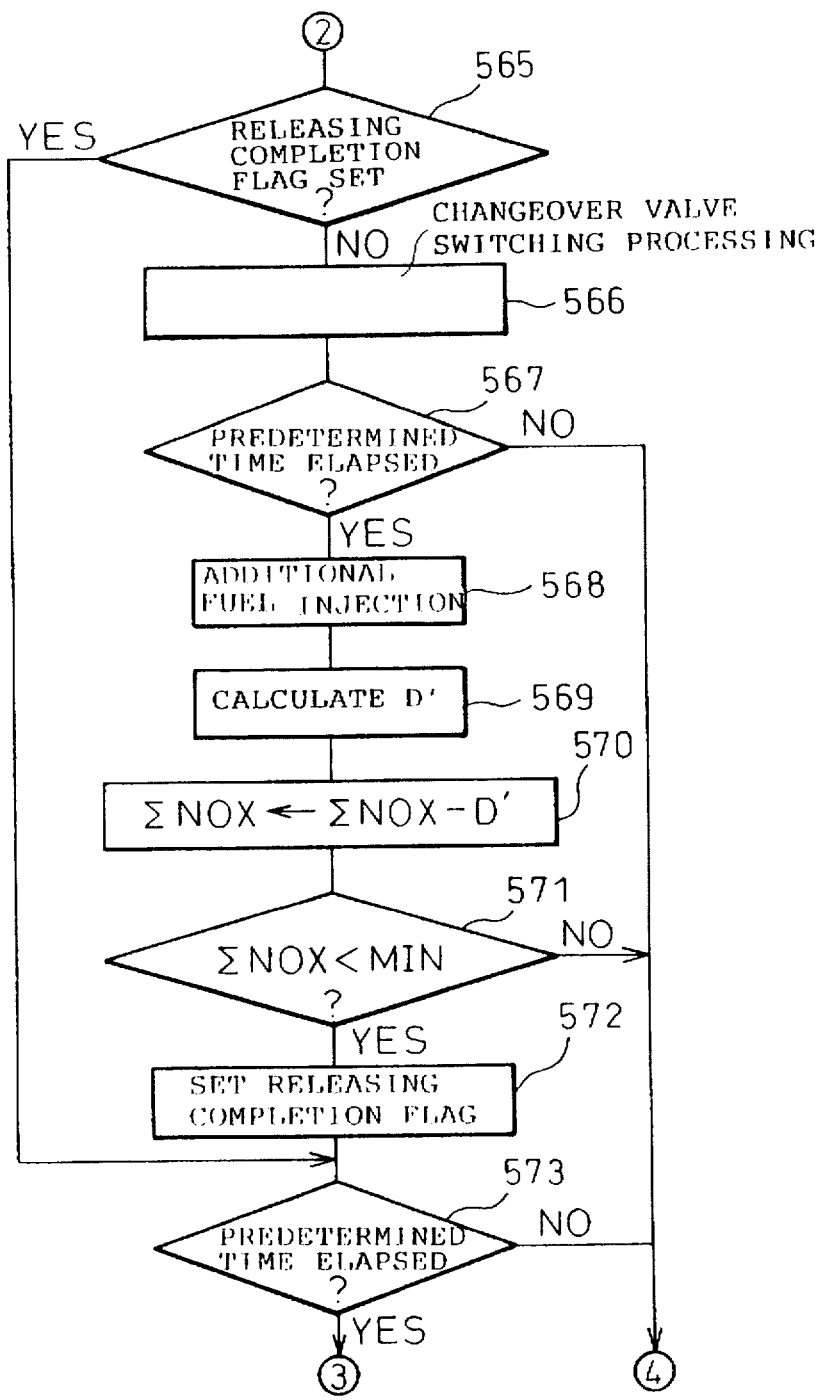

FIG. 94 to FIG. 96 show the routine for control of the fuel injection applicable to any of the internal combustion engines shown in FIG. 90 to FIG. 92. This routine is executed by interruption every predetermined time interval.

Referring to FIG. 94 to FIG. 96, first of all, at step 550, the intake stroke injection amount $Q_1$ and compression stroke injection amount $Q_2$ shown in FIG. 6 and stored in advance in the ROM 32 as a function of the amount of depression L of the accelerator pedal 40 and engine rotational speed N are calculated. Next, at step 551, the injection timing shown in FIG. 6 and stored in advance in the ROM 32 as a function of the amount of depression L of the accelerator pedal 40 and engine rotational speed N is calculated. Next, at step 552 is proceeded to, where the $NO_x$ releasing flag is set or not is decided. Normally, the $NO_x$ releasing flag is reset, so step 553 is proceeded to. At step 553, whether the $NO_x$ amount $\Sigma NO_x$ estimated to be absorbed in the $NO_x$ absorbent 26 is larger than the allowable value MAX or not is decided. When $\Sigma NO_x \leq MAX$, step 554 is proceeded to.

At step 554, the opening of the EGR valve 29 shown in FIG. 7 and stored in advance in the ROM 32 as a function of the amount of depression L of the accelerator pedal 40 and engine rotational speed N is calculated. Next, at step 555, the opening of the throttle valve 23 shown in FIG. 7 and stored in advance in the ROM 32 as a function of the amount of depression L of the accelerator pedal 40 and engine rotational speed N is calculated.

Next, at step 556, whether the amount of depression L of the accelerator pedal 40 is lower than $L_0$ (FIG. 7) or not is decided. When $L<L_0$, step 557 is proceeded to, where the amount of $NO_x$ absorption A is calculated from the map shown in FIG. 14a. Next, at step 588, the $NO_x$ releasing D is made zero, then step 561 is proceeded to. On the other hand, when $L \geq L_0$ is decided at step 556, step 559 is proceeded to, where the $NO_x$ releasing D is calculated from the map shown in FIG. 14B. Next, at step 560, the amount of $NO_x$ absorption a is made zero, then step 561 is proceeded to.

At step 561, the $NO_x$ amount $\Sigma NO_x$ (=$\Sigma NO_x$+A−D) estimated to be absorbed in the $NO_x$ absorbent 26 is calculated. Next, at step 562, whether $\Sigma NO_x$ has become negative or not is decided. When $\Sigma NO_x<0$, step 563 is proceeded to, where $\Sigma NO_x$ is made zero.

On the other hand, when $\Sigma NO_x>MAX$ is decided at step 533, step 564 is proceeded to, where the $NO_x$ releasing flag is set, then step 565 is proceeded to. Note that, once the $NO_x$ releasing flag is set, the routine jumps from step 552 to step 565. At step 565, whether the releasing completion flag is set or not is decided. At this time, this releasing completion flag is not set, so step 566 is proceeded to.

At step 566, the second passage 28b is closed by the changeover valve 75 and the changeover valve 75 is switched so that the first passage 28a is communicated with the surge tank 16. Next, at step 567, whether a predetermined time has elapsed or not from when the switching action of the changeover valve 75 has been completed is decided. When the predetermined time has elapsed, step 568 is proceeded to.

At step 568, the action of injecting the predetermined amount of the additional fuel is started. Next, at step 569, $NO_x$ releasing D' is calculated when the additional fuel injection is performed, then at step 576, the $NO_x$ amount $\Sigma NO_x$ is reduced by the $NO_x$ releasing D'. Next, at step 571, whether the $\Sigma NO_x$ has become smaller than the lower value MIN or not is decided. When $\Sigma NO_x$<MIN, step 572 is proceeded to, where the releasing completion flag is set. Next, step 573 is proceeded to. Note that, once the releasing completion flag is set, the routine jumps from step 565 to step 575.

At step 573, whether a predetermined time has elapsed from when the releasing completion flag is set or not is decided. When the predetermined time has elapsed, step 574 is proceeded to.

At step 574, the first passage 28a is closed by the changeover valve 75 and the changeover valve 75 is switched so that the second passage 28b is communicated with the surge tank 16. Next, at step 575, whether the switching action of the changeover valve 75 has been completed or not is decided. When the switching processing has been completed, step 576 is proceeded to, where the releasing completion flag is reset. Next, at step 577, the $NO_x$ releasing flag is reset.

Figure 97:
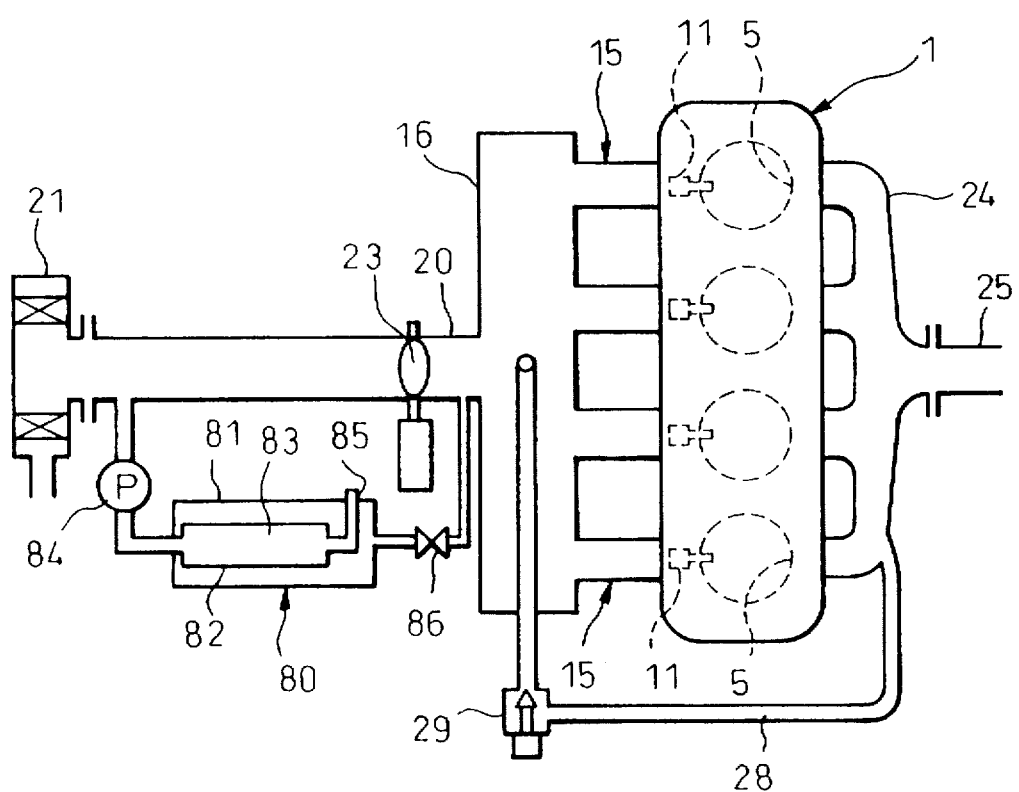
FIG. 97 is an overview of still another embodiment of an internal combustion engine.

FIG. 97 shows still another embodiment. In this embodiment, an oxygen supply means 80 is provided for supplying oxygen into the combustion chamber 5 when additional fuel is injected so as to cause the releasing of the $NO_x$ from the $NO_x$ absorbent 26. As shown in FIG. 97, this oxygen supply means 80 is provided with an oxygen tank 61 and an air chamber 83 disposed in the oxygen tank 81 and surrounded by a cylindrical oxygen permeable membrane 82. One end of the air chamber 83 is connected through an air pump 84 to the inside of an intake duct 20 upstream of the throttle valve 23, while the other end of the air chamber 83 is connected to the air exhaust pipe 85. Further, the inside of the oxygen tank 81 is connected through an oxygen feed valve 86 to the inside of an intake duct 20 downstream of the throttle valve 23.

The air feed valve 86 is normally closed. When the engine starts operating, the air pump 84 is actuated and the air pumped from the air pump 84 is fed into the air chamber 83. The oxygen contained in the air in the air chamber 83 passes through the oxygen permeable membrane 82 and flows into the oxygen tank 81, therefore oxygen is collected in the oxygen tank 81. On the other hand, the surplus air in the air chamber 83 is exhausted from the air exhaust pipe 85 to the outside air.

Figure 98:
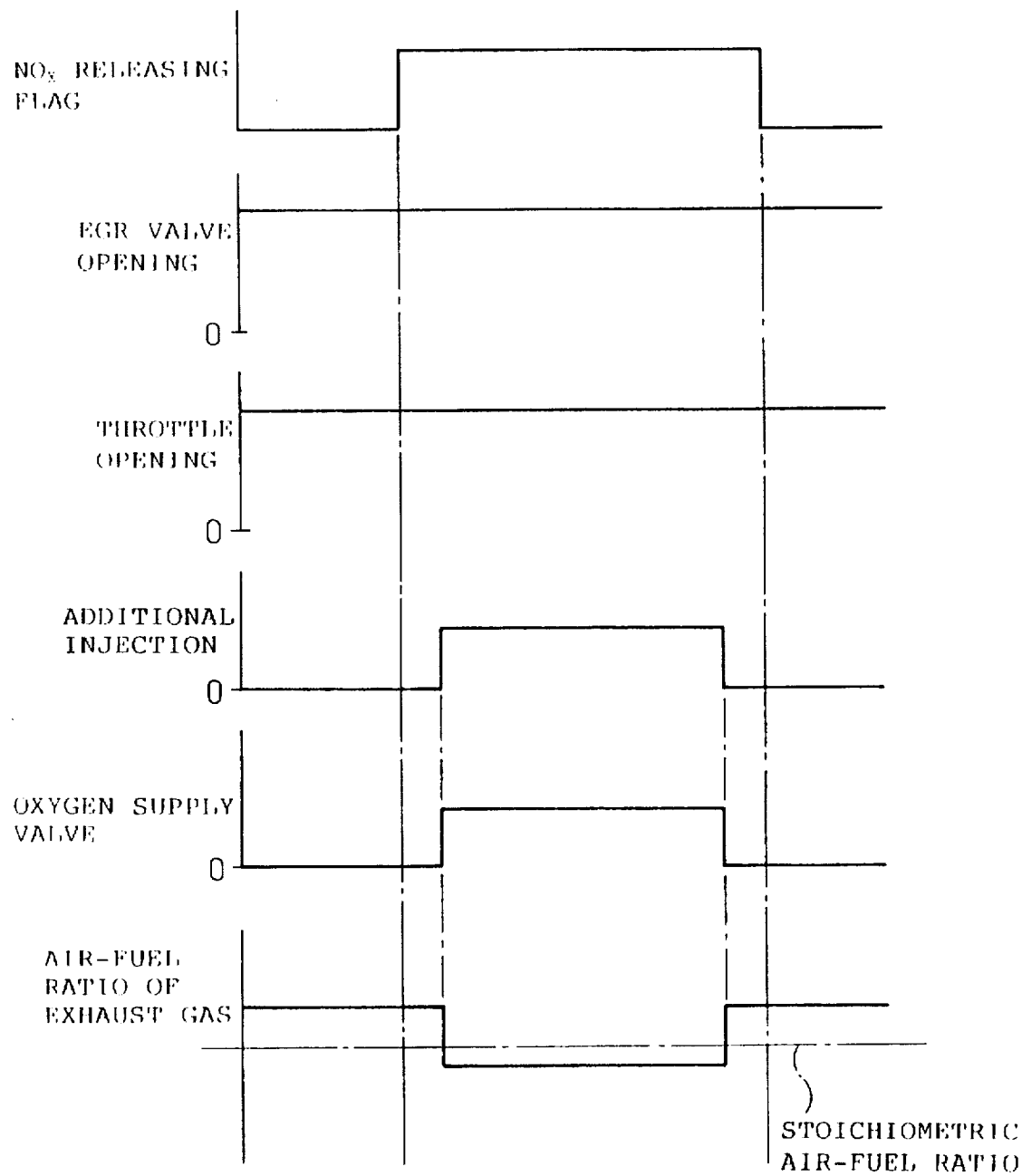
FIG. 98 is a time chart showing EGR valve opening, throttle opening, additional fuel injection, etc..

As shown in FIG. 98, if additional fuel is injected so as to release the $NO_x$ from the $NO_x$ absorbent 26, the oxygen feed valve 86 is opened while the action of supplying the additional fuel is performed. When the oxygen feed valve 86 is opened, the oxygen in the oxygen tank 81 is supplied to the combustion chamber 5 of each of the cylinders. When the additional fuel is burnt and, as a result, the oxygen concentration in the EGR gas becomes extremely low, the supply of oxygen into the combustion chamber 5 of each of the cylinders enables misfires to be inhibited.

Figure 99:
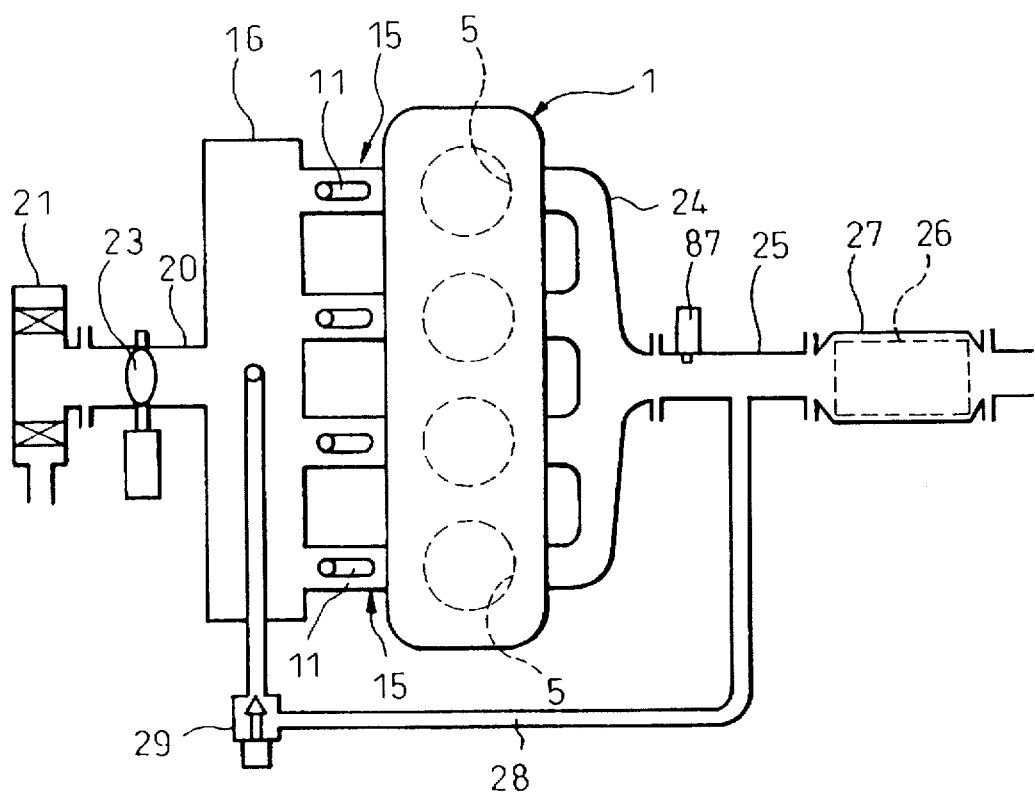
FIG. 99 is an overview of still another embodiment of an internal combustion engine.

FIG. 99 shows still another embodiment. In this embodiment, a fuel injector 11 is provided in each intake tube 15 and the fuel is injected toward the corresponding intake ports. Further, in this embodiment, additional fuel for causing the $NO_x$ to be released from the $NO_x$ absorbent 26 is injected from an auxiliary fuel injector 87 provided in the exhaust pipe 25. The EGR gas passage 28 is connected with the inside of the exhaust pipe 25 downstream of the auxiliary fuel injector 87. In this internal combustion engine as well, it is possible to use the EGR gas switching control means shown in FIG. 80 to FIG. 92.

As explained up to now, when the oxygen concentration in the EGR gas is extremely low, inhibition of the occurrence of misfires requires stopping the recirculation of the EGR gas or reduction of the amount of recirculation of the EGR gas. That is, it is necessary either to make the average air-fuel ratio in the combustion chamber 5 rich in the state with the recirculation of the EGR gas stopped or to make the average air-fuel ratio in the combustion chamber 5 rich in the state with the amount of recirculation of the EGR gas reduced. However, when the latter method among these two methods is adopted, that is, when making the average air-fuel ratio in the combustion chamber 5 rich in the state while recirculating the EGR gas, it is learned that the amount of recirculation of the EGR gas of course and also the degree of richness have a major impact on the occurrence of misfires.

That is, if the average air-fuel ratio in the combustion chamber 5 is made rich in a state where the EGR gas is being recirculated, the temperature of the combustion flame will drop and therefore propagation of the flame will become difficult and misfires will easily occur. That is, if combustion is started in the combustion chamber 5, the heat of combustion is used for heating the EGR gas and the fuel still not burned in the combustion chamber. Accordingly, the higher the rate of recirculation of the exhaust gas, the lower the temperature of the combustion flame, while the larger the degree of richness, the lower the temperature of the combustion flame. Accordingly, the higher the rate of recirculation of the exhaust gas, the easier the occurrence of misfires, while the larger degree of richness, the easier the occurrence of misfires. That is, as the degree of richness becomes higher, unless the rate of recirculation of the exhaust gas is made lower, misfires will occur.

Figure 100:
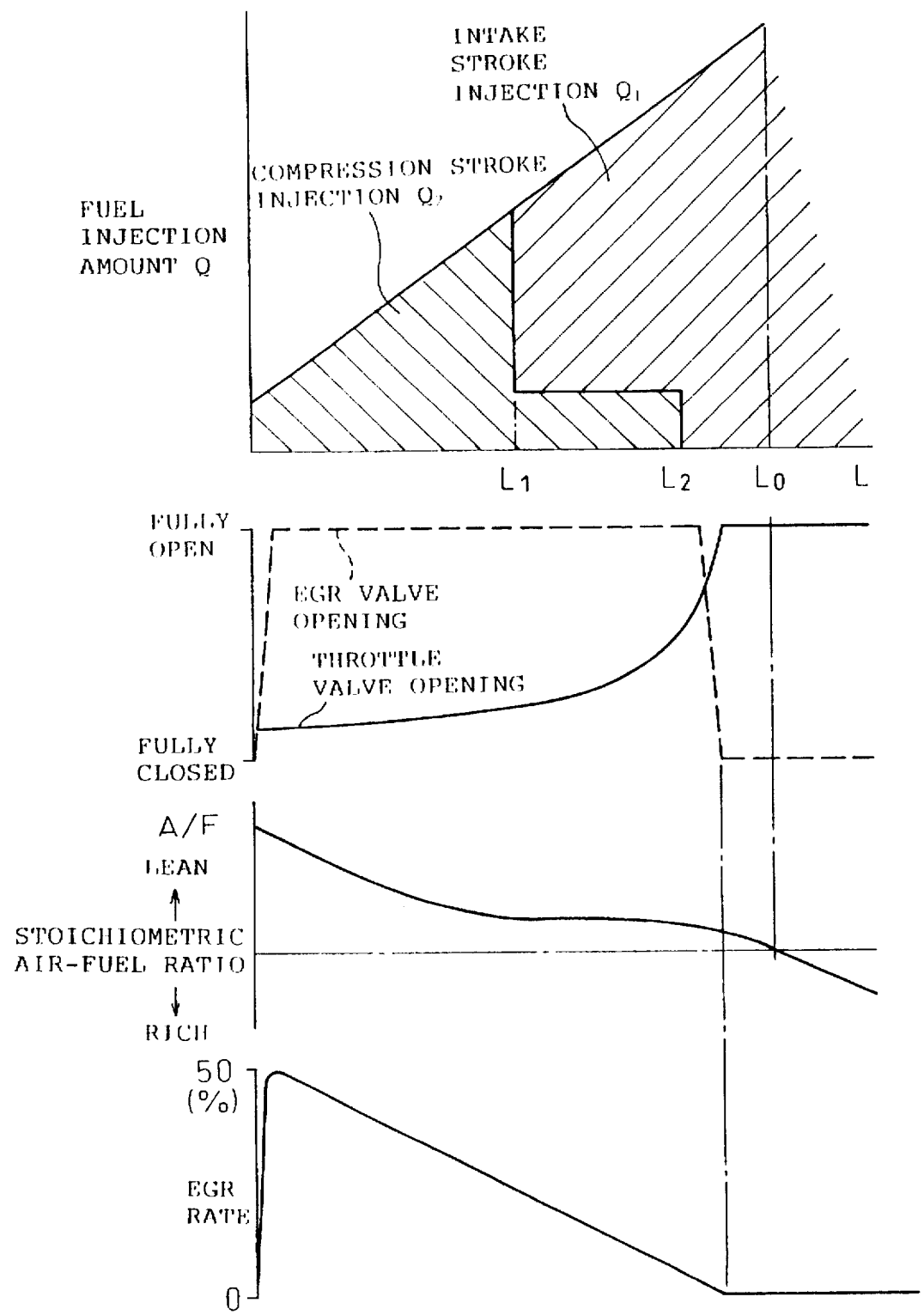
FIG. 100 is a view showing the fuel injection amount, throttle opening, EGR valve opening, average air-fuel ratio in the combustion chamber, and EGR rate.

Therefore, first of all, referring to FIG. 100 and FIG. 101, an explanation will be made of the relationship between the amount of EGR gas and degree of richness and misfires. FIG. 100 shows the fuel injection amount Q, opening of the throttle valve 23, the opening of the EGR valve 29, average air-fuel ratio A/F in the combustion chamber 5, and rate of recirculation of the exhaust gas [the amount of EGR gas/ (amount of EGR gas+amount of intake air)], that is, EGR rate, in the internal combustion engine shown in FIG. 1. As shown in FIG. 100, the opening of the throttle valve 23 becomes smaller the lower the engine load. Accordingly, when the engine load becomes the smallest in the region where the EGR valve 29 is fully opened, the EGR rate becomes maximum. At this time, as shown in FIG. 100, the EGR rate becomes about 50%. The EGR rate falls substantially linearly along with an increase of the amount of depression L of the accelerator pedal 40 and becomes zero when the EGR valve 29 is fully closed.

In the embodiment shown in FIG. 100, at the time of engine low load operation or at the time of engine medium load operation, the EGR gas is recirculated. At this time, if the $NO_x$ amount $\Sigma NO_x$ exceeds the allowable value MAX, the average air-fuel ratio A/F in the combustion chamber 5 is made rich in a state where recirculation of the EGR gas is performed. However, in this case, as mentioned above, if the EGR rate is not made lower the higher the degree of richness of the average air-fuel ratio A/F, misfires will occur. The broken line in FIG. 101 shows the misfire limit value showing the limit where misfires occur. If the combination of the air-fuel ratio and the EGR rate is present in a region above this misfire limit value, misfires will not occur. As opposed to this, if the combination of the air-fuel ratio and the EGR rate is present in a region below this misfire limit value, misfires will occur. From FIG. 101, it is understood that to prevent misfires from occurring, it is necessary to make the degree of richness of the average air-fuel ratio A/F smaller the higher the EGR rate.

Figure 101:
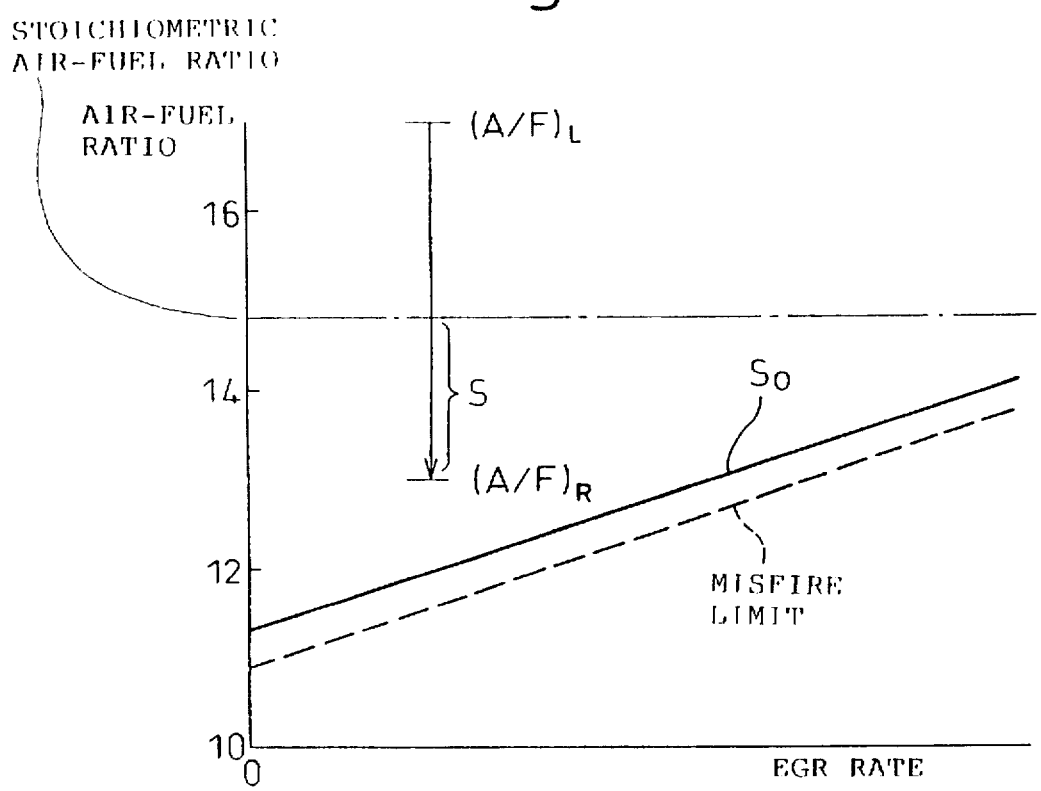
FIG. 101 is a view showing the misfire limit.

However, as shown in FIG. 101, when switching from a certain lean air-fuel ratio (A/F) L to a certain rich air-fuel ratio (A/F) R for releasing the $NO_x$, what contributes to the $NO_x$ releasing action is the amount of fuel S required for making changing from the stoichiometric air-fuel ratio to the rich air-fuel ratio (A/F) R. Accordingly, making the amount of fuel S as large as possible to make effective use of the fuel for releasing of the $NO_x$, that is, making the degree of richness of the rich air-fuel ratio (A/F) R as large as possible, is preferred. That is, it is preferable to make the degree of richness of the rich air-fuel ratio (A/F) R as close as possible to the misfire limit value to an extent not exceeding the misfire limit value as shown by the solid line So. Accordingly, in the embodiments explained from here, control is performed so that the degree of richness with respect to the EGR rate becomes the value shown by the solid line So.

Figure 102:
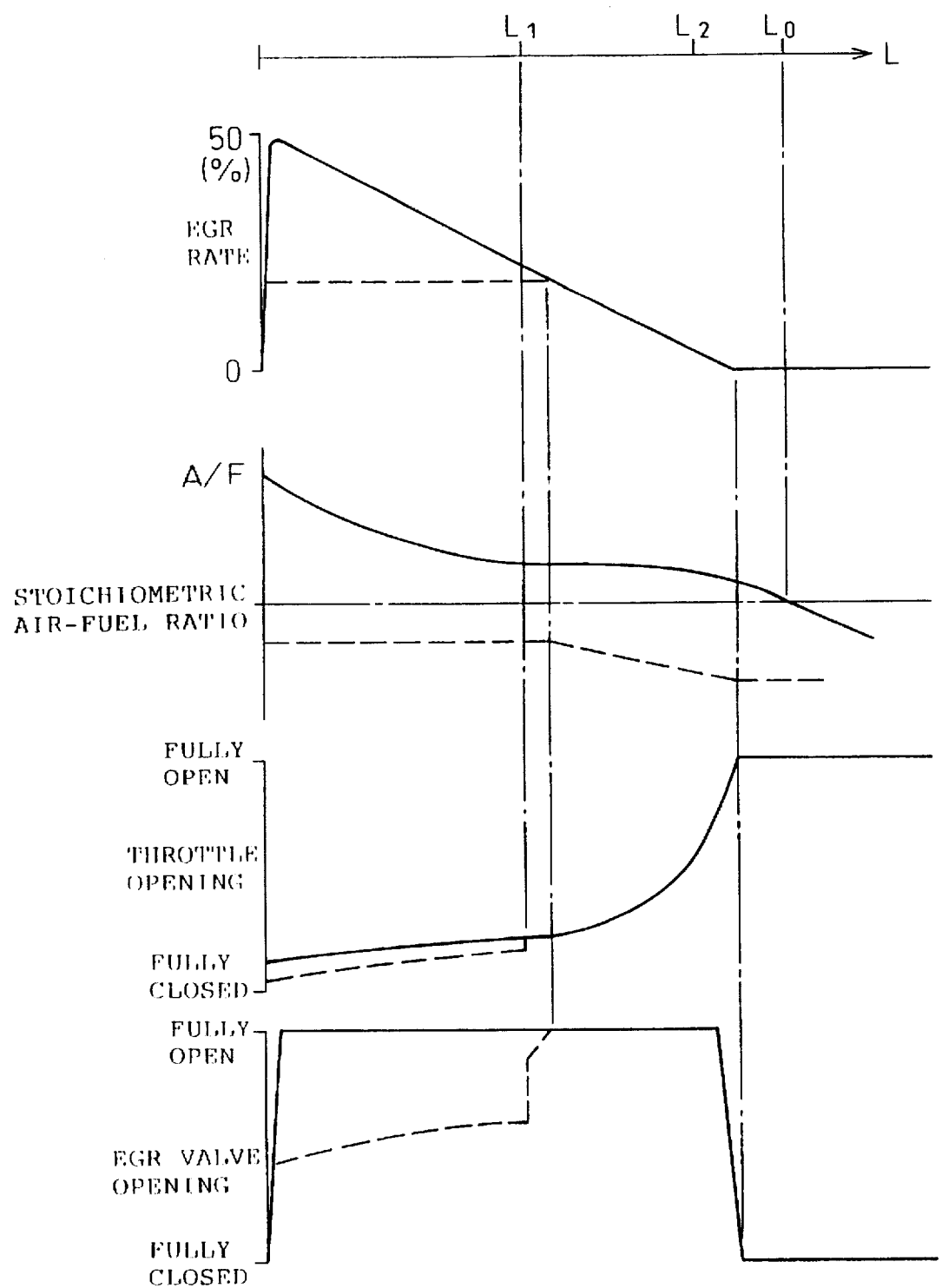
FIG. 102 is a view showing the EGR rate, average air-fuel ratio A/F, throttle opening, and EGR valve opening.
Figure 103:
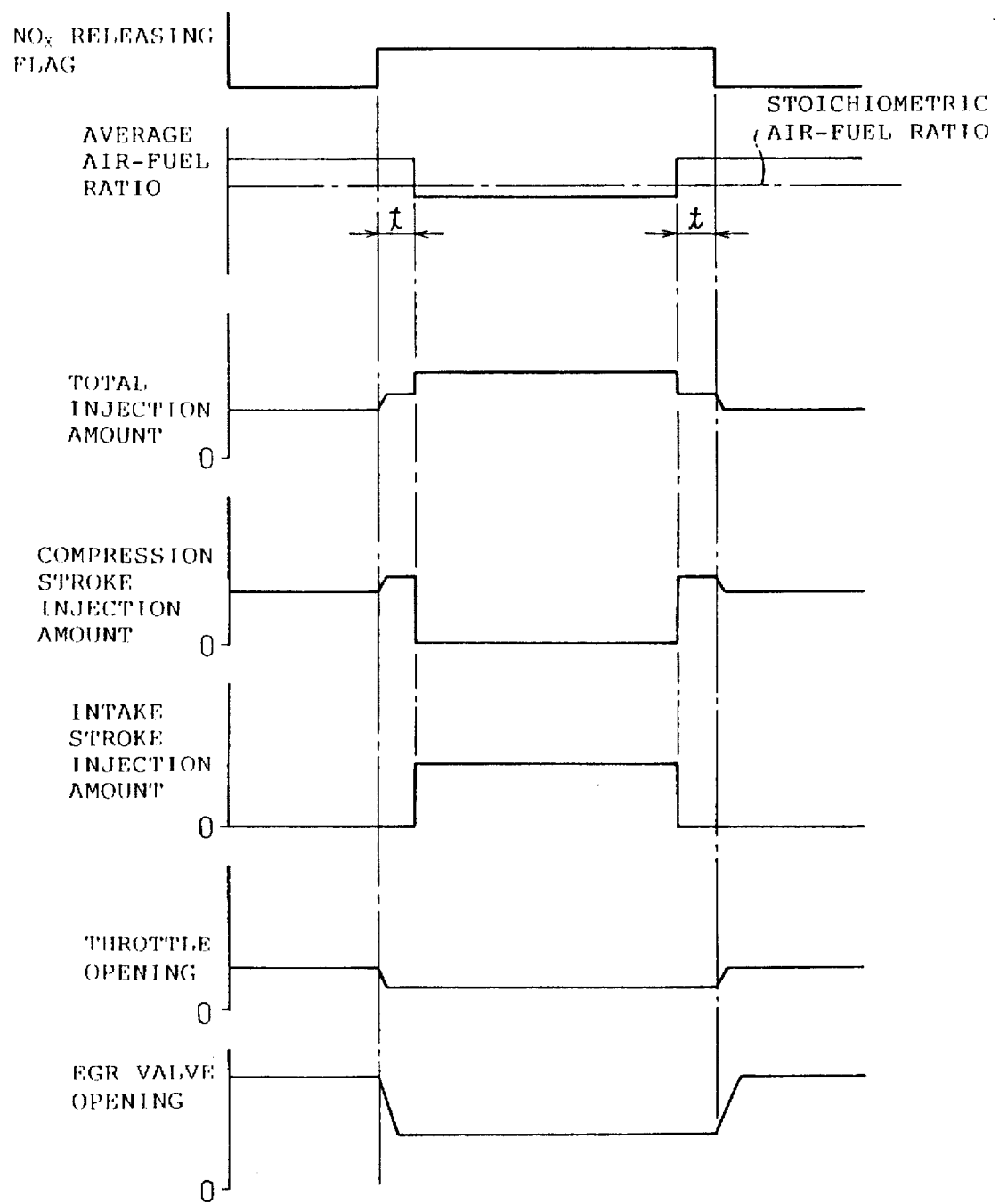
FIG. 103 is a time chart of $NO_x$ releasing control at the time of engine low load operation.
Figure 104:
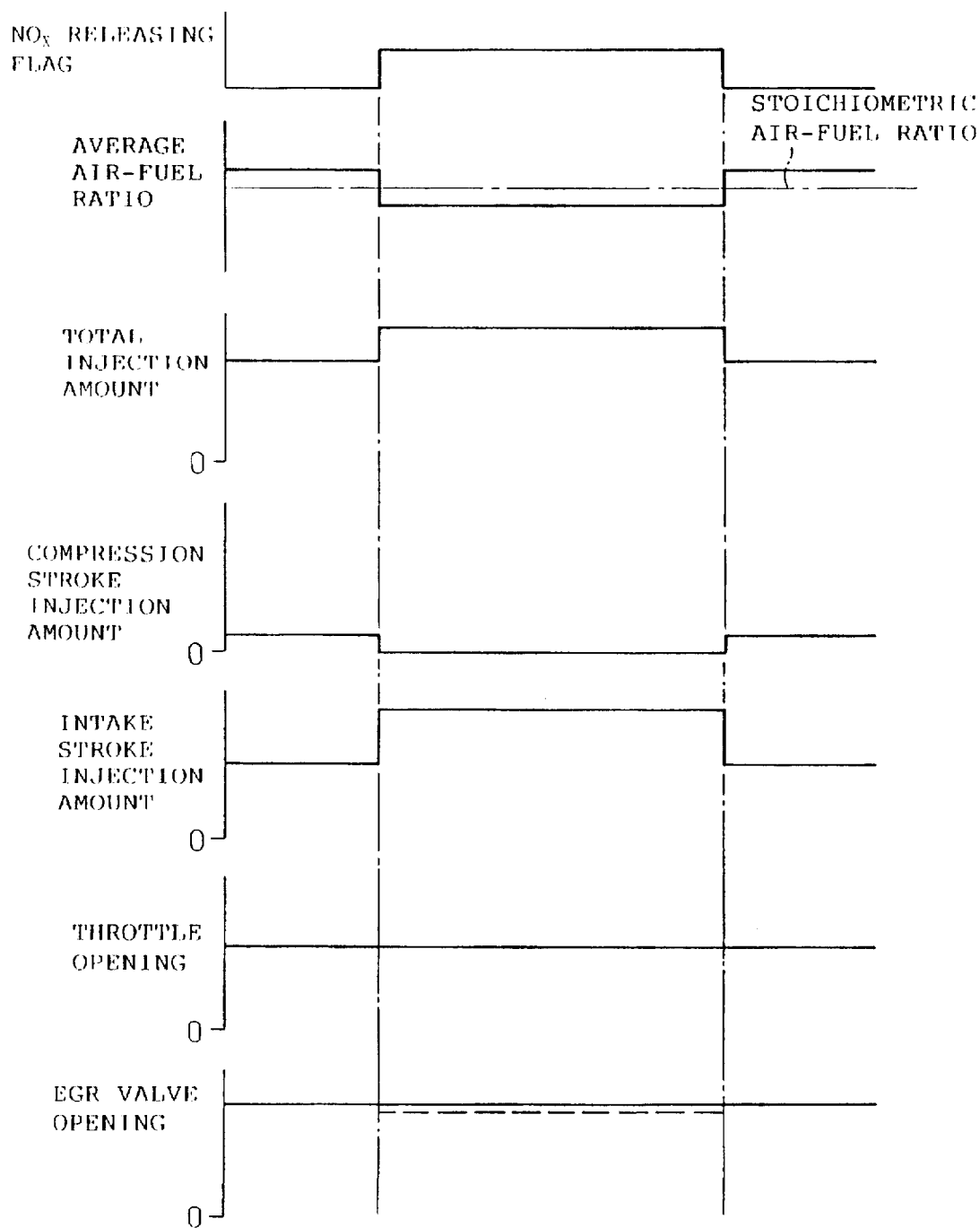
FIG. 104 is a time chart of $NO_x$ releasing control at the time of engine medium load operation.
Figure 105:
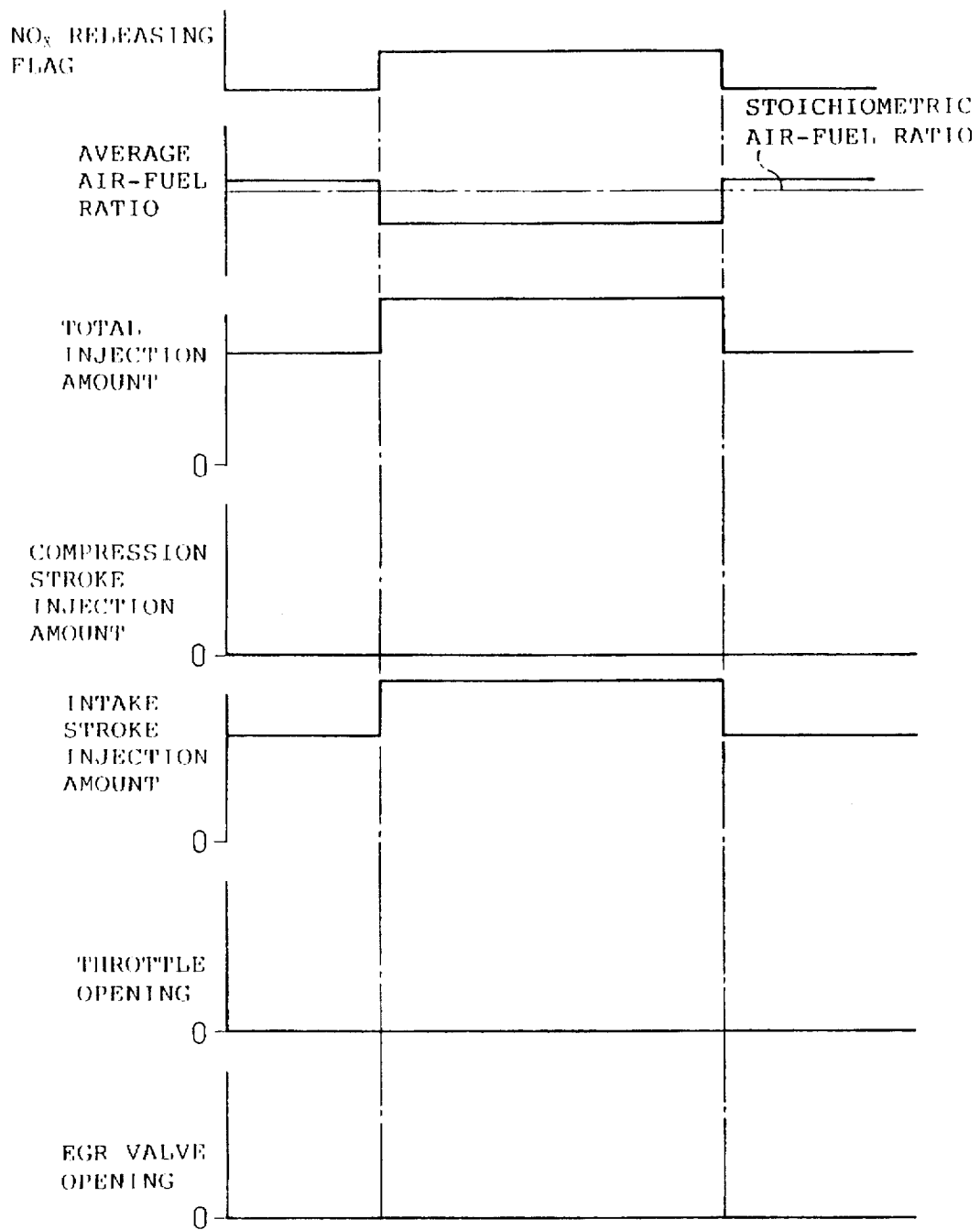
FIG. 105 is a time chart of $NO_x$ releasing control at the time of engine high load operation.

The solid lines of FIG. 102 show the EGR rate, average air-fuel ratio A/F in the combustion chamber 5, opening of the throttle valve 23, and the opening of the EGR valve 29 at the time of ordinary operation, while the broken lines of FIG. 102 show the EGR rate, average air-fuel ratio in the combustion chamber 5, opening of the throttle valve 23, and the opening of the EGR valve 29 when the average air-fuel ratio A/F in the combustion chamber 5 is made rich so as to release the $NO_x$ from the $NO_x$ absorbent 26. Further, FIG. 103 to FIG. 105 show time charts of the case where the $NO_x$ releasing flag is set so as to release the $NO_x$ from the $NO_x$ absorbent 26. Next, an explanation will be given of the $NO_x$ releasing control from the $NO_x$ absorbent 26 while referring to FIG. 102 to FIG. 105

As shown in FIG. 100, at the time of engine low load operation when the amount of depression L of the accelerator pedal 40 is smaller than $L_1$, fuel is injected only at the end of the compression stroke. At this time, as shown in FIG. 9C, the air-fuel mixture is formed only in the cavity 3a. The regions other than the cavity 3a are substantially filled with air and EGR gas, so a strong stratifying state with a high degree of stratification results.

On the other hand, at the time of engine medium load operation when the amount of depression L of the accelerator pedal 40 is between $L_1$ and $L_2$, a lean air-fuel mixture is formed overall in the combustion chamber 5 due to the intake stroke injection. As shown in FIG. 10C, the compression stroke injection causes an air-fuel mixture richer than this lean air-fuel mixture to be formed in the cavity 3a. Accordingly, at this time, a weak stratifying state results with a degree of stratification lower than even the strong stratifying state at the time of engine low load operation. Further, at the time of engine high load operation when the amount of depression L of the accelerator pedal 40 is larger than $L_2$, only the intake stroke injection is performed. Accordingly, at this time, a homogeneous air-fuel mixture is formed in the combustion chamber 5.

FIG. 103 shows a time chart of the $NO_x$ releasing control at the time of engine low load operation. In this embodiment, when it is necessary to release $NO_x$ from the $NO_x$ absorbent 26 in the strong stratifying state, the strong stratifying state is changed to a homogeneous air-fuel mixture state and the injection amount is increased in the homogeneous air-fuel mixture state, whereby the average air-fuel ratio A/F is made rich and the $NO_x$ is released from the $NO_x$ absorbent 26. Further, when the average air-fuel ratio A/F is made rich so as to release the $NO_x$ from the $NO_x$ absorbent 26, the output torque of the engine increases, but in this embodiment this increase of the output torque is controlled by reducing the amount of intake air supplied in the combustion chamber 5. When the output torque increases even so, for example, the ignition timing is delayed so as to prevent the output torque from increasing.

That is, as shown in FIG. 103, in the engine low load operating state before the $NO_x$ releasing flag is set, that is, in the strong stratifying operation state, the intake stroke injection is not performed—only the compression stroke injection is performed so the average air-fuel ratio in the combustion chamber 5 becomes lean. Further, at this time, the throttle valve 23 and EGR valve 29 are opened. Next, when the $NO_x$ releasing flag is set so as to release the $NO_x$ from the $NO_x$ absorbent 26, the EGR valve 29 is closed and the throttle valve 23 is also closed. When the throttle valve 23 is closed, the compression stroke injection amount is increased somewhat so that the output torque of the engine does not fall.

Next, when the time t elapses after the $NO_x$ releasing flag is set, the compression stroke injection is stopped and the intake stroke injection is started. That is, there is a switch from a strong stratifying state to a homogeneous air-fuel mixture state. At this time, the injection amount is increased so as to make the average air-fuel ratio in the combustion chamber 5 rich. However, as shown by the solid line in FIG. 102, at the time of engine low load, when in the strong stratifying state, the EGR rate becomes considerably high. At this time, there is sufficient air present, so even if the EGR rate is made high, good combustion is obtained without the occurrence of misfires. However, when the average air-fuel ratio A/F is made rich in the homogeneous air-fuel mixture state, if the EGR rate is made too high, misfires will occur. In this case, the allowable misfire EGR rate where misfires will not occur is about 20 percent.

Accordingly, when there is a transition from a strong stratifying state to a homogeneous air-fuel mixture state, as shown by the broken line in FIG. 102, the EGR rate is lowered to about 20 percent. That is, when the EGR rate is higher than the allowable EGR rate, the EGR rate is reduced to below the allowable EGR rate. This action of reducing the EGR rate is performed by reducing the opening of the EGR valve 29 as shown by the broken line in FIG. 102. Note that, at this time, this degree of richness is made a value on the solid line $S_0$ of FIG. 101 determined by the EGR rate. Accordingly, at this time, good combustion is performed with no occurrence of misfires.

When the average air-fuel ratio A/F is made rich, the action of releasing of $NO_x$ from the $NO_x$ absorbent 26 is started. Next, when the action of releasing the $NO_x$ from the $NO_x$ absorbent 26 is completed, the reverse procedure is followed to return once again to the strong stratifying state. That is, when the $NO_x$ releasing action is completed, the intake stroke injection is stopped and the compression stroke injection is started. When the time t elapses from when the $NO_x$ releasing action has been completed, the throttle valve 23 and EGR valve 29 are opened and the $NO_x$ releasing flag is reset.

FIG. 104 shows a time chart of the $NO_x$ releasing control at the time of engine medium load operation. At the time of engine medium load operation, when the $NO_x$ releasing flag is set, the compression stroke injection is stopped and the intake stroke injection amount is increased. That is, when the $NO_x$ releasing flag is set, the weak stratifying state is changed to the homogeneous air-fuel mixture state, the average air-fuel ratio in the combustion chamber 5 is made rich, and the action of releasing of the $NO_x$ from the $NO_x$ absorbent 26 is started. When the $NO_x$ releasing action has been completed, the homogeneous air-fuel mixture state is returned to the weak stratifying state.

As shown in FIG. 102, even during the time of engine medium load operation, when the engine load is low, the EGR rate becomes higher than the allowable EGR rate as shown by the solid line. Accordingly, at this time, as shown by the broken lines in FIG. 102 and FIG. 104, when releasing $NO_x$, the EGR valve 29 is closed somewhat to make the EGR rate below the allowable EGR rate. At other times, the EGR rate is below the allowable EGR rate, so the EGR rate during the $NO_x$ releasing action is maintained at a value the same as the EGR rate before the $NO_x$ releasing action. At this time, the EGR rate and the degree of richness are on the solid line $S_0$ in FIG. 101. Accordingly, as will be understood from FIG. 101, the lower the EGR rate, the higher the degree of richness.

FIG. 105 shows a time chart of the $NO_x$ releasing control at the time of engine high load operation. As shown in FIG. 105, at the time of engine high load operation before the $NO_x$ releasing flag is set, only intake stroke injection is performed and the homogeneous air-fuel mixture is burned. When the $NO_x$ releasing flag is set, the intake stroke injection amount is increased and the average air-fuel ratio A/F is made rich.

Next, referring to FIG. 106 and FIG. 107, an explanation will first be made of the basic routine for controlling the fuel injection. Note that this routine for example is executed by interruption every predetermined time interval.

Figure 106:
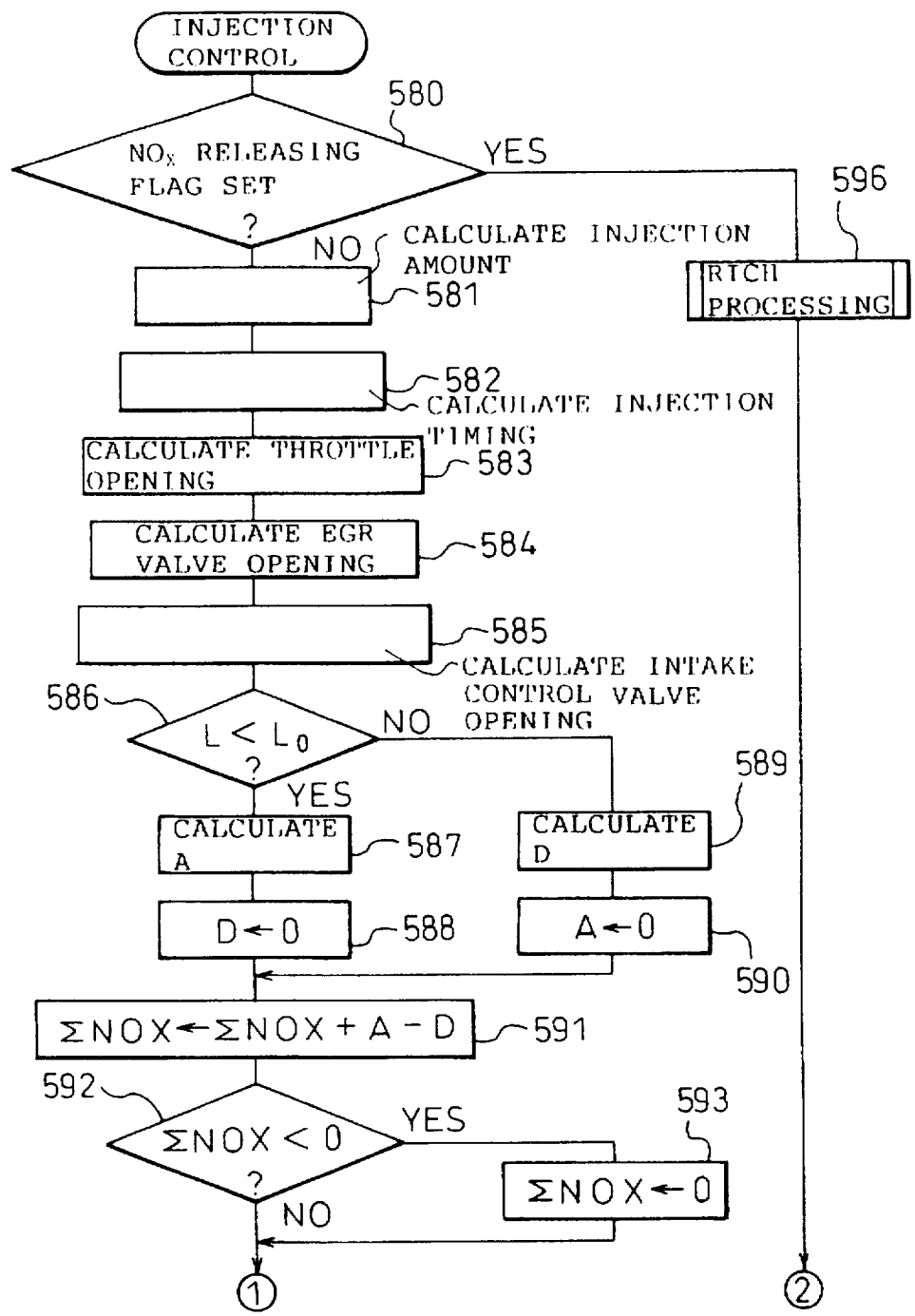
FIG. 106 and FIG. 107 are flow charts for injection control.
Figure 107:
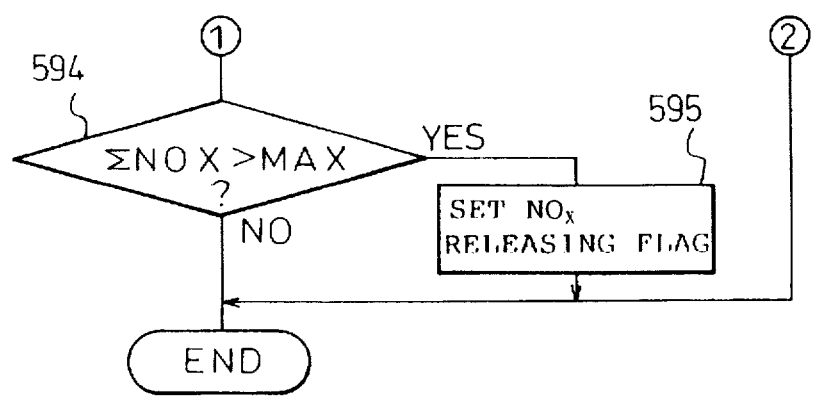

Referring to FIG. 106 and FIG. 107, first of all, at step 580, whether the $NO_x$ releasing flag is set or not is decided. When the $NO_x$ releasing flag is not set, step 581 is proceeded to, where the intake stroke injection amount $Q_1$ and compression stroke injection amount $Q_2$ are calculated from the relationship shown in FIG. 6 stored in advance in the ROM 33 based on the amount of depression L of the accelerator pedal 40 and engine rotational speed N. Next, at step 582, the injection timing is calculated based on the amount of depression L of the accelerator pedal 40 and engine rotational speed N from the relations stored in advance in the ROM 33 and shown in FIG. 6. Next, at step 583, the opening of the throttle valve 23 is calculated based on the amount of depression L of the accelerator pedal 40 and engine rotational speed N from the relationship stored in advance in the ROM 33 and shown in FIG. 7. Next, at step 584, the opening of the EGR valve 29 is calculated based on the amount of depression L of the accelerator pedal 40 and engine rotational speed N from the relationship stored in advance in the ROM 33. Next, at step 585, the opening of the intake control valve 17 is calculated based on the amount of depression L of the accelerator pedal 40 from the relationship stored in advance in the ROM 33 and shown in FIG. 8.

Next, at step 586, whether the amount of depression L of the accelerator pedal 40 is lower than $L_0$ (FIG. 100) or not is decided. When $L<L_0$, step 587 is proceeded to, where the amount of $NO_x$ absorption A is calculated from the map shown in FIG. 14A. Next, at step 588, the $NO_x$ releasing D is made zero, then step 591 is proceeded to. On the other hand, when $L \geq L_0$ is decided at step 586, step 589 is proceeded to, where the $NO_x$ releasing D is calculated from the map shown in FIG. 14B. Next, at step 590, the amount of $NO_x$ absorption A is made zero, then step 591 is proceeded to. At step 591, the $NO_x$ amount $\Sigma NO_x$ estimated to be absorbed in the $NO_x$ absorbent 26 ($=\Sigma NO_x + A - D$) is calculated. Next, at step 592, whether the $\Sigma NO_x$ has become negative or not is decided. When $\Sigma NO_x < 0$, step 593 is proceeded to, where the $\Sigma NO_x$ is made zero. Next, at step 594, whether the $NO_x$ amount $\Sigma NO_x$ has exceeded the allowable value MAX shown in FIG. 13 or not is decided. When $\Sigma NO_x > MAX$, step 595 is proceeded to, where the $NO_x$ releasing flag is set.

On the other hand, when it is decided at step 580 that the $NO_x$ releasing flag is set, step 596 is proceeded to, where the rich processing shown in FIG. 103 to FIG. 105 is performed. This rich processing is executed by the routine shown in FIG. 108.

Figure 108:
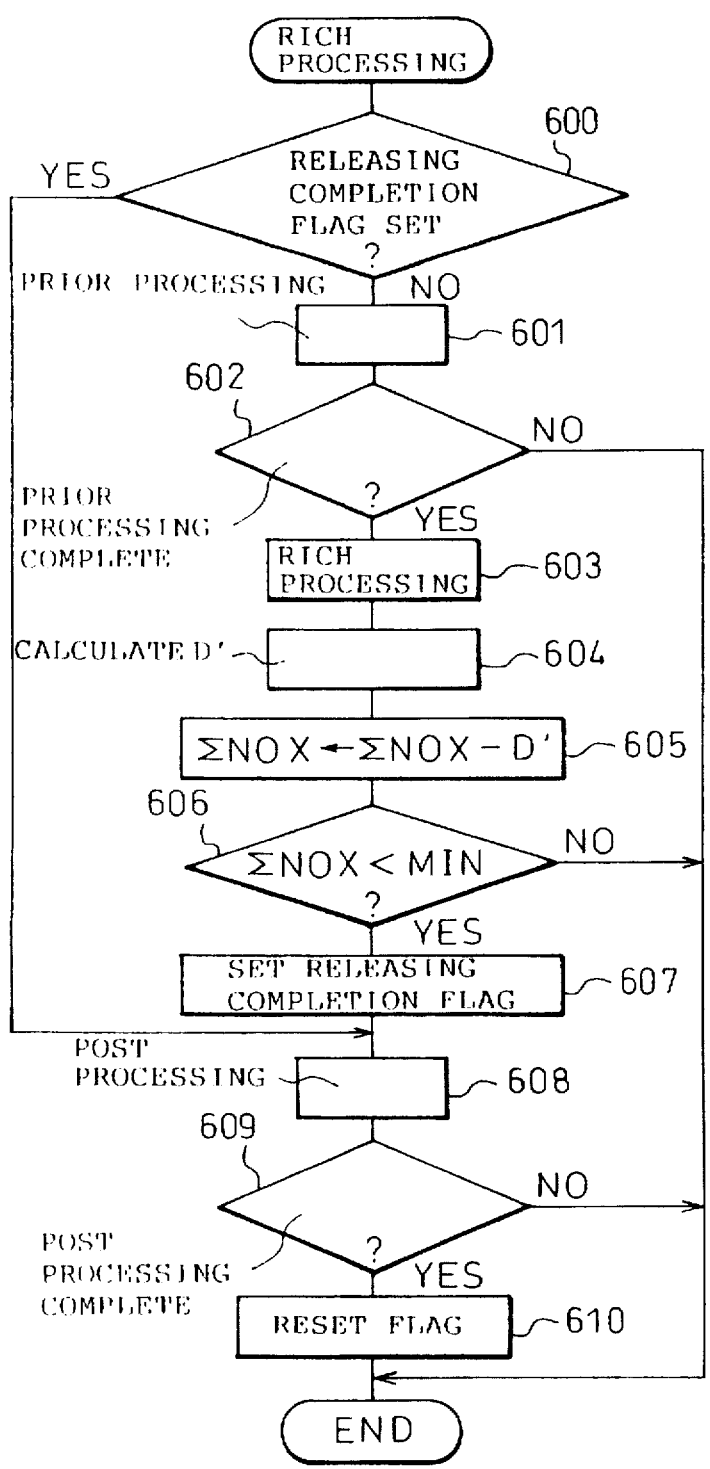
FIG. 108 is a flow chart for rich control.

That is, referring to FIG. 108, first of all, at step 600, whether the releasing completion flag showing that the releasing of $NO_x$ has been completed is set or not is decided. Right after the rich processing is started, the releasing completion flag is not set, so step 601 is proceeded to, where the prior processing is performed until the average air-fuel ratio A/F is made rich. At the time of a low load as shown in FIG. 103, this prior processing is processing for opening the throttle valve 23 and EGR valve 29 when the $NO_x$ releasing flag is set, that is, when the rich processing is started. This prior processing is not performed in the time of a medium load as shown in FIG. 104 or a high load as shown in FIG. 105.

Next, at step 602, whether this prior processing has been completed or not is decided. When the prior processing has been completed, step 603 is proceeded to, where the rich processing is performed to make the average air-fuel ratio A/F rich. Next, at step 604, the $NO_x$ releasing D' during the $NO_x$ releasing action is calculated. This $NO_x$ releasing D' is stored in advance in the ROM 33 in the form of the map shown in FIG. 23 as a function of the amount of depression L of the accelerator pedal 40 and engine rotational speed N. Next, at step 605, the $NO_x$ amount $\Sigma NO_x$ is reduced by the $NO_x$ releasing D'. Next, at step 606, whether the $NO_x$ amount $\Sigma NO_x$ has become smaller than the lower value MIN or not is decided. When $\Sigma NO_x < MIN$, it is decided that the $NO_x$ releasing action has been completed and step 607 is proceeded to, where the releasing completion flag is set. Next, step 608 is proceeded to. Note that once the releasing completion flag is set, the routine jumps from step 600 to step 608.

At step 608, the post processing is performed until the original state is returned to after the $NO_x$ releasing action has been completed. In the case shown in FIG. 103, this post processing is comprised of processing for changing from intake stroke injection to compression stroke injection when the $NO_x$ releasing action has been completed and the processing for opening the throttle valve 23 and EGR valve 29. In the case shown in FIG. 104 and FIG. 105, the post processing is comprised of the processing for return to the original injection form. Next, at step 609, whether this post processing has been completed or not is decided. When the post processing is completed, step 610 is proceeded to, where the $NO_x$ releasing flag and releasing completion flag are reset.

Figure 109:
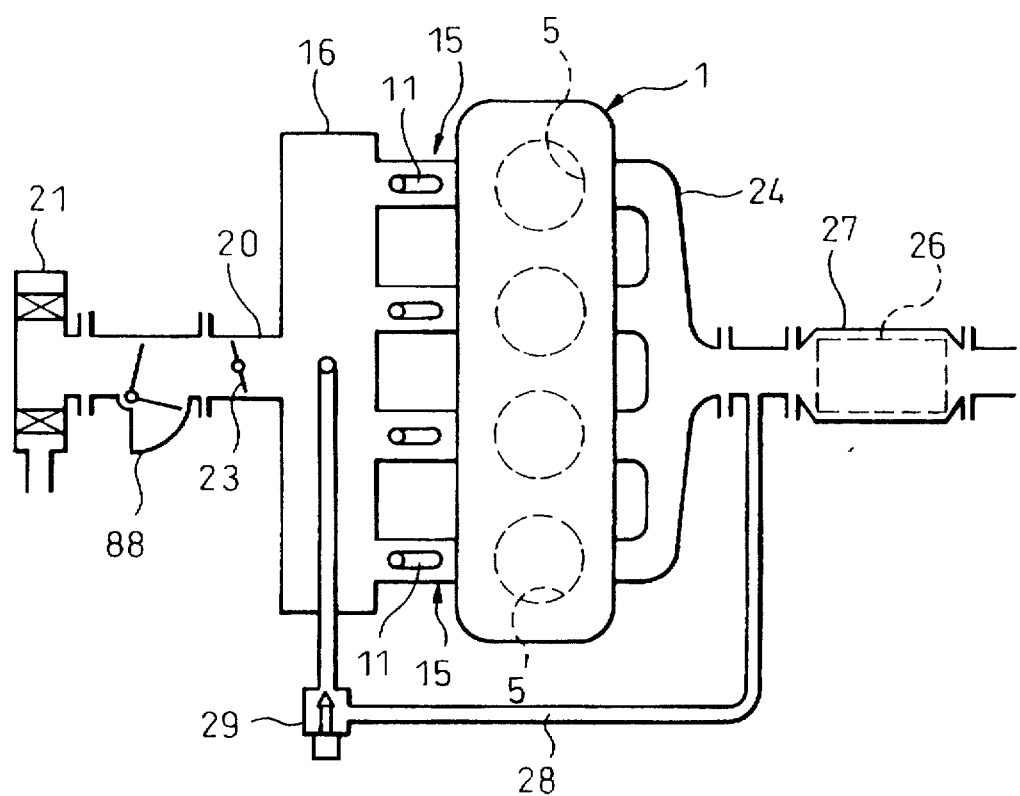
FIG. 109 is an overview of still another embodiment of an internal combustion engine.

FIG. 109 shows the case of application of the present invention to an internal combustion engine wherein each intake pipe 15 is provided with a fuel injector 11 and a lean air-fuel mixture is burned in a stratified state or homogeneous air-fuel mixture state in the combustion chamber 5. Note that, in this embodiment, the opening of the throttle valve 23 is directly controlled by accelerator pedal and, further, an air flow meter 88 is disposed between the intake duct 20 and air cleaner 21 to detect the amount of intake air.

In this embodiment, the fuel injection time TAU is calculated basically based on the following equation:

$$TAU = K \cdot TP$$

Figure 110:
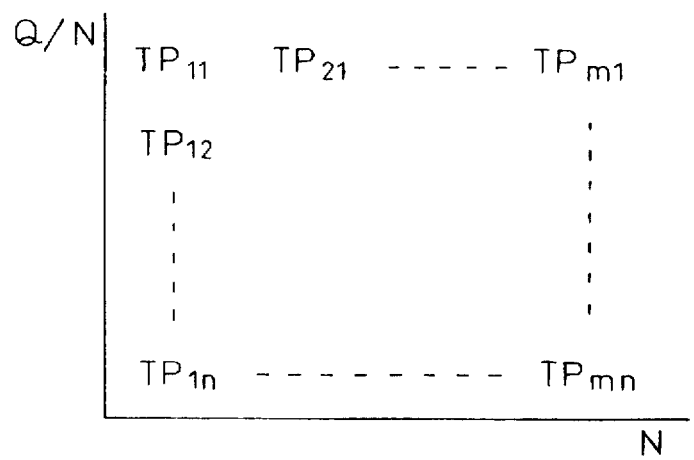
FIG. 110 is a view of a map of a basic fuel injection time TP.

Here, TP shows the basic fuel injection time, and K shows the correction coefficient. The basic fuel injection time TP shows the fuel injection time necessary for making the air-fuel ratio of the air-fuel mixture supplied into the engine cylinder the stoichiometric air-fuel ratio. This basic fuel injection time TP is found in advance by experiments and is stored in a ROM in advance in the form of a map such as shown in FIG. 110 as a function of the engine load Q/N (amount of intake air Q/engine rotational speed N) and engine rotational speed N. The correction coefficient K is a coefficient for controlling the air-fuel ratio of the air-fuel mixture supplied into the engine cylinder, so if K=1.0, the air-fuel mixture supplied into the engine cylinder becomes the stoichiometric air-fuel ratio. As opposed to this, if K<1.0, air-fuel ratio of the air-fuel mixture supplied into the engine cylinder becomes larger than the stoichiometric air-fuel ratio, that is, becomes lean. If K>1.0, the air-fuel ratio of the air-fuel mixture supplied into the engine cylinder becomes smaller than the stoichiometric air-fuel ratio, that is, becomes rich.

Figure 112:
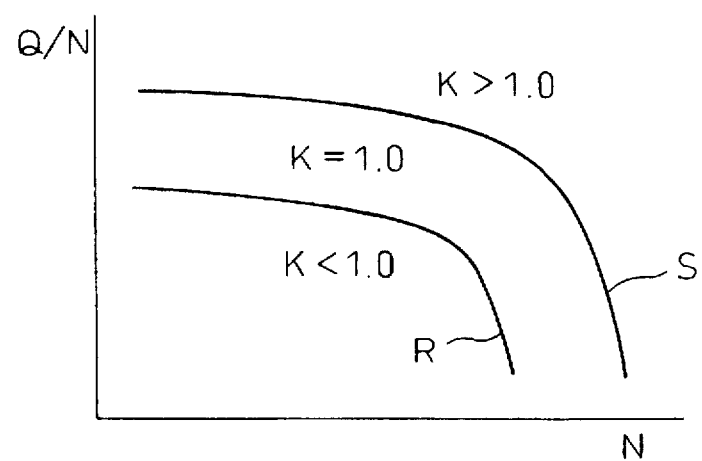
FIG. 112 is a view of the correction coefficient K.

The target air-fuel ratio of the air-fuel mixture to be supplied into the engine cylinder, that is, the value of the correction coefficient K, is changed in accordance with the operating state of the engine. In this embodiment, basically, as shown in FIG. 112, it is determined in advance as a function of the engine load Q/N and engine rotational speed N. That is, as shown in FIG. 112, in the low load operating region at the low load side of the solid line R, K<1.0, that is, the air-fuel mixture is made lean, in the high load operation region between the solid line R and the solid line S, K=1.0, that is, the air-fuel ratio of the air-fuel mixture is made the stoichiometric air-fuel ratio, while in the full load operation region at the high load side of the solid line S, K>1.0, that is, the air-fuel mixture is made rich.

Figure 111:
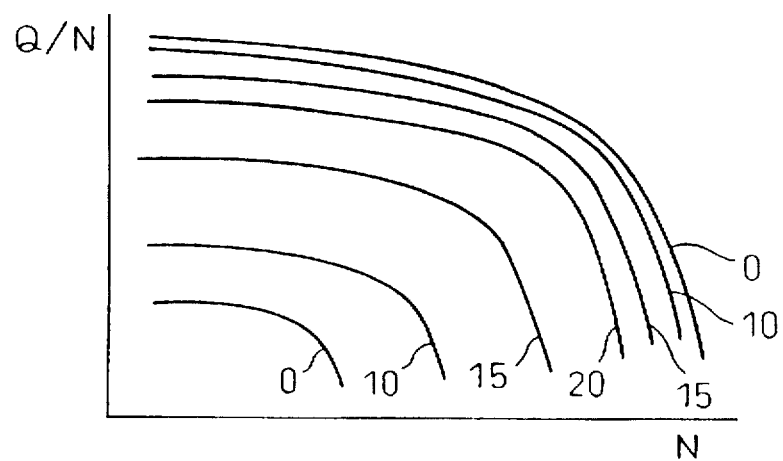
FIG. 111 is a view of the EGR rate.

FIG. 111 shows the EGR rate. The figures in FIG. 111 show the EGR rates. As shown in FIG. 111, the EGR rate is a function of the engine load Q/N and engine rotational speed N. This EGR rate is stored in advance in a ROM. The opening of the EGR valve 29 is controlled to give the EGR rate shown in FIG. 111.

Figure 113:
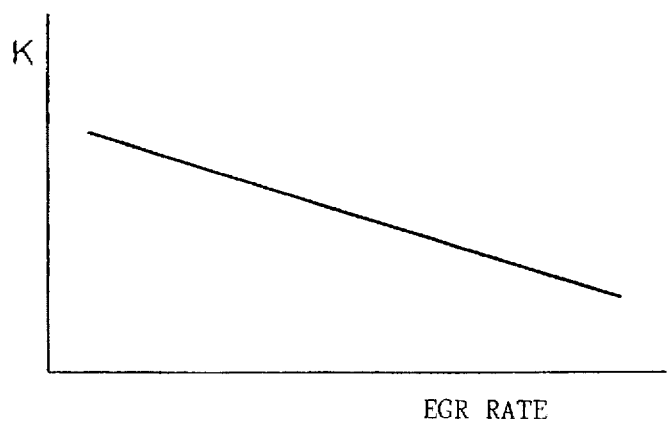
FIG. 113 is a view of the correction coefficient K.

As shown in FIG. 111, in this embodiment, the maximum value of the EGR rate is 20 percent. Accordingly, when the $NO_x$ is to be released from the $NO_x$ absorbent 26, the EGR rate is maintained as it is. FIG. 113 shows the relationship between the correction coefficient K and the EGR rate when making the air-fuel mixture rich to release the $NO_x$ from the $NO_x$ absorbent 26. The solid line shown in FIG. 113 corresponds to the misfire limit value SO shown in FIG. 101. Accordingly, in this embodiment as well, the degree of richness of the air-fuel mixture is made smaller the higher the EGR rate.

Figure 114:
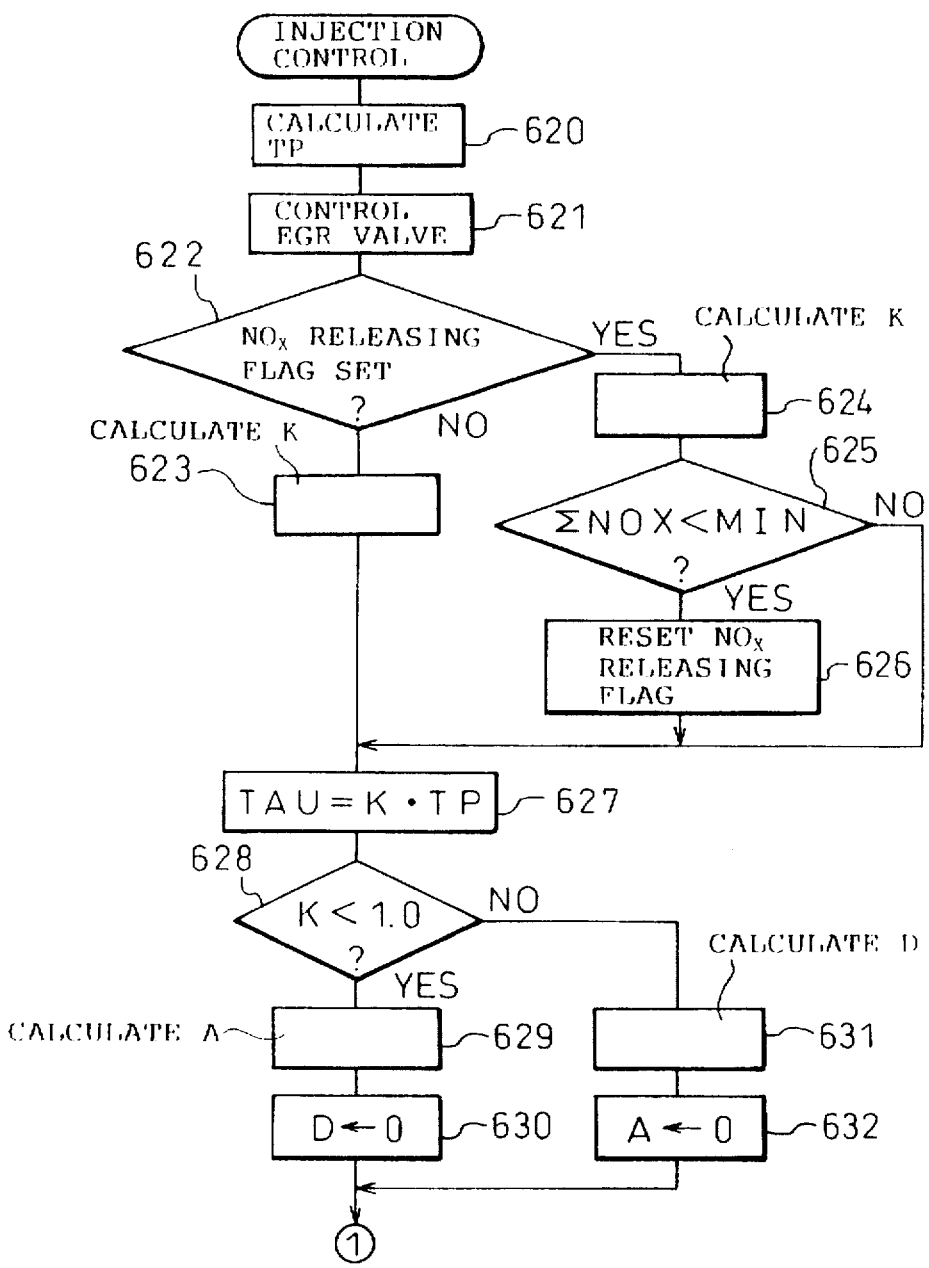
FIG. 114 and FIG. 115 are flow charts for injection control.
Figure 115:
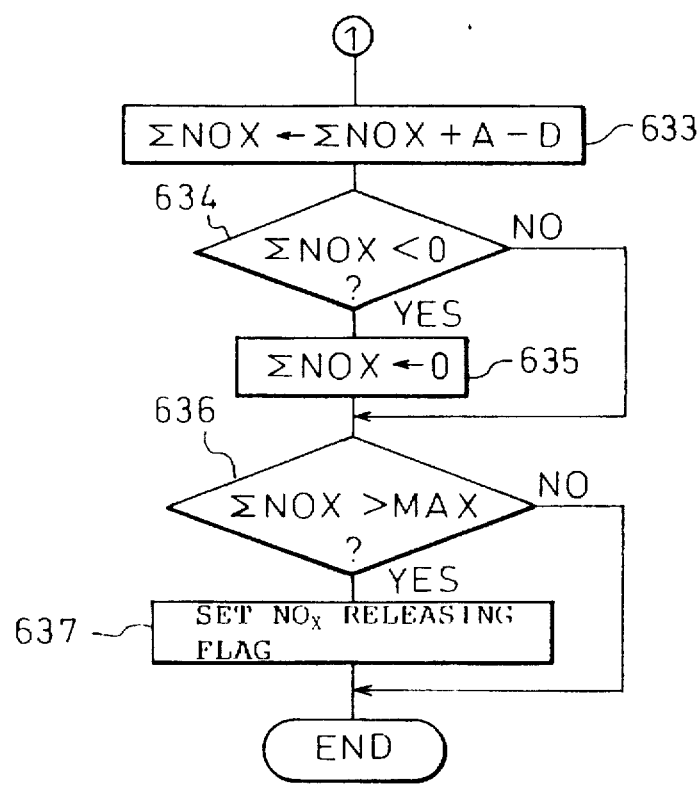

FIG. 114 and FIG. 115 show the routine for control of the fuel injection. This routine, for example, is executed by interruption every predetermined time interval.

Referring to FIG. 114 and FIG. 115, first of all, at step 620, the basic fuel injection time TP is calculated from the map shown in FIG. 110. Next, at step 261, the EGR rate is found from FIG. 111 and the opening of the EGR valve 29 is controlled so that this EGR rate is given. Next, at step 622, whether the $NO_x$ releasing flag is set or not is decided. When the $NO_x$ releasing flag is not set, step 623 is proceeded to, where the correction coefficient K is calculated based on FIG. 112. Next, at step 627, the fuel injection time TAU (=K·TP) is calculated from the basic fuel injection time TP and the correction coefficient K.

Next, at step 628, whether the correction coefficient K is smaller than 1.0 or not is decided. When K<1.0, step 629 is proceeded to, where the amount of $NO_x$ absorption A is calculated from the map shown in FIG. 14a. Next, at step 630, the $NO_x$ releasing D is made zero, then step 633 is proceeded to. On the other hand, when it is decided that K≧1.0 at step 628, step 631 is proceeded to, where the $NO_x$ releasing D is calculated from the map shown in FIG. 14B. Next, at step 632, the amount of $NO_x$ absorption A is made zero. Next, step 633 is proceeded to.

At step 633, the $NO_x$ amount $\Sigma NO_x$ (=$\Sigma NO_x$+A−D) estimated to be absorbed in the $NO_x$ absorbent 26 is calculated. Next, at step 634, whether the $\Sigma NO_x$ has become negative or not is decided. When $\Sigma NO_x$<0, step 635 is proceeded to, where the $\Sigma NO_x$ is made zero. Next, at step 636, whether the $\Sigma NO_x$>MAX or not is decided. When $\Sigma NO_x$>MAX, step 637 is proceeded to, where the $NO_x$ releasing flag is set.

On the other hand, when it is decided at step 622 that the $NO_x$ releasing flag is set, step 624 is proceeded to, where the correction coefficient K (>1.0) is calculated from relationship shown in FIG. 113. At this time, the air-fuel ratio of the air-fuel mixture is made rich, therefore the action of releasing the $NO_x$ from the $NO_x$ absorbent 26 is started. Next, at step 625, whether the $\Sigma NO_x$ has become smaller than the lower value MIN or not is decided. When $\Sigma NO_x$<MIN, step 626 is proceeded to, where the $NO_x$ releasing flag is reset.

We claim:

1. A method of purifying the exhaust of an internal combustion engine wherein an $NO_x$ absorbent which absorbs $NO_x$ when the air-fuel ratio of the inflowing exhaust gas flowing into the $NO_x$ absorbent is lean and releases the absorbed $NO_x$ when the air-fuel ratio of the inflowing exhaust gas becomes the stoichiometric air-fuel ratio or rich is arranged in the engine exhaust passage, wherein, when in a lean air-fuel mixture combustion operating state where the air-fuel mixture is burned in a state with a lean average air-fuel ratio in the combustion chamber, the air-fuel mixture formed in the combustion chamber is stratified to form an ignitable air-fuel mixture in a limited region of part of the inside of the combustion chamber and the $NO_x$ produced at this time is made to be absorbed in the $NO_x$ absorbent and when releasing the $NO_x$ from the $NO_x$ absorbent when in the lean air-fuel mixture combustion operating state, the average air-fuel ratio in the combustion chamber is changed from lean to the stoichiometric air-fuel ratio or rich and the amount of fluctuation of the ignitable air-fuel ratio of the air-fuel mixture formed in the limited region of part of the inside of the combustion chamber at this time is made smaller than the amount of reduction of the average air-fuel ratio.

2. A method of purifying the exhaust of an internal combustion engine as set forth in claim 1, wherein when releasing the $NO_x$ from the $NO_x$ absorbent, the fuel to be supplied is increased so that the average air-fuel ratio in the combustion chamber becomes the stoichiometric air-fuel ratio or rich and the incombustible air-fuel mixture formed by the increased fuel is used to fill the regions other than the above limited region of part of the chamber.

3. A method of purifying the exhaust of an internal combustion engine as set forth in claim 2, wherein said limited region of part of the combustion chamber is comprised of a cavity formed at the top of the piston, a combustible air-fuel mixture is formed in the cavity by fuel injected into the cavity at the end of the compression stroke when making the average air-fuel ratio in the combustion chamber lean, and additional fuel is supplied into the combustion chamber even during the intake stroke in addition to the end of the compression stroke when making the average air-fuel ratio in the combustion chamber the stoichiometric air-fuel ratio or rich so as to release the $NO_x$ from the $NO_x$ absorbent in the lean air-fuel mixture combustion operating state, the amount of fuel injected at the end of the compression stroke being reduced just slightly from the amount of additional fuel at the intake stroke so that the amounts of fuel forming the combustible air-fuel mixture in the cavity when making the average air-fuel ratio lean and making it the stoichiometric air-fuel ratio or rich become substantially the same and part of the fuel additionally supplied at the intake stroke forms the incombustible air-fuel mixture.

4. A method of purifying the exhaust of an internal combustion engine as set forth in claim 1, wherein when the engine is operating with a load lower than a predetermined set load, a combustible air-fuel mixture is formed in the limited region of part of the inside of the combustion chamber so that the average air-fuel ratio in the combustion chamber becomes lean, when the engine is operating with an engine load higher than the above set load, fuel is supplied into the combustion chamber at the time of the intake stroke and fuel forming the ignition source is injected into the combustion chamber at the end of the compression stroke so that the average air-fuel ratio in the combustion chamber becomes lean, and when releasing the $NO_x$ from the $NO_x$ absorbent when the engine is operating with an engine load higher than the above set load, the opening of a throttle valve provided in the intake passage being reduced so that the average air-fuel ratio in the combustion chamber becomes the stoichiometric air-fuel ratio or rich and the amount of fuel supplied during the intake stroke being increased so that the output torque of the engine is not reduced even if the opening of the throttle valve opening is reduced.

5. A method of purifying the exhaust of an internal combustion engine as set forth in claim 1, wherein when the average air-fuel ratio in the combustion chamber is changed from lean to the stoichiometric air-fuel ratio or rich so as to release the $NO_x$ from the $NO_x$ absorbent, the degree of stratification of the air-fuel mixture is reduced.

6. A method of purifying the exhaust of an internal combustion engine as set forth in claim 5, wherein when the average air-fuel ratio in the combustion chamber is changed from lean to the stoichiometric air-fuel ratio or rich so as to release the $NO_x$ from the $NO_x$ absorbent, the air-fuel mixture becomes substantially a homogeneous air-fuel mixture.

7. A method of purifying the exhaust of an internal combustion engine as set forth in claim 5, wherein when the average air-fuel ratio in the combustion chamber is changed from lean to the stoichiometric air-fuel ratio or rich so as to release the $NO_x$ from the $NO_x$ absorbent, the timing of supply of fuel into the combustion chamber is made earlier.

8. A method of purifying the exhaust of an internal combustion engine as set forth in claim 7, wherein when the average air-fuel ratio in the combustion chamber is changed from lean to the stoichiometric air-fuel ratio or rich so as to release the $NO_x$ from the $NO_x$ absorbent, the timing of supply of fuel is changed from the compression stroke to the intake stroke.

9. A method of purifying the exhaust of an internal combustion engine as set forth in claim 7, wherein the injection of fuel is made selective to the combustion chamber and intake port and, when releasing the $NO_x$ from the $NO_x$ absorbent, the average air-fuel ratio in the combustion chamber is changed from lean to the stoichiometric air-fuel ratio or rich by increasing the amount of fuel injected into the intake port.

10. A method of purifying the exhaust of an internal combustion engine as set forth in claim 7, wherein the injection of fuel is made selective to the combustion chamber and intake port and, when it is decided that $NO_x$ should be released from the $NO_x$ absorbent when fuel is being supplied only to the combustion chamber, the timing of injection of fuel into the combustion chamber is made earlier and the amount of fuel injected into the combustion chamber is increased to change the average air-fuel ratio in the combustion chamber from lean to the stoichiometric air-fuel ratio or rich, while when it is decided that $NO_x$ should be released from the $NO_x$ absorbent when fuel is being supplied to the intake port, the amount of fuel injected into the intake port is increased to change the average air-fuel ratio in the combustion chamber from lean to the stoichiometric air-fuel ratio or rich.

11. A method of purifying the exhaust of an internal combustion engine as set forth in claim 1, wherein when in the lean air-fuel mixture combustion operating state, fuel is supplied to the region around the spark plug to form an ignitable air-fuel mixture in the region around the spark plug, while when releasing $NO_x$ from the $NO_x$ absorbent, fuel is supplied and dispersed to regions other than around the spark plug as well.

12. A method of purifying the exhaust of an internal combustion engine as set forth in claim 11, wherein the region around the spark plug is comprised of a cavity formed in the top of the piston and when releasing $NO_x$ from the $NO_x$ absorbent, fuel is supplied to regions other than the cavity.

13. A method of purifying the exhaust of an internal combustion engine as set forth in claim 1, wherein when in the lean air-fuel mixture combustion operating state, a swirl flow is caused in the combustion chamber and the air-fuel mixture in the combustion chamber is stratified, while when releasing $NO_x$ from the $NO_x$ absorbent, the swirl flow is weakened to lower the degree of stratification of the air-fuel mixture.

14. A method of purifying the exhaust of an internal combustion engine as set forth in claim 13, wherein when releasing $NO_x$ from the $NO_x$ absorbent, the air-fuel mixture in the combustion chamber is made substantially a homogeneous air-fuel mixture.

15. A method of purifying the exhaust of an internal combustion engine as set forth in claim 1, wherein when the average air-fuel ratio in the combustion chamber is changed from lean to the stoichiometric air-fuel ratio or rich so as to release the $NO_x$ from the $NO_x$ absorbent, the oxygen concentration around the spark plug is increased.

16. A method of purifying the exhaust of an internal combustion engine as set forth in claim 15, wherein when the average air-fuel ratio in the combustion chamber is changed from lean to the stoichiometric air-fuel ratio or rich so as to release the $NO_x$ from the $NO_x$ absorbent, the amount of intake air supplied from the intake port to the combustion chamber is increased to increase the oxygen concentration around the spark plug.

17. A method of purifying the exhaust of an internal combustion engine as set forth in claim 16, wherein when the average air-fuel ratio in the combustion chamber is changed from lean to the stoichiometric air-fuel ratio or rich so as to release the $NO_x$ from the $NO_x$ absorbent, the amount of recirculated exhaust gas recirculated to the combustion chamber is reduced so as to increase the amount of intake air supplied from the intake port to the combustion chamber.

18. A method of purifying the exhaust of an internal combustion engine as set forth in claim 17, wherein when releasing $NO_x$ from the $NO_x$ absorbent, the average air-fuel ratio in the combustion chamber is changed from lean to the stoichiometric air-fuel ratio or rich after the reducing the amount of recirculated exhaust gas recirculated to the combustion chamber.

19. A method of purifying the exhaust of an internal combustion engine as set forth in claim 15, wherein when the average air-fuel ratio in the combustion chamber is changed from lean to the stoichiometric air-fuel ratio or rich so as to release the $NO_x$ from the $NO_x$ absorbent, air is locally supplied around the spark plug so as to increase the oxygen concentration around the spark plug.

20. A method of purifying the exhaust of an internal combustion engine as set forth in claim 19, wherein when the average air-fuel ratio in the combustion chamber is changed from lean to the stoichiometric air-fuel ratio or rich so as to release the $NO_x$ from the $NO_x$ absorbent, air is injected toward the air-fuel mixture formed around the spark plug so as to locally supply air around the spark plug.

21. A method of purifying the exhaust of an internal combustion engine as set forth in claim 1, wherein the air-fuel mixture in the combustion chamber is switched between a strong stratifying state, a weak stratifying state with a degree of stratification lower than the strong stratifying state, and a substantially homogeneous state in accordance with the engine operating state and when switching from the strong stratifying state to the substantially homogeneous state so as to release $NO_x$ from the $NO_x$ absorbent, it is switched first to the weak stratifying state and then to the substantially homogeneous state.

22. A method of purifying the exhaust of an internal combustion engine as set forth in claim 1, wherein the air-fuel mixture in the combustion chamber is switched between a strong stratifying state, a weak stratifying state with a degree of stratification lower than the strong stratifying state, and a substantially homogeneous state in accordance with the engine operating state and when switching from the strong stratifying state to the substantially homogeneous state so as to release $NO_x$ from the $NO_x$ absorbent, one of two switching methods, that is, switching first to the weak stratifying state and then to the substantially homogeneous state or switching directly from the strong stratifying state to the substantially homogeneous state, is selected depending on the engine operating state.

23. A method of purifying the exhaust of an internal combustion engine as set forth in claim 1, wherein there are a first operating state where the air-fuel mixture in the combustion chamber becomes the strong stratifying state and a second operating state where the air-fuel mixture in the combustion chamber becomes a state with a degree of stratification lower than the strong stratifying state or a substantially homogeneous state, and when changing from the second operating state to the first operating state when in a state for releasing of $NO_x$ from the $NO_x$ absorbent, the average air-fuel ratio in the combustion chamber is changed to the stoichiometric air-fuel ratio or rich so as to release the $NO_x$ from the $NO_x$ absorbent in the second operating state, then the operating state is changed to the first operating state.

24. A method of purifying the exhaust of an internal combustion engine as set forth in claim 1, wherein there are a first operating state where the air-fuel mixture in the combustion chamber becomes the strong stratifying state and a second operating state where the air-fuel mixture in the combustion chamber becomes a state with a degree of stratification lower than the strong stratifying state or a substantially homogeneous state, and when changing from the first operating state to the second operating state when in a state for releasing of $NO_x$ from the $NO_x$ absorbent, the average air-fuel ratio in the combustion chamber is changed to the stoichiometric air-fuel ratio or rich so as to release the $NO_x$ from the $NO_x$ absorbent in the second operating state, immediately after the change to the second operating state.

25. A method of purifying the exhaust of an internal combustion engine as set forth in claim 1, wherein there are a first operating state where the air-fuel mixture in the combustion chamber becomes the strong stratifying state and a second operating state where the air-fuel mixture in the combustion chamber becomes a state with a degree of stratification lower than the strong stratifying state or a substantially homogeneous state, and when releasing $NO_x$ from the $NO_x$ absorbent when in the first operating state, additional fuel is supplied into the combustion chamber in the expansion stroke or exhaust stroke, while when releasing $NO_x$ from the $NO_x$ absorbent when in the second operating state, the fuel supplied in the combustion chamber during the intake stroke is increased.

26. An apparatus for purifying the exhaust of an internal combustion engine as set forth in claim 1, wherein when releasing $NO_x$ from the $NO_x$ absorbent when the transmission is not in a neutral position, additional fuel is supplied in the combustion chamber in the expansion stroke or exhaust stroke while when releasing $NO_x$ from the $NO_x$ absorbent when the transmission is in the neutral position, the fuel supplied in the combustion chamber in the intake stroke is increased.

27. An apparatus for purifying the exhaust of an internal combustion engine as set forth in claim 1, wherein when releasing $NO_x$ from the $NO_x$ absorbent when a torque converter of the automatic transmission is in a direct connection state, additional fuel is supplied in the combustion chamber in the expansion stroke or exhaust stroke, while when releasing $NO_x$ from the $NO_x$ absorbent when the torque converter of the automatic transmission is not in the direct connection state, the fuel supplied in the combustion chamber in the intake stroke is increased.

28. A method for purifying the exhaust of an internal combustion engine as set forth in claim 1, wherein when the $NO_x$ amount estimated to be absorbed in the $NO_x$ absorbent exceeds a predetermined set value and the vehicle is at a stop, the average air-fuel ratio in the combustion chamber is changed from lean to the stoichiometric air-fuel ratio or rich so as to release $NO_x$ from the $NO_x$ absorbent.

29. A method for purifying the exhaust of an internal combustion engine as set forth in claim 1, wherein when the $NO_x$ amount estimated to be absorbed in the $NO_x$ absorbent exceeds a predetermined set value and when the transmission is placed in the neutral position, the average air-fuel ratio in the combustion chamber is changed from lean to the stoichiometric air-fuel ratio or rich so as to release the $NO_x$ from the $NO_x$ absorbent.

30. A method for purifying the exhaust of an internal combustion engine as set forth in claim 1, wherein when the $NO_x$ amount estimated to be absorbed in the $NO_x$ absorbent exceeds a predetermined set value and when a shift operation is performed, the average air-fuel ratio in the combustion chamber is changed from lean to the stoichiometric air-fuel ratio or rich so as to release the $NO_x$ from the $NO_x$ absorbent.

31. A method for purifying the exhaust of an internal combustion engine as set forth in claim 1, wherein when the air-fuel ratio of the exhaust gas flowing into the $NO_x$ absorbent is changed to the stoichiometric air-fuel ratio or rich so as to release the $NO_x$ from the $NO_x$ absorbent, the amount of the unburnt fuel which is recirculated through the exhaust gas recirculation passage into the engine intake passage is reduced.

32. A method for purifying the exhaust of an internal combustion engine as set forth in claim 31, wherein when the air-fuel ratio of the exhaust gas flowing into the $NO_x$ absorbent is made the stoichiometric air-fuel ratio or rich so as to release the $NO_x$ from the $NO_x$ absorbent, the amount of the recirculated exhaust gas which is recirculated through the exhaust gas recirculation passage into the engine intake passage is reduced.

33. A method for purifying the exhaust of an internal combustion engine as set forth in claim 32, wherein when the air-fuel ratio of the exhaust gas flowing into the $NO_x$ absorbent is made the stoichiometric air-fuel ratio or rich so as to release the $NO_x$ from the $NO_x$ absorbent, the amount of intake air is reduced along with the reduction of the amount of the recirculated exhaust gas.

34. A method for purifying the exhaust of an internal combustion engine as set forth in claim 31, wherein when the air-fuel ratio of the exhaust gas flowing into the $NO_x$ absorbent is made the stoichiometric air-fuel ratio of rich so as to release the $NO_x$ from the $NO_x$ absorbent, the exhaust gas passes through an unburnt fuel eliminating device for eliminating unburnt fuel and is recirculated into the engine intake passage, while when the air-fuel ratio of the exhaust gas flowing into the $NO_x$ absorbent is lean, the exhaust gas is recirculated into the engine intake passage without passing through the unburnt fuel eliminating device.

35. A method for purifying the exhaust of an internal combustion engine as set forth in claim 1, wherein when the air-fuel ratio of the exhaust gas flowing into the $NO_x$ absorbent is made the stoichiometric air-fuel ratio or rich so as to release the $NO_x$ from the $NO_x$ absorbent, the oxygen concentration in the engine combustion chamber is increased.

36. A method for purifying the exhaust of an internal combustion engine as set forth in claim 35, wherein when the air-fuel ratio of the exhaust gas flowing into the $NO_x$ absorbent is made the stoichiometric air-fuel ratio or rich so as to release the $NO_x$ from the $NO_x$ absorbent, oxygen is supplied into the engine combustion chamber.

37. A method for purifying the exhaust of an internal combustion engine as set forth in claim 1, wherein when recirculating exhaust gas into the engine intake passage and releasing $NO_x$ from the $NO_x$ absorbent and when the rate of recirculation of the exhaust gas is high, the degree of richness of the exhaust gas flowing into the $NO_x$ absorbent is made smaller than that when it is low.

38. A method for purifying the exhaust of an internal combustion engine as set forth in claim 37, wherein when releasing $NO_x$ from the $NO_x$ absorbent and when the rate of recirculation of the exhaust gas is higher than a predetermined allowable recirculation rate, the rate of recirculation of the exhaust gas is made lower than the allowable recirculation rate.

39. A method for purifying the exhaust of an internal combustion engine as set forth in claim 37, wherein when releasing the $NO_x$ from the $NO_x$ absorbent, if the rate of recirculation of the exhaust gas is lower than a predetermined recirculation rate, the rate of recirculation of the exhaust gas is maintained unchanged before the $NO_x$ releasing action and during the $NO_x$ releasing action.

* * * * *

UNITED STATES PATENT AND TRADEMARK OFFICE
CERTIFICATE OF CORRECTION

PATENT NO. : 5,775,099

DATED : July 7, 1998

INVENTOR(S) : Yasushi ITO, et al.

It is certified that error appears in the above-identified patent and that said Letters Patent is hereby corrected as shown below:

Column 3, line 57, sentence beginning with "FIG. 66" should continue on line 56 after "FIG. 65 and"

Column 4 line 11 "FIG. 79" should begin a new paragraph.

Column 9, line 58, change "$O^{-2}$" to --$O^{2-}$--.

Column 14, line 9, change "<" to --$\leq$--.

Column 15, line 49, change "No," to --$NO_x$--.

Column 16, line 51, change ">" to --$\geq$--.

Column 16, line 66, change ">" to --$\geq$--.

Column 17, line 3, change ">" to --$\geq$--.

Column 17, line 26, change "No," to --$NO_x$--.

Column 20, line 33, change "<" to --$\leq$--.

Column 20, line 55, change "<" to --$\leq$--.

UNITED STATES PATENT AND TRADEMARK OFFICE
CERTIFICATE OF CORRECTION

PATENT NO. : 5,775,099

DATED : July 7, 1998

INVENTOR(S) : Yasushi ITO, et al.

It is certified that error appears in the above-identified patent and that said Letters Patent is hereby corrected as shown below:

Column 23, line 51, change "No," to $-NO_x-$.

Column 24, line 8, change "<" to $-\leq-$.

Column 24, line 53, change "<" to $-\leq-$.

Column 24, line 54, change "<" to $-\leq-$.

Column 27, line 3, change "<" to $-\leq-$.

Column 31, line 48, change "<" to $-\leq-$.

Column 32, line 6, change "on" to -On-.

Column 32, line 6, change "<" to $-\leq-$.

Column 33, line 1, change "<" to $-\leq-$.

Column 33, line 64, change "No," to $-NO_x-$.

Column 34, line 53, change "Whei" to -When-.

Column 35, line 10, delete the comma after "L".

Column 36, line 12, change ">" to $-\geq-$.

Column 45, line 30, change "So" to $-S_0-$.

UNITED STATES PATENT AND TRADEMARK OFFICE
CERTIFICATE OF CORRECTION

PATENT NO. : 5,775,099

DATED : July 7, 1998

INVENTOR(S) :
Yasushi ITO, et al.

It is certified that error appears in the above-identified patent and that said Letters Patent is hereby corrected as shown below:

Column 45, line 34, change "So" to --$S_0$--.

Column 49, line 61, change "So" to --$S_0$--.

Signed and Sealed this

Twenty-ninth Day of May, 2001

Attest:

NICHOLAS P. GODICI

*Attesting Officer*         *Acting Director of the United States Patent and Trademark Office*